(12) United States Patent
Krivoruchko et al.

(10) Patent No.: US 12,271,531 B2
(45) Date of Patent: Apr. 8, 2025

(54) DEVICES, METHODS, AND GRAPHICAL USER INTERFACES FOR USING A CURSOR TO INTERACT WITH THREE-DIMENSIONAL ENVIRONMENTS

(71) Applicant: Apple Inc., Cupertino, CA (US)

(72) Inventors: Evgenii Krivoruchko, San Francisco, CA (US); Benjamin H. Boesel, Sunnyvale, CA (US); Jia Wang, Redmond, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/402,581

(22) Filed: Jan. 2, 2024

(65) Prior Publication Data

US 2024/0256049 A1 Aug. 1, 2024

Related U.S. Application Data

(60) Provisional application No. 63/541,745, filed on Sep. 29, 2023, provisional application No. 63/470,407, filed on Jun. 1, 2023, provisional application No. 63/439,703, filed on Jan. 18, 2023.

(51) Int. Cl.
*G06F 3/01* (2006.01)
*G06F 3/04815* (2022.01)
*G06F 3/04842* (2022.01)
*G06F 3/0485* (2022.01)

(52) U.S. Cl.
CPC .............. *G06F 3/017* (2013.01); *G06F 3/011* (2013.01); *G06F 3/04815* (2013.01); *G06F 3/04842* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 8,457,353 B2 | 6/2013 | Reville et al. | |
| 10,261,595 B1* | 4/2019 | Kin | G06F 3/04815 |
| 10,871,891 B2* | 12/2020 | Choi | G06F 3/04886 |
| 2012/0157203 A1 | 6/2012 | Latta | |
| 2012/0272179 A1* | 10/2012 | Stafford | G06F 3/0482 |
| | | | 345/157 |
| 2013/0181897 A1 | 7/2013 | Izumi | |
| 2015/0040040 A1* | 2/2015 | Balan | G06F 3/011 |
| | | | 715/762 |
| 2015/0220149 A1* | 8/2015 | Plagemann | G06F 3/017 |
| | | | 715/856 |
| 2018/0088792 A1* | 3/2018 | Klein | G06F 3/017 |
| 2019/0094981 A1 | 3/2019 | Bradski | |
| 2022/0382377 A1 | 12/2022 | Hosseinkhani Loorak et al. | |

OTHER PUBLICATIONS

International Search Report and Written Opinion received for PCT Patent Application No. PCT/US2024/011931, mailed on May 29, 2024, 23 pages.
Tan et al., "Informatics in Radiology: Developing a Touchless User Interface for Intraoperative Image Control during Interventional Radiology Procedures", Radiographics. vol. 33, No. 2, Apr. 30, 2013, 10 pages.

* cited by examiner

*Primary Examiner* — Matthew Yeung
(74) *Attorney, Agent, or Firm* — DLA Piper LLP (US)

(57) ABSTRACT

Techniques for controlling and/or moving a cursor, such as by using air gestures, are described.

72 Claims, 56 Drawing Sheets

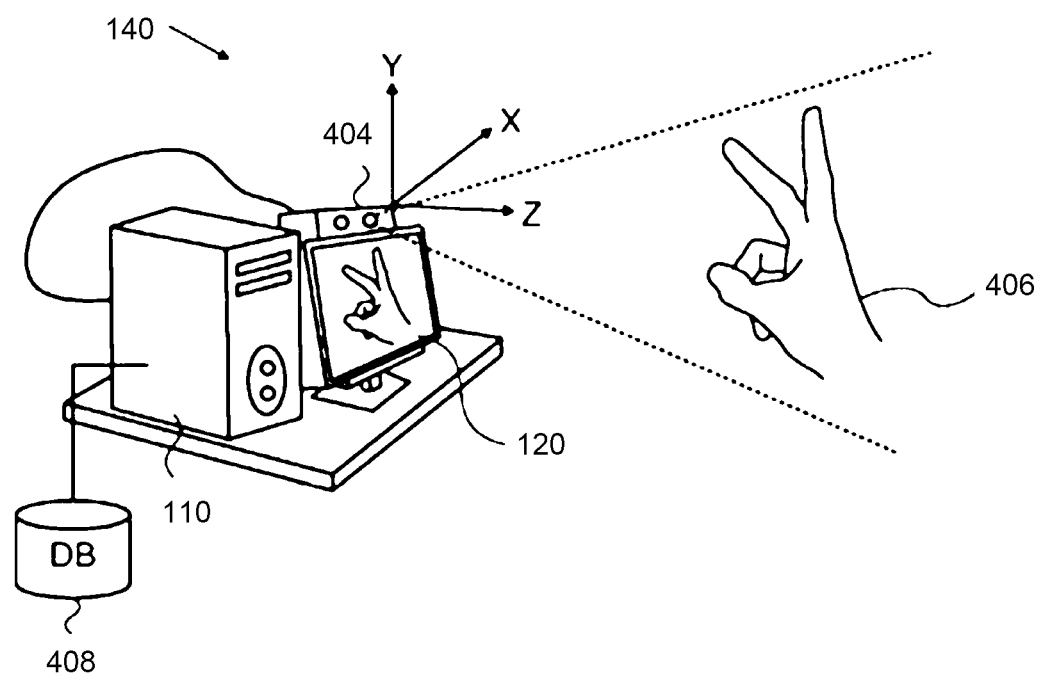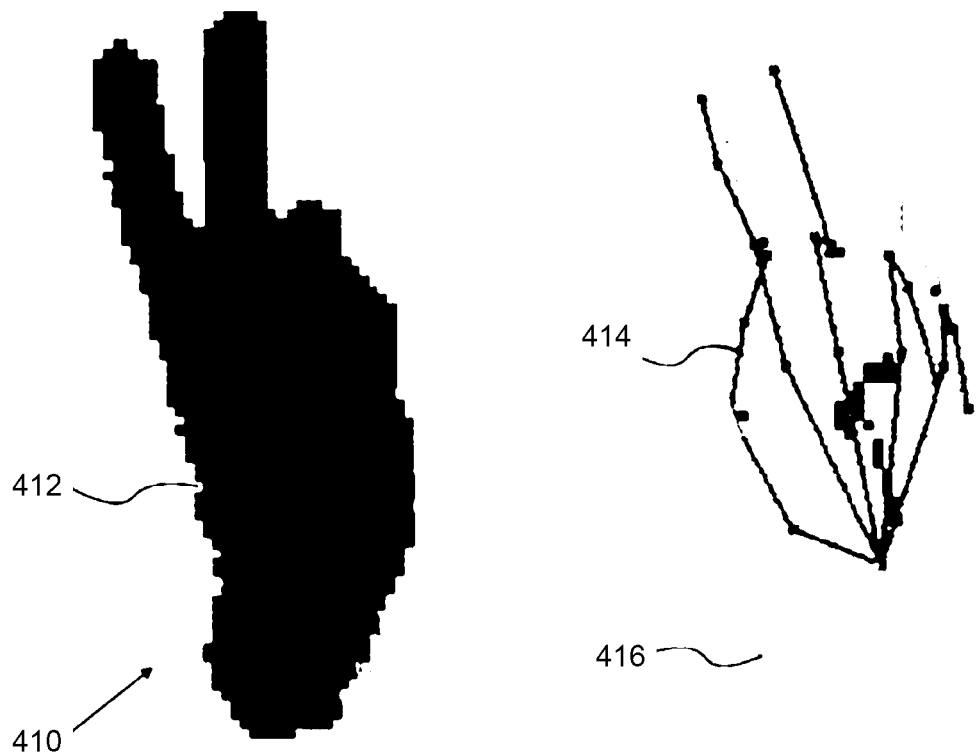
FIG. 4

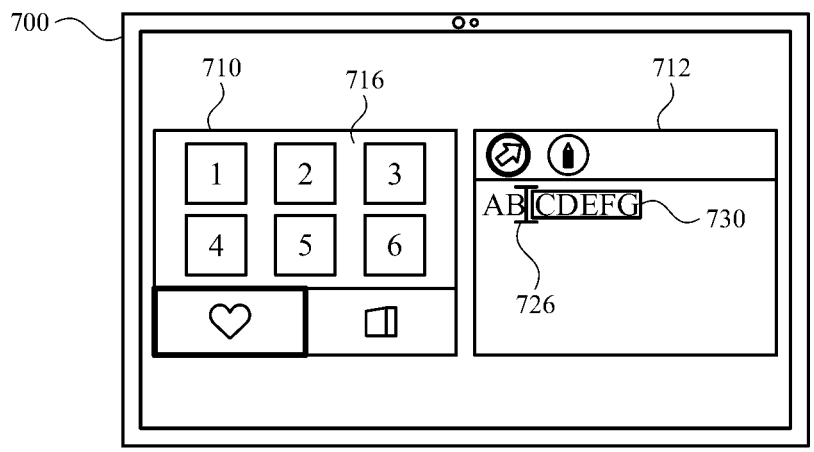
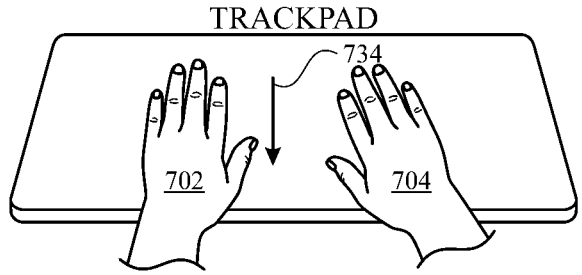
*FIG. 7C*
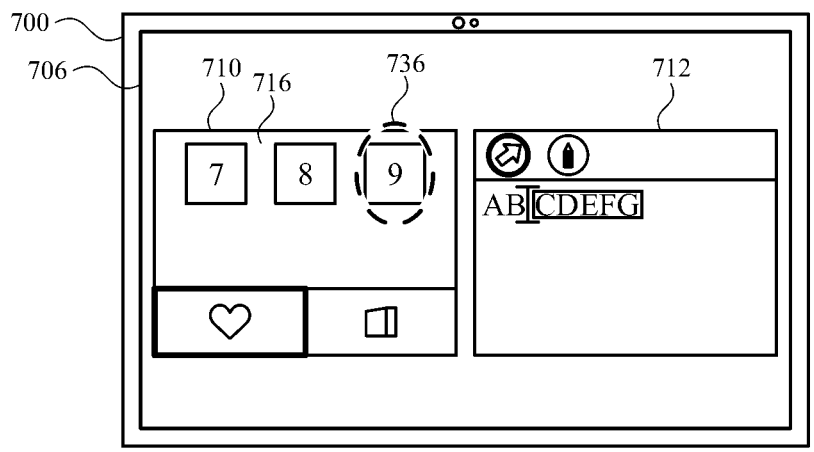
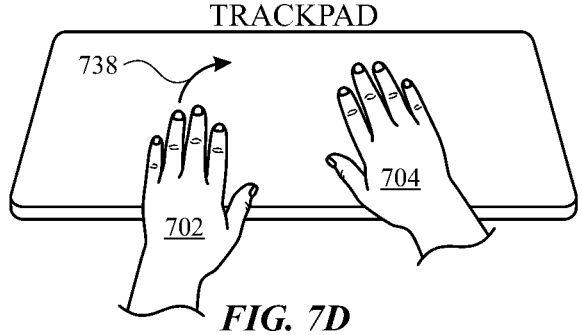
*FIG. 7D*

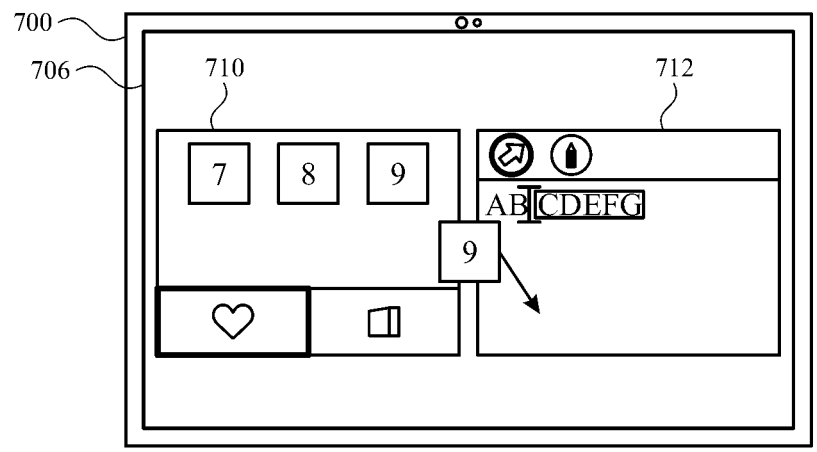
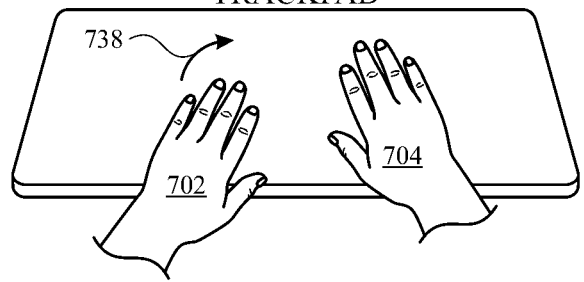
FIG. 7E
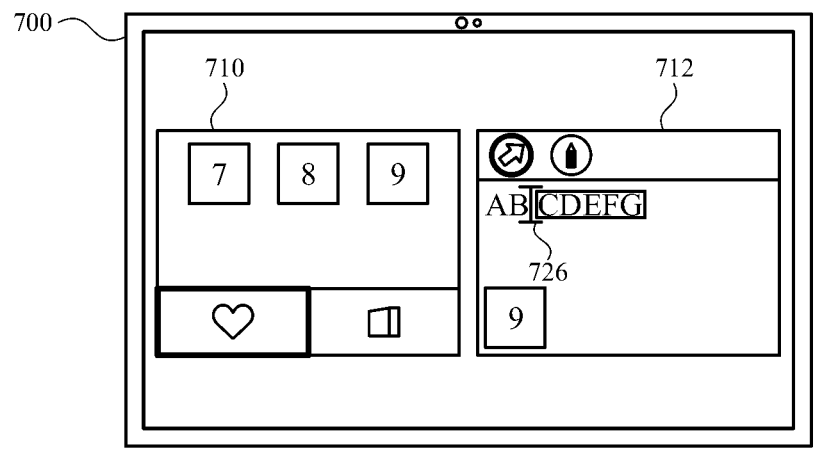
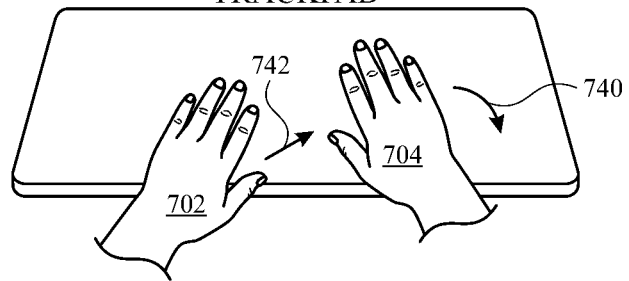
FIG. 7F1

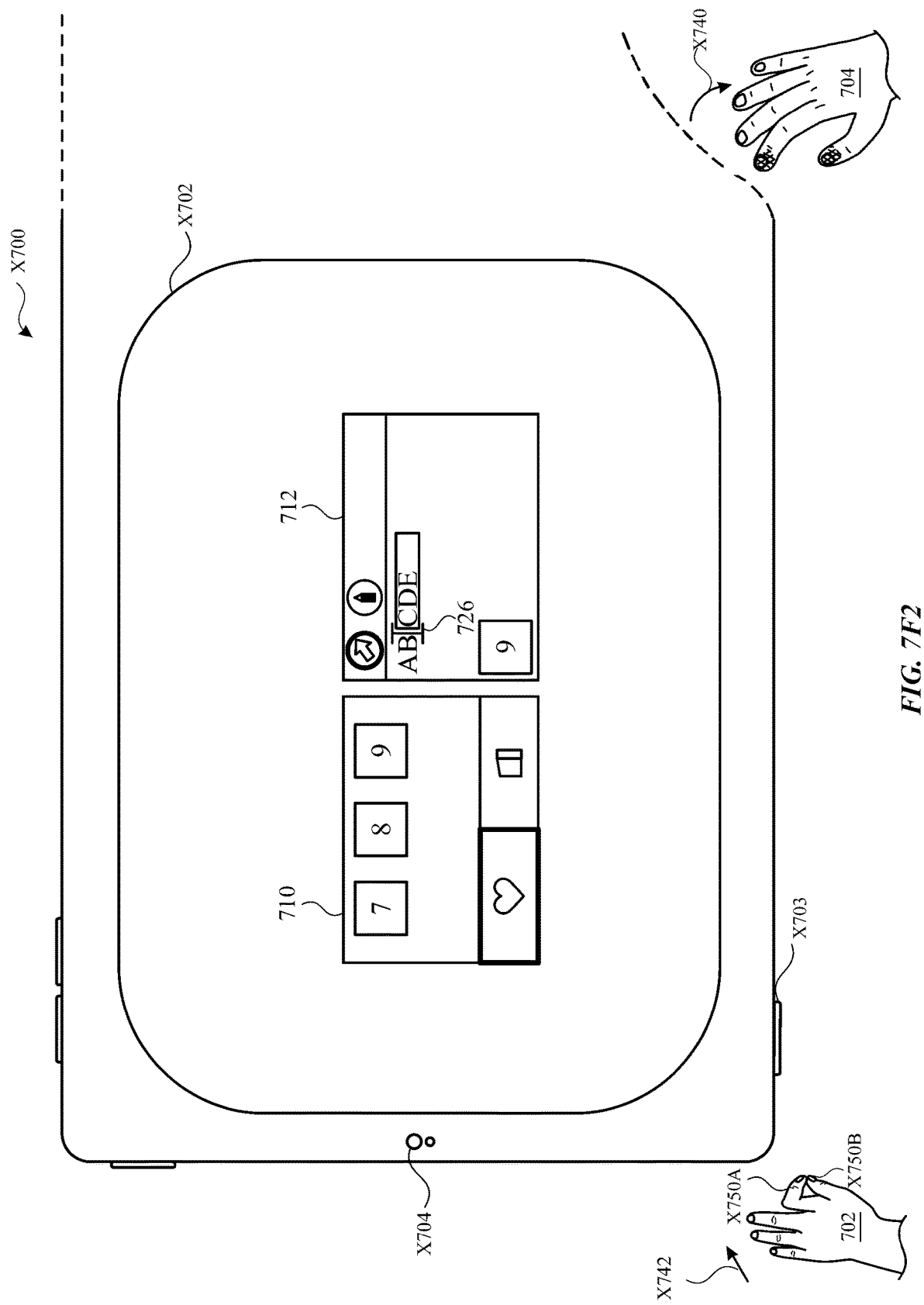
FIG. 7F2

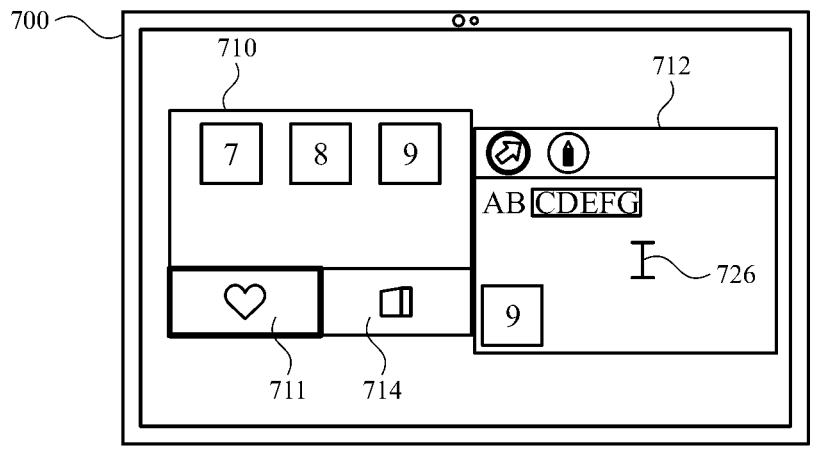
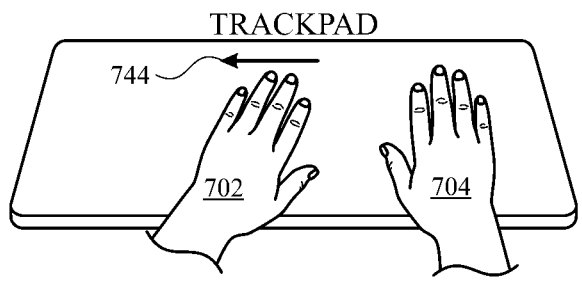
*FIG. 7G*
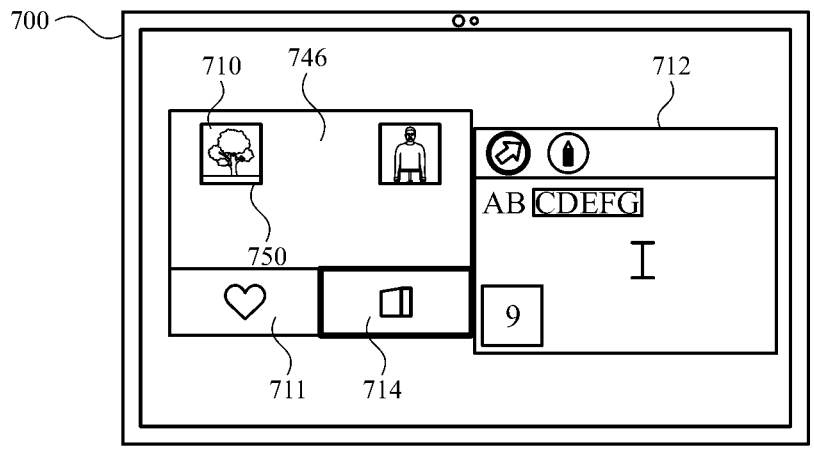
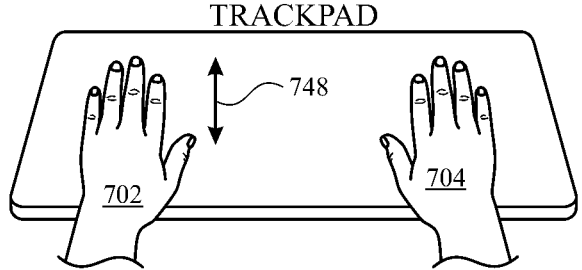
*FIG. 7H*

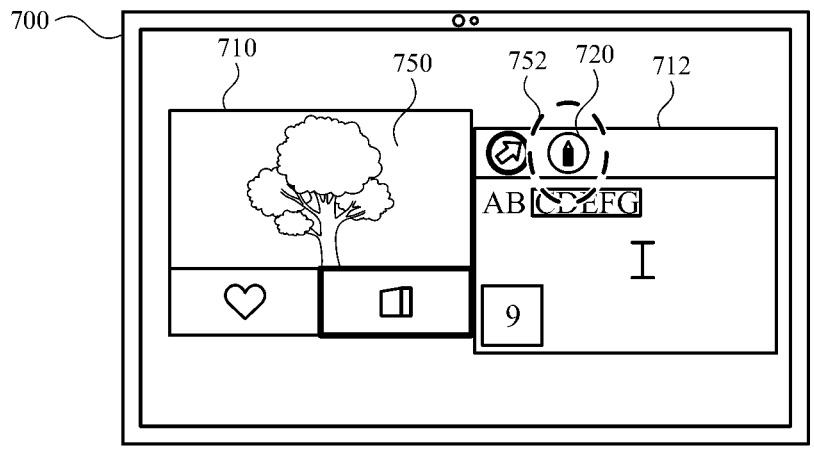
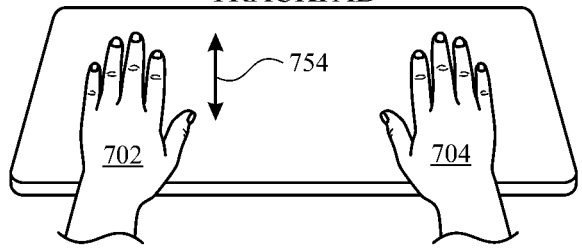
*FIG. 7I*
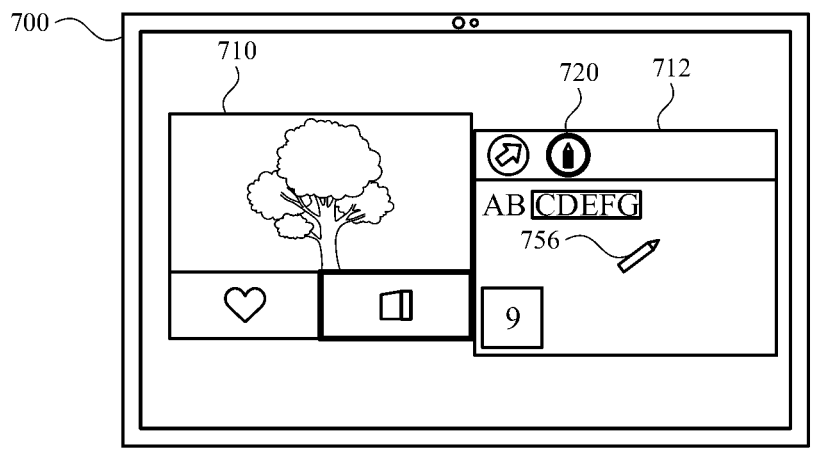
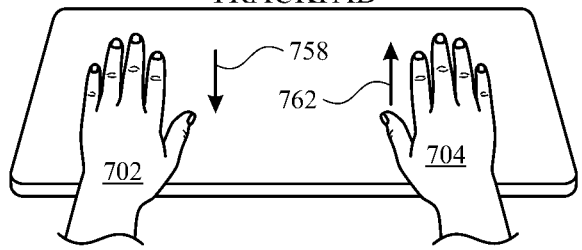
*FIG. 7J*

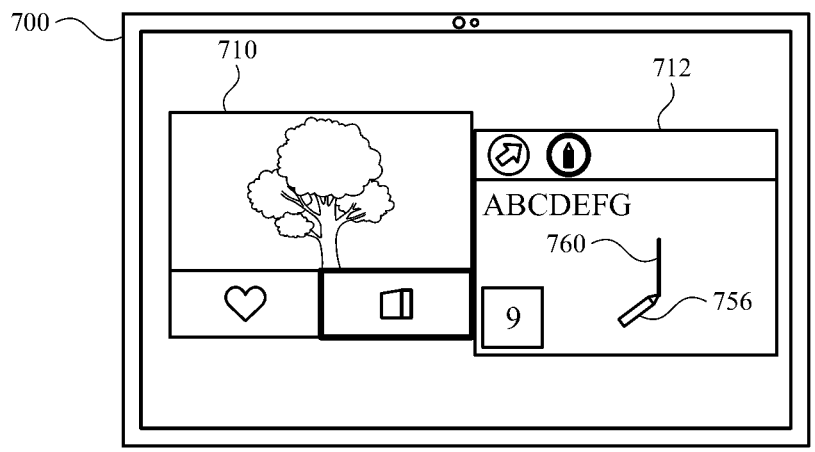
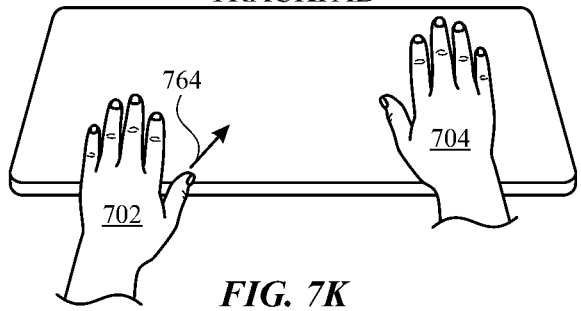
*FIG. 7K*
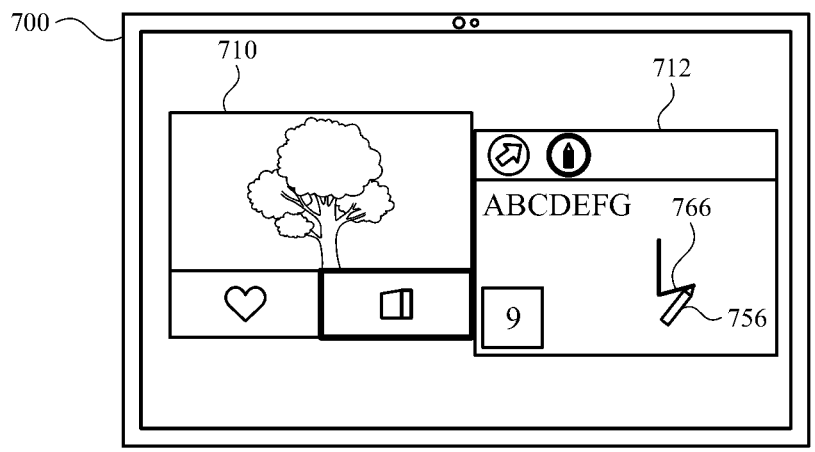
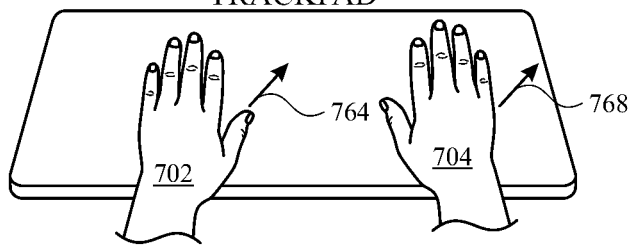
*FIG. 7L*

800 

```
┌─────────────────────────────────────────────────────────────────────────┐
│                                   802                                   │
│  Detecting, via the one or more input devices, movement of a respective │
│              hand of a user of the computer system                      │
└─────────────────────────────────────────────────────────────────────────┘
                                    ↓
┌─────────────────────────────────────────────────────────────────────────┐
│                                   804                                   │
│                    In response to detecting the movement:               │
│                                                                         │
│   ┌─────────────────────────────────────────────────────────────────┐   │
│   │                             806                                 │   │
│   │ In accordance with a determination that the movement of the     │   │
│   │ respective hand satisfies a first set of criteria, wherein the  │   │
│   │ first set of criteria includes a first criterion that is        │   │
│   │ satisfied when the movement of the respective hand is movement  │   │
│   │ of a first hand of the user of the computer system different    │   │
│   │ from a second hand of the user of the computer system, changing │   │
│   │ a position of a cursor based on the movement of the respective  │   │
│   │ hand                                                            │   │
│   └─────────────────────────────────────────────────────────────────┘   │
│                                                                         │
│   ┌─────────────────────────────────────────────────────────────────┐   │
│   │                             808                                 │   │
│   │ In accordance with a determination that the movement of the     │   │
│   │ respective hand does not satisfy the first set of criteria,     │   │
│   │ forgoing changing the position of the cursor based on the       │   │
│   │ movement of the respective hand                                 │   │
│   └─────────────────────────────────────────────────────────────────┘   │
└─────────────────────────────────────────────────────────────────────────┘
```

*FIG. 8*

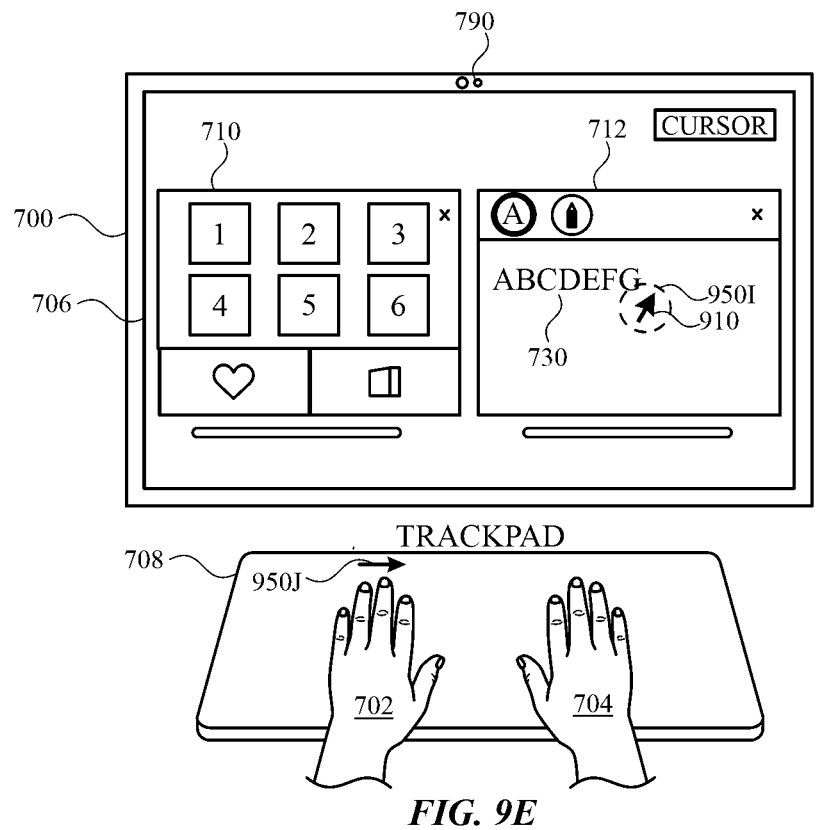
FIG. 9E
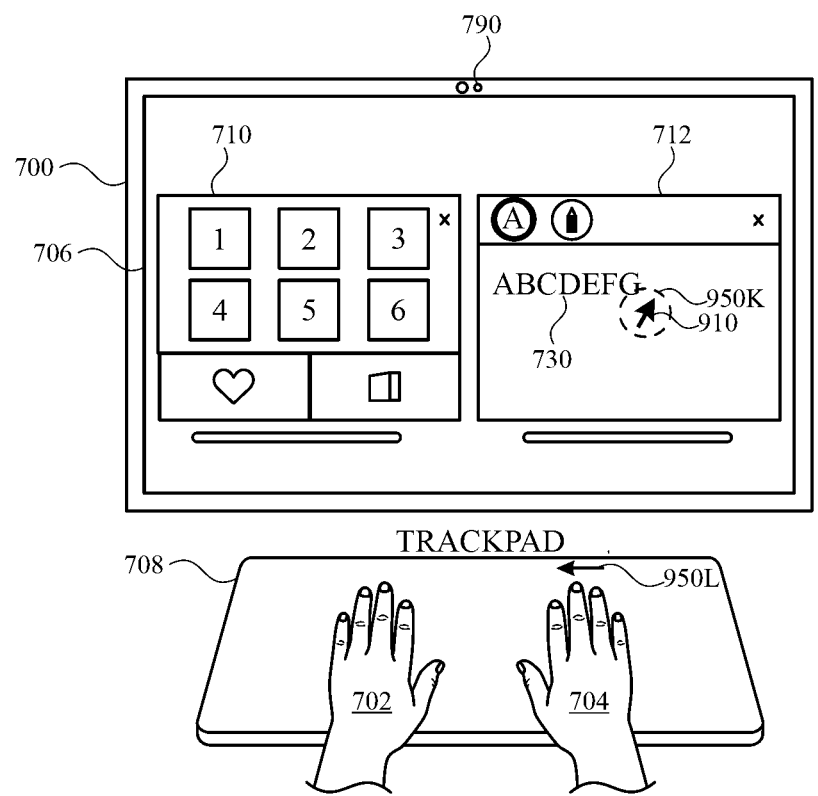
FIG. 9F1

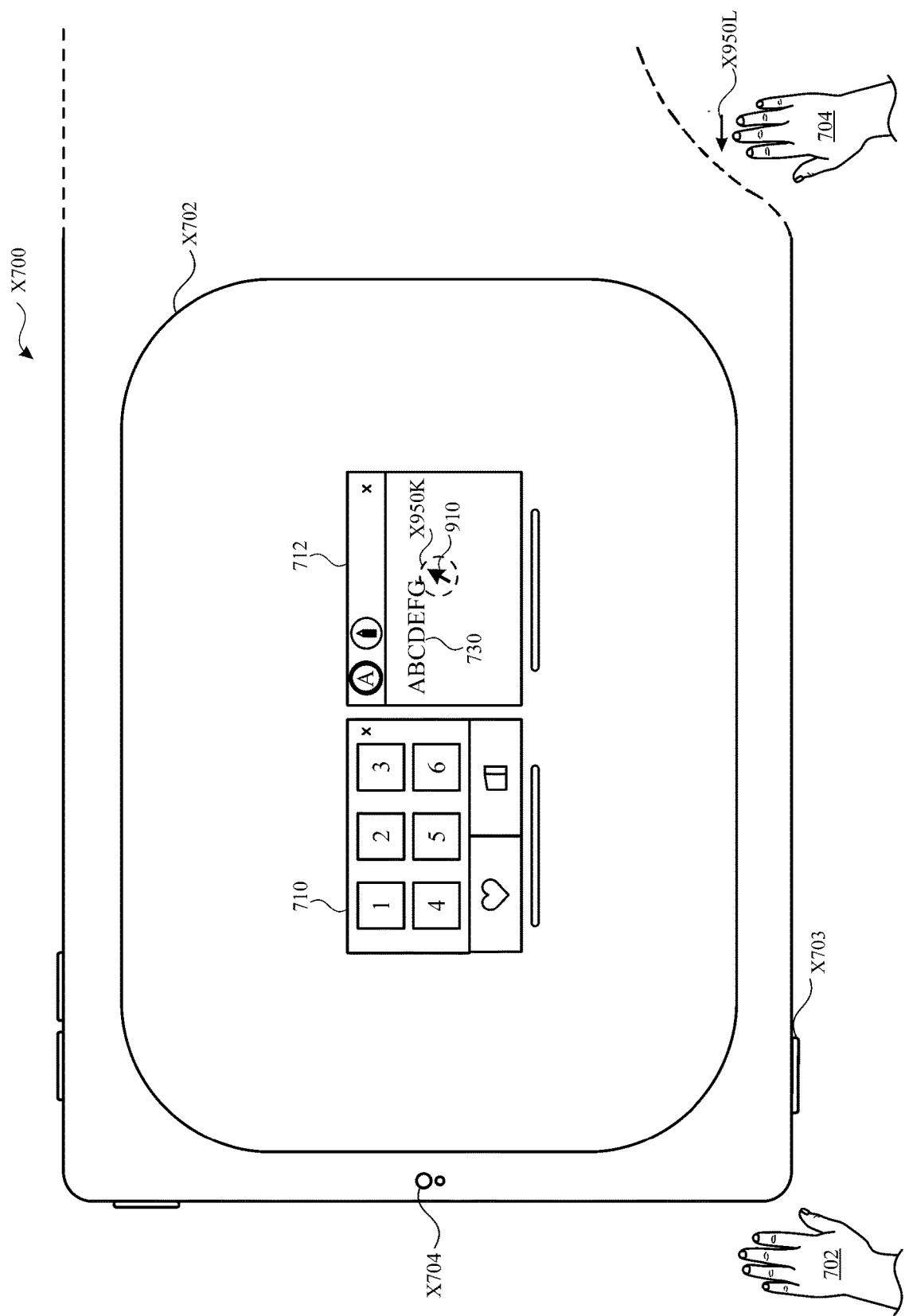
FIG. 9F2

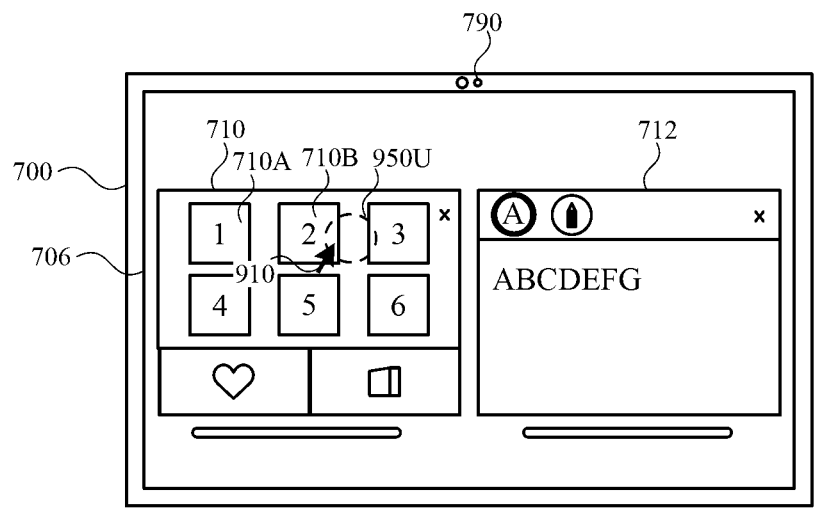
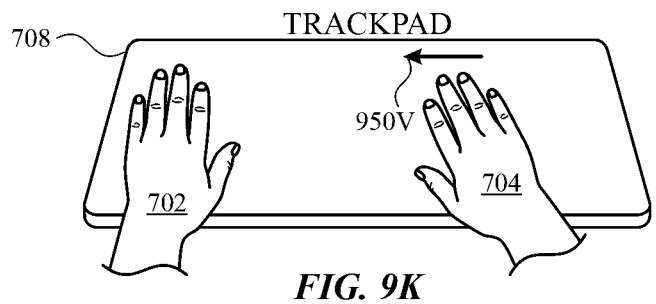
*FIG. 9K*
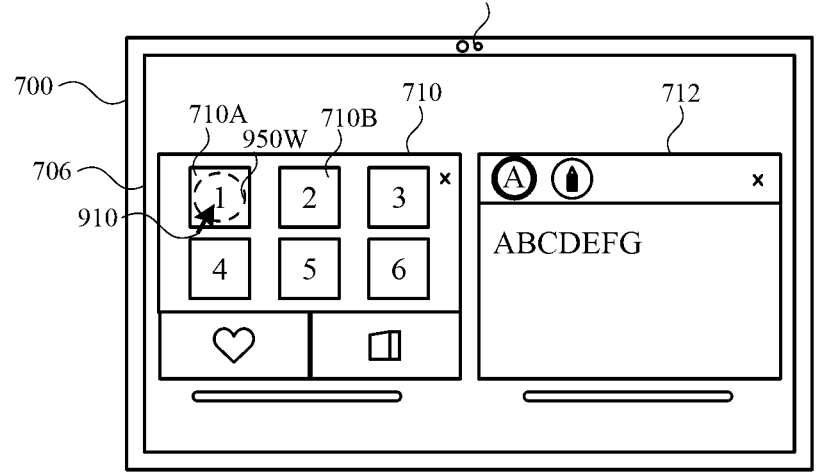
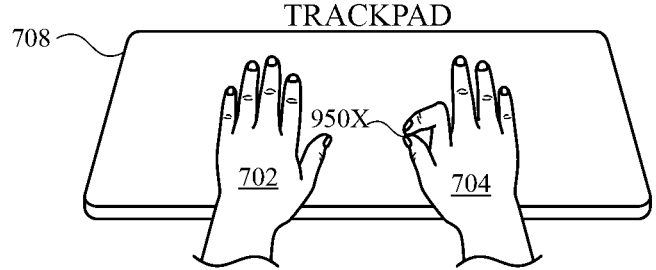
*FIG. 9L*

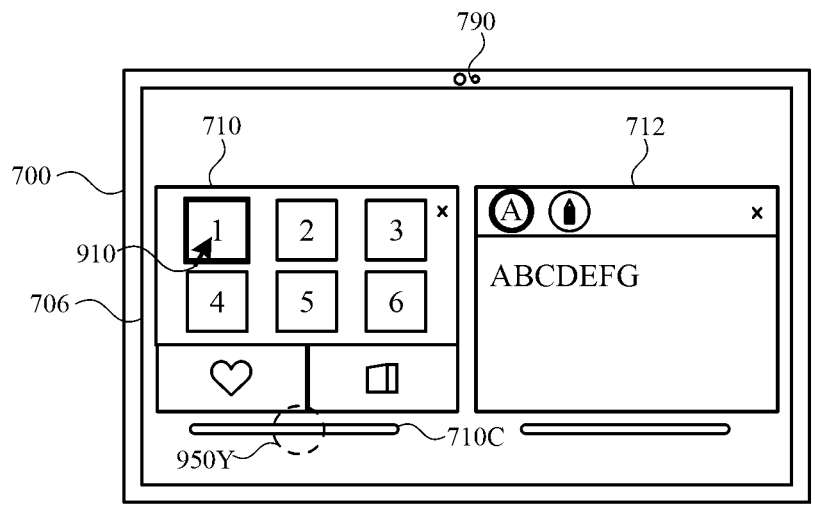
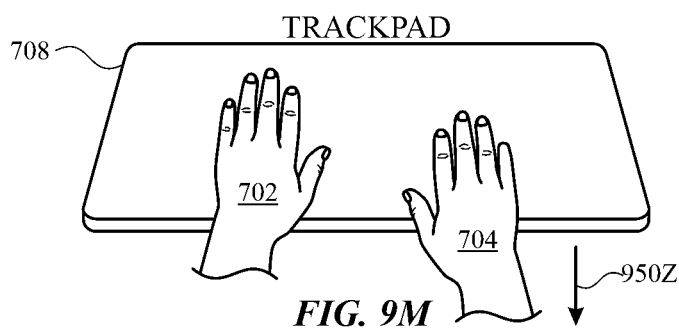
FIG. 9M
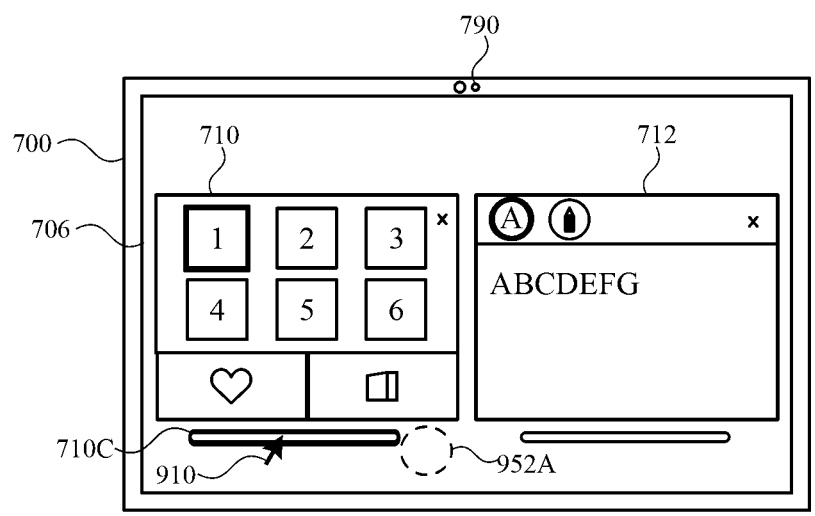
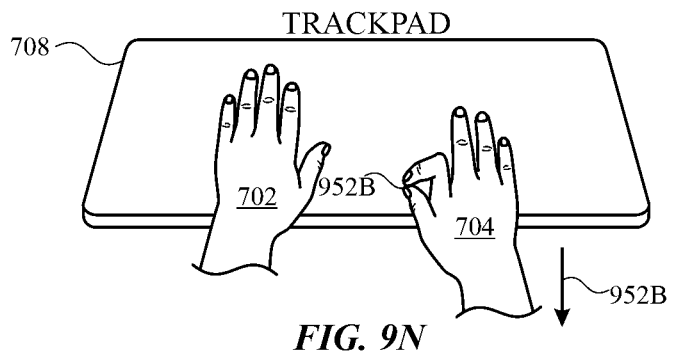
FIG. 9N

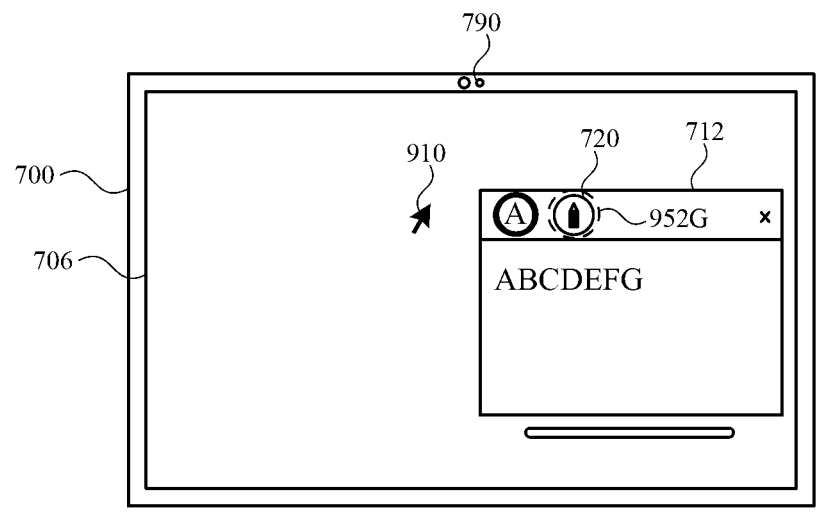
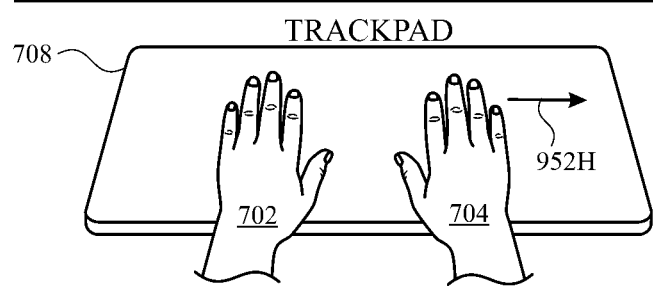
FIG. 9Q
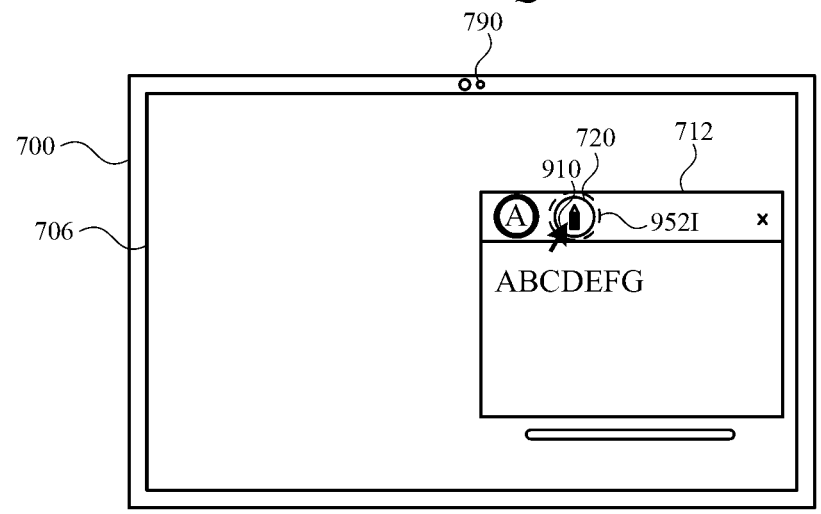
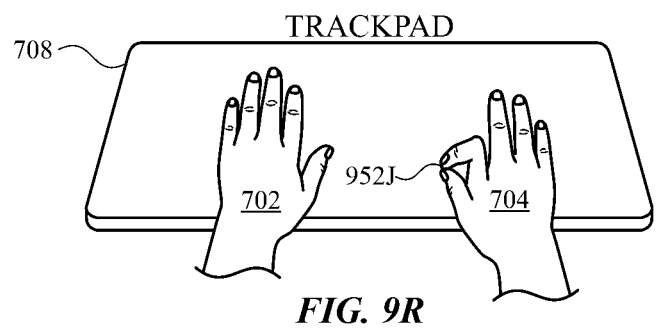
FIG. 9R

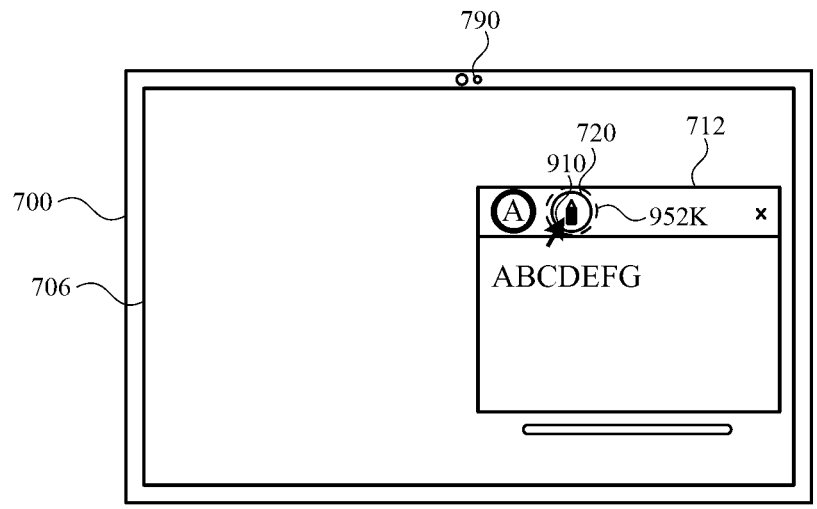
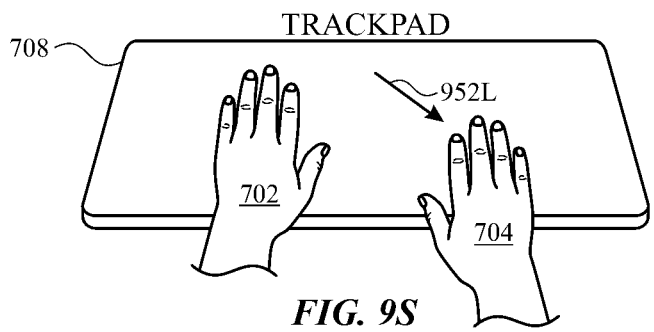
FIG. 9S
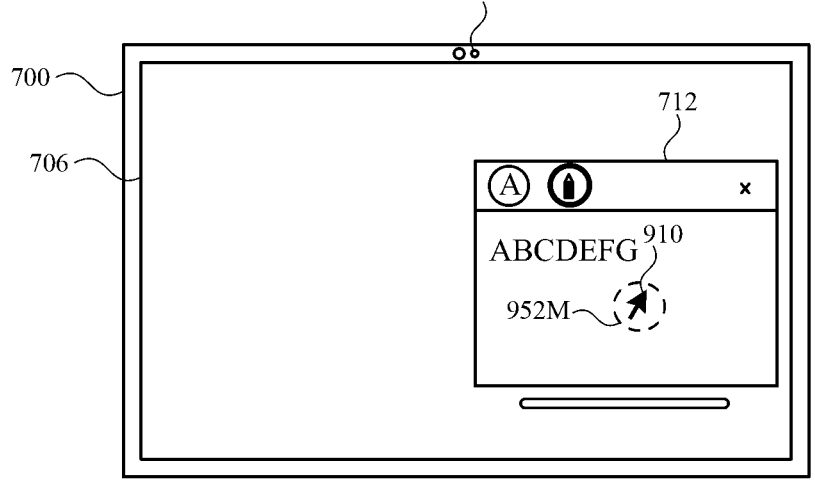
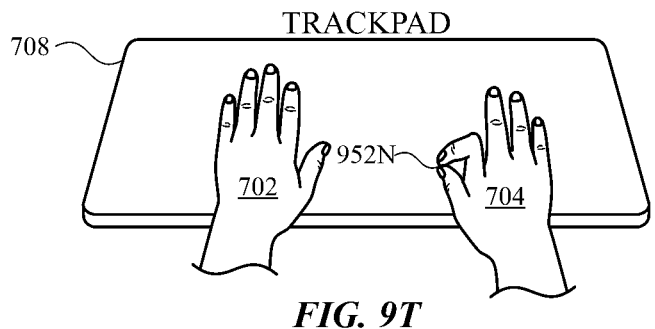
FIG. 9T

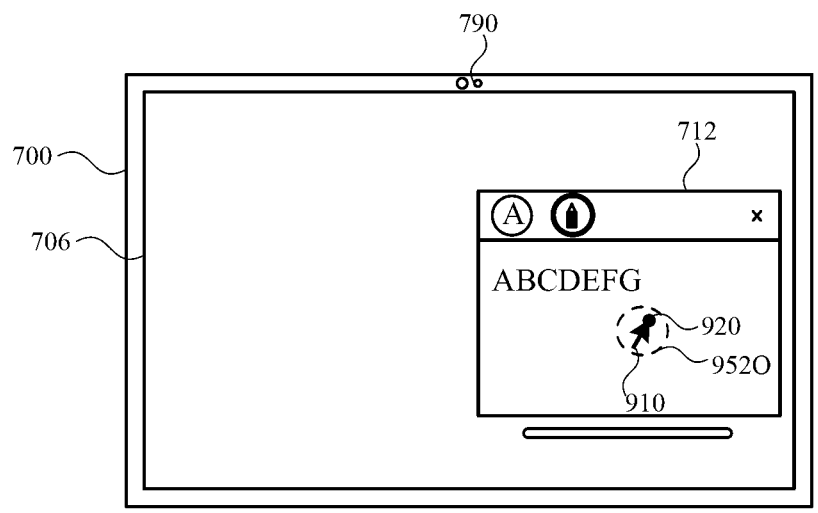
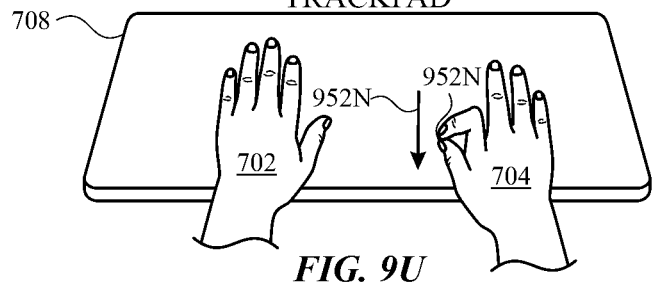
FIG. 9U
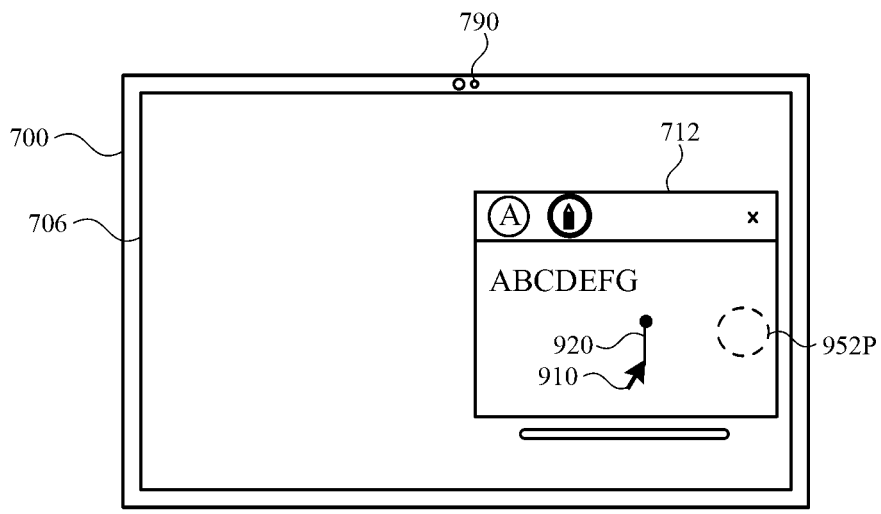
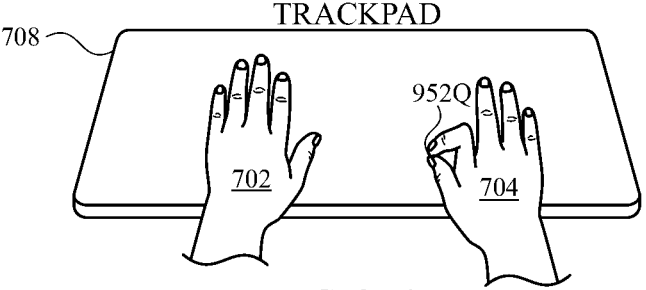
FIG. 9V1

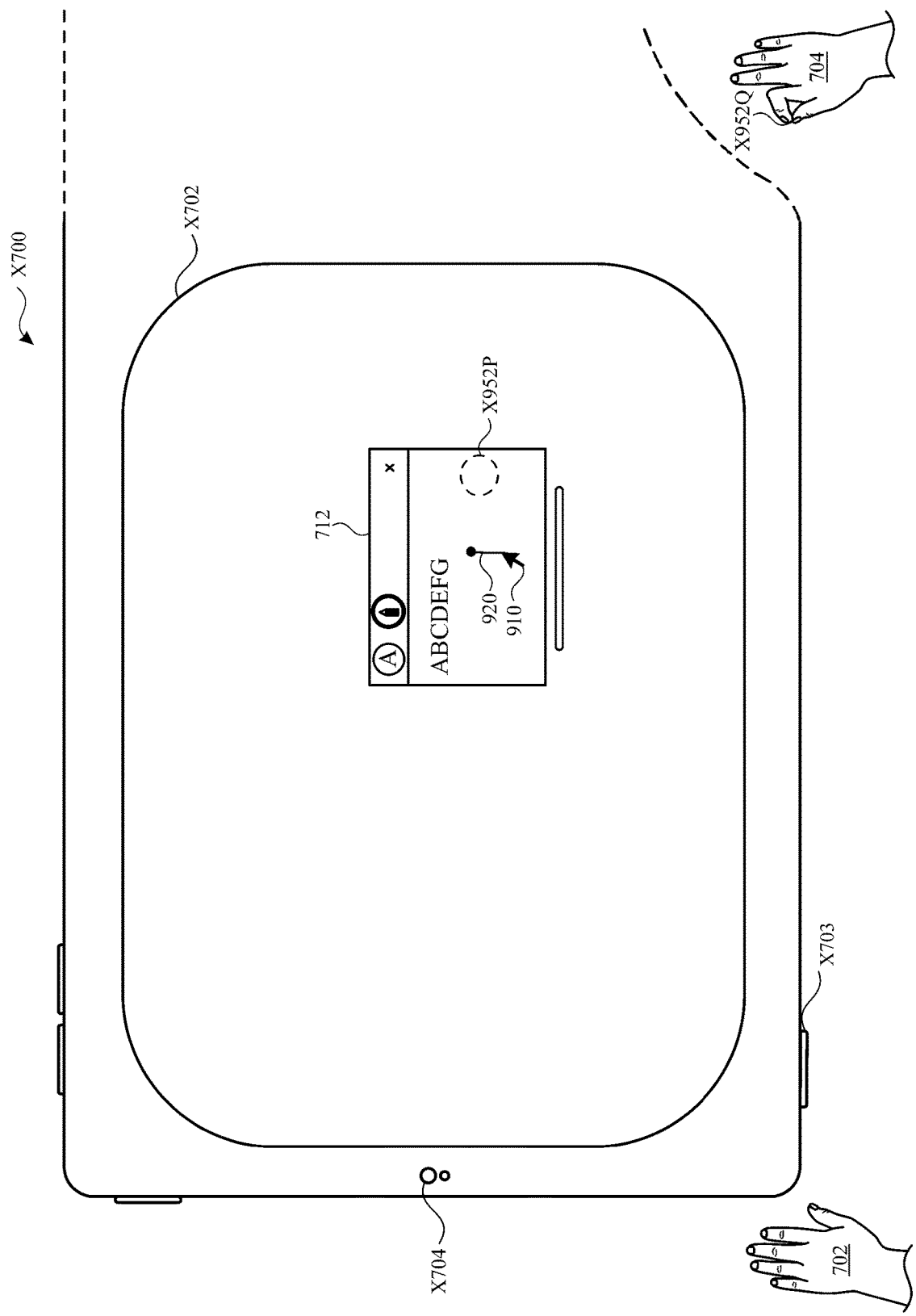
FIG. 9V2

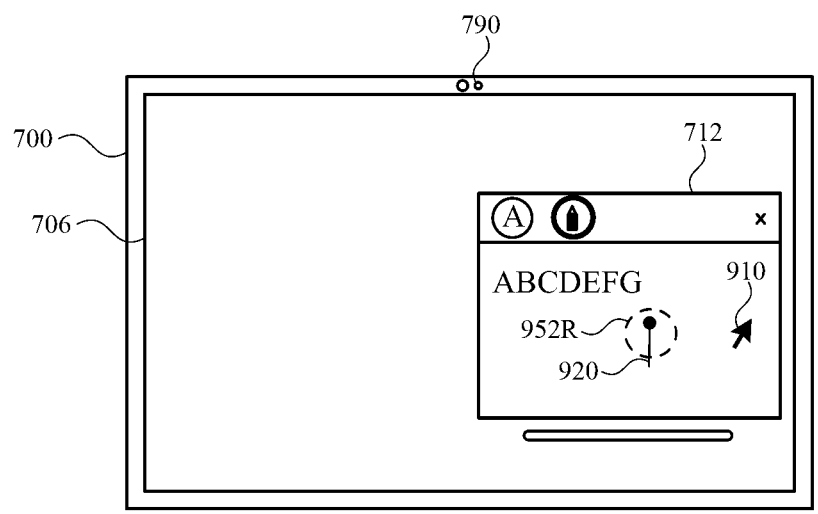
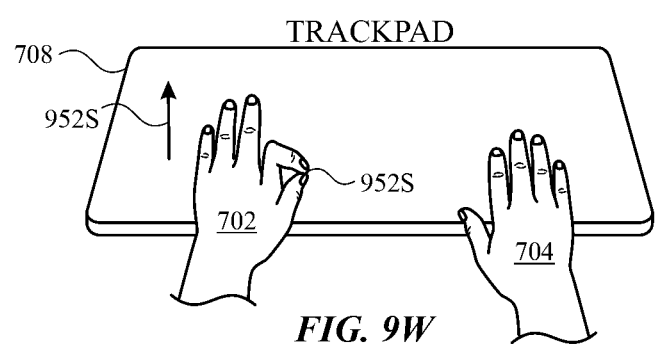
*FIG. 9W*
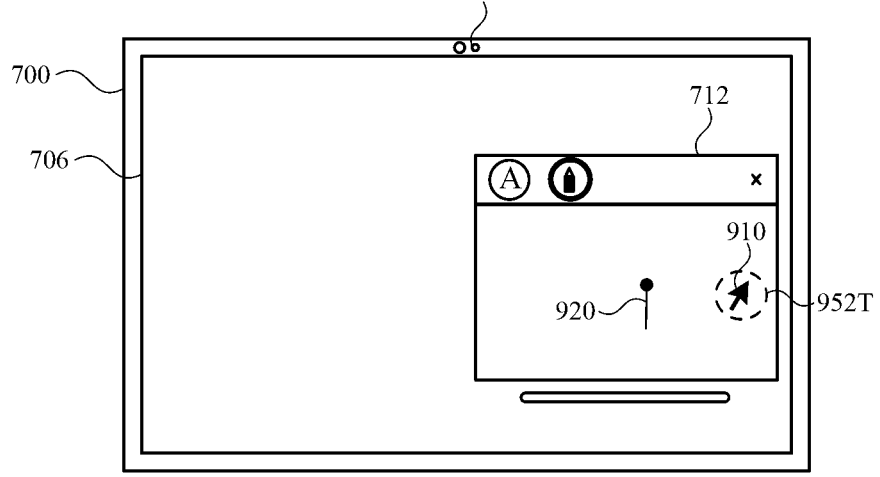
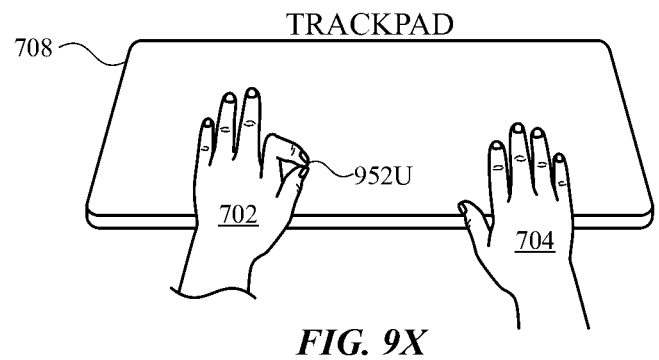
*FIG. 9X*

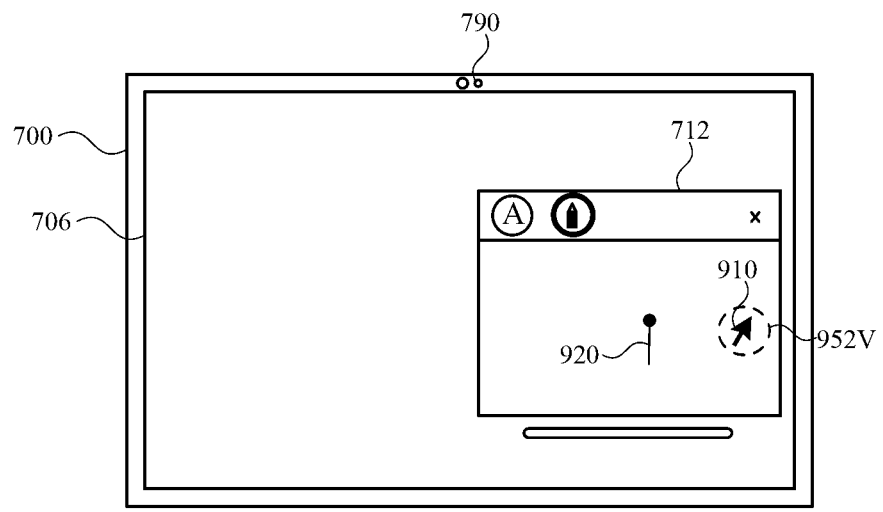
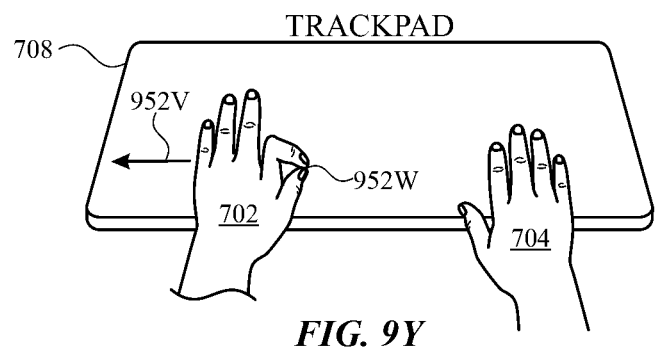
*FIG. 9Y*
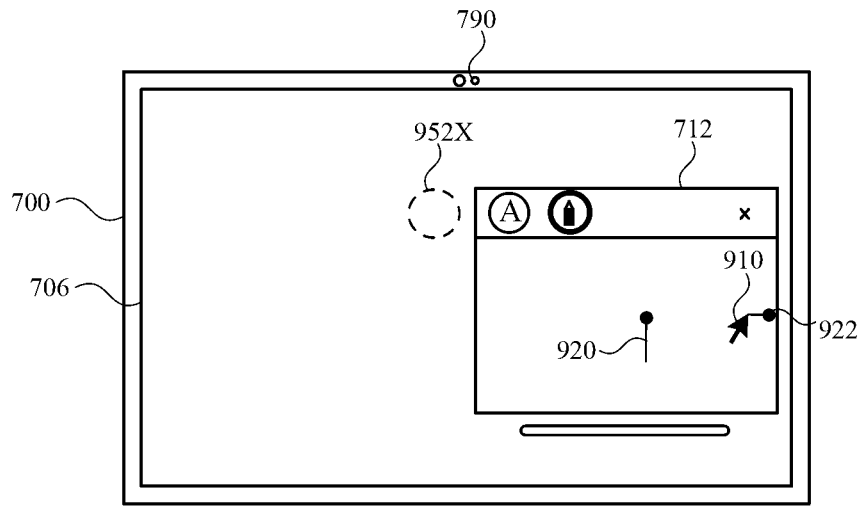
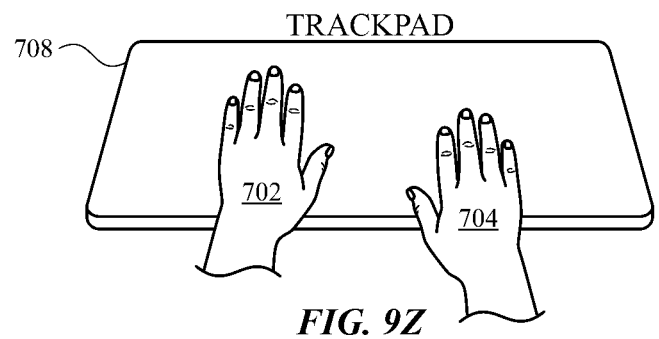
*FIG. 9Z*

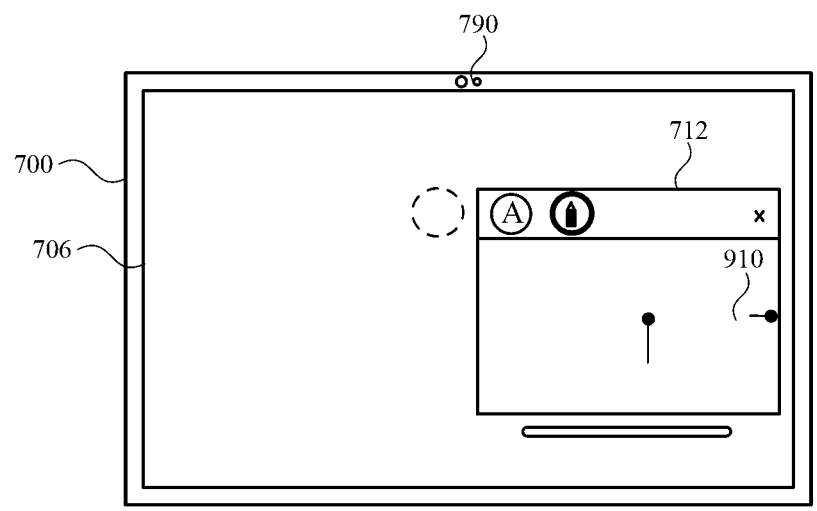
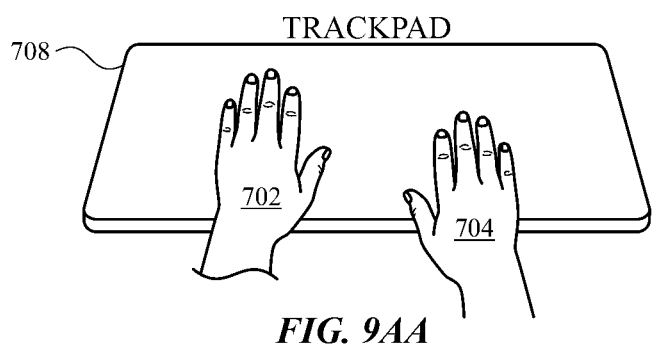
*FIG. 9AA*

1300

1302
While displaying a cursor that indicates a current location for user interaction in an environment:

1304
Detecting, via the one or more input devices, an occurrence of an event that includes user input that includes hand movement.

1306
In response to detecting occurrence of the event:

1308
In accordance with a determination that the cursor is a first type of cursor that responds to hand movement, updating, via the display generation component, the cursor in a first manner based on the user input.

1310
In accordance with a determination that the cursor is a second type of cursor that is different from the first type of cursor, wherein the second type of cursor responds to hand movement:

1312
Forgoing updating, via the display generation component, the cursor in the first manner.

1314
Updating, via the display generation component, the cursor in a second manner based on the user input, wherein the second manner is different from the first manner.

*FIG. 13*

DEVICES, METHODS, AND GRAPHICAL USER INTERFACES FOR USING A CURSOR TO INTERACT WITH THREE-DIMENSIONAL ENVIRONMENTS

CROSS-REFERENCE TO RELATED APPLICATIONS

This application claims priority to the following provisional applications: U.S. Patent Application Ser. No. 63/439,703, entitled "DEVICES, METHODS, AND GRAPHICAL USER INTERFACES FOR USING A CURSOR TO INTERACT WITH THREE-DIMENSIONAL ENVIRONMENTS," filed Jan. 18, 2023; U.S. Patent Application Ser. No. 63/470,407, entitled "DEVICES, METHODS, AND GRAPHICAL USER INTERFACES FOR USING A CURSOR TO INTERACT WITH THREE-DIMENSIONAL ENVIRONMENTS," filed Jun. 1, 2023; and U.S. Patent Application Ser. No. 63/541,745 entitled "DEVICES, METHODS, AND GRAPHICAL USER INTERFACES FOR USING A CURSOR TO INTERACT WITH THREE-DIMENSIONAL ENVIRONMENTS," filed Sep. 29, 2023. The entire contents of each of these applications are hereby incorporated by reference in their entireties.

TECHNICAL FIELD

The present disclosure relates generally to computer systems that are in communication with a display generation component and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with three-dimensional environments are cumbersome, inefficient, and limited. For example, some systems do not enable use of a cursor to interact with virtual objects, which can make performing precise operations, such as text editing or drawing, cumbersome and/or inefficient. Further, other systems that enable the use of a cursor to interact with virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for interacting with virtual objects using a cursor to make interaction with three-dimensional environments more efficient and intuitive for a user. Such methods and interfaces optionally complement or replace conventional methods for interacting with three-dimensional environments. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with three-dimensional environments using a cursor. Such methods and interfaces may complement or replace conventional methods for interacting with three-dimensional environments. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and one or more input devices. The method includes: detecting, via the one or more input devices, movement of a respective hand of a user of the computer system; and in response to detecting the movement: in accordance with a determination that the movement of the respective hand satisfies a first set of criteria, wherein the first set of criteria includes a first criterion that is satisfied when the movement of the respective hand is movement of a first hand of the user of the computer system, changing a position of a cursor based on the movement of the respective hand; and in accordance with a determination that the movement of the respective hand does not satisfy the first set of criteria, forgoing changing the position of the cursor based on the movement of the respective hand.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, movement of a respective hand of a user of the computer system; and in response to detecting the movement: in accordance with a determination that the movement of the respective hand satisfies a first set of criteria, wherein the first set of criteria includes a first criterion that is satisfied when the movement of the respective hand is movement of a first hand of the user of the computer system, changing a position of a cursor based on the movement of the respective hand; and in accordance with a determination that the movement of the respective hand does not satisfy the first set of criteria, forgoing changing the position of the cursor based on the movement of the respective hand.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, movement of a respective hand of a user of the computer system; and in response to detecting the movement: in accordance with a determination that the movement of the respective hand satisfies a first set of criteria, wherein the first set of criteria includes a first criterion that is satisfied when the movement of the respective hand is movement of a first hand of the user of the computer system, changing a position of a cursor based on the movement of the respective hand; and in accordance with a determination that the movement of the respective hand does not satisfy the first set of criteria, forgoing changing the position of the cursor based on the movement of the respective hand.

In accordance with some embodiments, a computer system that is configured to communicate with a display generation component and one or more input devices is described. The computer system includes: one or more processors; and memory storing one or more programs configured to be executed by the one or more processors, the one or more programs including instructions for: detecting, via the one or more input devices, movement of a respective hand of a user of the computer system; and in response to detecting the movement: in accordance with a determination that the movement of the respective hand satisfies a first set of criteria, wherein the first set of criteria includes a first criterion that is satisfied when the movement of the respective hand is movement of a first hand of the user of the computer system, changing a position of a cursor based on the movement of the respective hand; and in accordance with a determination that the movement of the respective hand does not satisfy the first set of criteria, forgoing changing the position of the cursor based on the movement of the respective hand.

In accordance with some embodiments, a computer system that is configured to communicate with a display generation component and one or more input devices is described. The computer system includes: means for detecting, via the one or more input devices, movement of a respective hand of a user of the computer system; and means, in response to detecting the movement, for: in accordance with a determination that the movement of the respective hand satisfies a first set of criteria, wherein the first set of criteria includes a first criterion that is satisfied when the movement of the respective hand is movement of a first hand of the user of the computer system, changing a position of a cursor based on the movement of the respective hand; and in accordance with a determination that the movement of the respective hand does not satisfy the first set of criteria, forgoing changing the position of the cursor based on the movement of the respective hand In accordance with some embodiments, a computer program product is described. The computer program product comprises one or more programs configured to be executed by one or more processors of a computer system that is in communication with a display generation component and one or more input devices. The one or more programs include instructions for: detecting, via the one or more input devices, movement of a respective hand of a user of the computer system; and in response to detecting the movement: in accordance with a determination that the movement of the respective hand satisfies a first set of criteria, wherein the first set of criteria includes a first criterion that is satisfied when the movement of the respective hand is movement of a first hand of the user of the computer system, changing a position of a cursor based on the movement of the respective hand; and in accordance with a determination that the movement of the respective hand does not satisfy the first set of criteria, forgoing changing the position of the cursor based on the movement of the respective hand.

In accordance with some embodiments, a method is described. The method is performed at a computer system that is in communication with one or more input devices and a display generation component. The method comprises: detecting, via the one or more input devices, a first hand gesture performed by a first hand; in response to detecting the first hand gesture performed by the first hand, displaying, via the display generation component, a cursor; while displaying the cursor, detecting, via the one or more input devices, movement of a respective hand; and in response to detecting movement of the respective hand: in accordance with a determination that the respective hand is the first hand, moving, via the display generation component, the cursor based on the movement of the first hand; and in accordance with a determination that the respective hand is a second hand that is different from the first hand, forgoing moving, via the display generation component, the cursor based on the movement of the second hand.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: detecting, via the one or more input devices, a first hand gesture performed by a first hand; in response to detecting the first hand gesture performed by the first hand, displaying, via the display generation component, a cursor; while displaying the cursor, detecting, via the one or more input devices, movement of a respective hand; and in response to detecting movement of the respective hand: in accordance with a determination that the respective hand is the first hand, moving, via the display generation component, the cursor based on the movement of the first hand; and in accordance with a determination that the respective hand is a second hand that is different from the first hand, forgoing moving, via the display generation component, the cursor based on the movement of the second hand.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: detecting, via the one or more input devices, a first hand gesture performed by a first hand; in response to detecting the first hand gesture performed by the first hand, displaying, via the display generation component, a cursor; while displaying the cursor, detecting, via the one or more input devices, movement of a respective hand; and in response to detecting movement of the respective hand: in accordance with a determination that the respective hand is the first hand, moving, via the display generation component, the cursor based on the movement of the first hand; and in accordance with a determination that the respective hand is a second hand that is different from the first hand, forgoing moving, via the display generation component, the cursor based on the movement of the second hand.

In accordance with some embodiments, a computer system is described. The computer system is configured to communicate with one or more input devices and a display generation component and comprises: one or more processors; and memory storing one or more programs configured to be executed by the one or more processors, the one or more programs including instructions for: detecting, via the one or more input devices, a first hand gesture performed by a first hand; in response to detecting the first hand gesture performed by the first hand, displaying, via the display generation component, a cursor; while displaying the cursor, detecting, via the one or more input devices, movement of a respective hand; and in response to detecting movement of the respective hand: in accordance with a determination that the respective hand is the first hand, moving, via the display generation component, the cursor based on the movement of the first hand; and in accordance with a determination that the respective hand is a second hand that is different from the first hand, forgoing moving, via the display generation component, the cursor based on the movement of the second hand.

In accordance with some embodiments, a computer system is described. The computer system is configured to communicate with one or more input devices and a display generation component and comprises: means for detecting, via the one or more input devices, a first hand gesture performed by a first hand; means, responsive to detecting the first hand gesture performed by the first hand, for displaying, via the display generation component, a cursor; means, while displaying the cursor, for detecting, via the one or more input devices, movement of a respective hand; and means, responsive to detecting movement of the respective hand, for: in accordance with a determination that the respective hand is the first hand, moving, via the display generation component, the cursor based on the movement of the first hand; and in accordance with a determination that the respective hand is a second hand that is different from the first hand, forgoing moving, via the display generation component, the cursor based on the movement of the second hand.

In accordance with some embodiments, a computer program product is described. The computer program product comprises one or more programs configured to be executed by one or more processors of a computer system that is in communication with one or more input devices and a display generation component, the one or more programs including instructions for: detecting, via the one or more input devices, a first hand gesture performed by a first hand; in response to detecting the first hand gesture performed by the first hand, displaying, via the display generation component, a cursor; while displaying the cursor, detecting, via the one or more input devices, movement of a respective hand; and in response to detecting movement of the respective hand: in accordance with a determination that the respective hand is the first hand, moving, via the display generation component, the cursor based on the movement of the first hand; and in accordance with a determination that the respective hand is a second hand that is different from the first hand, forgoing moving, via the display generation component, the cursor based on the movement of the second hand.

In accordance with some embodiments, a method is described. The method is performed at a computer system that is in communication with one or more input devices and a display generation component. The method comprises: displaying, via the display generation component, a cursor that moves based on movement of a first hand; while displaying the cursor that moves based on movement of the first hand, detecting, via the one or more input devices, a first input of a respective type performed by a respective hand; and in response to detecting the first input of the respective type performed by the respective hand: in accordance with a determination that the first input is a first type of input performed with the first hand, initiating a process to display, via the display generation component, a mark; and in accordance with a determination that the first input is the first type of input performed with a second hand that is different from the first hand, configuring the computer system to move the cursor based on movements of the second hand without initiating the process to display a mark.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: displaying, via the display generation component, a cursor that moves based on movement of a first hand; while displaying the cursor that moves based on movement of the first hand, detecting, via the one or more input devices, a first input of a respective type performed by a respective hand; and in response to detecting the first input of the respective type performed by the respective hand: in accordance with a determination that the first input is a first type of input performed with the first hand, initiating a process to display, via the display generation component, a mark; and in accordance with a determination that the first input is the first type of input performed with a second hand that is different from the first hand, configuring the computer system to move the cursor based on movements of the second hand without initiating the process to display a mark.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: displaying, via the display generation component, a cursor that moves based on movement of a first hand; while displaying the cursor that moves based on movement of the first hand, detecting, via the one or more input devices, a first input of a respective type performed by a respective hand; and in response to detecting the first input of the respective type performed by the respective hand: in accordance with a determination that the first input is a first type of input performed with the first hand, initiating a process to display, via the display generation component, a mark; and in accordance with a determination that the first input is the first type of input performed with a second hand that is different from the first hand, configuring the computer system to move the cursor based on movements of the second hand without initiating the process to display a mark.

In accordance with some embodiments, a computer system is described. The computer system is configured to communicate with one or more input devices and a display generation component and comprises: one or more processors; and memory storing one or more programs configured to be executed by the one or more processors, the one or more programs including instructions for: displaying, via the display generation component, a cursor that moves based on movement of a first hand; while displaying the cursor that moves based on movement of the first hand, detecting, via the one or more input devices, a first input of a respective type performed by a respective hand; and in response to detecting the first input of the respective type performed by the respective hand: in accordance with a determination that the first input is a first type of input performed with the first hand, initiating a process to display, via the display generation component, a mark; and in accordance with a determination that the first input is the first type of input performed with a second hand that is different from the first hand, configuring the computer system to move the cursor based on movements of the second hand without initiating the process to display a mark.

In accordance with some embodiments, a computer system is described. The computer system is configured to communicate with one or more input devices and a display generation component and comprises: means for displaying, via the display generation component, a cursor that moves based on movement of a first hand; means, while displaying the cursor that moves based on movement of the first hand, for detecting, via the one or more input devices, a first input of a respective type performed by a respective hand; and means, responsive to detecting the first input of the respective type performed by the respective hand, for: in accordance with a determination that the first input is a first type of input performed with the first hand, initiating a process to display, via the display generation component, a mark; and in accordance with a determination that the first input is the first type of input performed with a second hand that is different from the first hand, configuring the computer system to move the cursor based on movements of the second hand without initiating the process to display a mark.

In accordance with some embodiments, a computer program product is described. The computer program product comprises one or more programs configured to be executed by one or more processors of a computer system that is in communication with one or more input devices and a display generation component, the one or more programs including instructions for: displaying, via the display generation component, a cursor that moves based on movement of a first hand; while displaying the cursor that moves based on movement of the first hand, detecting, via the one or more input devices, a first input of a respective type performed by a respective hand; and in response to detecting the first input of the respective type performed by the respective hand: in accordance with a determination that the first input is a first type of input performed with the first hand, initiating a process to display, via the display generation component, a mark; and in accordance with a determination that the first input is the first type of input performed with a second hand that is different from the first hand, configuring the computer system to move the cursor based on movements of the second hand without initiating the process to display a mark.

In accordance with some embodiments, a method is described. The method is performed at a computer system that is in communication with one or more input devices and a display generation component. The method comprises: while displaying a cursor that indicates a current location for user interaction in an environment: detecting, via the one or more input devices, an occurrence of an event that includes user input that includes hand movement; and in response to detecting occurrence of the event: in accordance with a determination that the cursor is a first type of cursor that responds to hand movement, updating, via the display generation component, the cursor in a first manner based on the user input; and in accordance with a determination that the cursor is a second type of cursor that is different from the first type of cursor, wherein the second type of cursor responds to hand movement, forgoing updating, via the display generation component, the cursor in the first manner.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: while displaying a cursor that indicates a current location for user interaction in an environment: detecting, via the one or more input devices, an occurrence of an event that includes user input that includes hand movement; and in response to detecting occurrence of the event: in accordance with a determination that the cursor is a first type of cursor that responds to hand movement, updating, via the display generation component, the cursor in a first manner based on the user input; and in accordance with a determination that the cursor is a second type of cursor that is different from the first type of cursor, wherein the second type of cursor responds to hand movement, forgoing updating, via the display generation component, the cursor in the first manner.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: while displaying a cursor that indicates a current location for user interaction in an environment: detecting, via the one or more input devices, an occurrence of an event that includes user input that includes hand movement; and in response to detecting occurrence of the event: in accordance with a determination that the cursor is a first type of cursor that responds to hand movement, updating, via the display generation component, the cursor in a first manner based on the user input; and in accordance with a determination that the cursor is a second type of cursor that is different from the first type of cursor, wherein the second type of cursor responds to hand movement, forgoing updating, via the display generation component, the cursor in the first manner.

In accordance with some embodiments, a computer system is described. The computer system is configured to communicate with one or more input devices and a display generation component and comprises: one or more processors; and memory storing one or more programs configured to be executed by the one or more processors, the one or more programs including instructions for: while displaying a cursor that indicates a current location for user interaction in an environment: detecting, via the one or more input devices, an occurrence of an event that includes user input that includes hand movement; and in response to detecting occurrence of the event: in accordance with a determination that the cursor is a first type of cursor that responds to hand movement, updating, via the display generation component, the cursor in a first manner based on the user input; and in accordance with a determination that the cursor is a second type of cursor that is different from the first type of cursor, wherein the second type of cursor responds to hand movement, forgoing updating, via the display generation component, the cursor in the first manner.

In accordance with some embodiments, a computer system is described. The computer system is configured to communicate with one or more input devices and a display generation component and comprises: means, while displaying a cursor that indicates a current location for user interaction in an environment, for: detecting, via the one or more input devices, an occurrence of an event that includes user input that includes hand movement; and in response to detecting occurrence of the event: in accordance with a determination that the cursor is a first type of cursor that responds to hand movement, updating, via the display generation component, the cursor in a first manner based on the user input; and in accordance with a determination that the cursor is a second type of cursor that is different from the first type of cursor, wherein the second type of cursor responds to hand movement, forgoing updating, via the display generation component, the cursor in the first manner.

In accordance with some embodiments, a computer program product is described. The computer program product comprises one or more programs configured to be executed by one or more processors of a computer system that is in communication with one or more input devices and a display generation component, the one or more programs including instructions for: while displaying a cursor that indicates a current location for user interaction in an environment: detecting, via the one or more input devices, an occurrence of an event that includes user input that includes hand movement; and in response to detecting occurrence of the event: in accordance with a determination that the cursor is a first type of cursor that responds to hand movement, updating, via the display generation component, the cursor in a first manner based on the user input; and in accordance with a determination that the cursor is a second type of cursor that is different from the first type of cursor, wherein the second type of cursor responds to hand movement, forgoing updating, via the display generation component, the cursor in the first manner.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in some embodiments.

FIG. 8 is a flow diagram of methods of controlling a cursor based on detected hand movement, in some embodiments.

FIG. 13 is a flow diagram of methods of updating different cursors in different manners, in some embodiments.

DESCRIPTION OF EMBODIMENTS

The present disclosure relates to user interfaces for providing an extended reality (XR) experience to a user, in some embodiments.

The systems, methods, and GUIs described herein improve user interface interactions with virtual/augmented reality environments in multiple ways.

Figure 9A:
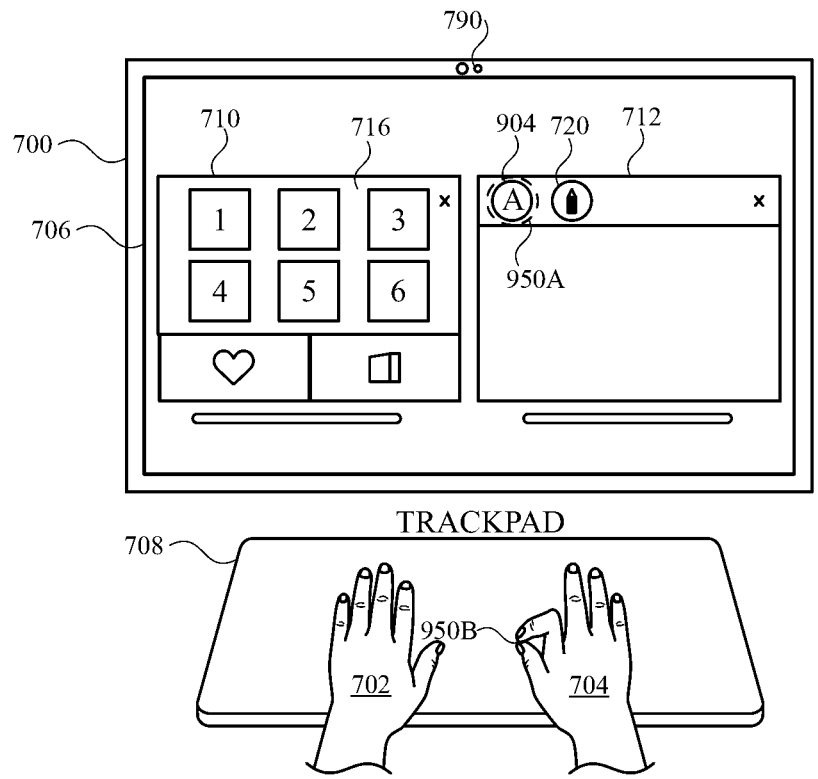
FIGS. 9A-9AA illustrate example techniques for controlling a cursor based on detected hand movement, in some embodiments.
Figure 10:
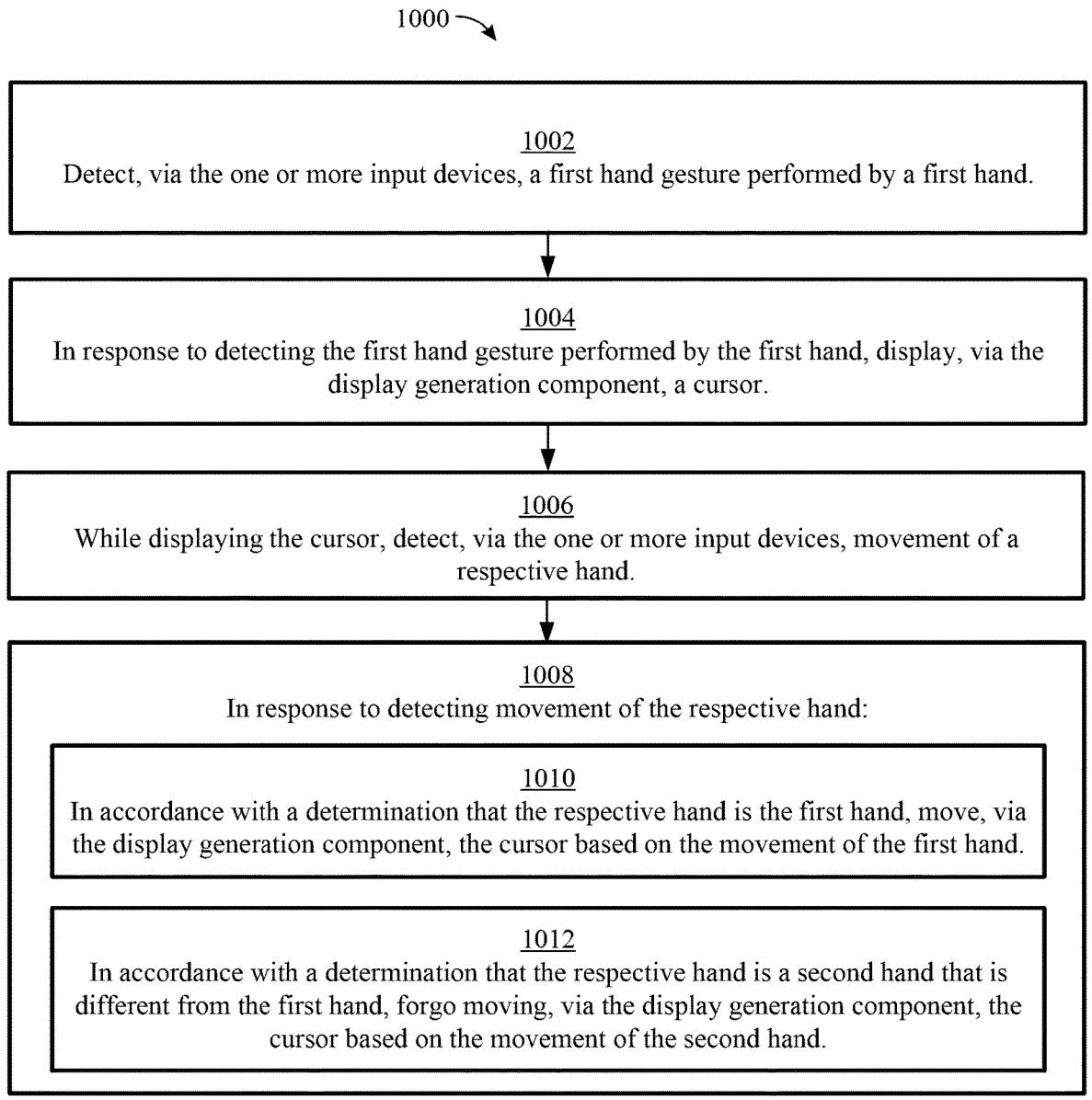
FIG. 10 is a flow diagram of methods of controlling a cursor using the hand that invoked the cursor, in some embodiments.
Figure 11:
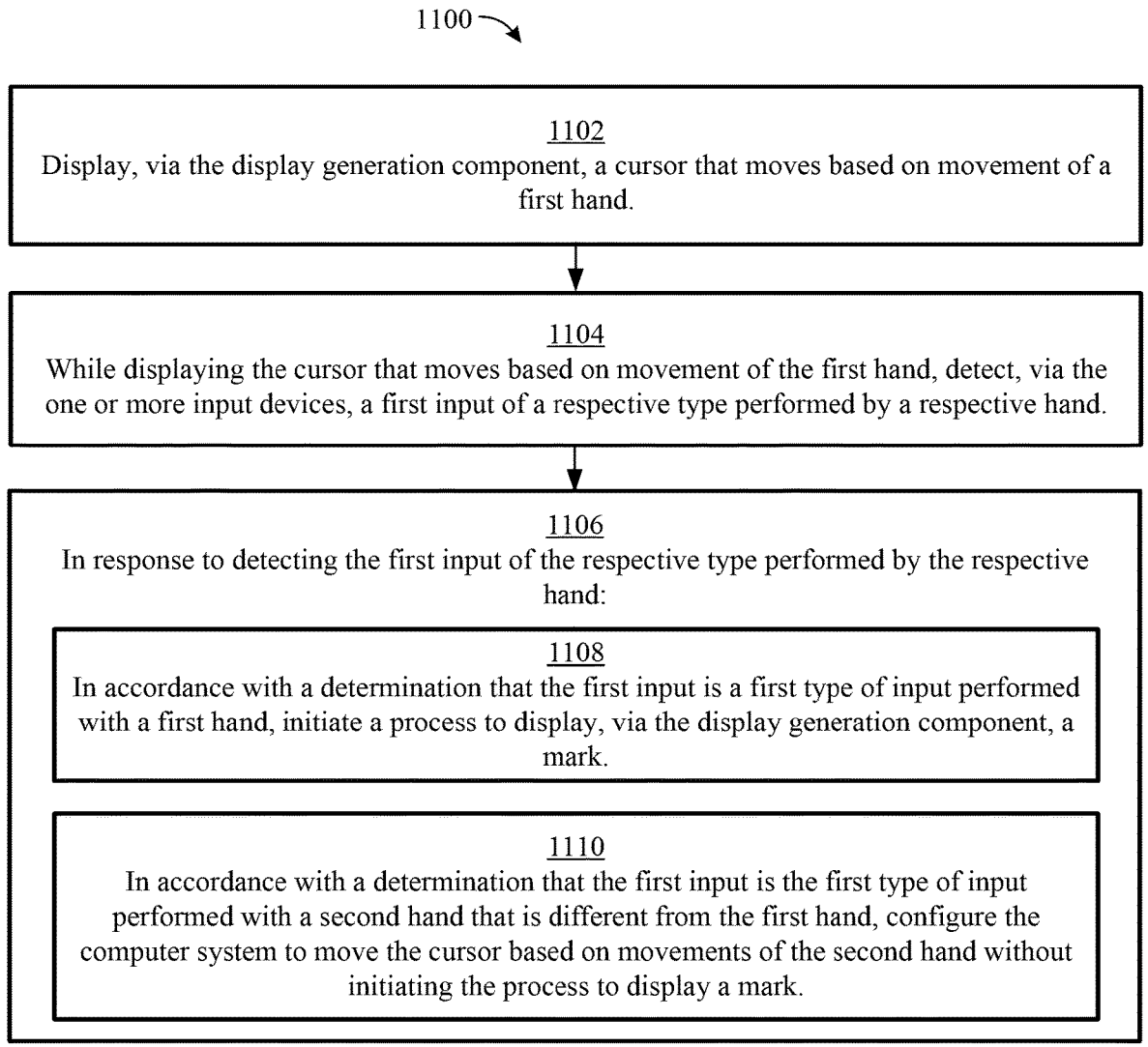
FIG. 11 is a flow diagram of methods of controlling a cursor based on detected hand movement, in some embodiments.
Figure 12A:
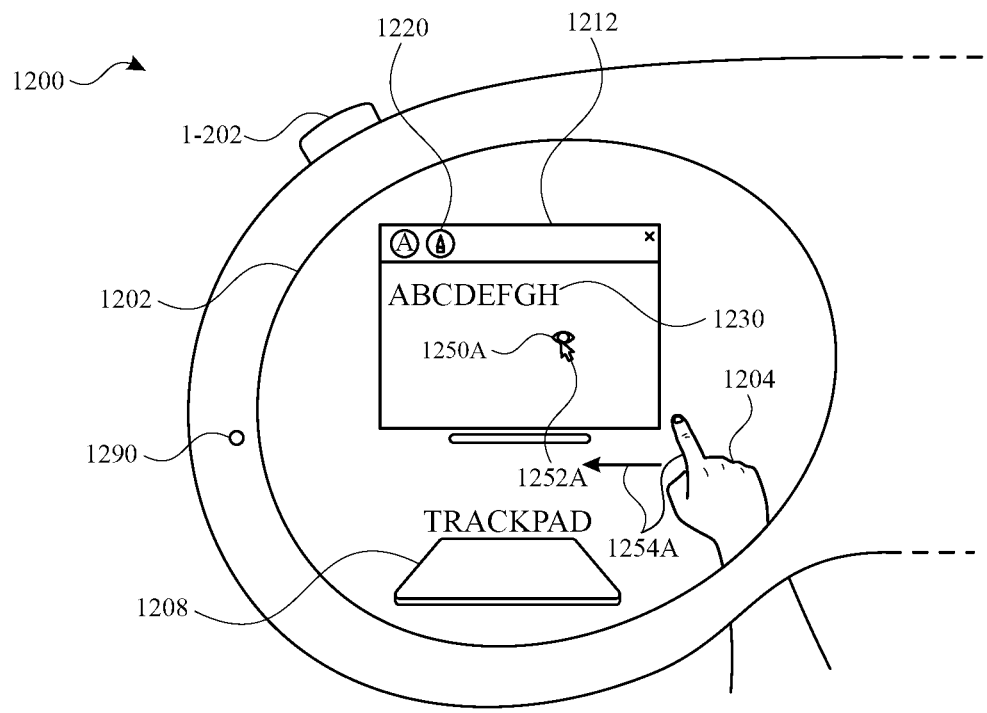
FIGS. 12A-12V illustrate example techniques for updating different cursors in different manners, in some embodiments.
Figure 12B:
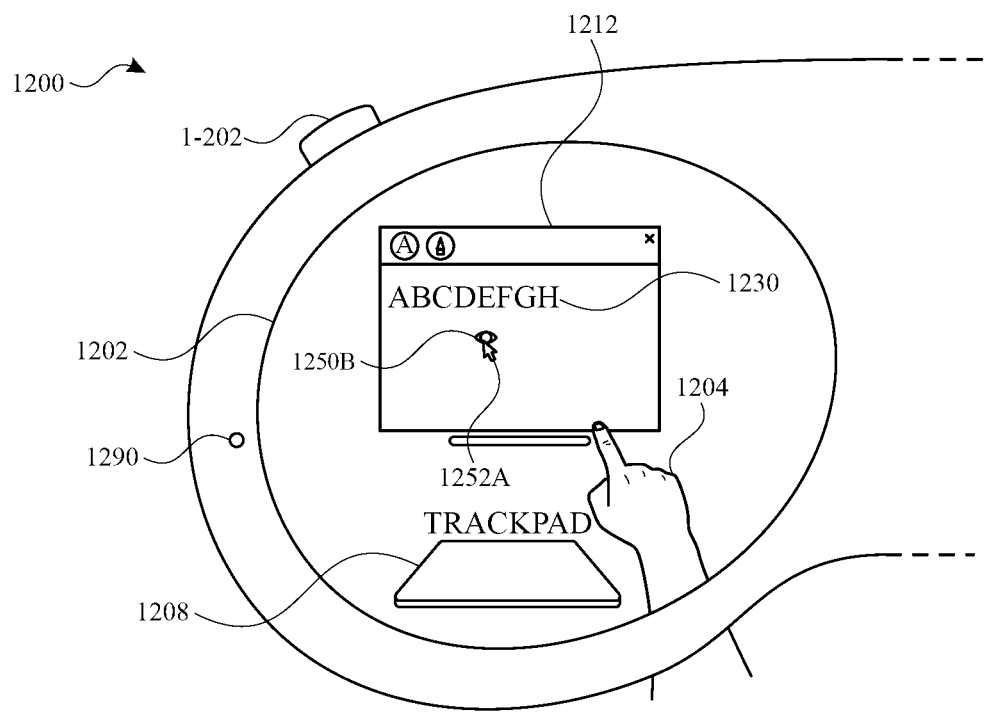

FIGS. 1A-6 provide a description of example computer systems for providing XR experiences to users. FIGS. 7A-7P illustrate example techniques for controlling a cursor based on detected hand movement, in some embodiments. FIG. 8 is a flow diagram of methods of controlling a cursor based on detected hand movement, in some embodiments. The user interfaces in FIGS. 7A-7P are used to illustrate the processes in FIG. 8. FIGS. 9A-9AA illustrate example techniques for controlling a cursor based on detected hand movement, in some embodiments. FIG. 10 is a flow diagram of methods of controlling a cursor using the hand that invoked the cursor, in some embodiments. FIG. 11 is a flow diagram of methods of controlling a cursor based on detected hand movement, in some embodiments. The user interfaces in FIGS. 9A-9AA are used to illustrate the processes in FIGS. 10-11. FIGS. 12A-12V illustrate example techniques for updating different cursors in different manners, in some embodiments. FIG. 13 is a flow diagram of methods of updating different cursors in different manners, in some embodiments. The user interfaces and graphs in FIGS. 12A-12V are used to illustrate the processes in FIG. 13.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1A:
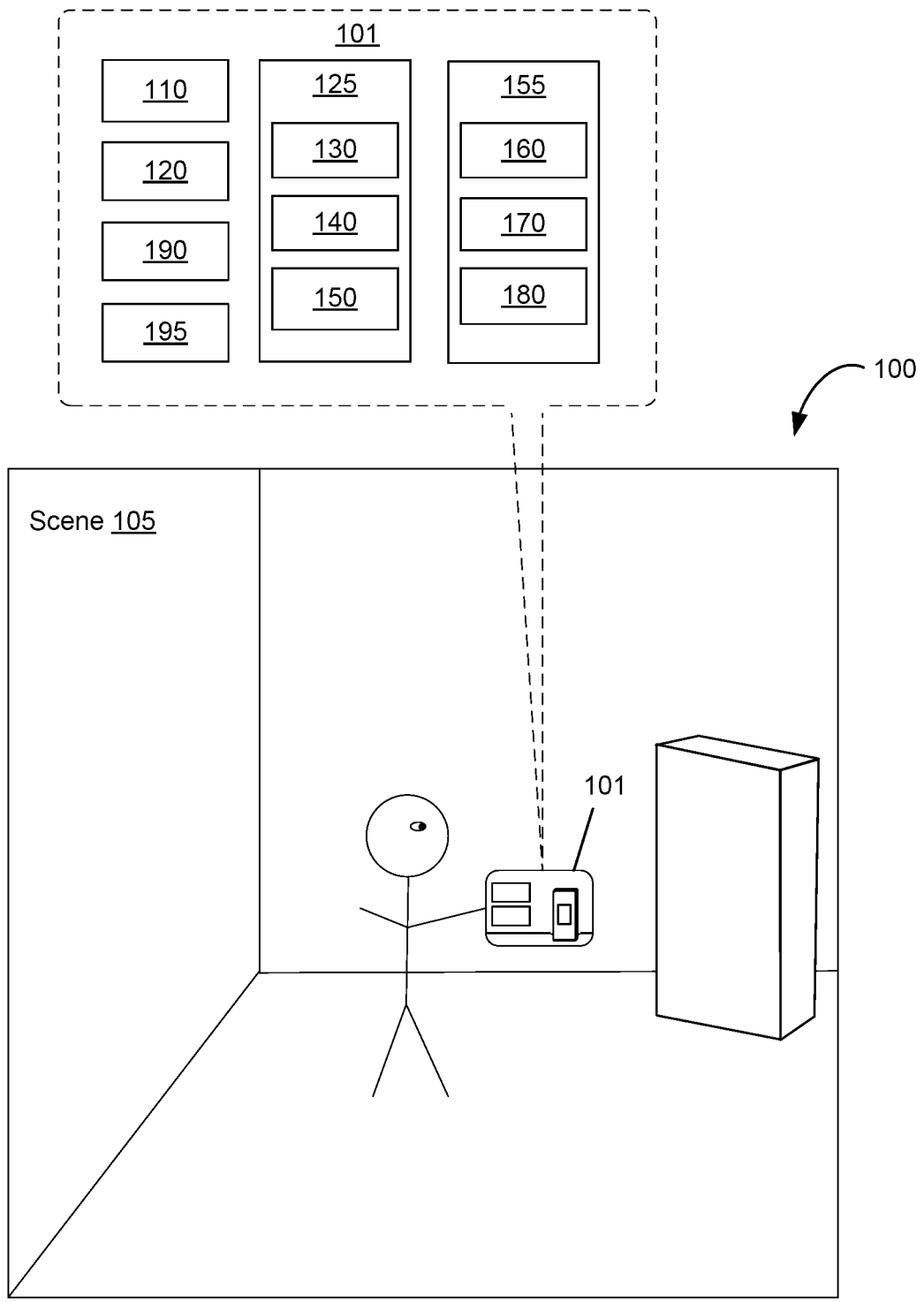
FIG. 1A is a block diagram illustrating an operating environment of a computer system for providing XR experiences in some embodiments.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (IMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
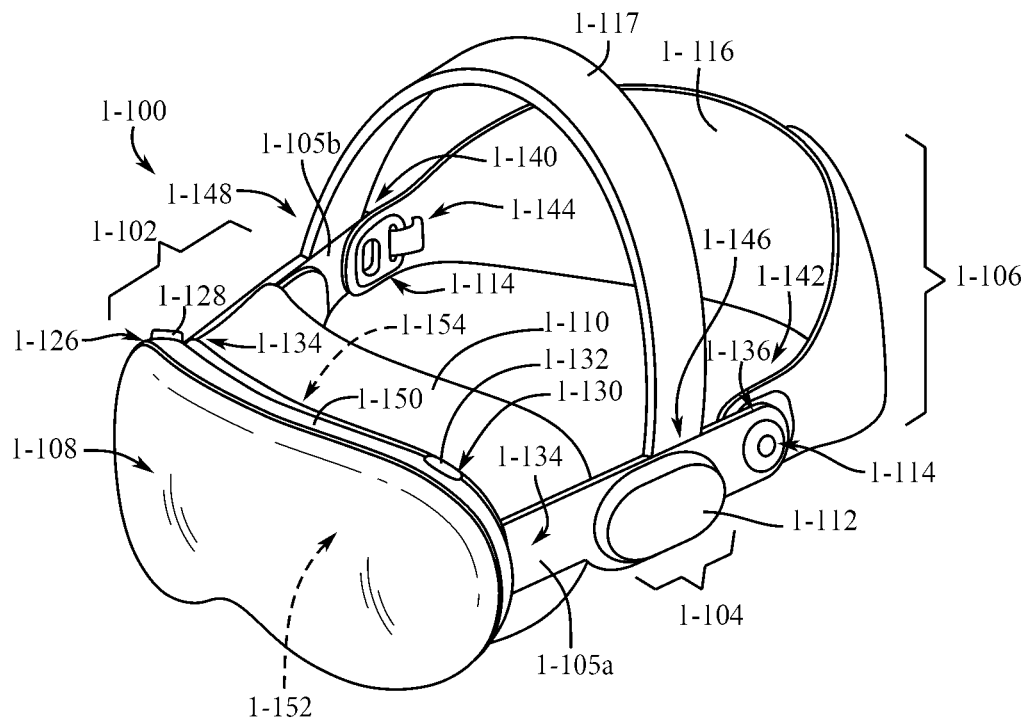
FIGS. 1B-1P are examples of a computer system for providing XR experiences in the operating environment of FIG. 1A.
Figure 1C:
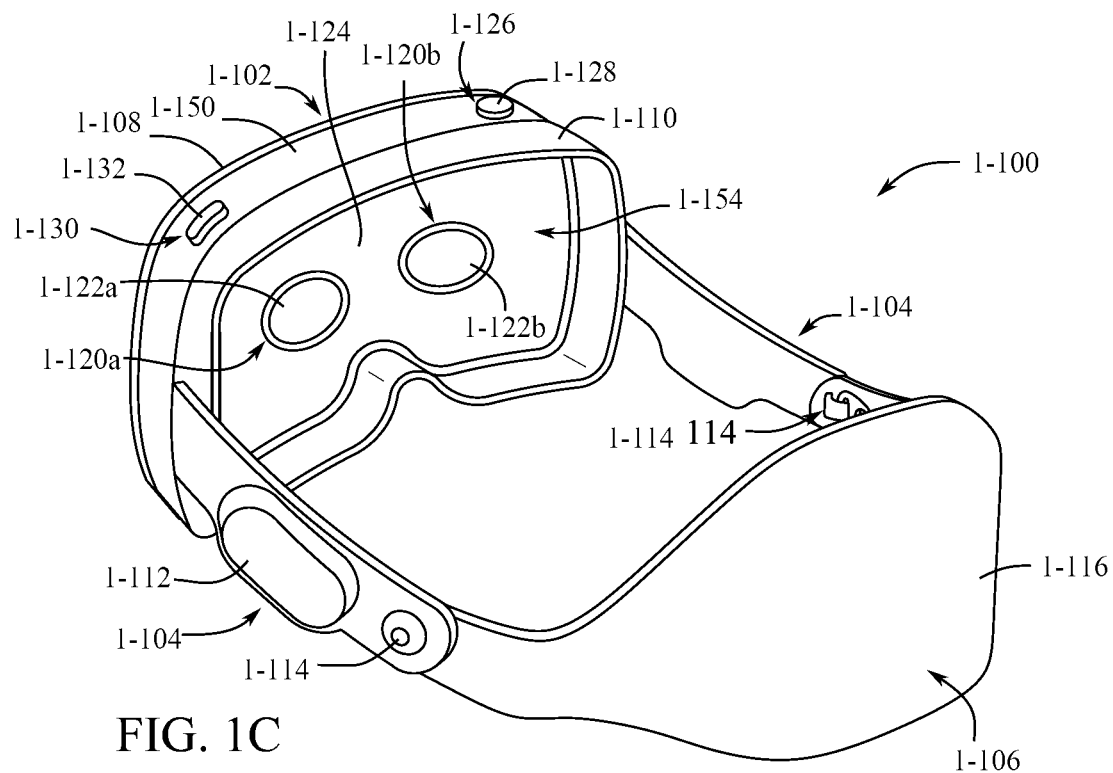
Figure 1D:
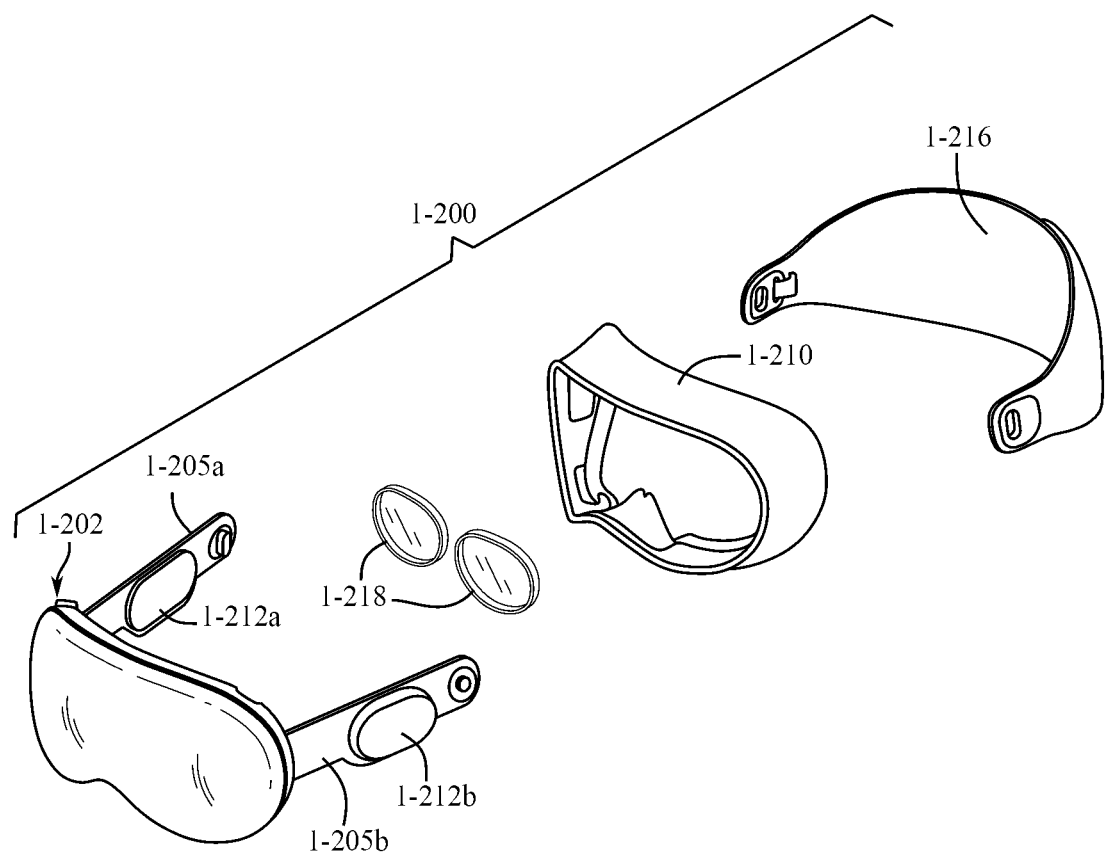
Figure 1E:
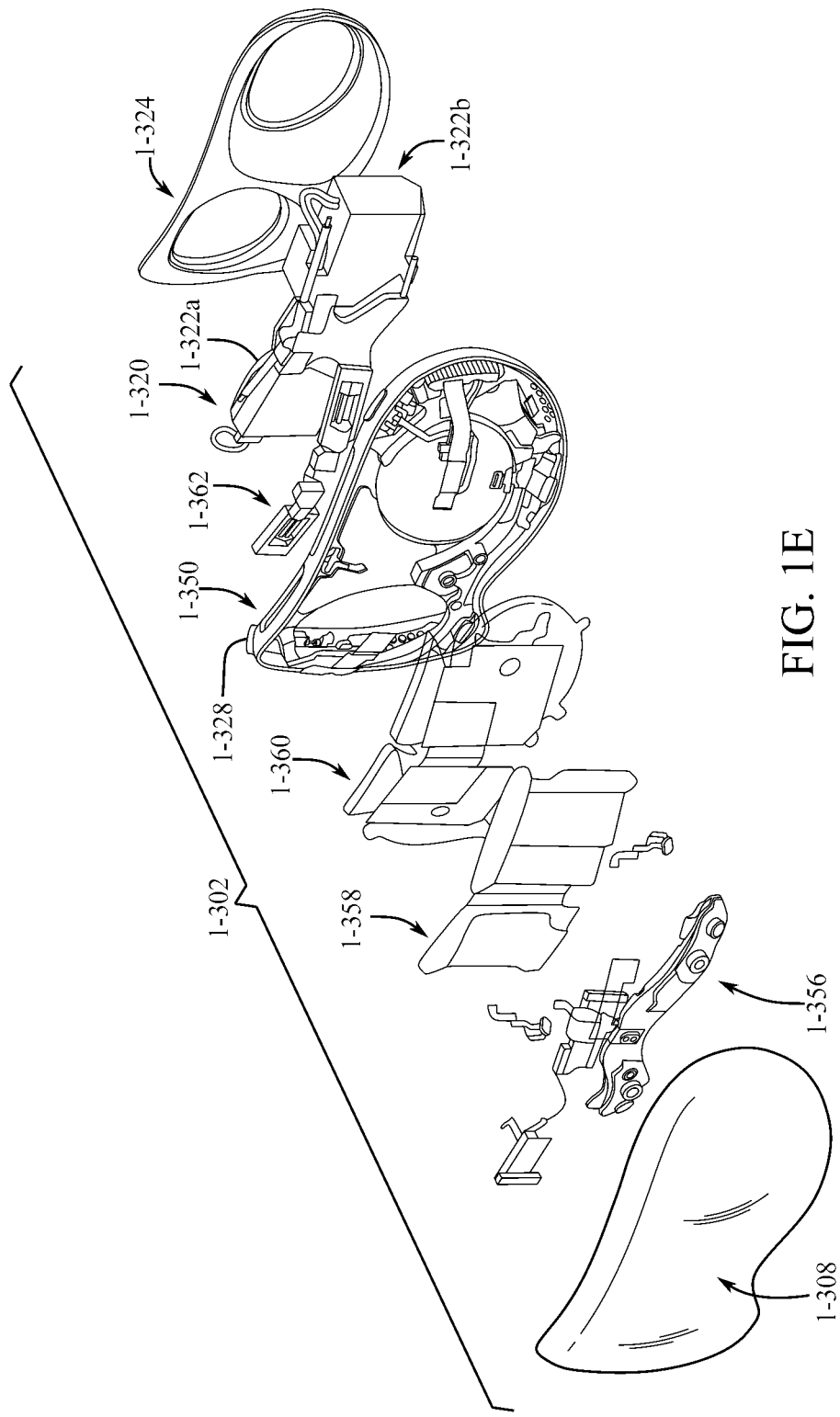
Figure 1F:
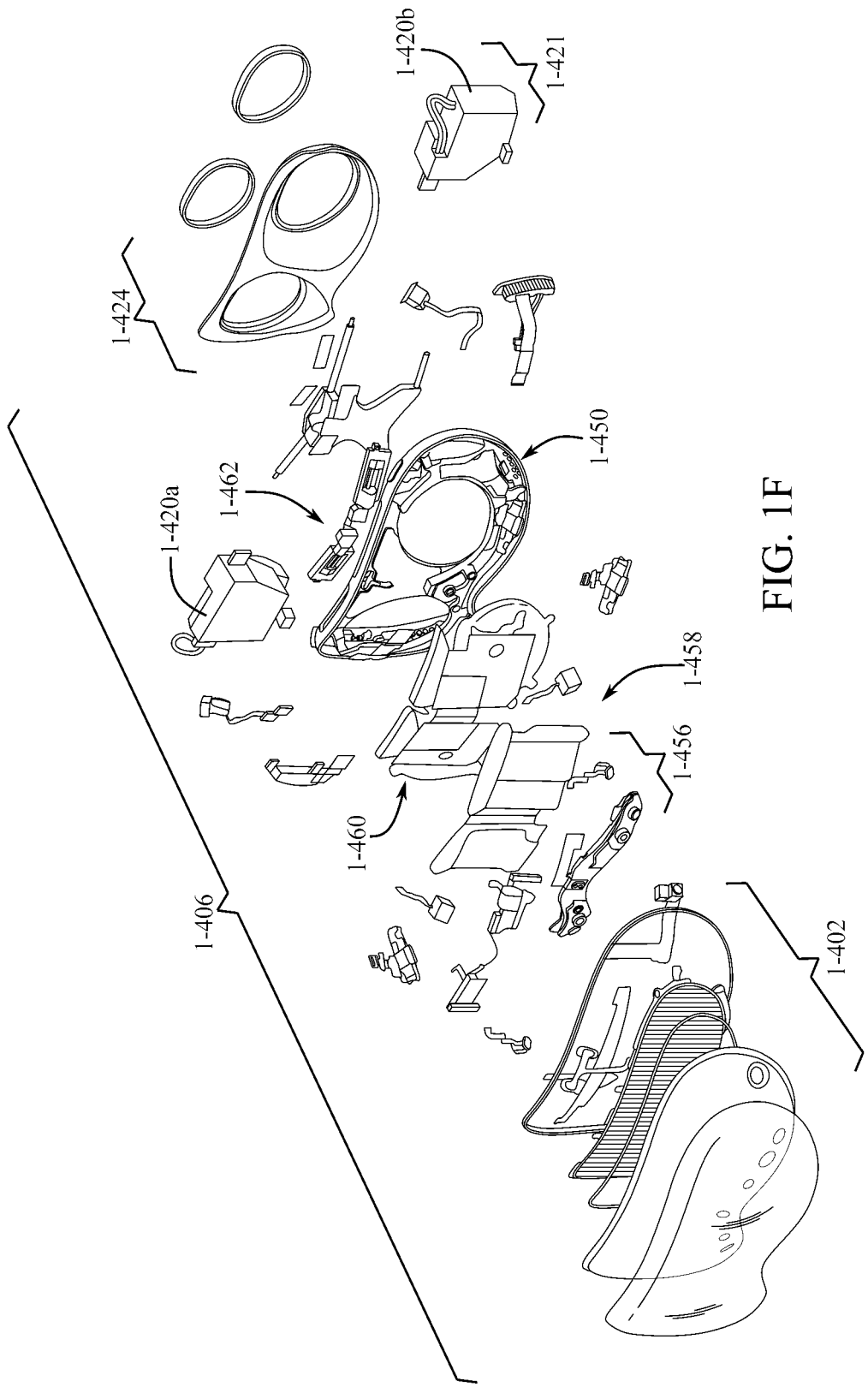
Figure 1G:
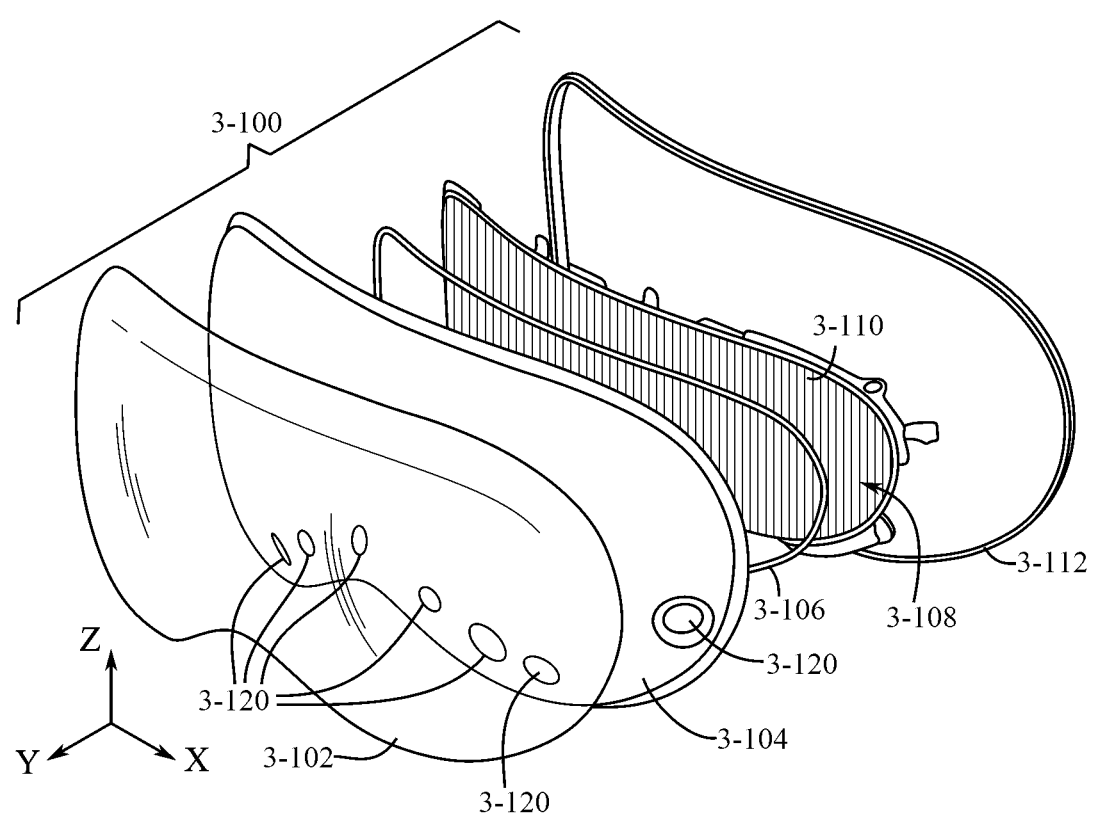
Figure 1H:
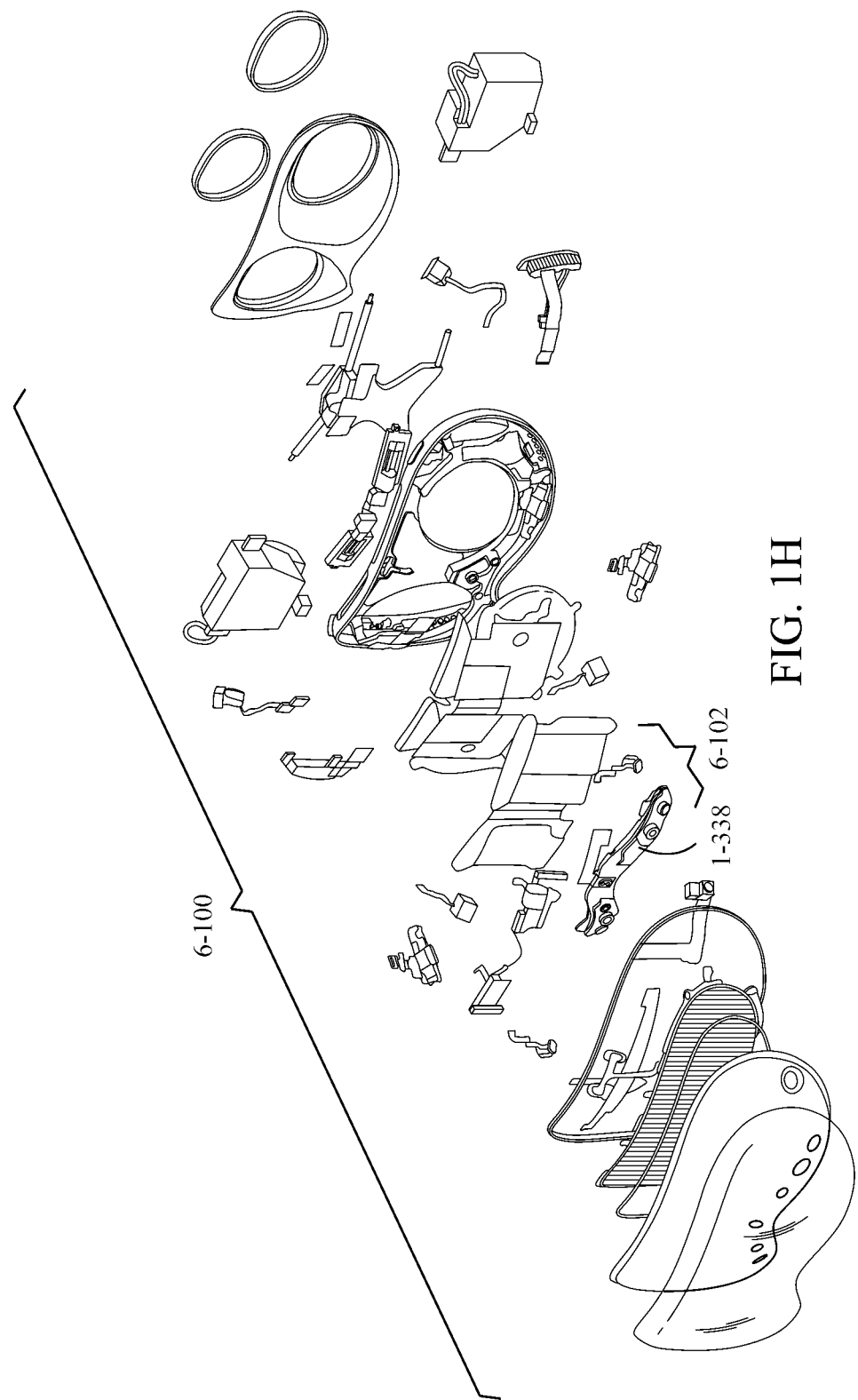
Figure 1I:
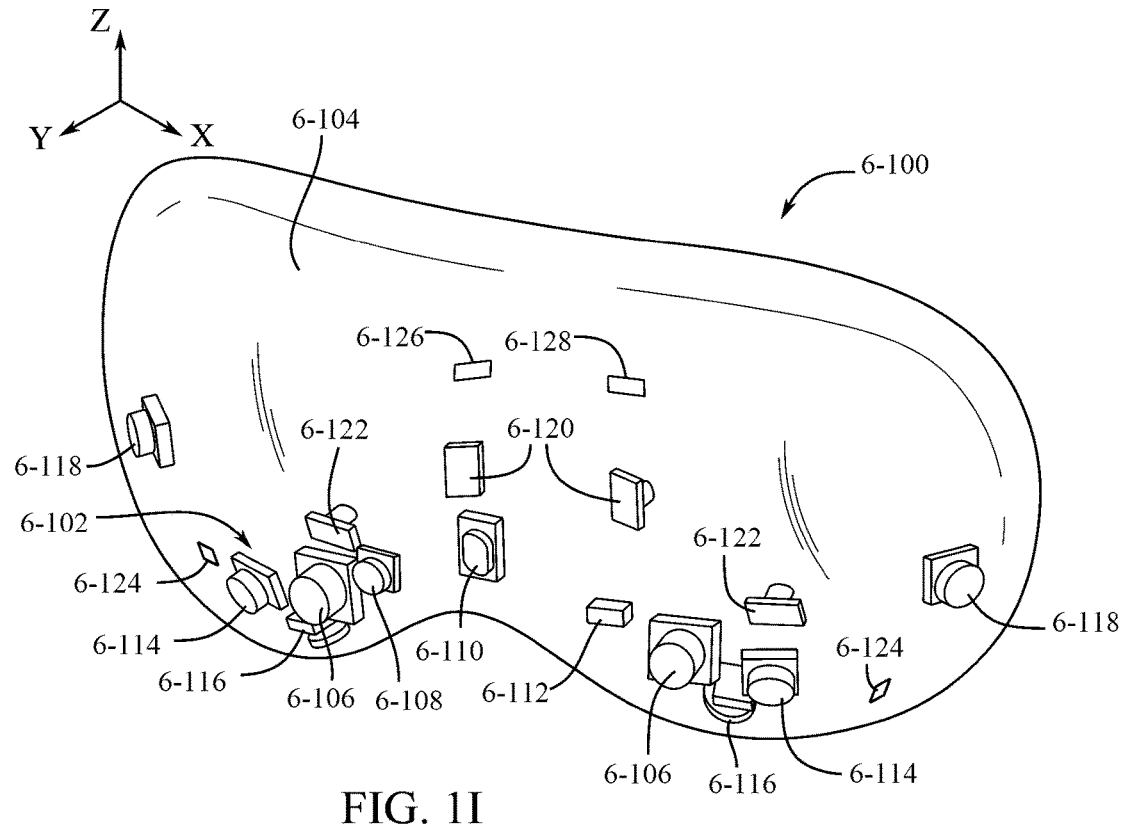
Figure 1J:
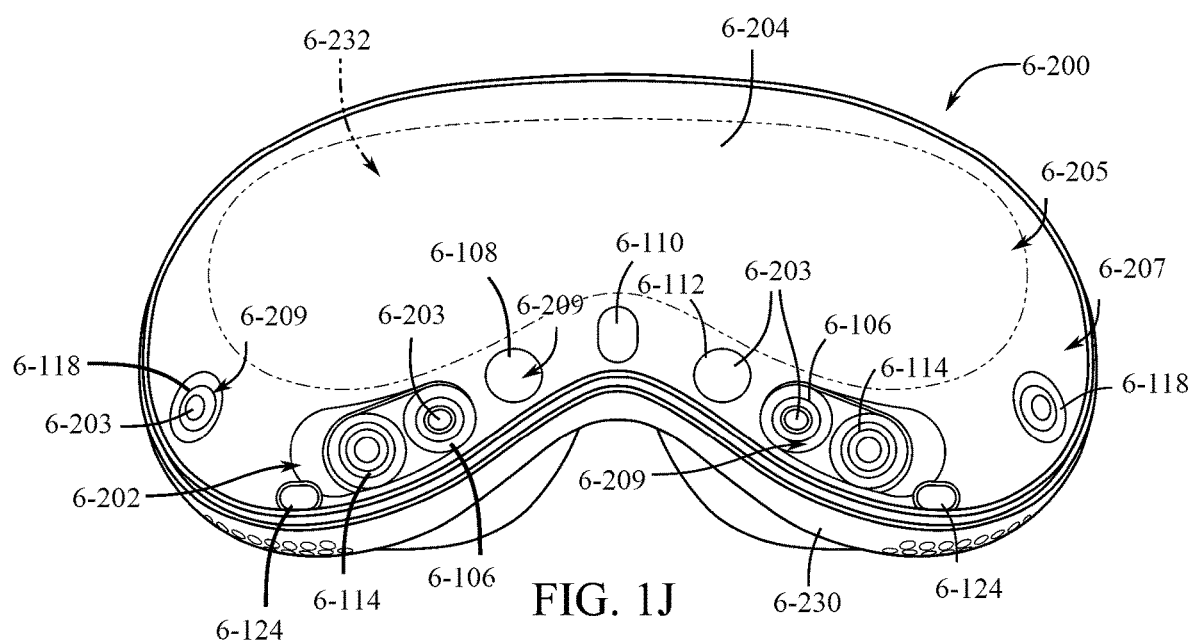
Figure 1K:
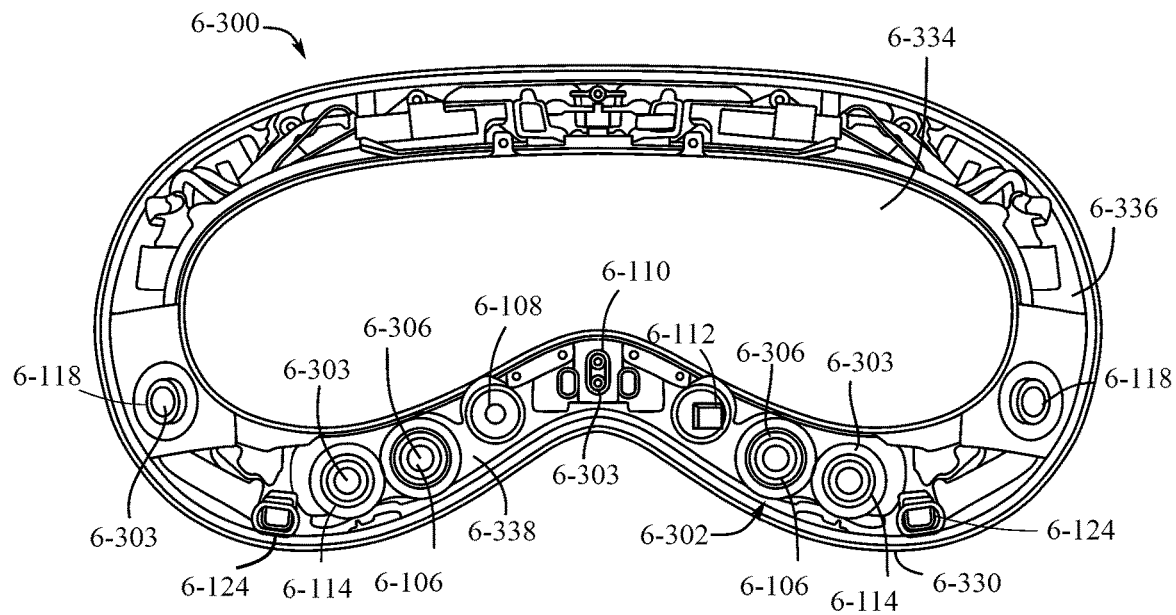
Figure 1L:
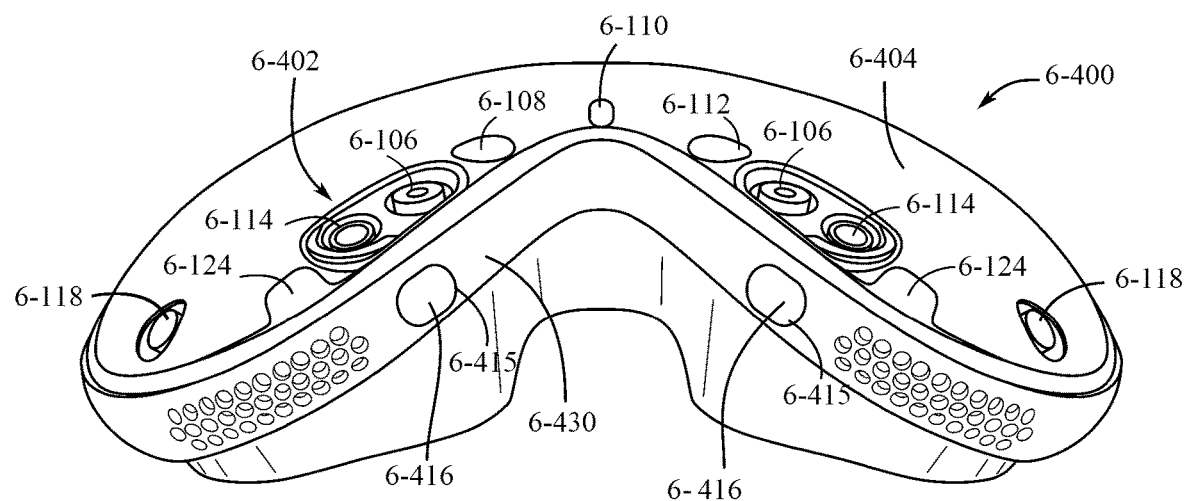
Figure 1M:
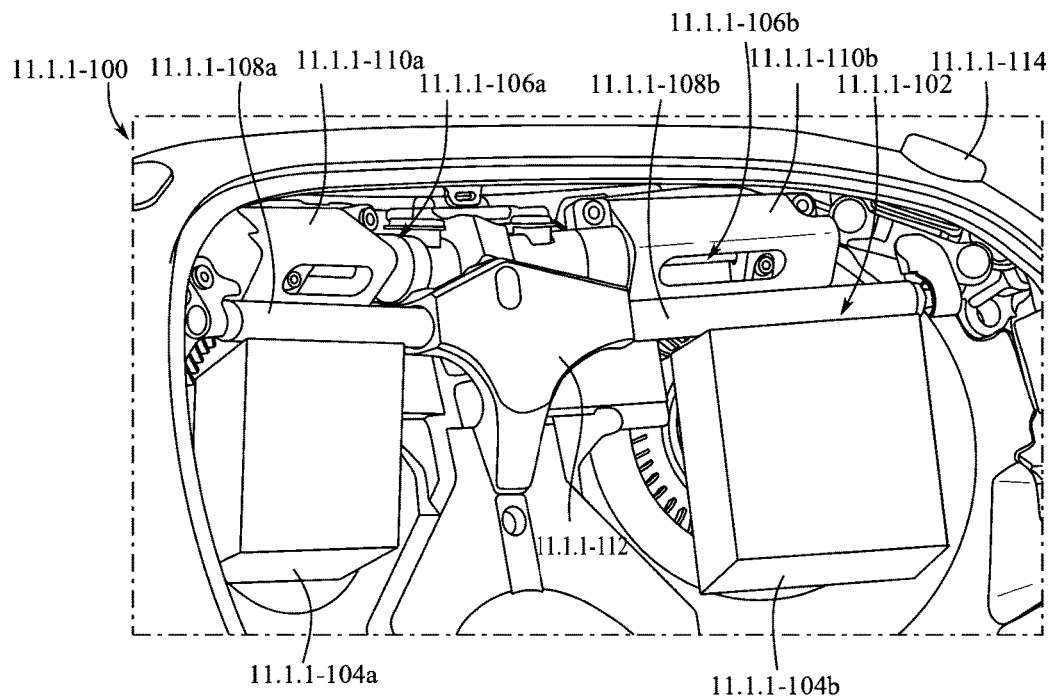
Figure 1N:
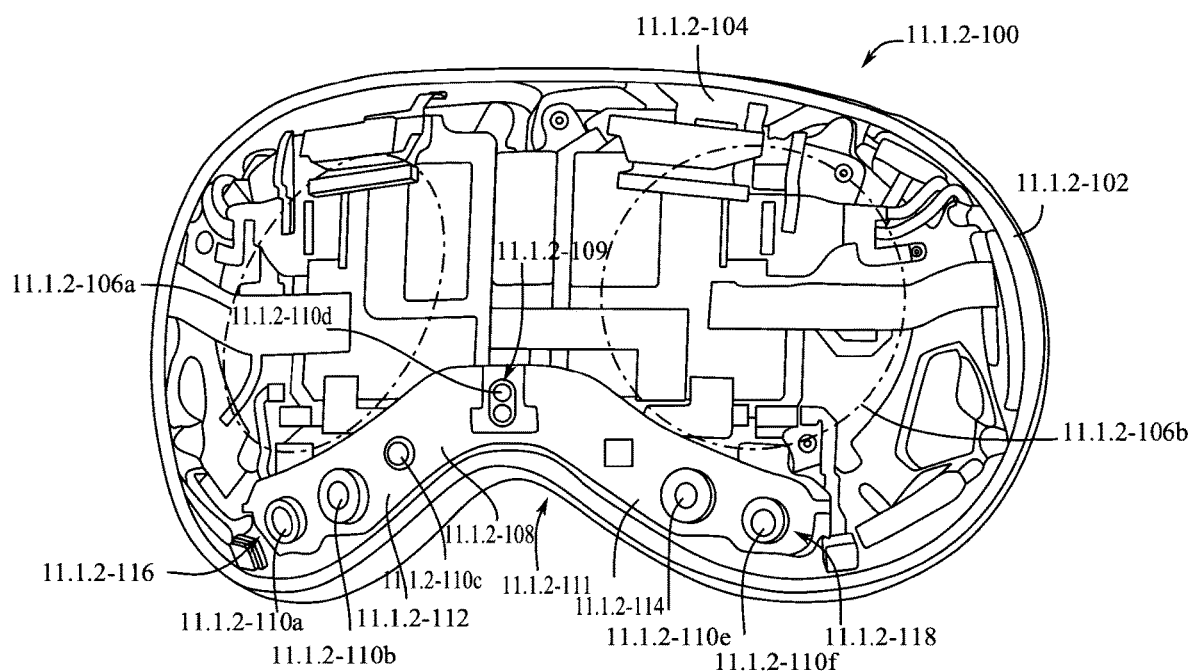
Figure 1O:
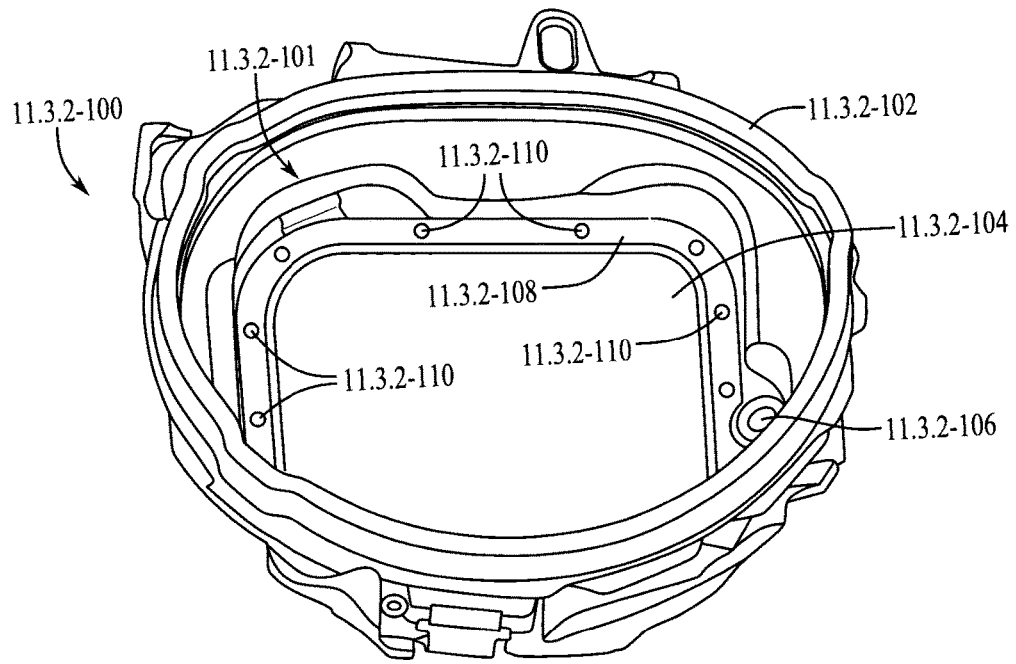
Figure 1P:
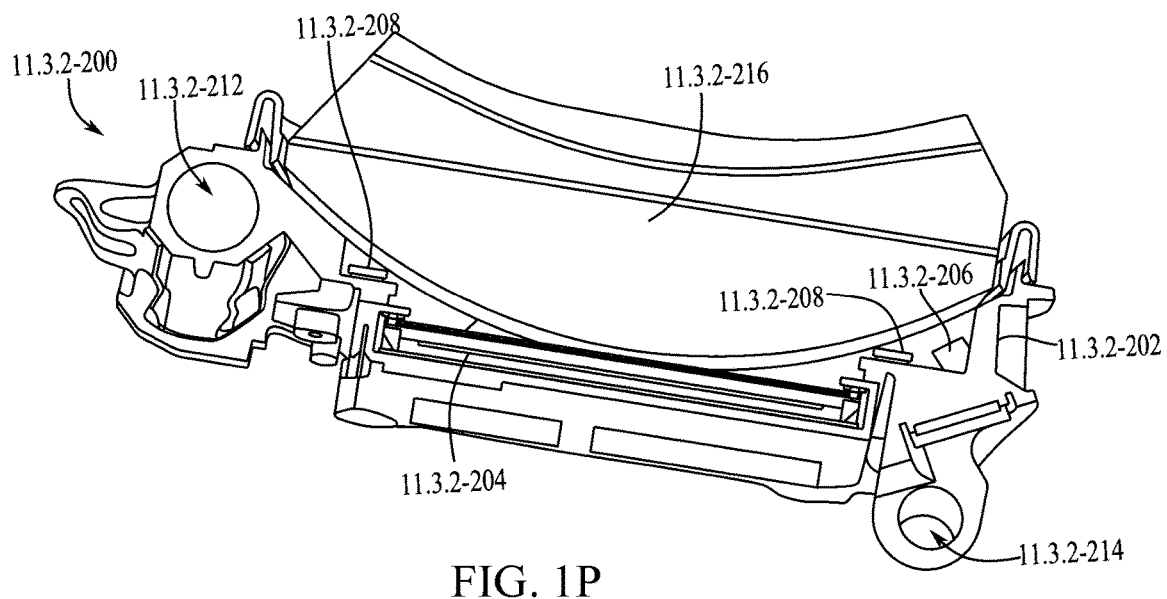

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein.

Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered"

or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
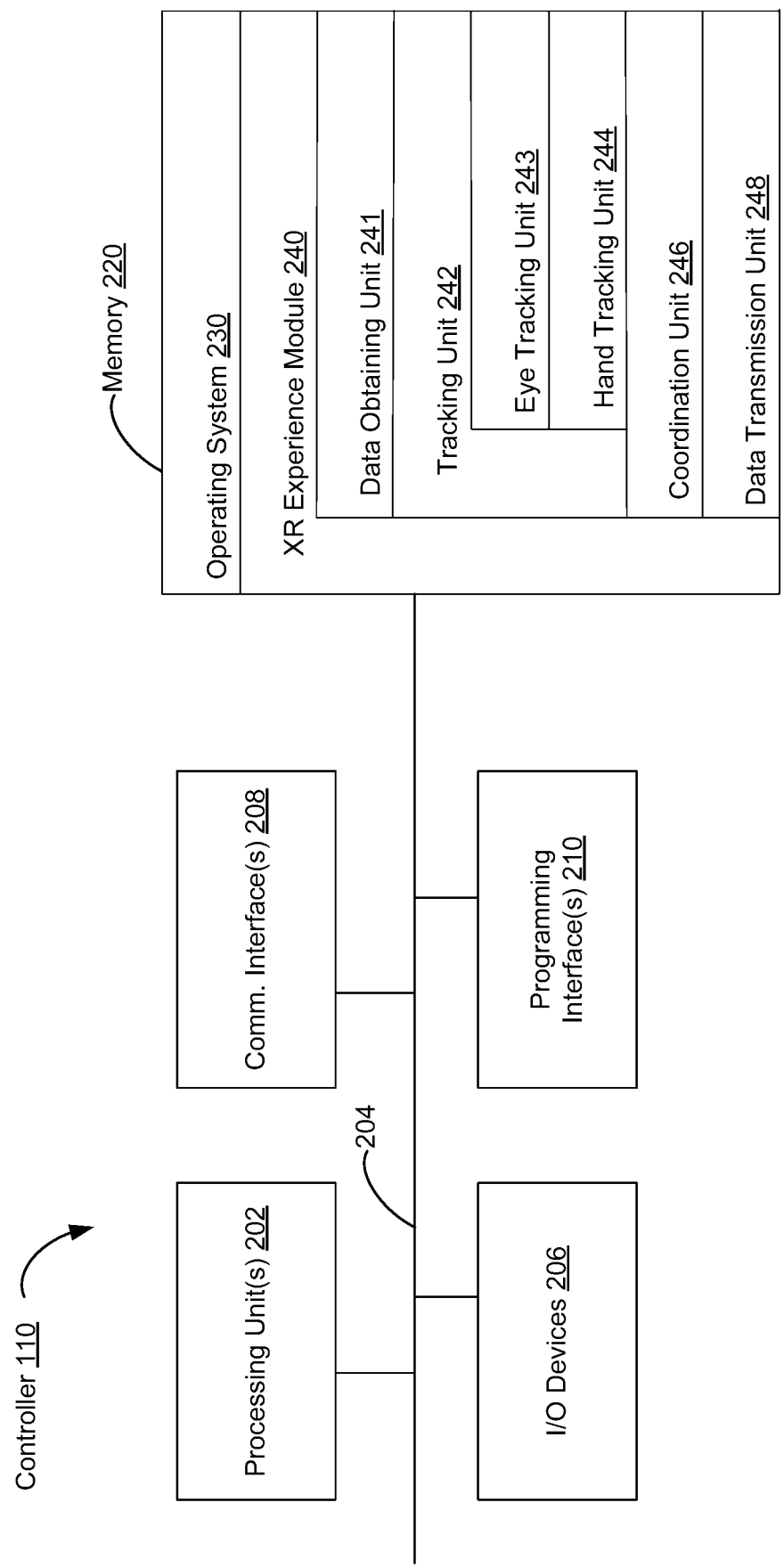
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
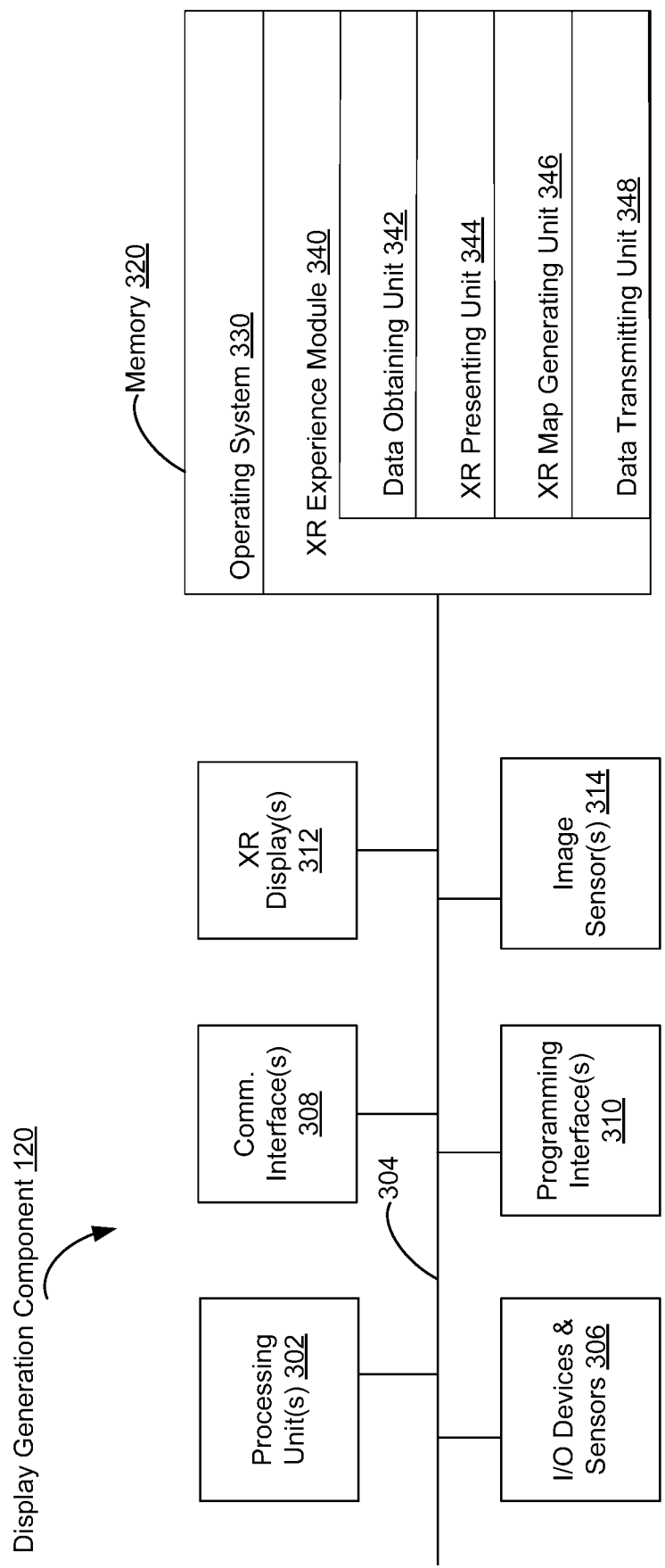
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
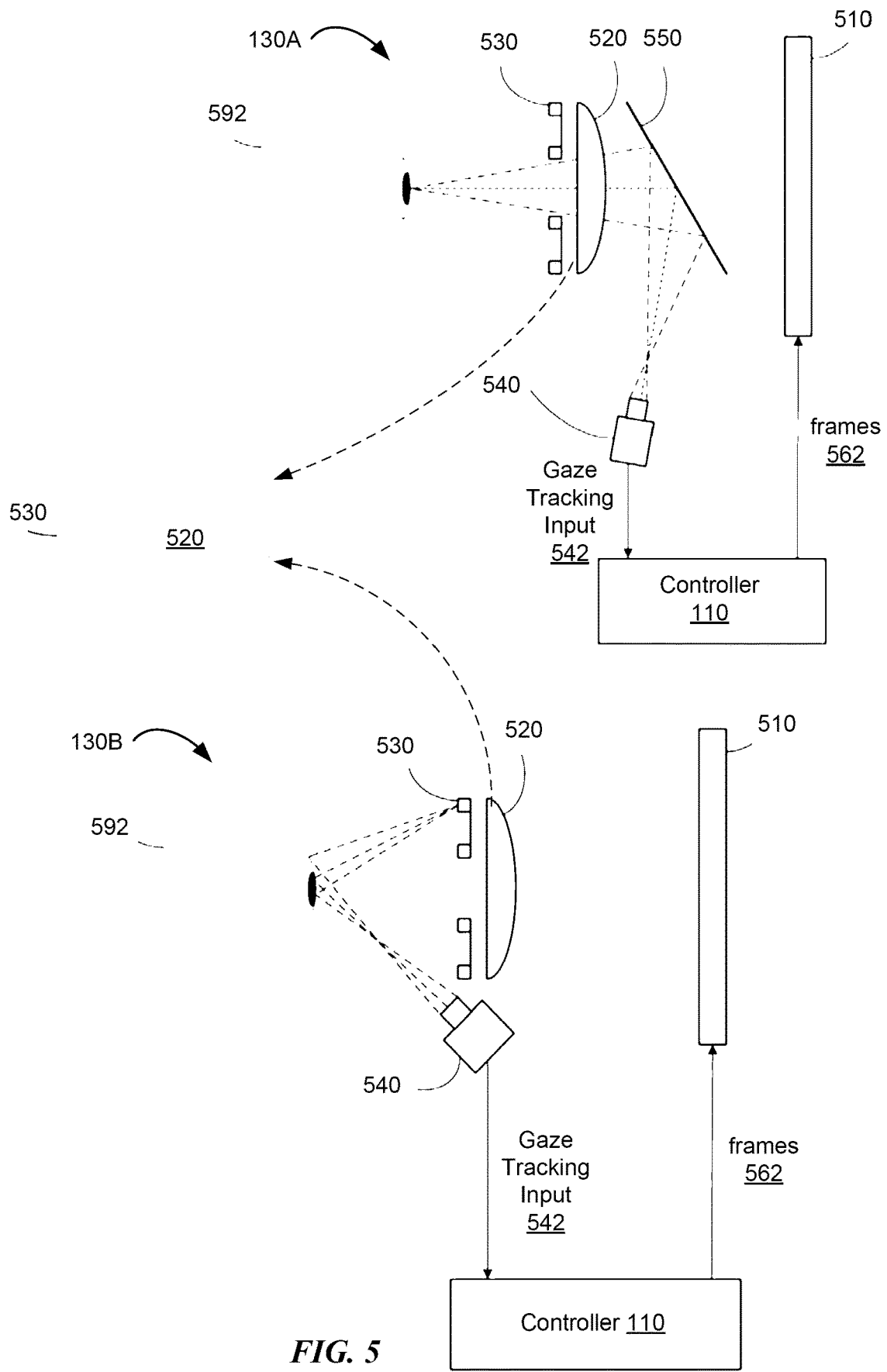
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper leverage to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
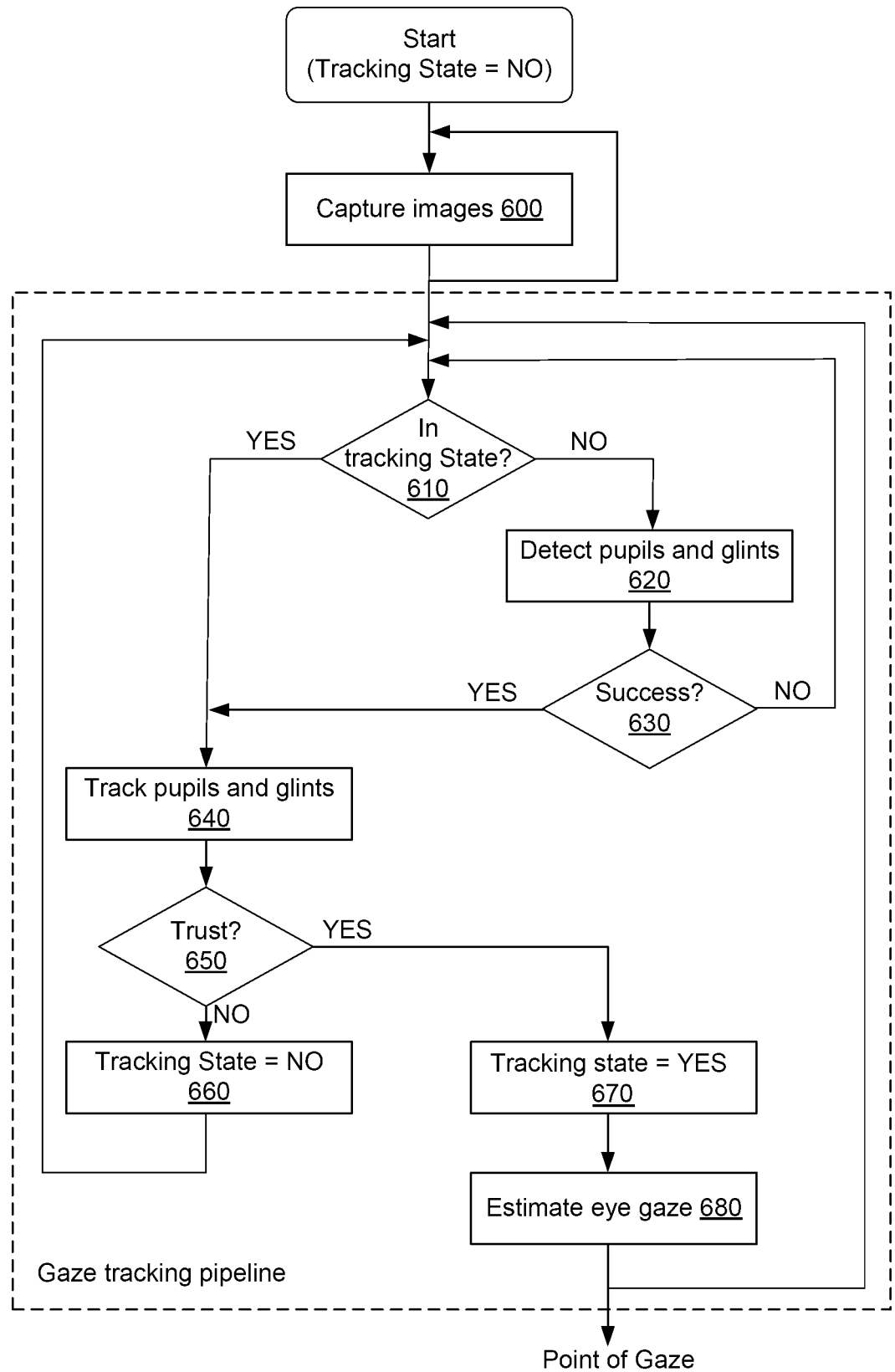
FIG. 6 is a flow diagram illustrating a glint-assisted gaze tracking pipeline in some embodiments.
Figure 7A:
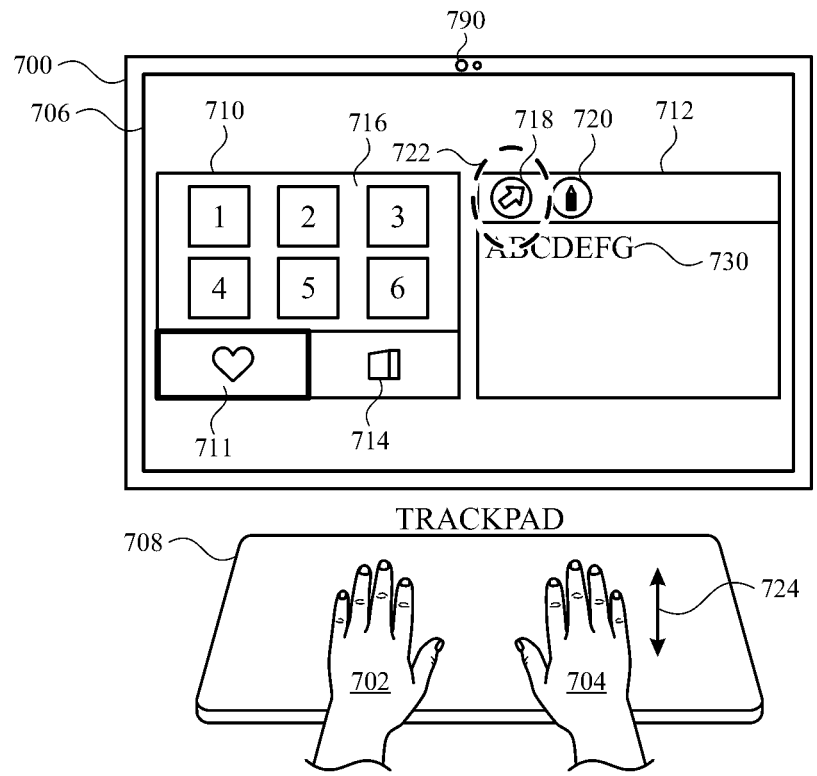
FIGS. 7A-7P illustrate example techniques for controlling a cursor based on detected hand movement, in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and one or more input devices.

FIGS. 7A-7P illustrate examples of controlling a cursor based on detected hand movement. FIG. 8 is a flow diagram of an exemplary method 800 for controlling a cursor based on detected hand movement. The user interfaces in FIGS. 7A-7P are used to illustrate the processes described below, including the processes in FIG. 8.

FIGS. 7A-7P illustrate a user interacting with device 700 using their left hand 702 and/or their right hand 704. In some embodiments, device 700 includes one or more features of computer system 101.

In the illustrated embodiments, device 700 is a desktop computer that includes display 706 and one or more image sensors 790 (e.g., implemented as one or more image sensors 314) and that is in communication with trackpad (e.g., a touch-sensitive surface) 708. In other embodiments, device 700 is implemented as another type of device. For example, device 700 is implemented as a head-mounted device that includes display 706, that is in communication with one or more image sensors 314, and optionally that neither includes nor is in communication with trackpad 708. Accordingly, in embodiments where device 700 is implemented as a head-mounted device, the content provided by display 706 in FIGS. 7A-7P forms a three-dimensional environment that the user is immersed in. For example, when immersed in the three-dimensional environment, the user perceives the content as three-dimensional elements, and optionally, does not view their left hand 702, their right hand 704, and/or trackpad 708. As another example, when immersed in the three-dimensional environment, the user can view a left hand and a right hand of an avatar representing the user, e.g., instead of viewing their physical left hand 702 and their physical right hand 704. As another example, the user can view a pass-through representation of the physical environment that can include their hands.

As described below, using one or more image sensors 790 and/or trackpad 708, device 700 detects respective movements of, and respective gestures (e.g., gestures on trackpad 708 and/or air gestures) performed by, left hand 702 and right hand 704. Device 700 further performs various operations based on the respective movements and respective gestures.

In FIG. 7A, device 700 displays window 710 for a photos application and window 712 for a markup application (e.g., an application that allows the user to create and/or edit content, e.g., by drawing, typing, and/or adding other types of graphical elements into the content). Window 710 includes favorites icon 711 and recently added icon 714. Favorites icon 711 is currently selected (as indicated by the bolded border around it). Device 700 thus displays, in window 710, the user's favorite photos 716, labeled 1-6.

Window 712 includes cursor icon 718 and markup icon 720. Both cursor icon 718 and markup icon 720 are in an unselected state, thereby respectively indicating that a cursor is not invoked and that a markup mode (e.g., a drawing mode in which the cursor can be used to draw marks on content) for the markup application is inactive. Window 712 further displays text 730 included in the content being created and/or edited using the markup application.

In FIG. 7A, while cursor icon 718 is in the unselected state, device 700 detects that the user is currently focused on (e.g., gazing at) cursor icon 718. Device 700 thus displays focus indicator 722 around cursor icon 718. In other embodiments, device 700 detects that the user's gaze is directed to cursor icon 718, but does not display a focus indicator to indicate focus on a particular user interface element. For example, device 700 instead changes one or more visual characteristics (e.g., brightness, size, depth, color, border width, text size, and/or font) of a currently in-focus user interface element.

Figure 7B:
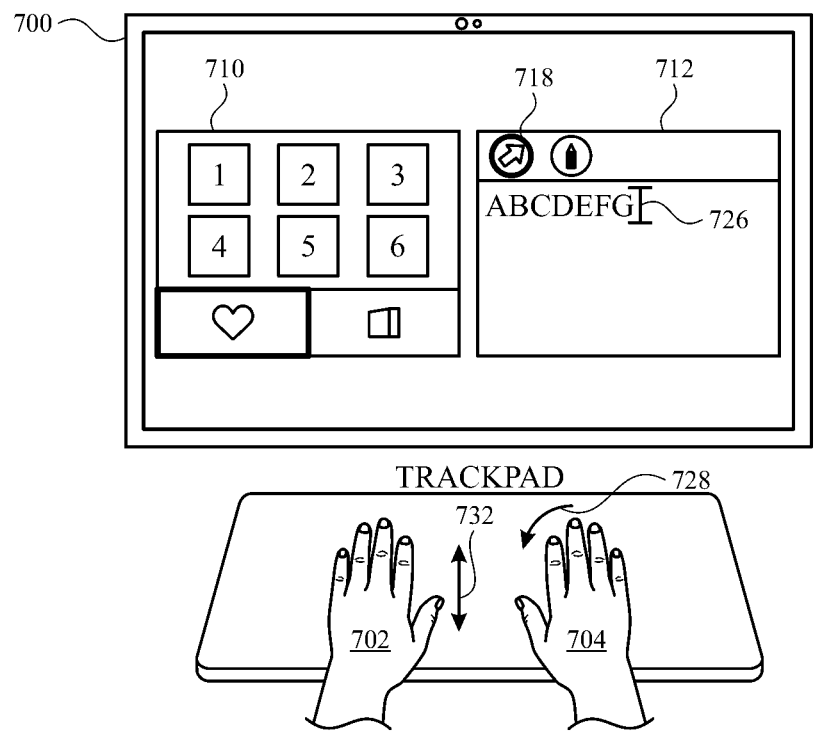

While device 700 displays focus indicator 722 around cursor icon 718, device 700 detects gesture 724 (e.g., a pinch gesture detected by trackpad 708) performed by right hand 704 that selects cursor icon 718. In some embodiments, such as embodiments in which device 700 is a head-mounted device, gesture 724 is an air gesture. In FIG. 7B, in response to detecting gesture 724, device 700 invokes (e.g., initiates display of) cursor 726. Device further displays a bolded border around cursor icon 718 to indicate that cursor 726 is invoked.

In some embodiments, such as the embodiments shown in FIGS. 7B-7I, the hand that invoked cursor 726 (e.g., via selection of cursor icon 718 or markup icon 720) becomes the hand that controls cursor 726, e.g., the hand whose detected movement causes cursor 726 to change position. Thus, in FIGS. 7B-7I, right hand 704 controls cursor 726 because right hand 704 performed gesture 724 to select cursor icon 718.

In FIG. 7B, device 700 detects movement 728 of right hand 704. In FIG. 7C, in response to detecting movement 728 of right hand 704, device 700 changes the position of cursor 726 based on movement 728. In some embodiments, device 700 changes the position of cursor 726 based on a characteristic (e.g., magnitude, speed, and/or direction) of movement 728. For example, device 700 moves cursor 726 over a distance proportional to the distance of movement 728, moves cursor 726 with a speed proportional to the speed of movement 728, and/or moves cursor 726 in the same direction as the direction of movement 728.

In FIG. 7C, device 700 further selects (e.g., highlights) a portion of text 730 based on movement 728. For example, movement 728 is part of a detected pinch and drag air gesture performed by right hand 704. Based on the detected pinch and drag air gesture, device 700 selects a corresponding portion of text 730. In some embodiments, if device 700 detects that right hand 704 moves without performing a pinch air gesture during the movement, device 700 changes the position of cursor 726 based on the movement of right hand 704, but without selecting content based on the movement of right hand 704.

In some embodiments, while one hand of the user (e.g., right hand 704) controls cursor 726, movement of the other hand that does not control the cursor (e.g., left hand 702) can perform an operation (e.g., a scrolling operation, a drag and drop operation, an operation of moving windows 710 and/or 712, an operation of navigating between sections of an application, and/or a selection operation), as illustrated in FIGS. 7B-7I below. In some embodiments, movement of the other hand performs an operation if the other hand is in a predetermined pose (e.g., a pinch pose) during the movement (e.g., during at least a portion of the movement) and movement of the other hand does not perform the operation if the other hand is not in the predetermined pose during the movement (e.g., during any portion of the movement), as detailed below.

Referring back to FIG. 7B, device 700 detects movement 732 of left hand 702. Device 700 further detects that left hand 702 is not in a predetermined pose (e.g., a pinch pose) during movement 732. In some embodiments in which device 700 is a head-mounted device, requiring the hand to be in a predetermined pose to invoke certain functions can reduce the chances of unintended performance of the functions, as the user moves their hands for other reasons. Because left hand 702 is not in the predetermined pose during movement 732, device 700 does not perform any operation based on movement 732. For example, in FIG. 7C, the displayed content does not change based on movement 732.

In FIG. 7C, device 700 detects movement 734 of left hand 702 to perform a panning (e.g., scrolling) operation. Device 700 further detects that left hand 702 is in a predetermined pose (e.g., a pinch pose) during movement 734. In some embodiments, device 700 further detects that movement 734 is a downward movement and determines that the user focuses on (e.g., gazes at) window 710 of the photos application during at least a portion of movement 734. Because left hand 702 is in the predetermined pose during movement 734 and because movement 734 is a downward movement and/or because the user focuses on window 710 during at least a portion of movement 734, device 700 performs a scroll down operation on window 710. For example, in FIG. 7D, device 700 scrolls down the user's favorite photos 716 to display favorite photos 7-9 instead of favorite photos 1-6.

In FIG. 7D, device 700 detects that the user focuses on (e.g., gazes at) favorite photo 9. Device 700 thus displays focus indicator 736 around favorite photo 9. While displaying focus indicator 736 around favorite photo 9, device 700 detects movement 738 of left hand 702 to perform a drag and drop operation on favorite photo 9. For example, device 700 detects movement 738 as part of detecting a pinch and drag air gesture performed by left hand 702. In particular, as illustrated in FIGS. 7D-7F1, while displaying focus indicator 736 around favorite photo 9, device 700 detects that left hand 702 starts a pinch and drag air gesture to select favorite photo 9 and to move favorite photo 9 into window 712 of the markup application. In FIG. 7F1, while device 700 displays favorite photo 9 in window 712, device 700 detects that the pinch and drag gesture ends by left hand 702 releasing the pinch pose. In response to detecting the end of the pinch and drag gesture, device 700 places favorite photo 9 in window 712 by copying favorite photo 9 into the currently displayed content of the markup application.

In FIG. 7F1, device 700 detects movement 740 of right hand 704. Further, device 700 has not received any input to change which hand controls cursor 726, since detecting gesture 724 in FIG. 7A. Therefore, right hand 704 continues to control cursor 726. In FIG. 7G, device 700 thus changes the position of cursor 726 based on movement 740.

In FIG. 7F1, device 700 further detects movement 742 of left hand 702 to move window 710 of the photos application. In some embodiments, device 700 detects that left hand 702 is in a predetermined pose (e.g., pinched pose) during movement 742 and/or that the user focuses on (e.g., gazes at) window 710 during at least a portion of movement 742. In response to detecting movement 742 and in response to detecting that left hand 702 is in the predetermined pose during movement 742 and/or that the user focuses on window 710 during at least a portion of movement 742, device 700 moves window 710 based on movement 742. In particular, in FIG. 7G, based on movement 742, device 700 displays window 710 to be closer to and higher than window 712.

In some embodiments, the techniques and user interface(s) described in FIG. 7F1 are provided by one or more of the devices described in FIGS. 1A-1P. FIG. 7F2 illustrates an embodiment in which windows 710 and 712 and cursor 726 are displayed on display module X702 of head-mounted device (HMD) X700. In some embodiments, device 700 is implemented as device X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

In FIG. 7F2, device X700 detects movement X740 of right hand 704. Further, device X700 has not received any input to change which hand controls cursor 726, since detecting gesture 724 in FIG. 7A. Therefore, right hand 704 continues to control cursor 726. In FIG. 7G, device 700 thus changes the position of cursor 726 based on movement 740 in FIG. 7F1 or movement 740X in FIG. 7F2.

In FIG. 7F2, device X700 further detects movement X742 of left hand 702 to move window 710 of the photos application. In some embodiments, device X700 detects that left hand 702 is in a predetermined pose (e.g., a pinched pose in which left finger 750A and left thumb 750B make contact) during movement X742 and/or that the user focuses on (e.g., gazes at) window 710 during at least a portion of movement X742. In some embodiments, device X700 detects that the user focuses on window 710 based on detecting the user's gaze using camera X704. In response to detecting movement X742 and in response to detecting that left hand 702 is in the predetermined pose during movement X742 and/or that the user focuses on window 710 during at least a portion of movement X742, device X700 moves window 710 based on movement X742. In particular, in FIG. 7G, based on movement 742 or movement X742, device 700 displays window 710 to be closer to and higher than window 712.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 790, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 includes any of the features, components, and/or parts of any of first button 1-128, button 11.1.1-114, second button 1-132, and/or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

In FIG. 7G, device 700 detects movement 744 of left hand 702 to switch from the favorites section of window 710 to the recently added section of window 710. In some embodiments, device 700 further detects that left hand 702 is in a predetermined pose (e.g., a pinched pose) during movement 744 and/or that the user focuses on (e.g., gazes at) recently added icon 714 during at least a portion of movement 744. In response to detecting movement 744 and in response to detecting that left hand 702 is in a predetermined pose during movement 744 and/or that the user focuses on recently added icon 714 during at least a portion of movement 744, device 700 switches from the favorites section of window 710 to the recently added section of window 710, as shown in FIG. 7H. In particular, in FIG. 7H, device 700 displays the user's recently added photos 746 in window 710, indicates that recently added icon 714 is now selected (e.g., by displaying the bolded box around it), and indicates that favorites icon 711 is unselected.

In FIG. 7H, device 700 detects movement 748 of left hand 702 to select recently added photo 750. In some embodiments, device 700 further detects that left hand 702 is in a predetermined pose (e.g., a pinched pose) during movement 748 and/or that the user focuses on (e.g., gazes at) recently added photo 750 during at least a portion of movement 748. In response to detecting movement 748 and in response to detecting that left hand 702 is in a predetermined pose during movement 748 and/or that the user focuses on recently added photo 750 during at least a portion of movement 748, device 700 selects recently added photo 750. In particular, in FIG. 7I, device 700 enlarges recently added photo 750 into an expanded view due to the selection of recently added photo 750.

In FIG. 7I, the user focuses on (e.g., gazes at) markup icon 720. Device 700 thus displays focus indicator 752 around markup icon 720. While displaying focus indicator 752 around markup icon 720, device 700 detects pinch gesture 754 (e.g., an air gesture) performed by left hand 702 to select markup icon 720. In response to detecting pinch gesture 754, in FIG. 7J, device 700 invokes the markup mode of the markup application (e.g., as indicated by the bolded border around markup icon 720) and invokes cursor 756 (e.g., a pencil icon).

In some embodiments, because left hand 702 invoked the markup mode and invoked cursor 756, the respective hand that controls cursor 756 changes from right hand 704 to left hand 702 in FIGS. 7J-7O. Further, in some embodiments, while the markup mode is invoked, respective movement of each hand interacts with (e.g., performs operations associated with) the markup application and the respective movement does not interact with another application. For example, as described in FIGS. 7J-7P below, while the markup mode is invoked, movement of left hand 702 and movement of right hand 704 each interact with the markup application and the movements do not interact with the photos application. In contrast, as described in FIGS. 7A-7I above, when the markup mode is not invoked, movement of one hand (e.g., right hand 704) can interact with the markup application while movement of another hand (e.g., left hand 702) can interact with another application, such as the photos application.

In FIG. 7J, device 700 detects movement 758 of left hand 702. In the illustrated embodiment, device 700 further detects that left hand 702 is in a predetermined pose (e.g., a pinch) during movement 758. For example, device 700 detects movement 758 as part of a pinch and drag air gesture performed by left hand 702. In response to detecting movement 758, in FIG. 7K, device 700 changes the location of cursor 756 based on movement 758. In FIG. 7K, because left hand 702 is in the predetermined pose during movement 758, device 700 further generates line 760 based on movement 758, thereby allowing the user to draw with left hand 702.

In FIG. 7J, device 700 further detects gesture 762 (e.g., a pinch and drag air gesture) performed by right hand 704. Device 700 detects gesture 762 after a predetermined duration (e.g., 0.05 seconds, 0.1 seconds, 0.25 seconds, 0.5 seconds, or 1 second) from when the location of cursor 756 changed based on movement 758. Because device 700 detected gesture 762 after the predetermined duration from when the location of cursor 756 changed based on movement 758, device 700 forgoes performing any operation based on gesture 762. For example, in FIG. 7K, device 700 does not change the displayed content based on gesture 762.

In FIG. 7K, device 700 detects movement 764 of left hand 702. For example, movement 764 is part of a pinch and drag air gesture performed by left hand 702. In response, in FIG. 7L, device 700 changes the location of cursor 756 based on movement 764 and further generates line 766 based on movement 764.

Figure 7M:
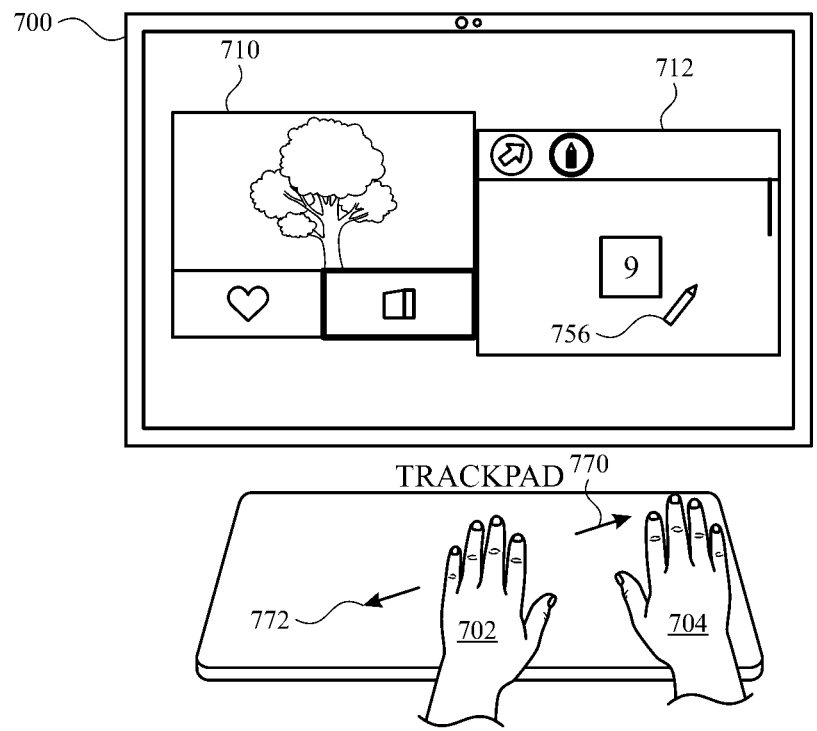

In FIG. 7L, device 700 detects continued movement 764 of left hand 702, e.g., detects that the pinch and drag air gesture performed by left hand 702 continues. Device 700 further detects gesture 768 (e.g., a pinch and drag air gesture) performed by right hand 704. Device 700 detects gesture 768 within a predetermined duration (e.g., 0.05 seconds, 0.1 seconds, 0.25 seconds, 0.5 seconds, or 1 second) after changing the location of cursor 756 based on movement 764. Because device 700 detected gesture 768 within the predetermined duration after changing the location of cursor 756 based on movement 764, device 700 performs an operation based on movement 764 and gesture 768. For example, because movement 764 and gesture 768 each correspond to movement in the upper right direction, in FIG. 7M, device 700 performs the operation of panning the content of the markup application in the upper right direction. In FIG. 7M, because device 700 detected gesture 768 within the predetermined duration after changing the location of cursor 756 based on movement 764, device 700 removed line 766 generated based on the initial portion of movement 764 in FIG. 7K.

In FIG. 7M, device 700 detects gesture 770 (e.g., an air pinch and drag gesture) performed by right hand 704. Device 700 further detects gesture 772 (e.g., an air pinch and drag gesture) performed by left hand 702 after detecting gesture 770. Because device 700 detects gesture 772 performed by left hand 702 (that controls cursor 756) after detecting gesture 770 performed by right hand 704 (that does not control cursor 756), device 700 does not change the location of cursor 756 based on gesture 772. Device 700 instead performs an operation based on both gesture 770 and gesture 772. For example, in FIG. 7N, because gestures 770 and 772 respectively correspond to respective hand movements in opposite directions, device 700 performs a zooming operation on the content of the markup application based on gestures 770 and 772.

Figure 7N:
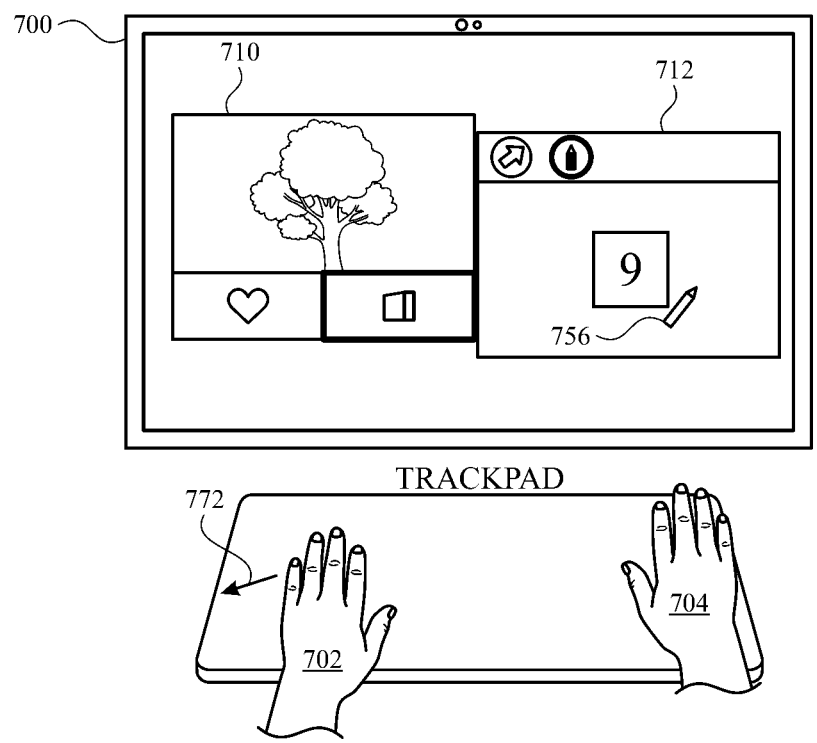

In FIG. 7N, device 700 detects that gesture 770 performed by right hand 704 ends. For example, device 700 detects that the pinch and drag air gesture performed by right hand 704 ends because right hand 704 is no longer in a pinched pose. Device 700 further detects that after gesture 770 ends, gesture 772 performed by left hand 702 continues. For example, left hand 702 continues to perform the pinch and drag air gesture, e.g., by continuing to perform a drag air gesture while left hand 702 is in a pinched pose. Because gesture 772 continues after gesture 700 ends, device 700 performs an operation based on the continued gesture 772 without changing the location of cursor 756 based on gesture 772 (e.g., despite that gesture 772 includes movement of left hand 702 that currently controls the cursor). For example, in FIG. 7O, because continued gesture 772 corresponds to movement in the bottom left direction, device 700 pans the content of the markup application towards the bottom left.

Figure 7O:
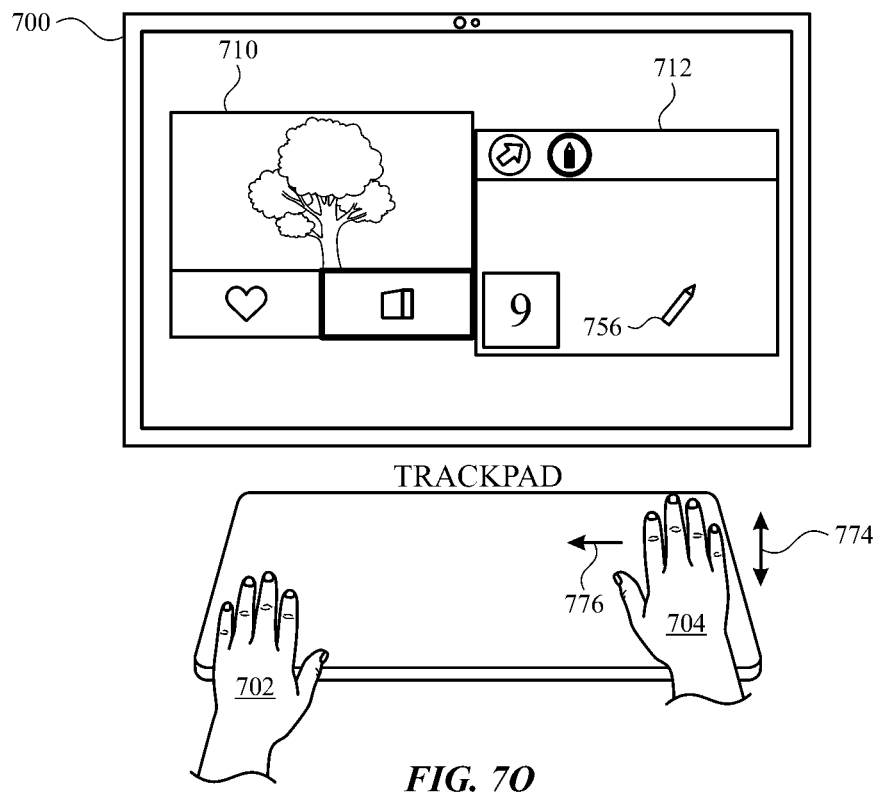
Figure 7P:
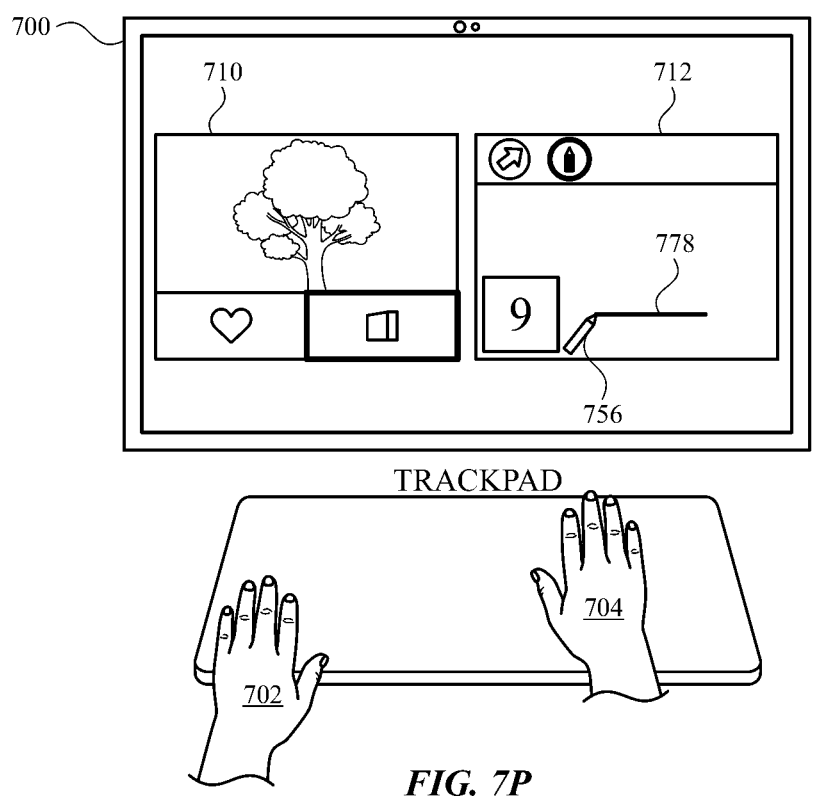

In FIG. 7O, device 700 detects that right hand 704 performs gesture 774 (e.g., a pinch and release air gesture or a double pinch and release air gesture) to change the respective hand that controls cursor 756. In response to detecting gesture 774, device 700 changes a setting so that right hand 704 (e.g., not left hand 702) now controls cursor 756. Further in FIG. 7O, while right hand 704 controls cursor 756, device 700 detects movement 776 of right hand 704. For example, device 700 detects movement 776 as part of detecting a pinch and drag gesture performed by right hand 704. In FIG. 7P, in response to detecting movement 776, device 700 changes the location of cursor 756 based on movement 776. In FIG. 7P, device 700 further generates line 778 based on movement 776, e.g., because movement 776 is part of a pinch and drag gesture performed by right hand 704.

In embodiments where device 700 is a head-mounted device, the techniques demonstrated in FIGS. 7A-7P, above, can be used to manipulate virtual objects (e.g., application windows and/or cursors) displayed in an extended reality environment, while still permitting the user to use their hands to interact with the physical environment.

Additional descriptions regarding FIGS. 7A-7P are provided below in reference to method 800 described with respect to FIG. 8.

FIG. 8 is a flow diagram of an exemplary method 800 for controlling a cursor based on detected hand movement, in some embodiments. In some embodiments, method 800 is performed at a computer system (e.g., computer system 101 in FIG. 1A, device 700, and/or device X700) (e.g., a smartphone, a desktop computer, a laptop, a tablet, a wearable device (e.g., a smart watch or, a wearable fitness tracker), a head-mounted device, and/or a projection-based system) that is in communication with a display generation component (e.g., display generation component 120 in FIGS. 1A, 3, and 4) (e.g., a head-mounted display system, a display (e.g., a touch-sensitive display), and/or a projector) and one or more input devices (e.g., a camera, a gyroscope, an accelerometer, a mouse, a trackpad, and/or a physiological sensor (e.g., a blood pressure sensor and/or a heart rate sensor)). In some embodiments, the one or more input devices are integrated into the computer system. In some embodiments, the one or more input devices are integrated into an external device (e.g., a wearable device) that is in communication with the computer system.

In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system (e.g., 700 and/or X700) detects (802), via the one or more input devices (e.g., 708 and/or 790), movement (e.g., 728, 732, 734, 738, 740, 742, X740, X742, 744, 748, 758, 762, 764, 768, 770, 772, or 776) of a respective hand (e.g., 702 or 704) of a user of the computer system. In some embodiments, during the movement, the hand does not directly contact the computer system or any sensor(s) of the computer system. In some embodiments, the movement is lateral, forward, and/or backward (each relative to the user) movement. In some embodiments, the movement of the hand changes the respective locations of each part (e.g., palm and fingers) of the hand.

In response to detecting (804) the movement: in accordance with (806) a determination that the movement of the respective hand satisfies a first set of criteria, wherein the first set of criteria includes a first criterion that is satisfied when the movement of the respective hand is movement of a first hand of the user of the computer system (e.g., 702 or 704) (e.g., a first type of hand (e.g., a left hand or a right hand)) different from a second hand of the user of the computer system (e.g., 702 or 704) (e.g., a left hand of the user when the first hand is the right hand of the user and vice versa), the computer system changes a position of a cursor (e.g., 726 or 756) (e.g., a displayed icon or marking (e.g., drawing) that indicates a current location of user attention and/or a current focal point for operations of the computer system) based on the movement of the respective hand. In some embodiments, the first set of criteria includes a second criterion that is satisfied when the movement represents a first type of hand movement (e.g., movement of the entire hand) different from a second type of hand movement corresponding to one or more predetermined hand gestures (e.g., a pinch gesture, an air pinch gesture, a double pinch gesture, a double air pinch gesture, a tap gesture, and/or an air tap gesture) recognized by the computer system. In some embodiments, changing the position of the cursor includes displaying movement of the cursor. In some embodiments, the cursor is already displayed when detecting the movement. In some embodiments, the display of the cursor is initiated upon detecting the movement and determining that the first set of criteria are met. In some embodiments, the cursor is continuously displayed during the movement of the first hand, e.g., by sequentially displaying the cursor at a plurality of locations that each respectively correspond to a respective location of the first hand during the movement of the first hand. In some embodiments, the cursor is not continuously displayed during movement of the first hand. For example, the cursor is displayed at a first location immediately before movement of the first hand and displayed at a second location at the end of the movement of the first hand, without being displayed at any other locations while the first hand moves. In some embodiments, displaying the movement of the cursor includes displaying a marking (e.g., a drawing (e.g., a line)) that corresponds to movement of the hand.

In response to detecting (804) the movement (e.g., 728, 732, 734, 738, 740, 742, X740, X742, 744, 748, 758, 762, 764, 768, 770, 772, or 776): in accordance with (808) a determination that the movement of the respective hand (e.g., 702 or 704) does not satisfy the first set of criteria, the computer system forgoes changing the position of the cursor (e.g., 726 or 756) based on the movement of the respective hand. In some embodiments, the first set of criteria is not satisfied when the movement of the hand corresponds to movement of the second hand of the user of the computer system. In some embodiments, forgoing changing the position of the cursor based on the movement of the respective hand includes forgoing displaying movement of the cursor based on the movement of the respective hand. In some embodiments, the computer system continues to display the cursor, without movement. In some embodiments, the cursor is not displayed prior to detecting the movement and is not displayed in response to detecting the movement when the first set of criteria are not met. In some embodiments, during movement of the second hand, the position of the cursor changes based on movement of the first hand. Selectively changing the position of the cursor based on whether the movement of the respective hand satisfies the first set of criteria that includes the respective hand being a first hand, rather than a second hand, provides a more precise input scheme that is less prone to false positives resulting from movement of both hands, while also freeing the second hand to potentially control other operations. Providing a more precise and flexible input scheme enhances the operability of the system and makes the user-system interface more efficient (e.g., by helping the user to provide proper inputs and reducing user mistakes when operating/interacting with the system) while also reducing power usage and improving battery life of the system by enabling the user to use the device more quickly and efficiently. Doing so also reduces the number of inputs required to perform an operation by allowing the user to perform, using the cursor, operations with the first hand (e.g., text editing operations, drawing operations) that may be cumbersome to perform using a second hand that does not currently control the cursor. Doing so also performs an operation (e.g., moving the cursor) when a set of conditions (e.g., the first set of criteria) has been met without requiring further user input.

In some embodiments, prior to the cursor being displayed, the computer system detects, via the one or more input devices, a first input (e.g., 724 or 754) corresponding to a request to invoke the cursor, wherein the first input is provided by the first hand (e.g., 702 or 704). In response to detecting the first input, the computer system invokes (e.g., activates and/or initiates (e.g., initiates display of)) the cursor (e.g., as illustrated in FIG. 7B or FIG. 7J). In some embodiments, the cursor is invoked before detecting the movement of the respective hand. In some embodiments, because the first hand provided input to invoke the cursor, subsequent movement of the first hand causes the position of the cursor to change, e.g., if the movement of the first hand satisfies the first set of criteria. In some embodiments, the first hand is a hand of the user that invoked the cursor. Having the first hand that previously invoked the cursor control the cursor allows the user to specify a preferred hand for the cursor without cluttering the user interface. Allowing the user to select a preferred hand for the cursor also improves user control of the computer system, which reduces the number of inputs required for the computer system to perform operations and reduces power usage and improves battery life of the device by enabling the user to use the device more quickly and efficiently.

In some embodiments, the first input (e.g., 724 and/or 754) corresponds to a selection (e.g., touch, gaze, air gesture (optionally based on gaze input and hand input), speech input, and/or button input) of a cursor display selectable user interface object (e.g., an affordance) (e.g., 718 or 720). Providing a selectable user interface object to invoke the cursor provides the user with feedback about how to invoke the cursor.

In some embodiments, the first input (e.g., 724 and/or 754) corresponds to interaction (e.g., touch, gaze, air gesture, speech input, and/or button input) with displayed content (e.g., the content of window 712) (e.g., selection of an object in the content, scrolling the content, and/or moving the object in the content). In some embodiments, the displayed content includes one or more affordances (e.g., text boxes) that can be interacted with via a cursor. Interacting with displayed content to invoke the cursor provides the user with feedback about how to invoke the cursor. Interacting with displayed content to invoke the cursor further provides an additional control option for invoking the cursor without cluttering the user interface.

In some embodiments, the first input (e.g., 724 and/or 754) (e.g., touch, gaze, air gesture, speech input, and/or button input) corresponds to initiation of (e.g., activation of, selection of, and/or enabling of) a drawing mode in which the cursor can be used to draw marks on one or more virtual objects (e.g., the content of window 712) (e.g., a mode of an application that enables a user to provide input to make a drawing and/or edit displayed content). In some embodiments, the cursor is displayed with a first visual characteristic (e.g., a pencil or pen icon) when the drawing mode is initiated and the cursor is displayed with a second visual characteristic (e.g., an arrow or I-cursor) when the drawing mode is not initiated. In some embodiments, the first input corresponds to a selection of a drawing mode user interface element (e.g., 720). In some embodiments, prior to receiving the first input, the drawing mode is inactive and another mode of the application, such as a viewing mode (e.g., a mode that allows a user to navigate and view (but not edit) content), is active. In some embodiments, in response to receiving the first input, the other mode is deactivated and the drawing mode is activated. Initiating a drawing mode to control the cursor provides the user with feedback about how to invoke the cursor. Using a cursor in a drawing mode (e.g., to draw) also allows the user to more easily edit and/or create content, which reduces the number of inputs required to perform desired operations.

In some embodiments, a setting (e.g., a setting that can be modified via a configuration menu) of the computer system specifies which hand of the user is the first hand (e.g., 702 or 704) (e.g., whether a left hand or a right hand of the user of the computer system is used to control a location of the cursor). In some embodiments, the setting includes a right handed mode and left handed mode and specifies that movement of the selected hand causes the position of the cursor to change, e.g., if the movement satisfies the first set of criteria. Having a setting of the electronic device specify which hand controls the cursor provides the user with feedback that they can select a preferred hand (e.g., left hand or right hand) to control the cursor. Having a user-preferred hand control the cursor also reduces user mistakes when interacting with the device and reduces the number of inputs required to perform an operation.

In some embodiments, the first set of criteria includes a second criterion that is satisfied when the respective hand is in a first pose (e.g., a one-finger-pinch, a two-finger pinch, or another predetermined type of hand pose recognized by the computer system) during the movement of the respective hand (e.g., 728, 732, 734, 738, 740, 742, X740, X742, 744, 748, 758, 762, 764, 768, 770, 772, or 776) (e.g., during at least a portion of the movement of the respective hand). In some embodiments, the first set of criteria is not satisfied when the respective hand is not in the first pose during the movement of the respective hand, e.g., not in the first pose during any portion of the movement. Selectively moving the cursor based on whether the first hand is in the first pose provides the user with feedback about the pose of the first hand required to move the cursor and provides the user with control over when the cursor will move without cluttering the user interface.

In some embodiments, before detecting the movement of the respective hand (e.g., 740 and/or X740): the computer system detects, via the one or more input devices, second movement of the respective hand of the user (e.g., 728) that satisfies the first set of criteria; and in response to detecting the second movement, the computer system changes the position of the cursor based on the second movement of the respective hand (e.g., as shown in FIGS. 7B to 7C). In some embodiments, the first hand is the hand of the user that previously caused movement of the cursor. Having the same hand that previously controlled the cursor continue to control the cursor provides the user with feedback that the hand controlling the cursor remains consistent and reduces inputs required for the user to revert to a previously selected hand for controlling the cursor.

In some embodiments, in response to detecting the movement: in accordance with a determination that the movement of the respective hand satisfies a second set of criteria, wherein the second set of criteria includes a third criterion that is satisfied when the movement of the respective hand is movement of the second hand (e.g., 702 or 704), the computer system performs (e.g., executes or initiates) an operation (e.g., action or task) based on the movement of the respective hand. In some embodiments, in accordance with a determination that the movement of the respective hand does not satisfy the second set of criteria, the computer system forgoes performing the operation based on the movement of the respective hand. In some embodiments, the second set of criteria are not satisfied when the movement of the respective hand is movement of the first hand. In some embodiments, if the first set of criteria are satisfied, the second set of criteria are not satisfied, and vice versa. In some embodiments, the operation based on the movement of the respective hand does not include moving the cursor. Selectively performing the operation based on the movement of the respective hand (e.g., second hand) based on whether the second set of criteria are satisfied provides the user with feedback that movement of the second hand can perform the operation and further provides the user with additional options for controlling the computer system (e.g., as the first hand can control the cursor while the second hand can perform operations) without cluttering the user interface.

In some embodiments, the movement of the respective hand (e.g., 748) corresponds to a request to select a first user interface object (e.g., 750) (e.g., an affordance). In some embodiments, performing the operation based on the movement of the respective hand includes, displaying, via the display generation component, an indication that the first user interface object is selected (e.g., as shown in FIG. 7I) (e.g., displaying the first user interface object with one or more visual characteristics to indicate selection, enlarging the first user interface object, and/or displaying the result of an operation initiated based on selecting the first user interface object).

In some embodiments, before detecting the movement of the respective hand (e.g., 734), the computer system displays, via the display generation component, a first user interface (e.g., 710) (e.g., a window of an application) that includes a first portion of content (e.g., favorite photos 1-6 in FIG. 7C) (e.g., a portion of the content currently displayed in the window of the application) and that does not include a second portion of the content (e.g., favorite photos 7-9 in FIG. 7D) (e.g., a portion of the content that is available for display in the window of the application, but is not currently displayed in the window of the application), wherein performing the operation based on the movement of the respective hand includes: panning (e.g., scrolling) (e.g., sliding the display of the content in a particular direction to allow viewing of the second portion of the content without changing the layout of the content) the content to display, via the display generation component, the second portion of the content in the first user interface (e.g., 710) without displaying the first portion of the content in the first user interface.

In some embodiments, before detecting the movement of the respective hand (e.g., 738), the computer system displays, via the display generation component, a second user interface object (e.g., favorite photo 9) (e.g., an affordance that represents a data item, such as an image, a video, an audio file, a text document, or another file type) at a first location (e.g., the location of favorite photo 9 in FIG. 7D), wherein performing the operation based on the movement of the respective hand includes: displaying, via the display generation component, the second user interface object at a second location different from the first location (e.g., the location of favorite photo 9 in FIG. 7E, FIG. 7F1, and/or FIG. 7F2). In some embodiments, performing the operation includes performing a drag and drop operation to associate the second user interface object with the second location. In some embodiments, the second user interface object remains displayed at the first location while the second user interface object is displayed at the second location.

In some embodiments, before detecting the movement of the respective hand (e.g., 742 and/or X742), the computer system displays, via the display generation component, a second user interface (e.g., 710) (e.g., a window of an application) at a third location (e.g., the location of window 710 in FIG. 7F1 and/or in FIG. 7F2), and wherein performing the operation based on the movement of the respective hand includes: moving the second user interface to display, via the display generation component, the second user interface at a fourth location different from the third location (e.g., the location of window 710 in FIGS. 7G-7P).

In some embodiments, before detecting the movement of the respective hand (e.g., 744), the computer system displays, via the display generation component, a first section (e.g., first tab, first portion, or first view) of a third user interface (e.g., 710) (e.g., a window of an application) without displaying a second section (e.g., second tab, second portion, or second view) of the third user interface, and wherein performing the operation based on the movement of the respective hand includes: navigating (e.g., switching or changing) between the first section and the second section to display, via the display generation component, the second section without displaying the first section (e.g., as illustrated by the transition between FIGS. 7G and 7F1 or by the transition between FIGS. 7G and 7F2).

In some embodiments, the second set of criteria includes a fourth criterion that is satisfied when the respective hand (e.g., 702 or 704) is in a second pose (e.g., a one-finger pinch, a double-finger pinch, or another predetermined type of hand pose recognized by the computer system) during the movement of the respective hand (e.g., 732, 734, 738, 742, 744, X742, or 748) (e.g., during at least a portion of the movement of the respective hand). In some embodiments, the first pose and the second pose are the same pose. In some embodiments, the respective hand is in the second pose during the movement if the respective hand initially moves to be in the second pose (e.g., in a pinch), and optionally, then moves to be out of the second pose (e.g., not in a pinch). In some embodiments, in response to detecting the movement: in accordance with a determination that the movement of the respective hand does not satisfy the second set of criteria: the computer system forgoes performing the operation based on the movement of the respective hand (e.g., as illustrated by the transition between FIGS. 7B to 7C) (e.g., forgoes performing any operation based on the movement of the respective hand). In some embodiments, the movement of the respective hand does not satisfy the second set of criteria when the respective hand is not in the second pose during the movement of the respective hand, e.g., not in the second pose during any portion of the movement of the respective hand. Selectively performing the operation based on whether the respective hand is in the second pose provides the user with feedback about the hand pose required to perform the operation. Selectively performing the operation based on whether the respective hand is in the second pose further provides the user with additional control over how to perform the operation without cluttering the user interface.

In some embodiments, changing the position of the cursor based on the movement of the respective hand (e.g., 728) includes: displaying the cursor sequentially at different locations (e.g., the locations of cursor 726 in FIGS. 7B and 7C) that are selected based on a characteristic of the movement (e.g., magnitude, speed, and/or direction) of the respective hand. Displaying the cursor at different locations while the cursor changes position provides the user with feedback about the current location of the cursor.

In some embodiments, the computer system detects, via the one or more input devices, a gesture (e.g., 762, 768, 770, 772, or 774) performed by the second hand (e.g., an air gesture, such as an air pinch gesture, an air pinch and release gesture, an air pinch and drag gesture, and/or a double air pinch and release gesture). In some embodiments, detecting the gesture performed by the second hand includes detecting movement of the second hand. In response to detecting the gesture performed by the second hand: in accordance with a determination that the gesture performed by the second hand is detected (e.g., a determination that the gesture performed by the second hand has started) after (e.g., within a predetermined duration (e.g., 0.05, 0.1, 0.25, 0.5, 1, or 2 seconds) after) changing the position of the cursor (e.g., 756) (e.g., initially changing the position of the cursor) based on the movement of the respective hand (e.g., 758) (e.g., wherein the movement of the respective hand is movement of the first hand), the computer system forgoes performing a second operation (e.g., a selection operation, a panning operation, a zooming operation, a drag and drop operation, an operation to change a location a user interface, and/or an operation to switch between sections of a user interface) based on the gesture performed by the second hand (e.g., 762). In some embodiments, forgoing performing the second operation based on the gesture performed by the second hand includes forgoing performing any operation based on the gesture performed by the second hand. Forgoing performing the second operation if a gesture by the second hand is detected after changing the position of a cursor based on movement of the first hand provides the user with feedback that the second hand should first perform a gesture to perform an operation with the second hand. Forgoing performing the second operation if a gesture by a second hand is detected after changing the position of a cursor based on movement of the first hand also reduces the number of inputs required to reverse the result of mistaken operations otherwise performed based on the gesture by the second hand.

In some embodiments, the computer system detects, via the one or more input devices, a gesture performed by the second hand (e.g., 762, 768, 770, 772, or 774) (e.g., an air gesture, such as an air pinch gesture, an air pinch and release gesture, an air pinch and drag gesture, and/or a double air pinch and release gesture). In some embodiments, detecting the gesture performed by the second hand includes detecting movement of the second hand. In response to detecting the gesture performed by the second hand: in accordance with a determination that the gesture performed by the second hand is detected (e.g., a determination that the gesture performed by the second hand has started) after (e.g., detected within less than a predetermined duration (e.g., 0.05, 0.1, 0.25, 0.5, 1, or 2 seconds) after) changing the position of the cursor (e.g., 756) (e.g., initially changing the position of the cursor) based on the movement of the respective hand (e.g., 764) (e.g., wherein the movement of the respective hand is movement of the first hand): the computer system performs a second operation (e.g., a panning operation or a zooming operation) based on the gesture performed by the second hand (e.g., 768) and the movement of the respective hand (e.g., 764). In some embodiments, the computer system performs the panning operation if the first hand and the second hand (e.g., while performing the gesture) move in a same direction. In some embodiments, the computer system performs the zooming operation if the first hand the second hand (e.g., while performing the gesture) move in different directions. In some embodiments, the computer system performs the zooming operation if the second hand does not move (e.g., while holding the gesture (e.g., a pinch gesture or an air pinch gesture)) while the first hand moves. In some embodiments, the computer system performs the second operation further in accordance with a determination that the first hand is in a first pose (e.g., pinch) during (e.g., during at least a portion of) the movement of the first hand. In some embodiments, the second operation includes a selection operation, a drag and drop operation, an operation to change a location a user interface, and/or an operation to switch between sections of a user interface. Performing the second operation based on both hands if the gesture by the second hand is detected after changing the position of the cursor based on movement by the first hand provides the user with feedback about the timing of the gesture by the second hand required to perform the operation. Performing the second operation based on both hands if the gesture by the second hand is detected after changing the position of the cursor based on movement by the first hand further provides additional control for performing operations without cluttering the user interface.

In some embodiments, in response to detecting the movement of the respective hand: in accordance with a determination that the movement of the respective hand (e.g., 758 or 764) satisfies the first set of criteria, the computer system displays, via the display generation component, a marking (e.g., 760 or 766) (e.g., a line, a shape, and/or a drawing) generated based on the movement of the respective hand. In some embodiments, the computer system displays the marking if the first hand is in a first pose (e.g., pinch) during the movement of the first hand and do not display the marking if the first hand is not in the first pose during the movement. In some embodiments, in response to detecting the gesture performed by the second hand (e.g., 768): in accordance with a determination that the gesture performed by the second hand is detected after changing the position of the cursor based on the movement of the respective hand: the computer system ceases to display (e.g., hides, removes, and/or deletes), via the display generation component, the marking (e.g., as illustrated by the transition between FIGS. 7L and 7M). Removing the marking if the gesture by the second hand is detected after changing the position of the cursor based on movement by the first hand provides the user with feedback about how to remove the marking and additionally avoids cluttering the user interface with the marking. Automatically removing the marking (e.g., if the gesture by the second hand is detected after changing the position of the cursor based on movement by the first hand) further reduces the number of user inputs otherwise required to remove the marking.

In some embodiments, the computer system detects, via the one or more input devices, a gesture performed by the second hand (e.g., 762, 768, 770, 772, or 774) (e.g., an air gesture, such as an air pinch gesture, an air pinch and release gesture, an air pinch and drag gesture, and/or a double air pinch and release gesture). In some embodiments, performing the gesture includes moving the second respective hand to perform the gesture. In response to detecting the gesture performed by the second hand: in accordance with a determination that the gesture performed by the second hand is detected (e.g., a determination that the gesture performed by the second hand has started) within a predetermined duration (e.g., 0.02, 0.05, 0.1, 0.25, 0.5, 1, or 2 seconds) after changing the position of the cursor (e.g., initially changing the position of the cursor) based on the movement of the respective hand (e.g., wherein the movement of the respective hand is movement of the first hand): the computer system performs a second operation (e.g., a panning operation or a zooming operation) based on the gesture performed by the second hand (e.g., 768) and the movement of the respective hand (e.g., 764). In some embodiments, the computer system performs the second operation further in accordance with a determination that the first hand is in a first pose (e.g., pinch) during (e.g., during at least a portion of) the movement of the first hand. In some embodiments, the computer system performs the panning operation if the first hand and the second hand (e.g., while performing the gesture) move in a same direction. In some embodiments, the computer system performs the zooming operation if the first hand the second hand (e.g., while performing the gesture) move in different directions. In some embodiments, the computer system performs the zooming operation if the second hand does not move (e.g., while holding the gesture (e.g., a pinch gesture or an air pinch gesture)) while the first hand moves. In response to detecting the gesture performed by the second hand: in accordance with a determination that the gesture performed by the second hand (e.g., 762) is detected (e.g., a determination that the gesture performed by the second hand has started) after the predetermined duration (e.g., 0.02, 0.05, 0.1, 0.25, 0.5, 1, or 2 seconds) from when the position of the cursor changed (e.g., the position of the cursor initially changed) based on the movement of the respective hand (e.g., 758) (e.g., wherein the movement of the respective hand is movement of the first hand): the computer system forgoes performing the second operation (e.g., a selection operation, a panning operation, a zooming operation, a drag and drop operation, an operation to change a location a user interface, and/or an operation to switch between sections of a user interface) based on the gesture performed by the second hand. In some embodiments, forgoing performing the second operation includes forgoing performing any operation based on the gesture performed by the second hand. Selectively performing the second operation based on whether the gesture by the second hand is detected within a predetermined duration after changing the position of the cursor provides the user with feedback about the timing of the gesture required to perform the second operation. Selectively performing the second operation based on whether the gesture by the second hand is detected within a predetermined duration after changing the position of the cursor further provides additional control options for performing the second operation without cluttering the user interface.

In some embodiments, the computer system detects, via the one or more input devices, a second gesture (e.g., 772) (e.g., an air gesture, such as an air pinch gesture, an air pinch and release gesture, an air pinch and drag gesture, and/or a double air pinch and release gesture) performed by the first hand. In some embodiments, detecting the second gesture includes detecting movement of the first hand. For example, the first hand moves to perform the second gesture. In some embodiments, the movement of the first hand causes the cursor to change location, e.g., if the movement satisfies the first set of criteria. In some embodiments, the computer system detects, via the one or more input devices, a third gesture performed by the second hand (e.g., 770) (e.g., an air gesture, such as an air pinch gesture, an air pinch and release gesture, an air pinch and drag gesture, and/or a double air pinch and release gesture). In some embodiments, in response to detecting the second gesture and the third gesture: in accordance with a determination that the third gesture is detected before the second gesture is detected (e.g., a determination that the third gesture has started before the second gesture has started): the computer system performs a third operation based on the second gesture and the third gesture (e.g., as illustrated by the transition between FIGS. 7M and 7N) (e.g., a panning operation or a zooming operation). In some embodiments, the computer system performs the panning operation if the first hand (e.g., while performing the second gesture) and the second hand (e.g., while performing the third gesture) move in a same direction. In some embodiments, the computer system performs the zooming operation if the first hand (e.g., while performing the second gesture) and the second hand (e.g., while performing the third gesture) move in different directions. In some embodiments, the computer system performs the zooming operation if the first hand does not move while holding the second gesture (e.g., a pinch gesture or an air pinch gesture) and the second hand moves while performing the third gesture, and vice versa. In some embodiments, the third operation excludes changing the position of the cursor. Performing the third operation based on gestures made by both hands if the second hand starts the third gesture before the first hand starts the second gesture provides the user with feedback that, to perform the third operation, the second hand can start a gesture before the first hand starts a gesture. Performing the third operation based on gestures made by both hands if the second hand starts the third gesture before the first hand starts the second gesture further provides additional control options for performing the third operation without cluttering the user interface.

In some embodiments, the computer system detects, via the one or more input devices, an end of the third gesture (e.g., 770) (e.g., detects that the air gesture has ended). For example, the computer system detects that the second hand is no longer in an air pinch (e.g., released the air pinch) and/or is no longer performing an air pinch and drag gesture. In some embodiments, in response to detecting the end of the third gesture: in accordance with a determination that the second gesture (e.g., 772) continues (e.g., that the first hand continues to hold the air pinch, continues to perform the air pinch and drag gesture, or that the first hand continues another air gesture) after detecting the end of the third gesture: the computer system performs a fourth operation (e.g., a panning operation) based on the continued second gesture (e.g., a continued air pinch and/or a continued air pinch and drag) without changing the location of the cursor (e.g., without displaying the cursor at a different location relative to where the cursor was displayed before the second gesture is detected) based on the continued second gesture (e.g., as illustrated in the transition between FIGS. 7N and 7O). ISE, the computer system performs the panning operation if the third gesture ends by the second hand releasing the air pinch and the second gesture continues by the first hand continuing the air pinch and drag gesture. In some embodiments, in accordance with a determination that the second gesture does not continue (e.g., that the air gesture performed by the first hand does not continue, such as by the first hand releasing the air pinch and/or by the first hand stopping the air pinch and drag gesture) after detecting the end of the third gesture, the computer system forgoes performing the fourth operation (e.g., forgoes performing the panning operation based on movement of the first hand). Performing the fourth operation based on the continued second gesture without changing the location of the cursor based on conditions described provides the user with feedback that if the first hand continues the second gesture, the first hand can perform an operation different from moving the cursor. Performing the fourth operation based on the continued second gesture without changing the location of the cursor based on conditions described also provides additional control over the functions (e.g., performing an operation or moving the cursor) the first hand can perform without cluttering the user interface.

In some embodiments, the computer system detects (e.g., after changing the position of the cursor based on the movement of the first hand), via the one or more input devices, a set of one or more inputs (e.g., 754 or 774) corresponding to a request to change the respective hand that controls the cursor. In response to detecting the set of one or more inputs, the computer system changes the respective hand that controls the cursor from the first hand to the second hand (e.g., from right hand 704 to left hand 702 in FIG. 7J or from left hand 702 to right hand 704 in FIG. 7P). In some embodiments, after detecting the set of one or more inputs (e.g., while movement of the second hand causes the cursor to move if the movement satisfies the first set of criteria): the computer system detects, via the one or more input devices, third movement (e.g., 758, 764, or 776) of the respective hand of the user of the computer system; and in response to detecting the third movement: in accordance with a determination that the respective hand is the second hand: the computer system changes the position of the cursor (e.g., 756) based on the third movement of the respective hand (e.g., as illustrated by the transition between FIGS. 7O and 7P) (e.g., changing the position of the cursor based on a characteristic (e.g., magnitude, speed, and/or direction) of the third movement of the respective hand); and in accordance with a determination that the respective hand is the first hand: the computer system forgoes changing the position of the cursor based on the third movement of the respective hand. Changing the hand that controls the cursor responsive to receiving the set of one or more inputs provides the user with additional control over which hand controls the cursor without cluttering the user interface. Changing the hand that controls the cursor responsive to receiving the set of one or more inputs further allows the user to select a preferred hand to control the cursor (e.g., if the previously selected hand is incorrect), which allows the user to more easily operate the computer system and reduces the number of inputs required to operate the computer system as desired.

In some embodiments, the set of one or more inputs includes: a pinch and release input (e.g., 774) (e.g., an air gesture that is a pinch and release) performed by the second hand (e.g., 704) or a double pinch and release input (e.g., 774) (e.g., an air gesture that is a double pinch and release) performed by the second hand. Changing the hand that controls the cursor based on a pinch and release input or a double pinch and release input provides the user with additional control without cluttering the user interface.

In some embodiments, the set of one or more inputs includes an input (e.g., 754) selecting a third user interface object (e.g., 720) (e.g., a markup icon). In some embodiments, the respective hand that provides the input to select the displayed third user interface object (e.g., initiate a drawing mode) becomes the first hand whose movement causes the cursor to change location, e.g., if the first set of criteria are satisfied. In some embodiments, second input from the respective hand to deselect the third user interface object (e.g., to cancel the drawing mode) is received and then third input from the other respective hand to select the third user interface object (e.g., to re-initiate the drawing mode) is received. In response to receiving the third input, the other respective hand becomes the first hand whose movement causes the cursor to change location, e.g., if the first set of criteria are satisfied. Changing the hand that controls the cursor based on selection of a user interface object provides the user with feedback about how to change the hand that controls the cursor.

FIGS. 9A-9AA illustrate example techniques for controlling a cursor based on detected hand movement, in some embodiments. FIG. 10 is a flow diagram of methods of controlling a cursor using the hand that invoked the cursor, in some embodiments. FIG. 11 is a flow diagram of methods of controlling a cursor based on detected hand movement, in some embodiments. The user interfaces in FIGS. 9A-9AA are used to illustrate the processes described below, including the processes in FIGS. 10-11.

In the illustrated embodiments, device 700 is a desktop computer that includes display 706 and one or more image sensors 790 (e.g., implemented as one or more image sensors 314) and that is in communication with trackpad (e.g., a touch-sensitive surface) 708. In other embodiments, device 700 is implemented as another type of device. For example, device 700 is implemented as a head-mounted device that includes display 706, that is in communication with one or more image sensors 314, and optionally that neither includes nor is in communication with trackpad 708. Accordingly, in embodiments where device 700 is implemented as a head-mounted device, the content provided by display 706 in FIGS. 9A-9AA forms a three-dimensional environment that the user is immersed in. For example, when immersed in the three-dimensional environment, the user perceives the content as three-dimensional elements, and optionally, does not view their left hand 702, their right hand 704, and/or trackpad 708. As another example, when immersed in the three-dimensional environment, the user can view a left hand and a right hand of an avatar representing the user, e.g., instead of viewing their physical left hand 702 and their physical right hand 704. As another example, the user can view a pass-through representation of the physical environment that can include their hands (e.g., 702 and 704).

As described below, using one or more image sensors 790 and/or trackpad 708, device 700 detects respective movements of, and respective gestures (e.g., gestures on trackpad 708 and/or air gestures) performed by left hand 702 and right hand 704. Device 700 further performs various operations based on the respective movements and respective gestures.

In FIG. 9A, device 700 displays window 710 for a photos application and window 712 for a markup application (e.g., an application that allows the user to create and/or edit content, e.g., by drawing, typing, and/or adding other types of graphical elements into the content). Window 712 includes document icon 904 and markup icon 720. Document icon 904 is in an unselected state, thereby indicating that a document is not open. Similarly, Markup icon 720 is in an unselected state, thereby indicating that a markup mode (e.g., a drawing mode in which the cursor can be used to draw marks on content) for the markup application is inactive. At FIG. 9A, device 700 detects that the user's gaze 950A is directed at document icon 904 and concurrently detects pinch air gesture 950B performed by right hand 704. In response to detecting pinch air gesture 950B performed by right hand 704 while the user's gaze 950A is directed at document icon 904, device 700 activates document icon 904, which opens a document that includes text 730, as shown in FIG. 9B.

Figure 9B:
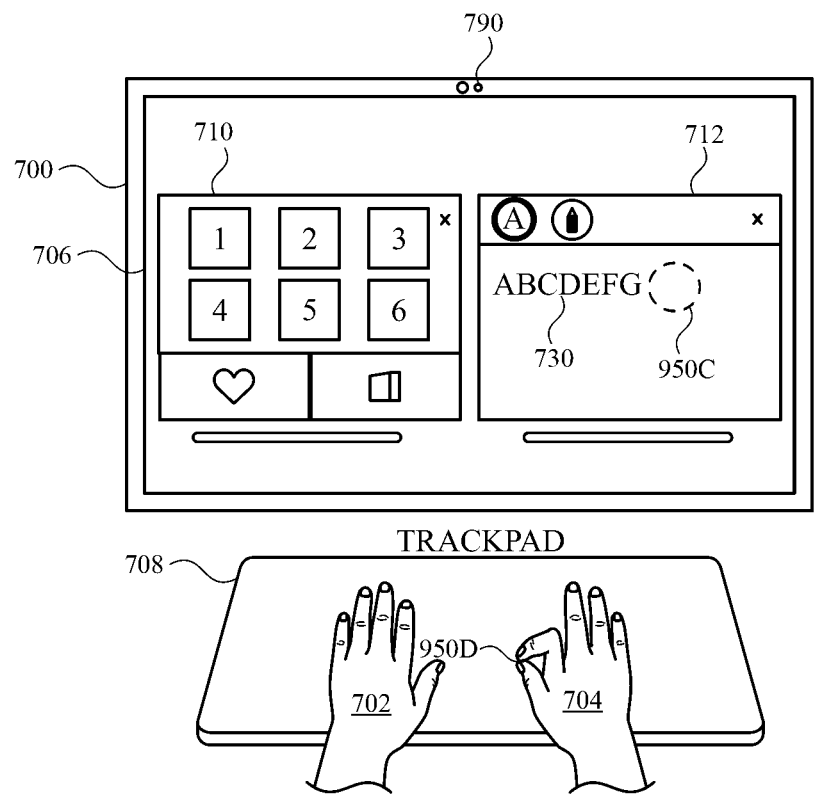
Figure 9C:
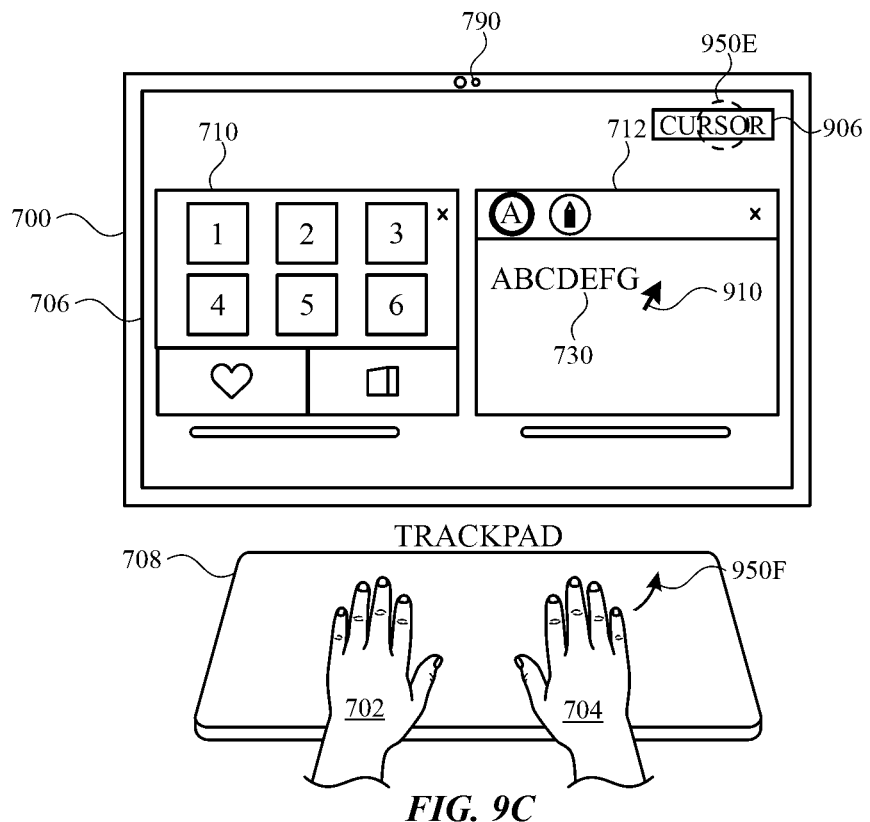
Figure 9D:
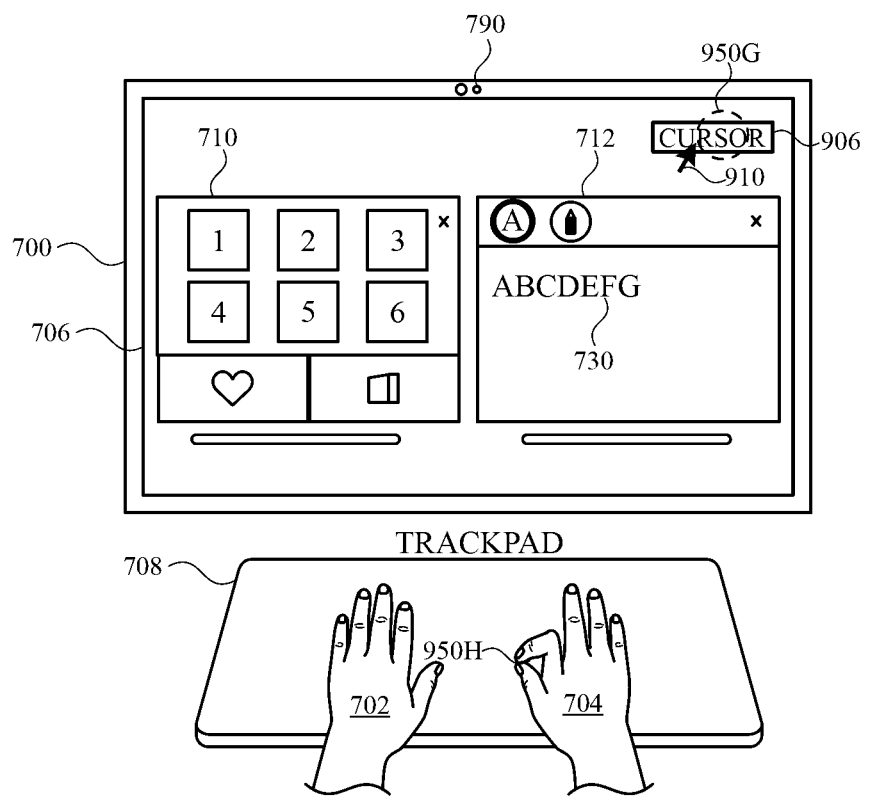

At FIG. 9B, device 700 detects that the user's gaze 950C is directed to the end of text 730 and concurrently detects double-pinch air gesture 950D by right hand 704. In response to detecting double pinch air gesture 950D by right hand 704 while the user's gaze 950C is directed to the end of text 730, device 700 invokes cursor 910 at the location of user's gaze 950C, as shown in FIG. 9C. When cursor 910 is invoked, it is controlled by the hand (e.g., right hand 704) that invoked the cursor and not controlled by the hand (e.g., left hand 702) that did not invoke the cursor. In some embodiments, as shown in FIG. 9C, when cursor 910 is invoked, device 700 displays selectable cursor option 906 that indicates that the cursor is active, thereby providing the user with feedback about the state of cursor 910. In some embodiments, as shown in FIGS. 9C-9D, device 700 detects activation of cursor option 906. In particular, at FIG. 9C, device 700 detects that the user's gaze 950E is directed at cursor option 906 and concurrently detects hand movement 950F (e.g., a flick and/or more than a threshold amount) by right hand 704. In response to detecting hand movement 950F by right hand 704 while the user's gaze 950E is directed at cursor option 906, device 700 moves cursor 910 to the location of cursor option 906, as shown in FIG. 9D, and/or device 700 highlights (e.g., by bolding and/or changing a color of) cursor option 906 to indicate that the focus is on cursor option 906. At FIG. 9D, while cursor 910 is at the location of cursor option 906 (and/or cursor option 906 is highlighted) (and, optionally, while the user's gaze 950G is directed to cursor option 906), device 700 detects a pinch air gesture 950H by right hand 704. In response to detecting pinch air gesture 950H while the user's gaze 950G is directed to cursor option 906, device 700 activates cursor option 906, which dismisses cursor 910 (e.g., causes cursor 910 to cease being displayed) and also causes cursor option 906 to cease being displayed.

Figure 9G:
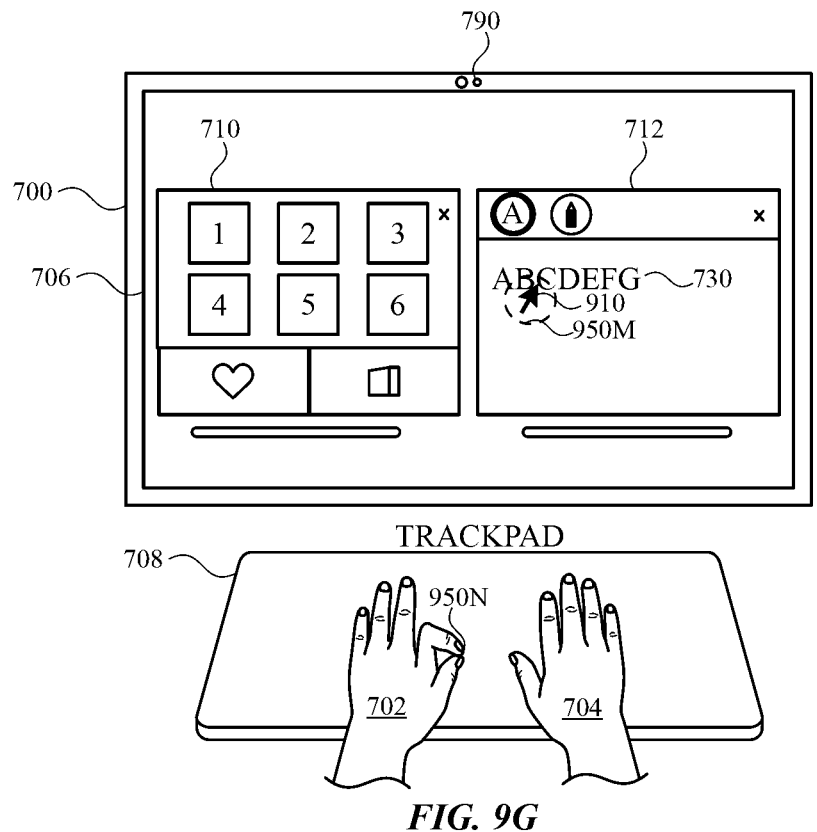

In some embodiments, as shown in FIG. 9E, the user does not move cursor 910 to cursor option 906 to dismiss the cursor. Instead, at FIG. 9E, device 700 detects that the user's gaze 950I is directed at cursor 910 and concurrently detects movement 950J (e.g., left, right, up, down, away from the user, and/or toward the user) of left hand 702. However, because cursor 910 was invoked by right hand 704 (and, optionally, left hand 702 has not taken over control of cursor 910), device 700 does not move cursor 910 in response to movement 950J, as shown in FIG. 9F1. At FIG. 9F1, device 700 detects that the user's gaze 950K is directed at cursor 910 and concurrently detects movement 950L (e.g., left, right, up, down, away from the user, and/or toward the user)

of right hand 704. Because cursor 910 was invoked by right hand 704 (and, optionally, left hand 702 has not taken over control of cursor 910), device 700 moves cursor 910 in response to movement 950L. In particular, because the user's gaze is directed at (e.g., within a threshold distance of) cursor 910 when movement 950L of right hand 704 is detected, cursor 910 moves in a direction and/or with a magnitude that is based on (e.g., the same as) the direction and/or magnitude of movement 950L, as shown in FIG. 9G. At FIG. 9G, cursor 910 has moved to between letters "B" and "C" in text 730 based on movement 950L of right hand 704.

In some embodiments, the techniques and user interface(s) described in FIG. 9F1 are provided by one or more of the devices described in FIGS. 1A-1P. FIG. 9F2 illustrates an embodiment in which windows 710 and 712 and cursor 910 are displayed on display module X702 of head-mounted device (HMD) X700. In some embodiments, device 700 is implemented as device X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

In FIG. 9F2, while displaying cursor 910 via display module X702, device X700 detects (e.g., using camera X704) that the user's gaze X950K is directed at cursor 910 and concurrently detects movement X950L (e.g., left, right, up, down, away from the user, and/or toward the user) of right hand 704. Because cursor 910 was invoked by right hand 704 (and, optionally, left hand 702 has not taken over control of cursor 910), device X700 moves cursor 910 in response to movement X950L. In particular, because the user's gaze is directed at (e.g., within a threshold distance of) cursor 910 when movement X950L of right hand 704 is detected, cursor 910 moves in a direction and/or with a magnitude that is based on (e.g., the same as) the direction and/or magnitude of movement X950L.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 790, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

At FIG. 9G, device 700 detects that the user's gaze 950M is directed to cursor 910 and concurrently detects double-pinch air gesture 950N by left hand 702. In response to detecting double pinch air gesture 950N by left hand 702 (e.g., while the user's gaze 950M is directed to cursor 910), device 700 moves control of cursor 910 to left hand 702 (e.g., without moving cursor 910). While left hand 702 is controlling cursor 910, movements of left hand 702 will move cursor 910. Because cursor 910 is currently being controlled by left hand 702, movements (e.g., left, right, up, down, away from the user, and/or toward the user) of right hand 704 will not move cursor 910.

Figure 9H:
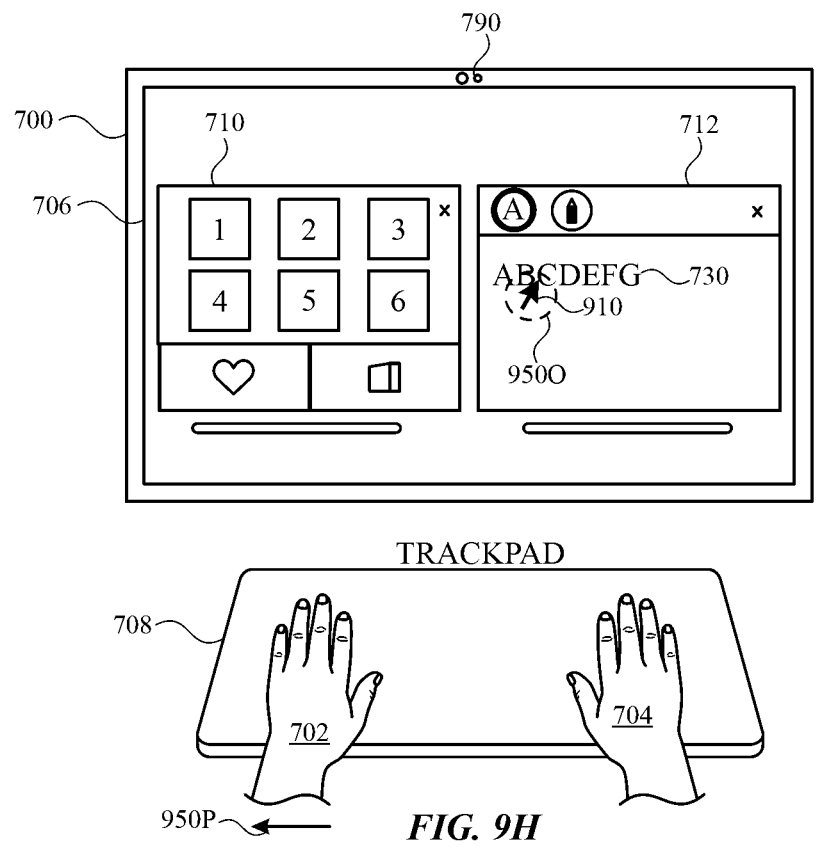
Figure 9I:
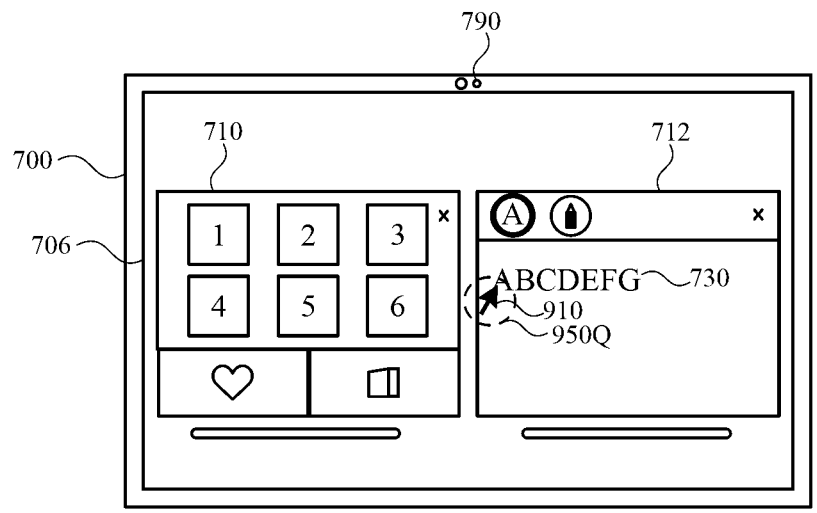

At FIG. 9H, device 700 detects that the user's gaze 9500 is directed at cursor 910 and concurrently detects movement 950P (e.g., left, right, up, down, away from the user, and/or toward the user) of left hand 702. In response to detecting movement 950P (and, optionally, because left hand 702 is controlling cursor 910), device 900 moves cursor 910 (e.g., to the left of "A" in text 730), as shown in FIG. 9I. Because device 700 detects that the user's gaze is directed at (e.g., within a threshold distance of) cursor 910 when movement 950P of left hand 702 is detected, cursor 910 moves in a direction and/or with a magnitude that is based on (e.g., the same as) the direction and/or magnitude of movement 950P, as shown in FIG. 9I.

At FIG. 9I, device 700 detects that the user's gaze 950Q is directed to cursor 910 and concurrently detects double-pinch air gesture 950R by right hand 704. In response to detecting double pinch air gesture 950R by right hand 704 (e.g., while the user's gaze 950Q is directed to cursor 910), device 700 moves control of cursor 910 to right hand 704. While right hand 704 is controlling cursor 910, movements of right hand 704 will move cursor 910. Because cursor 910 is now being controlled by right hand 704, movements (e.g., left, right, up, down, away from the user, and/or toward the user) of left hand 702 will not move cursor 910. In some embodiments, when the user's gaze is directed away from cursor 910 and device 700 detects a double-pinch air gesture by a hand that is not currently controlling the cursor, device 700 moves control of the cursor to the hand that performed the double-pinch air gesture and moves the cursor to the location of the user's gaze.

Figure 9J:
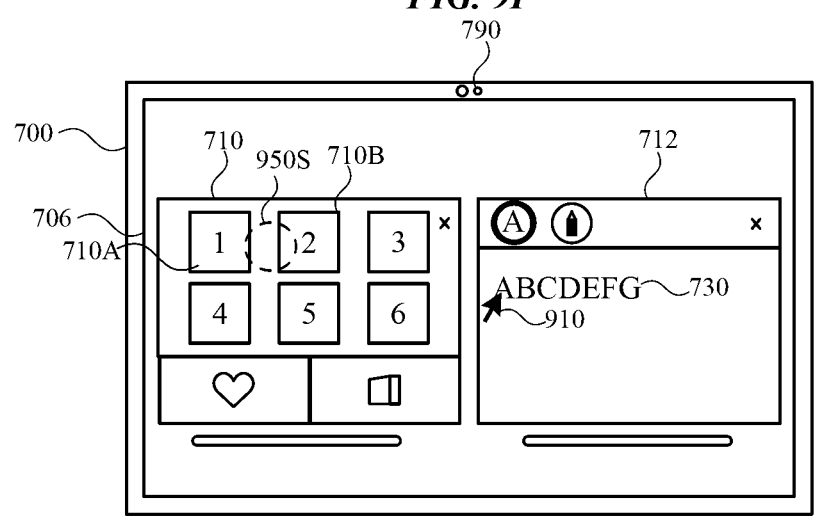

At FIG. 9J, device 700 detects that the user's gaze 950S is directed to a location (e.g., in the three-dimensional environment or in a user interface of an application) that is near (e.g., within a threshold distance of) image 710B (e.g., closer to image 710B than to image 710A) and concurrently detects hand movement 950T (e.g., a flick and/or more than a threshold amount of movement/speed) by right hand 704. In response to detecting hand movement 950T by right hand 704 while the user's gaze 950S is directed to a location (e.g., in the three-dimensional environment or in a user interface of an application) that is near image 710B, device 700 moves cursor 910 to the location of image 710B, as shown in FIG. 9K. In some embodiments, instead of, or in addition to, displaying the cursor at image 710B, device 700 optionally highlights image 710B to indicate that the focus is on image 710B. Thus, because the user's gaze 950S was more than a threshold distance away from the cursor when movement 950T was detected, device 700 moves cursor 910 to a location that is based on (e.g., at the location) where the user was gazing, rather than an amount (and/or direction) of movement of the user's hand that is controlling cursor 910. In this way, the user can quickly move the cursor to anywhere in the environment (e.g., on display 706) without needing to make large or exaggerated hand movements by using their gaze.

At FIG. 9K, device 700 detects that the user's gaze 950U is directed to a location (e.g., in the three-dimensional environment or in a user interface of an application) that is near (e.g., within a threshold distance of) cursor 910 and concurrently detects hand movement 950V (e.g., left and/or right movement) by right hand 704. In response to detecting hand movement 950V by right hand 704 while the user's gaze 950U is near cursor 910 (e.g., within a threshold distance of cursor 910), device 700 moves cursor 910 based on a direction and/or distance of movement 950V, as shown in FIG. 9L, rather than the location of gaze 950U. In particular, movement 950V is a leftward movement and device 700 moves cursor 910 to the left to image 710A. Thus, because the user's gaze 950U was less than the threshold distance away from the cursor when movement 950V was detected, device 700 moves cursor 910 to a location that is based on an amount (and/or direction) of movement of the user's hand, rather than based on where the user is gazing. In this way, the user can move cursor 910 with precision to an exact location in the environment (e.g., on display 706).

At FIG. 9L, device 700 detects that the user's gaze 950W is directed to cursor 910 and concurrently detects pinch air gesture 950X by right hand 704. In response to detecting pinch air gesture 950X by right hand 704 (e.g., while the user's gaze 950Q is directed to cursor 910), device 700 activates (or otherwise performs an action on) image 710A.

At FIG. 9M, device 700 detects that the user's gaze 950Y is directed to a location (e.g., in the three-dimensional environment or in a user interface of an application) that is near (e.g., within a threshold distance of) grabber 710C of window 710 and concurrently detects hand movement 950Z (e.g., a flick and/or more than a threshold amount of movement/speed) by right hand 704. In response to detecting hand movement 950Z by right hand 704 while the user's gaze 950Y is directed to a location (e.g., in the three-dimensional environment or in a user interface of an application) that is near grabber 710C, device 700 moves cursor 910 to the location of grabber 710C, as shown in FIG. 9N. In some embodiments, instead of, or in addition to, displaying the cursor at grabber 710C, device 700 optionally highlights grabber 710C to indicate that the focus is on grabber 710C.

Figure 9O:
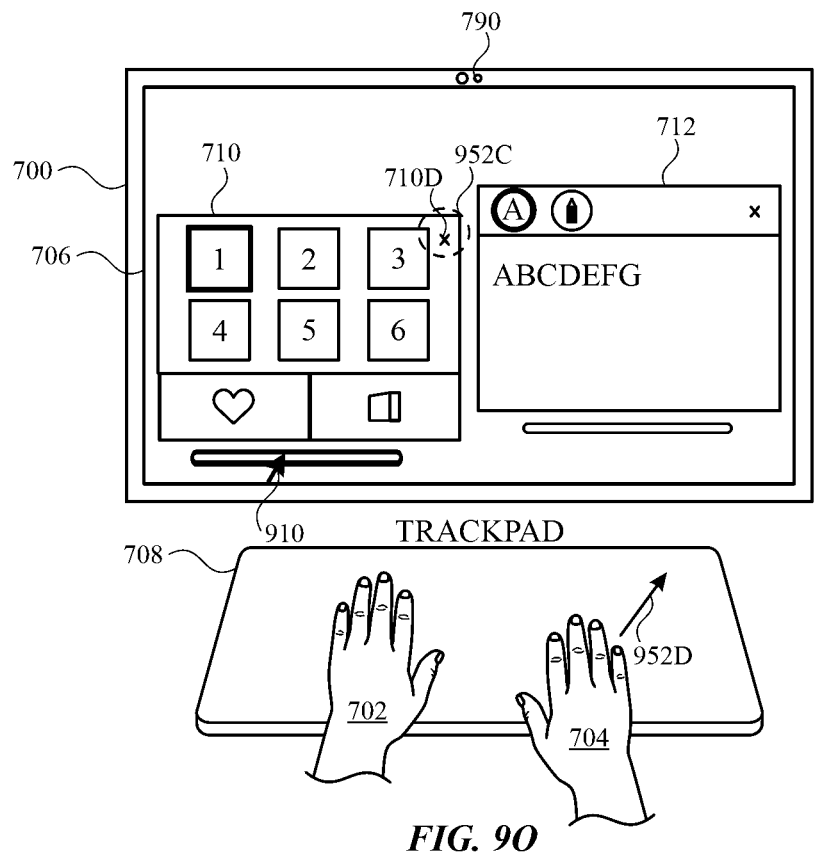

At FIG. 9N, device 700 detects that the user's gaze 952A is directed to a location (e.g., in the three-dimensional environment or in a user interface of an application) that is near (e.g., within a threshold distance of) cursor 910 (or grabber 710C) and concurrently detects pinch-and-drag (e.g., down) air gesture 952B by right hand 704. In response to detecting pinch-and-drag air gesture 952B by right hand 704 while the user's gaze 950Y is directed to a location (e.g., in the three-dimensional environment or in a user interface of an application) that is near grabber 710C, device 700 moves window 710 down in the environment (e.g., on display 706) in a direction and distance that is based on the direction and amount of movement of pinch-and-drag air gesture 952B. As shown in FIG. 9O, as a result, window 710 has moved down. In some embodiments, the user can perform the pinch-and-drag gesture in any direction (e.g., with six degrees of freedom) and, in response, window 710 moves in accordance with the gesture (e.g., also with six degrees of freedom). Thus, for example, the user can drag window 710 down, then left, then away from the user and to the right, then toward the user and up.

Figure 9P:
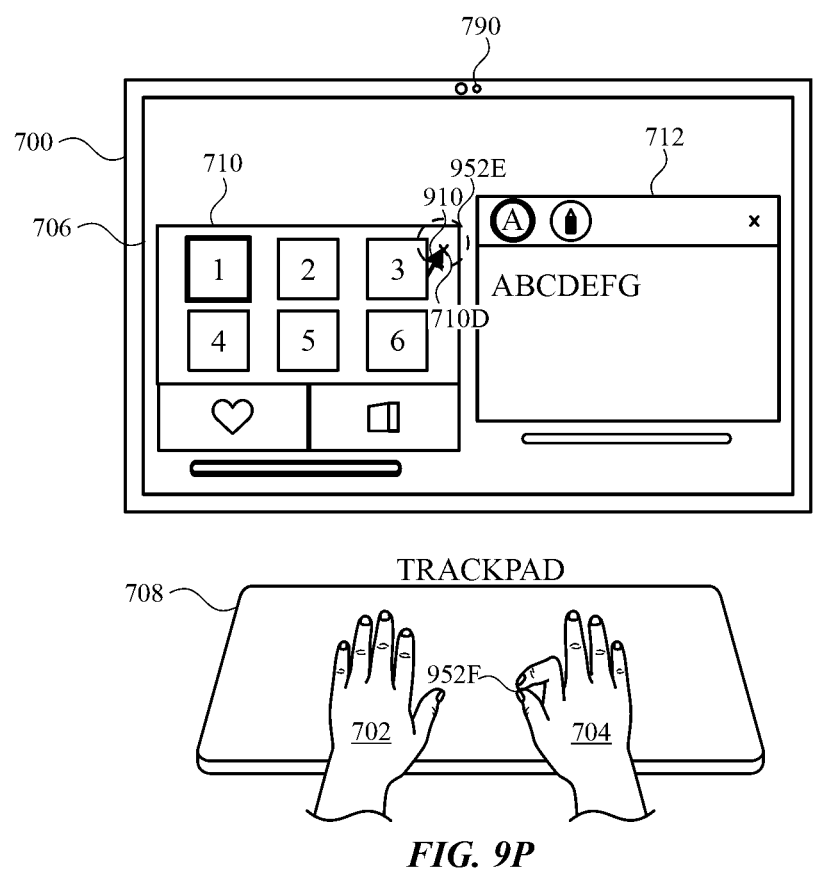

At FIG. 9O, device 700 detects that the user's gaze 952C is directed to a location (e.g., in the three-dimensional environment or in a user interface of an application) that is near (e.g., within a threshold distance of) close option 710D (e.g., "X") of window 710 and concurrently detects hand movement 952D (e.g., a flick and/or more than a threshold amount of movement/speed) by right hand 704. In response to detecting hand movement 952D by right hand 704 while the user's gaze 952C is directed to a location (e.g., in the three-dimensional environment or in a user interface of an application) that is near close option 710D of window 710, device 700 moves cursor 910 to the location of close option 710D, as shown in FIG. 9P. In some embodiments, instead of, or in addition to, displaying the cursor at close option 710D, device 700 optionally highlights close option 710D to indicate that the focus is on close option 710D.

At FIG. 9P, device 700 detects that the user's gaze 952E is directed to a location (e.g., in the three-dimensional environment or in a user interface of an application) that is near (e.g., within a threshold distance of) cursor 910 (or close option 710D) and concurrently detects pinch air gesture 952F by right hand 704. In response to detecting pinch air gesture 952F by right hand 704 while the user's gaze 952E is directed to a location (e.g., in the three-dimensional environment or in a user interface of an application) that is near close option 710D, device 700 activates close option 710D, which closes (e.g., ceases to display) window 710 in the environment (e.g., on display 706), as shown in FIG. 9Q.

At FIG. 9Q, device 700 detects that the user's gaze 952G is directed to a location (e.g., in the three-dimensional environment or in a user interface of an application) that is near (e.g., within a threshold distance of) markup icon 720 of window 710 and concurrently detects hand movement 952H (e.g., a flick and/or more than a threshold amount of movement/speed) by right hand 704. In response to detecting hand movement 952H by right hand 704 while the user's gaze 952G is directed to a location (e.g., in the three-dimensional environment or in a user interface of an application) that is near markup icon 720, device 700 moves cursor 910 to the location of markup icon 720, as shown in FIG. 9R. In some embodiments, instead of, or in addition to, displaying the cursor at grabber 710C, device 700 optionally highlights markup icon 720 to indicate that the focus is on markup icon 720.

At FIG. 9R, device 700 detects that the user's gaze 952I is directed to a location (e.g., in the three-dimensional environment or in a user interface of an application) that is near (e.g., within a threshold distance of) cursor 910 (or markup icon 720) and concurrently detects pinch air gesture 952J by right hand 704. In response to detecting pinch air gesture 952J by right hand 704 while the user's gaze 952I is directed to a location (e.g., in the three-dimensional environment or in a user interface of an application) that is near markup icon 720, device 700 activates markup icon 720, which places application 712 into a markup mode (e.g., activates the markup mode, a drawing mode in which the cursor can be used to draw marks on content), as shown in FIG. 9S.

At FIG. 9S, device 700 detects that the user's gaze 952K is directed to a location (e.g., in the three-dimensional environment or in a user interface of an application) that is near (e.g., within a threshold distance of) cursor 910 and concurrently detects hand movement 952L (e.g., down movement) by right hand 704. In response to detecting hand movement 952L by right hand 704 while the user's gaze 952K is near cursor 910 (e.g., within a threshold distance of cursor 910), device 700 moves cursor 910 based on a direction and/or distance of movement 952L, as shown in FIG. 9T, Thus, because the user's gaze 952K was less than the threshold distance away from the cursor when movement 952L was detected, device 700 moves cursor 910 to a location that is based on an amount (and/or direction) of movement of the user's hand, rather than based on where the user is gazing. In this way, the user can move cursor 910 with precision to an exact location in the environment (e.g., on display 706), as shown in FIG. 9T.

At FIG. 9T (e.g., while in the markup mode), device 700 detects that the user's gaze 952M is directed to a location (e.g., in the three-dimensional environment or in a user interface of an application) that is near (e.g., within a threshold distance of) cursor 910 and concurrently detects pinch air gesture 952N by right hand 704. In response to detecting pinch air gesture 952N by right hand 704 while the user's gaze 952M is near cursor 910 (e.g., within a threshold distance of cursor 910), device 700 starts making a mark 920, as shown in FIG. 9U.

At FIG. 9U (e.g., while in the markup mode), device 700 detects that the user's gaze 9520 is directed to a location (e.g., in the three-dimensional environment or in a user interface of an application) that is near (e.g., within a threshold distance of) cursor 910 and concurrently detects a continuation of pinch air gesture 952N by detecting the user dragging down right hand 704, such that device 700 detects a pinch-and-drag air gesture. In response to detecting the pinch-and-drag air gesture while in the markup mode (and, optionally, with cursor 910 at a location corresponding to window 712), device 700 continues mark 920 to draw a line 920, as shown in FIG. 9V1. The length and direction of line 920 is based on distance and direction of movement of pinch-and-air gesture 952N.

At FIG. 9V1 (e.g., while in the markup mode), device 700 detects that the user's gaze 952P is directed to away from (e.g., not within a threshold distance of) cursor 910 and concurrently detects a pinch air gesture 952Q by right hand 704. In response to detecting the pinch air gesture while in the markup mode (and, optionally, with the user's gaze 952P away from cursor 910), device 700 moves cursor 910 to the location of the user's gaze 952P without making a mark, as shown in FIG. 9U. Thus, the user can quickly and efficiently move cursor 910 around the environment (e.g., display 706) using their gaze and an air gesture.

In some embodiments, the techniques and user interface (s) described in FIG. 9V1 are provided by one or more of the devices described in FIGS. 1A-1P. FIG. 9V2 illustrates an embodiment in which window 712 and cursor 910 are displayed on display module X702 of head-mounted device (HMD) X700. In some embodiments, device 700 is implemented as device X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

In FIG. 9V2 (e.g., while in the markup mode), while displaying cursor 910 via display module X702, device X700 detects (e.g., using camera X704X) that the user's gaze X952P is directed to away from (e.g., not within a threshold distance of) cursor 910 and concurrently detects a pinch air gesture X952Q by right hand 704. In response to detecting the pinch air gesture while in the markup mode (and, optionally, with the user's gaze X952P away from cursor 910), device X700 moves cursor 910 to the location of the user's gaze X952P without making a mark. Thus, the user can quickly and efficiently move cursor 910 around the environment using their gaze and an air gesture.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 790, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

At FIG. 9W (e.g., while in the markup mode), device 700 detects that the user's gaze 952R is directed to window 712 (e.g., and away from (e.g., not within a threshold distance of) cursor 910) and concurrently detects a pinch-and-drag (e.g., upward) air gesture 952S by left hand 702, which is not currently controlling cursor 910. In response to detecting the pinch-and-drag air gesture by the hand not controlling the cursor while in the markup mode, device 700 scrolls the contents of window 712 in a direction and by an amount that is based on (e.g., the same as) the direction and/or amount of movement of pinch-and-drag air gesture 952S without making a mark and, optionally, without moving cursor 910, as shown in FIG. 9X.

At FIG. 9X (e.g., while in the markup mode), device 700 detects that the user's gaze 952T is directed to a location (e.g., in the three-dimensional environment or in a user interface of an application) that is near (e.g., within a threshold distance of) cursor 910 and concurrently detects a pinch air gesture 952U by left hand 702 that is not currently controlling cursor 910. In response to detecting the pinch air gesture by the hand not controlling cursor 910 while in the markup mode, device 700 moves control of cursor 910 to left hand 702 without making a mark, as shown in FIG. 9Y.

At FIG. 9Y (e.g., while in the markup mode), device 700 detects that the user's gaze 952V is directed to a location (e.g., in the three-dimensional environment or in a user interface of an application) that is near (e.g., within a threshold distance of) cursor 910 and concurrently detects a pinch-and-drag air gesture 952W (e.g., downward) by left hand 702. In response to detecting the pinch-and-drag air gesture while in the markup mode (and, optionally, with cursor 910 at a location corresponding to window 712), device 700 draws line 922, as shown in FIG. 9Z. The length and direction of line 922 is based on distance and direction of movement of pinch-and-air gesture 952W.

At FIG. 9Z, device 700 detects that the user's gaze 952X is directed to a location that is more than a threshold distance away from the location of cursor 910 for more than a threshold duration of time and, in response, device 700 fades out (e.g., partially or completely) cursor 910, as shown in FIG. 9AA.

FIG. 10 is a flow diagram of methods of controlling a cursor using the hand that invoked the cursor, in some embodiments. In some embodiments, method 1000 is performed at a computer system (e.g., computer system 101 in FIG. 1, device 700, and/or device x700) (e.g., a smartphone, a desktop computer, a laptop, a tablet, a wearable device (e.g., a smart watch or a wearable fitness tracker), a head-mounted device, and/or a projection-based system) that is in communication with one or more input devices (e.g., 708, 790, and/or X702) (e.g., a camera, a gyroscope, an accelerometer, a mouse, a trackpad, and/or a physiological sensor (e.g., a blood pressure sensor and/or a heart rate sensor)) and a display generation component (e.g., 706 and/or X702) (e.g., a head-mounted display system, a display (e.g., a touch-sensitive display), and/or a projector). In some embodiments, the one or more input devices are integrated into the computer system. In some embodiments, the one or more input devices are integrated into an external device (e.g., a wearable device) that is in communication with the computer system.

In some embodiments, method 1000 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

The computer system (e.g., 700 and/or X700) detects (1002) (e.g., while not displaying a cursor), via the one or more input devices (e.g., 708, 790, and/or X704), a first hand gesture (e.g., 950D) (e.g., a touch gesture on a touch sensitive surface and/or an air gesture) performed by a first hand (e.g., 704) (e.g., of a user of the computer system). In some embodiments, during the first hand gesture, the first hand does not directly contact the computer system or any sensor(s) of the computer system.

In response to detecting the first hand gesture (e.g., 950D) performed by the first hand (e.g., 704), the computer system (e.g., 700) displays (1004), via the display generation component (e.g., 706), a cursor (e.g., 910 at FIG. 9C) (e.g., invoking the cursor) (e.g., an indicator that indicates a current location for user interaction in an environment, such as in a two-dimensional or three-dimensional environment).

While displaying the cursor (e.g., 910 at FIGS. 9E-9F1 and/or 910 at FIG. 9F2), the computer system (e.g., 700 and/or X700) detects (1006), via the one or more input devices (e.g., 708, 790, and/or X704), movement (e.g., 950J, 950L, and/or 950L) (e.g., that does not include a pinch and/or double-pinch gesture, that includes movement at the wrist, and/or that includes translating the hand in space) of a respective hand (e.g., 702 and/or 704).

In response (1008) to detecting movement of the respective hand and in accordance with a determination that the respective hand is the first hand (e.g., 704) (e.g., the hand that invoked the cursor by performing the first hand gesture), the computer system (e.g., 700 and/or X700) moves (1010) (e.g., as in FIG. 9G), via the display generation component (e.g., 706 and/or X702), the cursor (e.g., 910 at FIG. 9G) based on the movement (e.g., 950L and/or X950L) (e.g., translation of the hand in space) of the first hand (e.g., 704).

In response (1008) to detecting movement of the respective hand and in accordance with a determination that the respective hand is a second hand (e.g., 702) (e.g., a hand other than the hand that invoked the cursor by performing the first hand gesture and/or a second hand of the user who performed the first hand gesture with the first hand) that is different from the first hand (e.g., 704), the computer system (e.g., 700) forgoes (1012) moving, via the display generation component (e.g., 706), the cursor (e.g., 910 in FIG. 9F1) based on the movement (e.g., 950J) (e.g., translation of the hand in space) of the second hand (e.g., 702). In some embodiments, once the cursor is invoked, the cursor moves based on movements of the hand that invoked the cursor and does not move based on movements of another hand that did not invoke the cursor. Move the cursor based on movement of the hand that invoked the cursor and not based on movement of a different hand enables the computer system assign control of movement of the cursor to a hand of the user without restricting the other hand of the user and also provides the user with visual feedback about which hand the computer system has detected movement of, thereby providing improved feedback.

In some embodiments, the computer system (e.g., 700) detects, via the one or more input devices (e.g., 708 and/or 790), a second hand gesture (e.g., 950B and/or 950X) (e.g., a pinch or double-pinch air gesture that uses the thumb and middle finger) performed by the first hand (e.g., 704), wherein the second hand gesture is different from the first hand gesture (e.g., a pinch or double-pinch air gesture that uses the thumb and forefinger). In response to detecting the second hand gesture (e.g., 950B and/or 950X) performed by the first hand (e.g., 704), making a selection (e.g., activating and/or selecting a user interface element (e.g., the user interface element based on the location of the cursor when the second hand gesture is detected) and, optionally, performing an operation associated with the user interface element). Using different gestures to invoke the cursor and to perform a selection operation enables the computer system to receive different commands from the user based on different gestures, thereby improving the man-machine interface.

In some embodiments, the first hand gesture (e.g., 950D) performed by the first hand (e.g., 704) is a double-pinch gesture (e.g., a double-pinch air gesture). Invoking the cursor based on a double-pinch gesture enables the computer system to control display of the cursor based on a user's double-pinch gesture input, thereby improving the man-machine interface.

While displaying the cursor (e.g., 910 at FIG. 9G) (e.g., that moves based on movement of the first hand and/or does not move based on the movement of the second hand), the computer system (e.g., 700) detects, via the one or more input devices (e.g., 708 and/or 790), the first hand gesture (e.g., 950N) (e.g., a touch gesture on a touch sensitive surface and/or an air gesture) performed by the second hand (e.g., of the user of the computer system). In some embodiments, during the first hand gesture, the second hand does not directly contact the computer system or any sensor(s) of the computer system. In response to detecting the first hand gesture (e.g., 950N) performed by the second hand (e.g., 702), the computer system (e.g., 700) configures the computer system to move the cursor (e.g., 910) based on movements of the second hand (e.g., as in FIGS. 9I-9J) (and, optionally, not the first hand). In some embodiments, in response to detecting the first hand gesture performed by the second hand, the computer system transitions control of the cursor from the first hand to the second hand. In some embodiments, the computer system detects a gaze of the user directed to a location in an environment, such as in a two-dimensional or three-dimensional environment, and moving the cursor in response to detecting the first hand gesture performed by the second hand includes moving the cursor to a location based on (e.g., near or at) the gaze location. In some embodiments, in response to the computer system detecting the first hand gesture performed by the second hand (e.g., regardless of whether the cursor moves or not), the second hand takes over control of the cursor (and, optionally, the first hand no longer controls the cursor). For example, while the second hand has control of the cursor, movement of the second hand moves the cursor while movement of the first hand does not move the cursor. Switching control of the cursor from the first hand to the second hand when the second hand performs the first hand gesture enables the computer system to receive user input to change the hand that controls the movement of the cursor, thereby providing the user with additional options for providing inputs to control the cursor and improving the man-machine interface.

In some embodiments, while displaying the cursor (e.g., that moves based on movement of the first hand and/or does not move based on the movement of the second hand), the computer system (e.g., 700) detects, via the one or more input devices (e.g., 708 and/or 790), the first hand gesture (e.g., 950N) (e.g., a touch gesture on a touch sensitive surface and/or an air gesture) performed by a second respective hand (e.g., 702 or 704) (e.g., of the user of the computer system). In some embodiments, during the first hand gesture, the second respective hand does not directly contact the computer system or any sensor(s) of the computer system. In response to detecting the first hand gesture performed by the second respective hand: in accordance with a determination that the second respective hand is the first hand (e.g., 702) (e.g., the hand that invoked the cursor by performing the first hand gesture and/or the hand that is currently controlling the cursor (e.g., via movements of the hand)), the computer system (e.g., 700) ceases display, via the display generation component (e.g., 706), of the cursor (e.g., such that neither the first hand nor the second hand is controlling the cursor) (e.g., as in FIG. 9A) and in accordance with a determination that the second respective hand is the second hand (e.g., 704) (e.g., a hand that is not currently controlling the cursor), the computer system (e.g., 700) moves, via the display generation component, the cursor (e.g., 910). In some embodiments, the computer system detects a gaze of the user directed to a location in an environment, such as in a two-dimensional or three-dimensional environment, and moving the cursor in response to detecting the first hand gesture performed by the second hand includes moving the cursor to a location based on (e.g., near or at) the gaze location. In some embodiments, in response to the computer system detecting the first hand gesture performed by the second hand (e.g., regardless of whether the cursor moves or not), the second hand takes over control of the cursor (and, optionally, the first hand no longer controls the cursor). For example, when the second hand has control of the cursor, movement of the second hand moves the cursor while movement of the first hand does not move the cursor. Dismissing the cursor in response to detecting the first hand gesture being performed by the hand that is controlling the cursor enables the user to dismiss the cursor with the hand that is already controlling the cursor, thereby reducing the number of inputs requires to dismiss the cursor.

In some embodiments, while displaying the cursor (e.g., that moves based on movement of the first hand and/or movement of the second hand), the computer system (e.g., 700) detects, via the one or more input devices (e.g., 708 and/or 790), a request to display a system user interface (e.g., a settings user interface for the computer system and/or a user interface of the operating system of the computer system). In some embodiments, the request is the user's gaze dwelling at an interface option for more than a threshold amount of time. In response to detecting the request to display the system user interface, the computer system (e.g., 700) displays, via the display generation component (e.g., 706), the system user interface and an indication (e.g., similar to or the same as 906) (e.g., separate from the cursor) that the cursor is currently displayed. In some embodiments, when the cursor is active (e.g., displayed), the system user interface (or another interface) includes an indication that the cursor is active. Displaying an indication that the cursor is active as part of the system user interface provides the user with visual feedback that the cursor is active, thereby providing improved feedback.

In some embodiments, the indication (e.g., similar to or same as 906) that the cursor is currently displayed includes a selectable option (e.g., 906) for ceasing to display the cursor (e.g., 910). While the computer system (e.g., 700) displays the selectable option (e.g., 906) for ceasing to display the cursor (e.g., 910), the computer system (e.g., 700) detects activation of (e.g., as in FIG. 9*d*) the selectable option (e.g., 906) for ceasing to display the cursor (e.g., a pinch air gesture while a gaze of the user is directed at the selectable option for ceasing to display the cursor). In response to detecting activation of the selectable option for ceasing to display the cursor, the computer system (e.g., 700) ceases display (e.g., as in FIG. 9A) of the cursor (e.g., 910) (and, optionally, ceasing display of the indication that the cursor is currently displayed). Displaying an option to dismiss the cursor as part of the system user interface provides the user with visual feedback that the cursor is active and enables the user to quickly dismiss the cursor, thereby providing improved feedback and improving the man-machine interface.

In some embodiments, in response to detecting the first hand gesture (e.g., 950D) performed by the first hand (e.g., 704), the computer system (e.g., 700) displays (e.g., concurrently with the cursor), via the display generation component (e.g., 706), a second selectable option (e.g., 906 at FIG. 9C) for ceasing to display the cursor. In some embodiments, while displaying the second selectable option for ceasing to display the cursor, the computer system detects, via the one or more input devices, activation of the second selectable option for ceasing to display the cursor (e.g., a pinch air gesture while a gaze of the user is directed at the second selectable option for ceasing to display the cursor). In response to detecting activation of the second selectable option for ceasing to display the cursor, the computer system ceases to display the cursor (and, optionally, ceasing display of the indication that the cursor is currently displayed). Displaying an option to dismiss the cursor when the cursor is invoked provides the user with visual feedback that the cursor is active and enables the user to quickly dismiss the cursor, thereby providing improved feedback and improving the man-machine interface.

In some embodiments, in accordance with a determination that the second selectable option (e.g., 906) has been displayed for a threshold duration of time (e.g., 0.2 seconds, 0.5 seconds, 1 second, 2 seconds, 5 seconds, 30 seconds, 1 minute, 5 minutes, or 10 minutes), the computer system (e.g., 700) ceases to display the second selectable option (e.g., as in FIGS. 9E-9F1). In some embodiments, in accordance with a determination that the second selectable option has been displayed for less than the threshold duration of time, the computer system continues displaying the second selectable option. Ceasing to display the option to dismiss the cursor after a time threshold has passed declutters the user interface and enables the display space to be used for displaying other visual feedback, thereby improving the man-machine interface.

In some embodiments, moving the cursor (e.g., 910) based on the movement of the first hand (e.g., 704) includes moving the cursor from a first location (e.g., FIG. 9J) (e.g., in an environment, such as in a two-dimensional or three-dimensional environment) corresponding to (e.g., pointing to an object of) a first application (e.g., 712) to a second location (e.g., at FIG. 9K) (e.g., in the environment) corresponding to (e.g., pointing to an object of) a second application (e.g., 710) that is different from the first application. Moving the cursor between different applications enables the computer system to provide the user with control of the various applications using the cursor, thereby providing an improved man-machine interface.

In some embodiments, moving the cursor (e.g., 910) based on the movement (e.g., 952B) of the first hand includes moving a first user interface (e.g., 710) corresponding to a first application from a first location (e.g., at FIG. 9N) (e.g., in an environment, such as in a two-dimensional or three-dimensional environment) to a second location (e.g., at FIG. 9O) (e.g., in the environment) that is different from the first location. In some embodiments, while the cursor is positioned at a grabber user interface object of the first application, the computer system detects a pinch-and-hold gesture (e.g., pinch-and-hold air gesture) followed by the movement (while optionally continuing to detect the pinch-and-hold gesture), thereby causing the first user interface to move to a location based on the movement of the first hand. Moving a user interface of an application using the cursor enables the computer system to give the user control of the placement of the user interface, thereby allowing the user to more efficiently use the computer system and to access information from the computer system.

In some embodiments, moving the cursor (e.g., 910) based on the movement (e.g., 952D) of the first hand (e.g., 704) includes moving the cursor to a location corresponding to a user interface object (e.g., 710D) for closing an application (e.g., 710). While the computer system (e.g., 700) displays, via the display generation component (e.g., 706), the cursor at the location (e.g., as in FIG. 9P) corresponding to the user interface object (e.g., 710D) for closing the application (e.g., 710), the computer system (e.g., 700) detects, via the one or more input devices (e.g., 708 and/or 790), an activation user input (e.g., 952F) (e.g., a pinch gesture and/or a pinch air gesture). In response to detecting the activation user input (e.g., 952F) and in accordance with a determination that the cursor is at the location corresponding to the user interface object for closing the application (e.g., as in FIG. 9p), the computer system (e.g., 700) closes the application (e.g., as in FIG. 9Q). In some embodiments, in response to detecting the activation user input and in accordance with a determination that the cursor is not at the location corresponding to the user interface object for closing the application, forgoing closing the application. Closing an application (and optionally causing a user interface of the application to cease being displayed) provides the user with visual feedback that the application is no longer running, thereby providing improved feedback. Quickly and efficiently closing an application based on the location of the cursor also helps to conserver computer memory and processing cycles, which also preserves the battery (if any) of the computer system.

In some embodiments, moving the cursor (e.g., 910) based on the movement of the first hand includes: in accordance with a determination that a gaze (e.g., 950U) of a user of the computer system is directed to within a threshold range (e.g., within 2 degrees, within 3 degrees, within 5 degrees) of a location of the cursor (e.g., 910 in FIG. 9K), the computer system (e.g., 700) moves the cursor without basing a direction of movement of the cursor on the gaze (e.g., as in FIGS. 9K-9L). In some embodiments, when a gaze of the user is directed to a location (e.g., in the three-dimensional environment or in a user interface of an application) that is near (e.g., within the threshold range of) a location of the cursor, the computer system moves the cursor without directional bias that is based on the location of the gaze. In some embodiments, when the user is looking at the cursor (e.g., within the threshold range), the cursor moves in a direction that is based on the movement of the first hand and not in a direction that is based on where the user is gazing. In some embodiments, moving the cursor (e.g., 910) based on the movement of the first hand includes: in accordance with a determination that the gaze (e.g., 950S) of a user of the computer system is not directed to within the threshold range (e.g., within 2 degrees, within 3 degrees, within 5 degrees) of the location of the cursor (e.g., 910 in FIG. 9J), In some embodiments, moving the cursor (e.g., 910) based on the movement of the first hand includes: moves the cursor in a direction that is based on (e.g., towards or away from) a location of the gaze (e.g., as in FIGS. 9J-9K). In some embodiments, when a gaze of the user is not directed to a location (e.g., in the three-dimensional environment or in a user interface of an application) that is near (e.g., within the threshold range of) the location of cursor, the computer system moves the cursor with directional bias towards the location of the gaze. In some embodiments, when the user is not looking at the cursor (e.g., not within the threshold range), the cursor moves in a direction that is based on the location of the gaze (and, optionally, that is not based on the direction of the movement of the first hand). Moving the cursor with or without directional bias based on whether the user is looking at the cursor enables the user to make small movements of the cursor (e.g., while looking at the cursor) and to make big movements of the cursor (e.g., while looking at where the user wants the cursor to be), thereby providing the user with increased control (e.g., of precision movements) of the cursor with a reduced need for inputs.

In some embodiments, moving the cursor (e.g., 910) based on the movement of the first hand includes: in accordance with a determination that the first hand is within a threshold distance (e.g., 2 inches, 3 inches, or 5 inches) (e.g., in an environment, such as a virtual 3D environment) of a canvas (e.g., a virtual canvas and/or a drawing surface), the computer system (e.g., 700) moves the cursor based on a location of a palm of the first hand (e.g., 704) (e.g., without moving the cursor based on a location of one or more fingertips of the first hand); and in accordance with a determination that the first hand (e.g., 704) is not within the threshold distance (e.g., 2 inches, 3 inches, or 5 inches) (e.g., in an environment, such as a virtual 3D environment) of the canvas, the computer system (e.g., 700) moves the cursor based on a location of one or more fingertips of the first hand (e.g., without moving the cursor based on a location of the palm of the first hand). Moving the cursor based on different parts of a user's hand enables the computer system to provide the user with enhanced control of the cursor, thereby enabling more precise and accurate user inputs.

In some embodiments, in response to detecting the first hand gesture (e.g., 950D) performed by the first hand (e.g., 704) and in accordance with a determination that a set of one or more conditions is met (e.g., the cursor has not been displayed during a current computing session, during the time since the computer system was most recently restarted, during the time since the computer system was initially configured, and/or during the time since the computer system was most recently reset), the computer system (e.g., 700) displays, via the display generation component, information about cursor use (e.g., similar to display of 906) (e.g., information about displaying the cursor (e.g., how to cause display of the cursor), information about ceasing to display the cursor (e.g., how to cause the cursor to not be displayed), and/or information about moving the cursor (e.g., how to move the cursor)). In some embodiments, in response to detecting the first hand gesture (e.g., 950D) performed by the first hand (e.g., 704) and in accordance with a determination that the set of one or more conditions is not met, the computer system (e.g., 700) forgoing display, via the display generation component, of the information about cursor use. Displaying information above controlling the cursor the first time that the cursor is invoked (e.g., first time that a user uses the computer system and/or the first time after the operating system is updated) provides the user with visual feedback about what inputs can be provided to perform what cursor-based operations, thereby providing the user with improved control of the cursor and, accordingly, the computer system.

In some embodiments, in response to detecting an end of a current session (e.g., at FIG. 9AA if the user logs off) (e.g., the computer system is being turned off and/or the computer system is being taken off of a body (e.g., hand and/or head) of the user), the computer system (e.g., 700) ends a cursor session associated with the cursor (e.g., 910) (e.g., ceasing to display the cursor, discarding information about a display state (e.g., location of cursor and/or whether cursor is displayed or not) of the cursor, and/or removing one or more triggering conditions for displaying the cursor, such as ceasing to listen for a pinch input to invoke the cursor). In some embodiments, the computer system does not base the display state of the cursor during a next session of use of the computer system on a display state of the cursor during a previous (e.g., most recent) session of use of the computer system. Disabling the cursor at the end of a computer system use session (e.g., when the computer system is turned off and/or when the computer system is taken off of a body of the user) enables the computer system to provide the user with a consistent starting state the next time that the computer system is used, thereby providing the user with a consistent experience and a reduced need to provide inputs to identify whether the cursor is active or disabled.

In some embodiments, moving the cursor (e.g., 910) based on the movement of the first hand includes: in accordance with a determination that a gaze (e.g., 950U) of a user of the computer system is directed to within a threshold range (e.g., within 0.3 degrees, within 0.7 degrees, within 1 degree, within 2 degrees, within 3 degrees, within 5 degrees, within 7 degrees, within 15 degrees, or within 30 degrees) of a location of the cursor (e.g., 910 at FIG. 9K), the computer system (e.g., 700) moves the cursor in correspondence with (e.g., direction of cursor movement is based on direction of movement of the first hand, distance of cursor movement is based on distance of movement of the first hand, and/or speed of cursor movement is based on speed of movement of the first hand) the movement of the first hand (e.g., as in FIGS. 9K-9L). In some embodiments, when a gaze of the user is directed to a location (e.g., in the three-dimensional environment or in a user interface of an application) that is near (e.g., within the threshold range of) a location of the cursor, the computer system moves the cursor to match (and/or in correspondence with) the direction, distance, and/or speed of the movement of the first hand. In some embodiments, when the user is looking at the cursor (e.g., within the threshold range), the cursor moves in a direction that is based on the movement of the first hand and not in a direction that is based on where the user is gazing. In some embodiments, moving the cursor (e.g., 910) based on the movement of the first hand includes: in accordance with a determination that the gaze (e.g., 950S) of a user of the computer system is not directed to within the threshold range (e.g., within 2 degrees, within 3 degrees, within 5 degrees) of the location of the cursor (e.g., 910 at FIG. 9J), the computer system (e.g., 700) moves the cursor to a location that is based on (e.g., at or within a distance of) a location of the gaze (e.g., as in FIGS. 9J-9K). In some embodiments, when a gaze of the user is not directed to a location (e.g., in the three-dimensional environment or in a user interface of an application) that is near (e.g., within the threshold range of) the location of cursor, the computer system moves the cursor to the location of the user's gaze. In some embodiments, when the user is not looking at the cursor (e.g., not within the threshold range), the cursor moves with a speed and/or for a distance that is not based on the movement of the first hand. Moving the cursor based on the movement of the user's hand or to a location where the user is gazing enables the user to make small movements of the cursor (e.g., while looking at the cursor) and to make big movements of the cursor (e.g., while looking at where the user wants the cursor to be), thereby providing the user with increased control (e.g., of precision movements) of the cursor with a reduced need for inputs.

In some embodiments (e.g., as described in further detail with respect to FIG. 11), in response to detecting movement of the respective hand (e.g., 704) and in accordance with the determination that the respective hand is the first hand (e.g., the hand that invoked the cursor by performing the first hand gesture), the computer system (e.g., 700) displays a mark (e.g., as in FIGS. 9U-9V1) (e.g., drawing and/or highlighting), via the display generation component (e.g., 706), on a portion of a document based on the movement of the first hand. In some embodiments, the cursor moves in correspondence with the movement of the first hand. Using the cursor to mark a document based on the movement of the hand enables the computer system to receive inputs to mark up a document, thereby providing the user with increased control.

In some embodiments, aspects/operations of methods 800, 1000, 1100, and 1300 may be interchanged, substituted, and/or added between these methods. In some embodiments, the cursor is the same cursor in the various methods. In some embodiments, the gestures are the same gestures in the various methods. For brevity, these details are not repeated here.

FIG. 11 is a flow diagram of methods of controlling a cursor based on detected hand movement, in some embodiments. In some embodiments, method 1100 is performed at a computer system (e.g., computer system 101 in FIG. 1A, device 700, and/or device X700) (e.g., a smartphone, a desktop computer, a laptop, a tablet, a wearable device (e.g., a smart watch or a wearable fitness tracker), a head-mounted device, and/or a projection-based system) that is in communication with one or more input devices (e.g., 708, 790, and/or X704) (e.g., a camera, a gyroscope, an accelerometer, a mouse, a trackpad, and/or a physiological sensor (e.g., a blood pressure sensor and/or a heart rate sensor)) and a display generation component (e.g., 706 and/or X702) (e.g., a head-mounted display system, a display (e.g., a touch-sensitive display), and/or a projector). In some embodiments, the one or more input devices are integrated into the computer system. In some embodiments, the one or more input devices are integrated into an external device (e.g., a wearable device) that is in communication with the computer system.

In some embodiments, method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

The computer system (e.g., 700 and/or X700) displays (1102), via the display generation component (e.g., 706 and/or X702), a cursor (e.g., 910 at FIGS. 9T and 9W) that moves based on (e.g., in conjunction with) movement (e.g., detected via the one or more input devices) of a first hand (e.g., 704) (and, optionally, not a second hand) (e.g., of a user of the computer system). In some embodiments, the computer system moves the cursor based on movement of the first hand that does not directly contact the computer system or any sensor(s) of the computer system. In some embodiments, the computer system moves the cursor in one or more directions that are substantially the same as the one or more directions of movement of the first hand. In some embodiments, as the cursor moves between two locations based on movement of the first hand, the computer system displays the cursor traversing a path between the two locations, wherein the shape of the path is based on (e.g., matches) the movement of the first hand.

While displaying the cursor (e.g., 910) that moves based on movement of the first hand (e.g., 704), the computer system (e.g., 700) detects (1104), via the one or more input devices (e.g., 708 and/or 790), a first input of a respective type performed by a respective hand.

In response (1106) to detecting the first input of the respective type performed by the respective hand and in accordance with a determination that the first input is a first type of input (e.g., 952N at FIG. 9T) performed with the first hand (e.g., 704), the computer system (e.g., 700) initiates (1108) a process (e.g., as in FIG. 9U) to display, via the display generation component (e.g., 700), a mark (e.g., 920 at FIGS. 9U-9V1) (e.g., make a mark in a drawing application and/or make a mark when movement of the first hand is detected).

In response (1106) to detecting the first input of the respective type performed by the respective hand and in accordance with a determination that the first input is the first type of input (e.g., 952U) performed with a second hand (e.g., 702) that is different from the first hand (e.g., 704), the computer system (e.g., 700) configures (1110) the computer system to move the cursor based on movements of the second hand (e.g., 704) (and, optionally, not the first hand) without initiating the process to display a mark (e.g., as in FIGS. 9X-9Y). In some embodiments, the computer system moves the cursor based on (e.g., in conjunction with) movement of the second hand that does not directly contact the computer system or any sensor(s) of the computer system. Initiating a process to make a mark when the first type of input is performed with a hand controlling the cursor enables the user to make marks in a document or on a canvas while also having the ability to provide the first type of input with another hand to change control of the cursor to the other hand, thereby providing the user with increased control of the cursor (and therefore the computer system) and providing the user with visual feedback about received inputs.

In some embodiments, initiating the process to display the mark includes displaying (e.g., without detecting additional input from the user) the mark (e.g., 920 at FIG. 9U) (e.g., a dot on a canvas of a drawing application). In some embodiments, the computer system makes a mark (e.g., in a drawing application) in response to detecting that the first input is a first type of input performed with the first hand. Making a mark when the first type of input is performed with a hand controlling the cursor enables the user to make marks in a document or on a canvas enables the user to create/revise content with increased control of the cursor (and therefore the computer system) and provides the user with visual feedback about received inputs.

In some embodiments, after detecting the first input (e.g., 952N at FIG. 9T) of the first type (e.g., a pinch air gesture or a double-pinch air gesture) performed by the first hand (e.g., 704), the computer system (e.g., 700) detects movement (e.g., 952N at FIG. 9U) of the first hand (e.g., while continuing to detect the first type of input being performed with the first hand and/or while the user maintains a pinch air gesture with the first hand). In response to detecting movement (e.g., 952N at FIG. 9U) of the first hand (e.g., 704), the computer system (e.g., 700) displays, via the display generation component (e.g., 700), a second mark (e.g., line portion of 920 at FIG. 9V1) (e.g., a continuation of the mark or separate from the mark) that is based on (e.g., a shape, a path, a length, and/or a location) of the movement (e.g., 952N at 9U) of the first hand. In some embodiments, the second mark is a continuation of the initial mark made when the first type of input is performed with the first hand. In some embodiments, the visual characteristics (e.g., shape, size, length, and/or location) of the second mark is based on characteristics of (e.g., to match, to correspond to, and/or to follow) the movement of the first hand. In some embodiments, the computer system makes the second mark based on (e.g., in conjunction with) movement of the first hand that does not directly contact the computer system or any sensor (s) of the computer system. Making a mark based on movement that follows the movement of the first input enables the user to control the shape, length, location of the mark and also provides the user with visual feedback that the movements of the first hand are being detected, thereby providing improved visual feedback.

In some embodiments, the first type of input (e.g., 952N at FIGS. 9T and/or 952U) is a pinch input (e.g., a pinch air gesture). In some embodiments, the computer system detects the pinch input while the first hand does not directly contact the computer system or any sensor(s) of the computer system. Initiating a process to make a mark when a pinch input is performed with a hand controlling the cursor enables the user to make marks in a document or on a canvas while also having the ability to provide the pinch input with another hand to change control of the cursor to the other hand, thereby providing the user with increased control of the cursor (and therefore the computer system) and providing the user with visual feedback about received pinch inputs.

In some embodiments, in response to detecting the first input of the respective type performed by the respective hand and in accordance with a determination that the first input is a second type of input performed with the first hand (e.g., 704), the computer system (e.g., 700) displays, via the display generation component (e.g., 706), a line (e.g., 920 at FIG. 9V1) (e.g., a straight line or a curved line) (e.g., drawing a line in a drawing application and/or drawing a line based on movement of the first hand as part of the second type of input). In some embodiments, the visual characteristics (e.g., shape, size, length, and/or location) of the line are based on characteristics of (e.g., to match, to correspond to, and/or to follow) the movement of the first hand. In some embodiments, the computer system draws the line based on (e.g., in conjunction with) movement of the first hand that does not directly contact the computer system or any sensor (s) of the computer system. In some embodiments, in response to detecting the first input of the respective type performed by the respective hand and in accordance with a determination that the first input is the second type of input (e.g., 952S) performed with the second hand (e.g., 702) that is different from the first hand, the computer system (e.g., 700) performs an operation (e.g., as in FIGS. 9W-9X) (e.g., a scroll operation and/or a tool selection operation) without drawing a line. In some embodiments, the scroll operation translates content on the screen, causing some content to cease to be displayed and other content to be newly displayed. In some embodiments, the operation is a scroll operation and a direction of the scroll operation is based on a direction of the movement of the second hand as part of the second type of input. In some embodiments, the operation is a scroll operation and a magnitude (e.g., distance and/or speed) of the scroll operation is based on a magnitude (e.g., distance and/or speed) of the movement of the second hand as part of the second type of input. Drawing a line when the second type of input is performed with the first hand enables the user to draw a line in a document or on a canvas while also having the ability to provide the second type of input with another hand to perform a different operation (such as scrolling the document or canvas), thereby providing the user with increased control of the computer system and providing the user with visual feedback about received inputs.

In some embodiments, the second type of input is a pinch-and-drag input (e.g., 952S) (e.g., a pinch-and-drag air gesture). Drawing a line when a pinch-and-drag input is performed with the first hand enables the user to draw a line in a document or on a canvas while also having the ability to provide the pinch-and-drag input with another hand to perform a different operation (such as scrolling the document or canvas), thereby providing the user with increased control of the computer system and providing the user with visual feedback about received pinch-and-drag inputs.

In some embodiments, in response to detecting the first input of the respective type performed by the respective hand and in accordance with a determination that the first input is the second type of input (e.g., 952S) (e.g., independent of which hand performs the first input), the computer system (e.g., 700) forgoes configuring the computer system to move the cursor (e.g., 910) based on movements of the second hand (e.g., as in FIG. 9X). In some embodiments, the computer system is configured to move the cursor based on movements of the first hand when the first input is detected and in response to detecting the first input of the second type, the computer system maintains the configuration of the computer system such that the cursor moves based on movements of the first hand. Not moving control of the cursor from the first hand to the second hand when the second type of input is detected enables the user to continue to control the cursor with the existing hand while performing other operations (e.g., the draw operation and/or the scroll operation), thereby increasing the user's control of the computer system and improving the man-machine interface.

In some embodiments, subsequent to (or prior to) detecting the first input and while displaying the cursor (e.g., 910) that moves based on movement of the first hand, the computer system (e.g., 700) detects, via the one or more input devices (e.g., 708 and/or 790), a second input of the first type performed by the first hand. In response to detecting the second input of the first type performed by the first hand and in accordance with a determination that a gaze of a user of the computer system is directed to within a threshold range (e.g., within 2 degrees, within 3 degrees, within 5 degrees) of a location of the cursor when the second input is detected, the computer system (e.g., 700) initiates a process to display, via the display generation component (e.g., 706), a third mark (e.g., similar to 904 at FIG. 9U) (e.g., make a mark in a drawing application and/or make a mark when movement of the first hand is detected) (e.g., that is not otherwise based on the location of the gaze of the user). In some embodiments, when the gaze of the user is directed to the cursor (e.g., near the cursor), the computer system moves the cursor in correspondence with (e.g., direction of cursor movement is based on direction of movement of the first hand, distance of cursor movement is based on distance of movement of the first hand, and/or speed of cursor movement is based on speed of movement of the first hand) movement of the first hand. In some embodiments, when a gaze of the user is directed to a location (e.g., in the three-dimensional environment or in a user interface of an application) that is near (e.g., within the threshold range of) a location of the cursor, the computer system moves the cursor to match (and/or in correspondence with) the direction, distance, and/or speed of the movement of the first hand. In some embodiments, when the user is looking at the cursor (e.g., within the threshold range), the cursor moves in a direction that is based on the movement of the first hand and not in a direction that is based on where the user is gazing. In response to detecting the second input of the first type performed by the first hand and in accordance with a determination that the gaze (e.g., 952P and/or X952P) of the user of the computer system is not directed to within the threshold range (e.g., within 2 degrees, within 3 degrees, within 5 degrees) of the location of the cursor (e.g., 910 at FIGS. 9V1 and/or 9V2) when the second input (e.g., 952Q and/or X952Q) is detected, the computer system (e.g., 700 and/or X700) moves the cursor (e.g., 910), via the display generation component (e.g., 706 and/or X702), in a direction that is based on (e.g., towards or away from) a location of the gaze (e.g., as in FIGS. 9V1, 9V2, and/or 9W).

In some embodiments, when a gaze of the user is not directed to a location (e.g., in the three-dimensional environment or in a user interface of an application) that is near (e.g., within the threshold range of) the location of cursor, the computer system moves the cursor with directional bias towards the location of the gaze. In some embodiments, when the user is not looking at the cursor (e.g., not within the threshold range), the cursor moves in a direction that is based on the location of the gaze (and, optionally, that is not based on the direction of the movement of the first hand). In some embodiments, the computer system detects the second input without the first hand directly contacting the computer system or any sensor(s) of the computer system. Initiating the process to make a mark or to move the cursor to a location where the user is gazing (e.g., based on where the user is gazing) enables the user to make marks in the document/on the canvas at the current location and also to quickly move the cursor to a different location (e.g., to make additional marks), thereby providing the user with increased control of the cursor (and computer system) with a reduced need for inputs.

In some embodiments, subsequent to (or prior to) detecting the first input and while displaying, at a first location, the cursor that moves based on movement of the first hand, the computer system (e.g., 700) detects, via the one or more input devices (e.g., 708 and/or 790), a third input of a third type (e.g., a pinch gesture, such as a pinch air gesture) performed by the second hand. In response to detecting the third input of the third type performed by the second hand, the computer system (e.g., 700) ceases to display the cursor at the first location and displays, via the display generation component (e.g., 706), the cursor (e.g., 910) at a second location that is different from the first location (e.g., similar to FIGS. 9V1-9W, but for left hand 702). In some embodiments, the computer system ceases to display the cursor at the first location before displaying the cursor at the second location. In some embodiments, the computer system does not display an animation of the cursor moving from the first location to the second location. In some embodiments, the second location at which the cursor is displayed is based on a distance (e.g., more than 30 cm away/less than 30 cm away and/or more than 50 cm away/less than 50 cm away) of a hand of the user from a drawing user interface (e.g., a canvas of a drawing application and/or a document of a word processing application) when the third input of the third type is detected. In some embodiments, in accordance with a determination that the second hand of the user is within a threshold distance (e.g., 30 cm or 50 cm) of a drawing user interface when the third input of the third type is detected, the computer system enters a direct markup mode and/or the cursor moves to a location corresponding to (e.g., location of) the second hand, and in accordance with a determination that the second hand of the user is not within the threshold distance (e.g., 30 cm or 50 cm) of the drawing user interface when the third input of the third type is detected, the computer system enters an indirect markup mode and/or the cursor moves to a location corresponding to (e.g., location of) a gaze of the user at the time that the third input of the third type was detected. Moving the cursor based on a location where the user is gazing enables the user to quickly move the cursor (e.g., while looking at where the user wants the cursor to be), thereby providing the user with increased control (e.g., of precise and/or large movements) of the cursor with a reduced need for inputs.

In some embodiments, while displaying the cursor (e.g., 910 at FIG. 9Z), the computer system (e.g., 700) detects that a gaze (e.g., 952X) of a user of the computer system is directed to one or more locations that are more than a threshold amount (e.g., more than 0.2 inches, more than 1 inch, more than 2 inches, more than 5 inches, more than 10 inches, more than 15 inches, more than 30 inches, more than 40 inches, more than 0.2 degrees, more than 1 degree, more than 3 degrees, more than 7 degrees, more than 10 degrees, more than 15 degrees more than 20 degrees, and/or more than 30 degrees) away from a location of the cursor (e.g., 910) (optionally, and/or for more than a threshold duration (e.g., 0.1 seconds, 1 second, 2 seconds, 3 seconds, 10 seconds, 15 seconds, 20 seconds, or 30 seconds)). In response to detecting that the gaze (e.g., 910) of the user of the computer system is directed to one or more locations that are more than the threshold amount away from the location of the cursor (optionally, and/or for more than the threshold duration), the computer system (e.g., 700) changes a visual characteristic of the cursor (e.g., 910 at FIG. 9AA) (e.g., fading out the cursor, ceasing to display the cursor, dimming the cursor, changing an opacity/transparency of the cursor, and/or reducing a visual prominence of the cursor). Fading out the cursor when the user looks away from the cursor by more than a threshold amount declutters the user interface and enables the computer system to focus the user's attention on other aspects of the user interface, thereby improving the man-machine interface. In some embodiments, changing the visual characteristic of the cursor includes reducing a visual prominence (e.g., partially fading and/or increasing transparency, saturation, contrast and/or other visual property) of the cursor while continuing to display the cursor (e.g., 910 at FIG. 9AA). Reducing the visual prominence of the cursor when the user looks away from the cursor by more than a threshold amount declutters the user interface and enables the computer system to focus the user's attention on other aspects of the user interface, thereby improving the man-machine interface.

In some embodiments, aspects/operations of methods 800, 1000, 1100, and 1300 may be interchanged, substituted, and/or added between these methods. In some embodiments, the cursor is the same cursor in the various methods. In some embodiments, the gestures are the same gestures in the various methods. For brevity, these details are not repeated here.

FIGS. 12A-12V illustrate example techniques for updating different cursors in different manners, in some embodiments. FIG. 13 is a flow diagram of methods of updating different cursors in different manners, in some embodiments. The user interfaces and graphs in FIGS. 12A-12V are used to illustrate the processes in FIG. 13.

In the illustrated embodiments, device 1200 is implemented as a head-mounted device (e.g., the same as or similar to HMD 120) that is optionally in communication with display 1202 (e.g., the same as or similar to one or more XR displays 312), one or more image sensors 1290 (e.g., the same as or similar to one or more image sensors 314), and trackpad 1208 (e.g., a physical trackpad that has a touch-sensitive surface). In some embodiments, device 1200 includes some or all of the features of device 700. In some embodiments, the content provided by display 1202 in FIGS. 12A-12T forms a three-dimensional environment that the user is optionally immersed in. For example, when immersed in the three-dimensional environment, the user perceives the content as three-dimensional elements. In some embodiments, when immersed in the three-dimensional environment, the user can view a left hand and right hand of an avatar representing the user, e.g., instead of viewing their physical left hand and their physical right hand 1204. In some embodiments, the user views a pass-through representation of the physical environment that includes one or more of the user's hands and/or trackpad 1208 as part of the three-dimensional environment.

As described below, using one or more image sensors 1290 (e.g., inward- and/or outward-facing image sensors) and/or trackpad 1208, device 1200 detects respective gestures (e.g., gestures on trackpad 1208 and/or air gestures) (e.g., including hand location, hand pose, and hand movement) performed by the user's hands (e.g., right hand 1204). Device 1200 performs various operations based on the respective gestures.

At FIG. 12A, device 1200 displays window 1212 (e.g., same as or similar to window 712) for a markup application (e.g., an application that allows the user to create and/or edit content, e.g., by drawing, typing, and/or adding other types of graphical elements into the content). Window 1212 includes markup icon 1220. Markup icon 1220 is in a selected state, thereby indicating that a markup mode (e.g., a drawing mode in which the cursor can be used to draw marks on content) for the markup application is active. As shown in FIG. 12A, window 1212 already includes content 1230 (e.g., handwritten characters and/or typed characters). At FIG. 12A, device 1200 detects that the user's gaze 1250A is directed at window 1212 (and, optionally, that hand 1204 is above a threshold height, hand 1204 has stopped moving for a threshold duration of time, and/or that hand 1204 is in a particular pose (e.g., pointing (with index finger extended) hand pose or with pointing finger and thumb prepared to pinch)) and, in response, displays cursor 1252A at a location that corresponds to (e.g., is the same as or is near) where the user's gaze 1250A is directed. Because cursor 1252A is indicating (e.g., displayed at) a location within a markup area (e.g., window 1212 for the markup application) (and, optionally, because the cursor was initiated via an air gesture), cursor 1252A exhibits a first type of behavior (e.g., behaves as a markup cursor and/or updates in a first manner) when manipulated (e.g., moved and/or interacted with). In some embodiments, device 1200 displays an indication (e.g., 1250A-1250T) of the location of the user's gaze to provide the user with visual feedback. In some embodiments, device 1200 does not display an indication of the location of the user's gaze (e.g., does not display 1250A-1250T).

At FIG. 12A, while cursor 1252A is displayed, device 1200 detects that the user's hand 1204 performs air gesture 1254A that includes a pointing hand pose (e.g., pointing towards the location of the cursor) and movement of a first amount to the left. As shown in FIG. 12B, in response to detecting gesture 1254A, device 1200 animates movement of cursor 1252A to a new location within the three-dimensional environment. In some embodiments, the new location of cursor 1252A is based on a magnitude and/or speed of the movement of air gesture 1254A. In some embodiments, cursor 1252A moves based on first acceleration curve 1272C, such as shown in FIG. 12U. In this example, the user moves their gaze to follow the movement of cursor 1252A, as indicated by gaze 1250B. In some embodiments, device 1200 deactivates (e.g., stops displaying) cursor 1252A in response to detecting that the user's hand (e.g., hand 1204) is below a deactivation threshold height (e.g., same as or different from the activation threshold height) for more than a threshold duration of time and/or that the user's gaze is more than a threshold distance from cursor 1252A for more than a threshold duration of time (e.g., 1 second, 2 seconds, or 5 seconds).

Figure 12C:
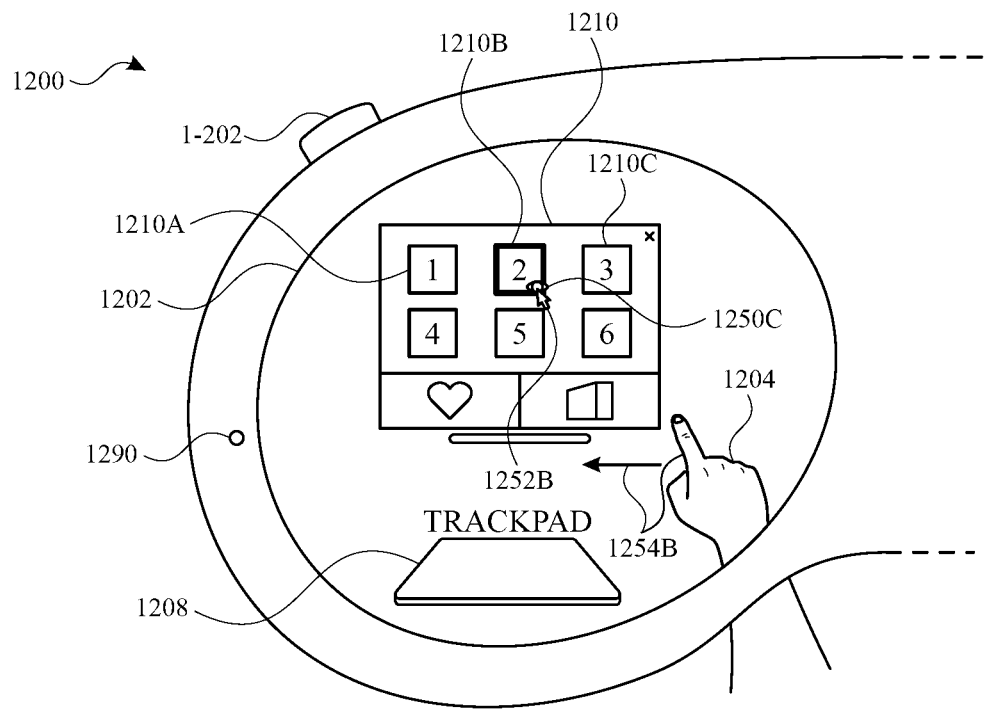

At FIG. 12C, device 1200 is displaying window 1210 (e.g., a user interface for a photos application and/or the same as or similar to window 710). While displaying window 1210, device 1200 detects a gesture (and/or activation of a user interface element, such as a displayed cursor activation button) and, in response, displays cursor 1252B at a location that corresponds to (e.g., is the same as or is near) where the user's gaze 1250C is directed (e.g., same cursor location as in FIG. 12A). Because cursor 1252B is indicating (e.g., displayed at) a location that is not within a markup area (e.g., not within window 1212 for the markup application) (and, optionally, because the cursor was initiated via an air gesture), cursor 1252B exhibits a second type of behavior (e.g., behaves as a hand cursor and/or updates in a second manner) when manipulated (e.g., moved and/or interacted with) that is different from the first type of behavior.

Figure 12D:
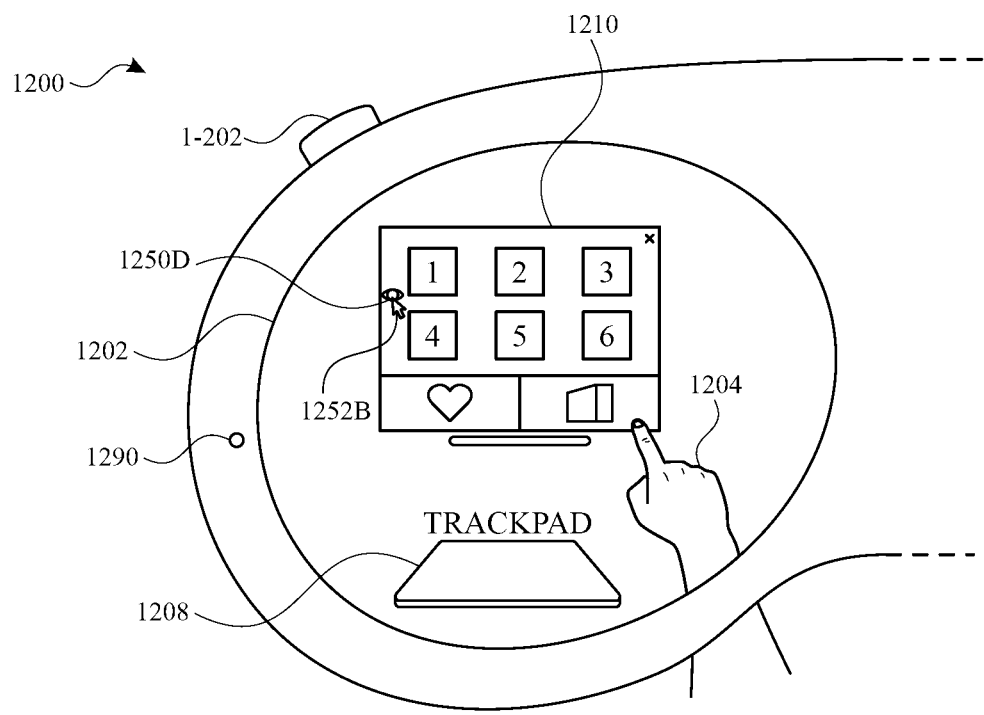

At FIG. 12C, while cursor 1252B is displayed, device 1200 detects that the user's hand 1204 performs air gesture 1254B that includes a pointing hand pose (e.g., towards the location of the cursor) and movement of the first amount to the left. As shown in FIG. 12D, in response to detecting gesture 1254B, device 1200 animates movement of cursor 1252B to a new location within the three-dimensional environment. In some embodiments, the new location of cursor 1252B is based on a magnitude and/or speed of the movement of air gesture 1254B. In some embodiments, cursor 1252B moves based on second acceleration curve 1270C, such as shown in FIG. 12V, that is different from first acceleration curve 1272C. In this example, the user moves their gaze to follow the movement of cursor 1252B, as indicated by gaze 1250D. Although device 1200 has detected the same gesture (e.g., same hand pose, same speed of movement, and/or same distance of movement), device 1200 moves cursor 1252B a different (e.g., further) distance as compared to 1252A because of the different behavior the cursors exhibit. Thus, the same air gesture input at FIGS. 12A and 12C produces different movements of cursors 1252A and 1252B. In some embodiments, device 1200 deactivates (e.g., stops displaying) cursor 1252B in response to detecting a user request (gesture and/or activation of a user interface element, such as the cursor activation button).

Figure 12E:
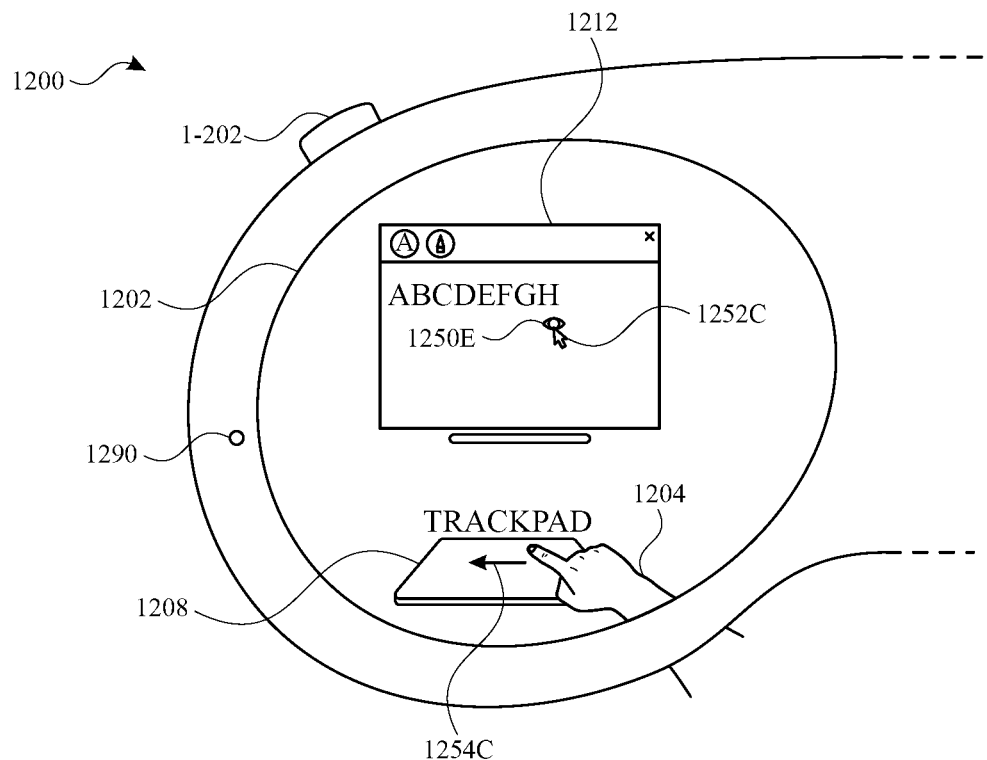

At FIG. 12E, device 1200 detects an input at trackpad 1204 and, in response, displays cursor 1252C at a location that corresponds to (e.g., is the same as or is near) where the user's gaze 1250F is directed (e.g., same location as in FIG. 12A). Because cursor 1252C is activated based on touch input at trackpad 1204, cursor 1252C exhibits a third type of behavior (e.g., behaves as a trackpad cursor and/or updates in a third manner) when manipulated (e.g., moved and/or interacted with) that is different from the first type of behavior and the second type of behavior.

Figure 12F:
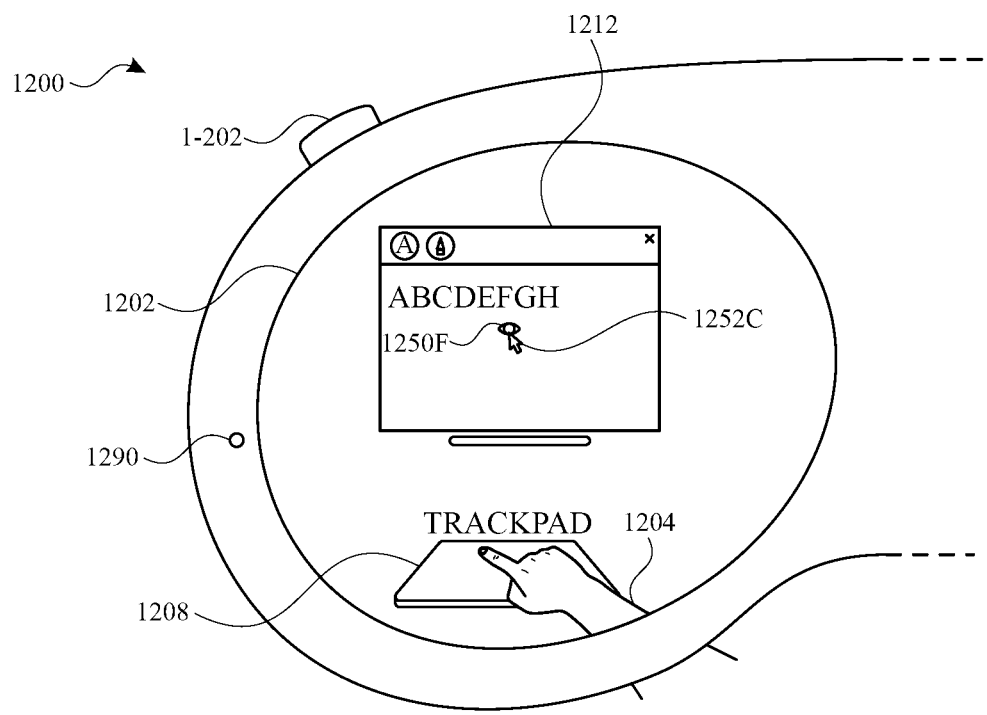

At FIG. 12E, while cursor 1252C is displayed over window 1212 (e.g., a markup area), device 1200 detects that the user's hand 1204 performs gesture 1254C on trackpad 1208 that includes a movement of a touch input by the first amount to the left. As shown in FIG. 12F, in response to detecting gesture 1254C, device 1200 animates movement of cursor 1252C to a new location within the three-dimensional environment. In some embodiments, the new location of cursor 1252C is based on a magnitude and/or speed of the movement of gesture 1254C. In some embodiments, cursor 1252C moves based on a third acceleration curve (e.g., no acceleration or constant acceleration) that is different from first acceleration curve 1272C and second acceleration curve 1270C. In this example, the user moves their gaze to follow the movement of cursor 1252C, as indicated by gaze 1250F. Although device 1200 has detected the same gesture (e.g., same hand pose, same speed of movement, and/or same distance of movement) as compared to gestures 1254A and 1254B, device 1200 moves cursor 1252C a different (e.g., less far) distance as compared to 1252A and 1252B because of the different behavior the cursors exhibit. Thus, the same gesture inputs at FIGS. 12A, 12C, and 12E produce different movements of cursors 1252A, 1252B, and 1252C. In some embodiments, device 1200 deactivates (e.g., stops displaying) cursor 1252C in response to detecting no touch inputs at trackpad 1208 for more than a threshold amount of time (e.g., 2 seconds, 3.5 seconds, or 6 seconds).

Figure 12G:
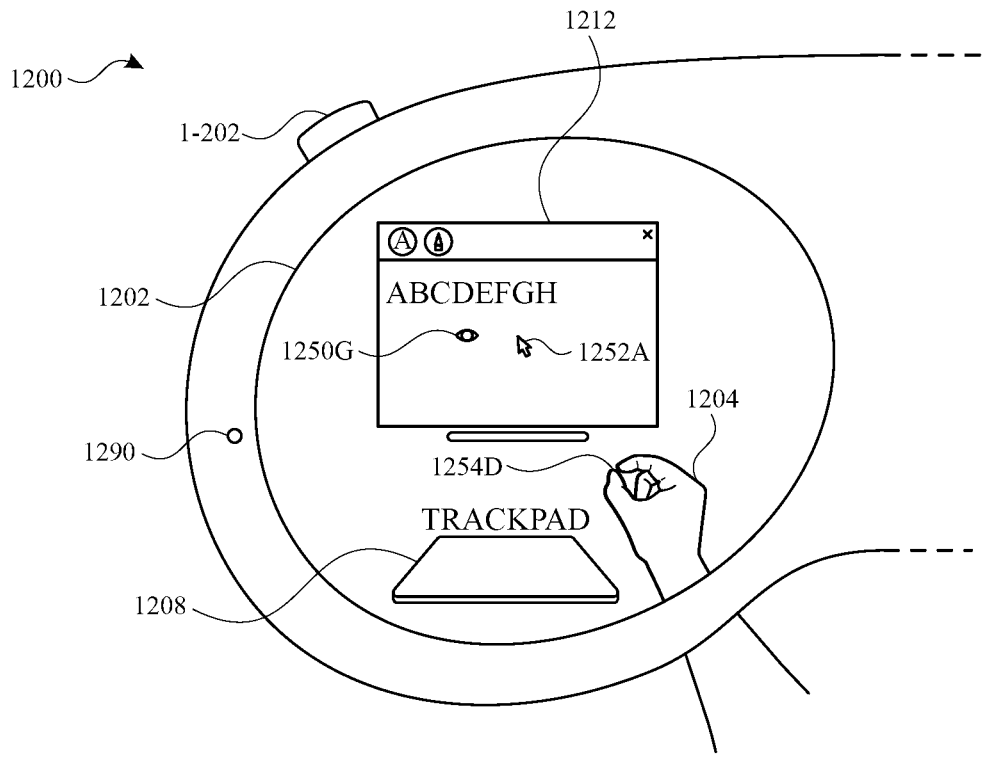

At FIG. 12G, device 1200 is displaying cursor 1252A over window 1212 (e.g., a markup area). Cursor 1252A exhibits the first type of behavior (e.g., behaves as a markup cursor and/or updates in a first manner) when manipulated (e.g., moved and/or interacted with). While device 1200 detects that the user's gaze 1250G is not directed to cursor 1252A, device 1200 detects gesture 1254D (e.g., an air pinch gesture and/or a single tap of a pointing finger and a thumb in the air). At FIG. 12H, in response to detecting gesture 1254D (and, optionally, in accordance with a determination that gaze 1250G is less than a respective first distance from cursor 1252A), device 1200 displays mark 1216A in the markup area of window 1212 (e.g., at the location of cursor 1252A) and does not move cursor 1252A to (or based on) the location of gaze 1250H. In some embodiments, when the user's gaze is less than a respective first distance from cursor 1252A, the air pinch gesture causes a mark without moving the cursor and when the user's gaze is more than the respective first distance from cursor 1252A, the air pinch gesture causes the cursor to move to the location of the user's gaze without causing a mark.

Figure 12H:
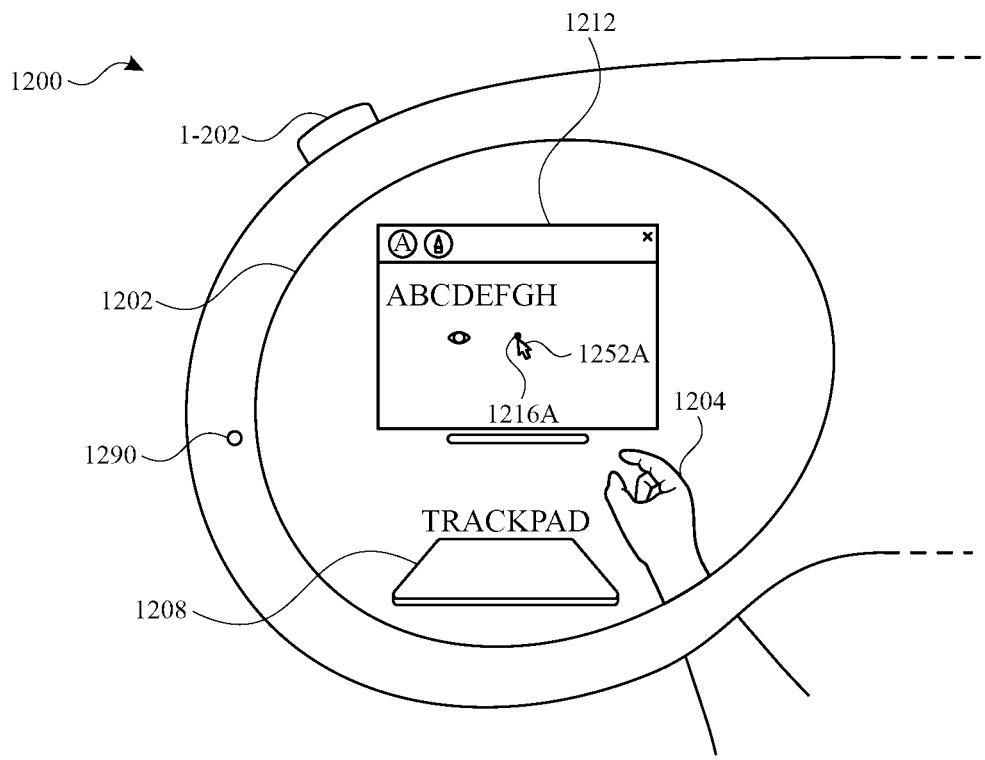
Figure 12I:
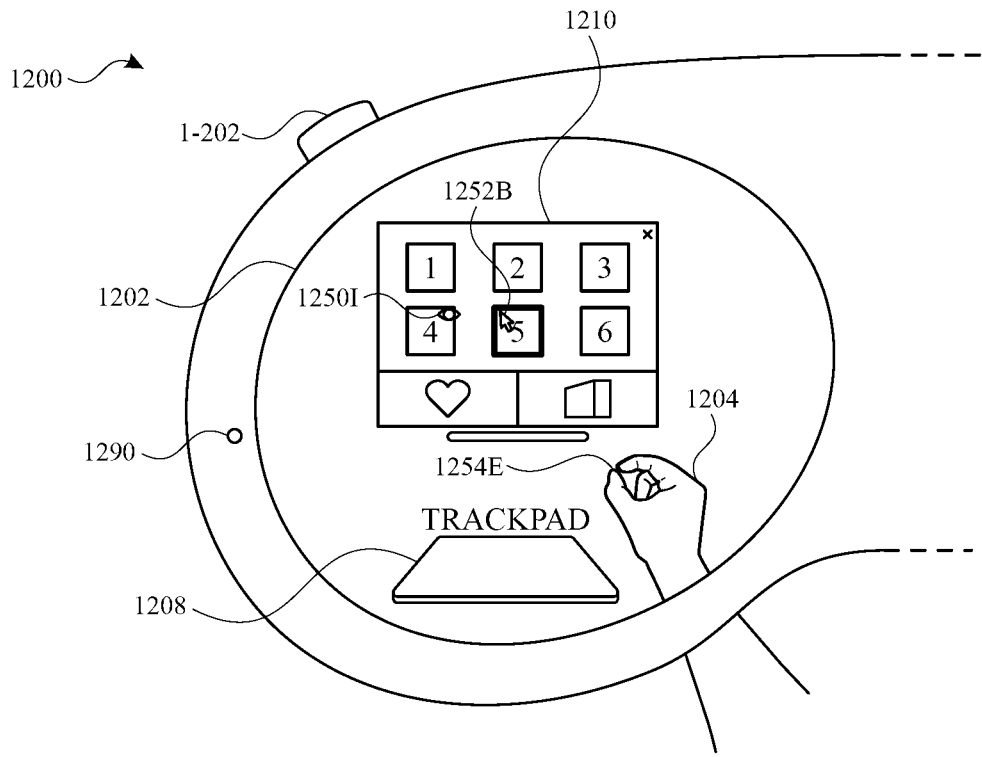
Figure 12J:
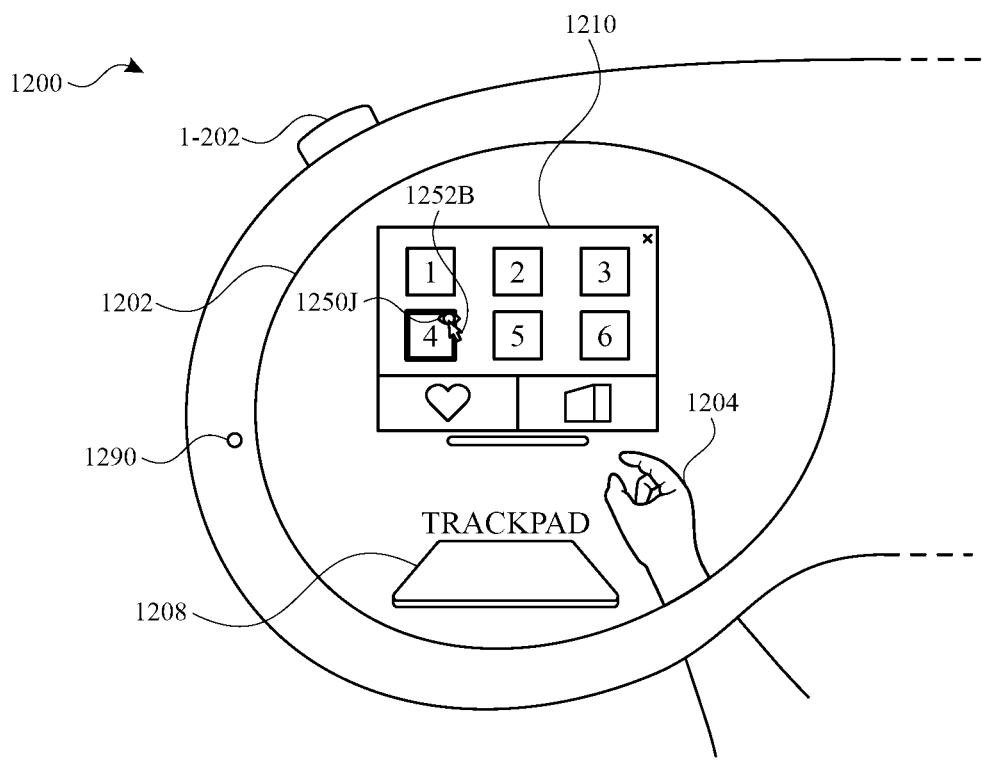
Figure 12K:
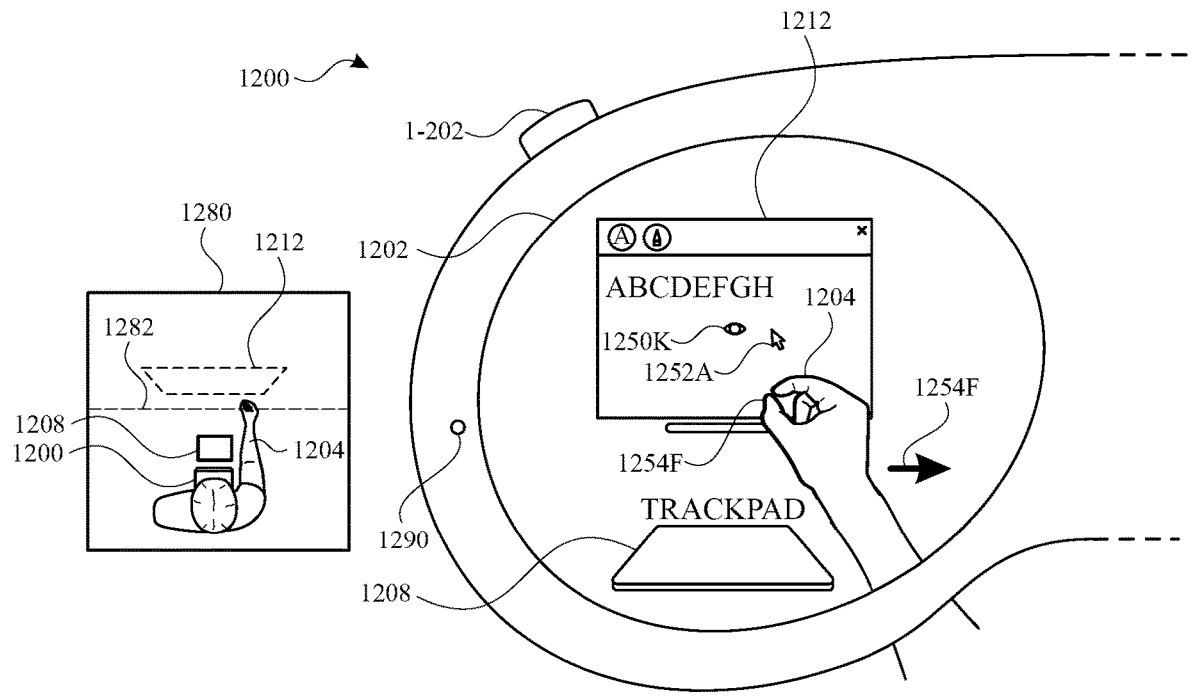

At FIG. 12I, device 1200 is displaying cursor 1252B over window 1210 (e.g., not a markup area). Cursor 1252B exhibits the second type of behavior (e.g., behaves as a hand cursor and/or updates in the second manner) when manipulated (e.g., moved and/or interacted with). While device 1200 detects that the user's gaze 1250I is not directed to cursor 1252B, device 1200 detects gesture 1254E (e.g., an air pinch gesture and/or a single tap of a pointing finger and a thumb in the air). At FIG. 12J, in response to detecting gesture 1254E (and, optionally, in accordance with a determination that gaze 1250I is more than a respective second distance from cursor 1252B), device 1200 moves cursor 1252B to (or based on) the location of gaze 1250I. In some embodiments, when the user's gaze is less than the respective second distance from cursor 1252B, the air pinch gesture does not move the cursor to the location of the user's gaze. In some embodiments, the respective first distance (described with respect to a markup cursor in FIGS. 12G-12H) is different from the respective second distance (e.g., the threshold distances for when an air pinch gesture causes the cursor to move are different for different types of cursors).

Figure 12L:
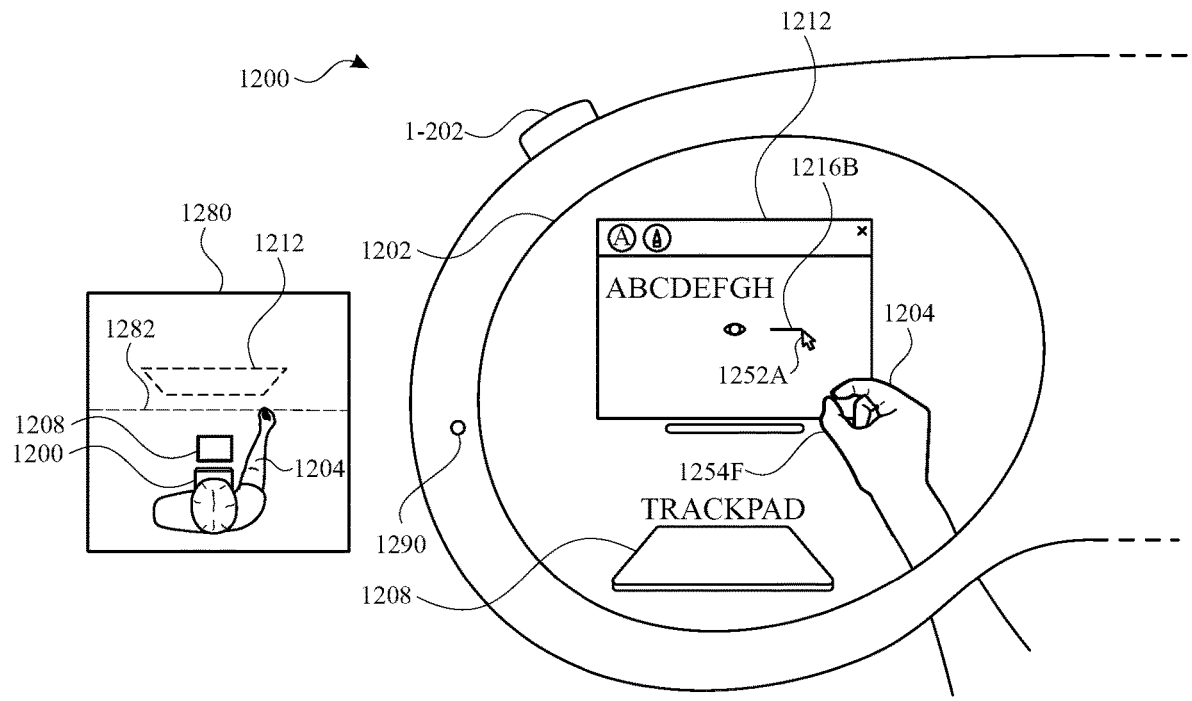

FIGS. 12K-12N illustrate behaviors of cursor 1252A (e.g., a markup cursor) based on distance of hand 1204 to window 1212. In each of FIGS. 12K-12N, top-down view 1280 illustrates the distance relationships between the user's hand 1204 and window 1212 for ease of understanding. At FIG. 12K, device 1200 is displaying cursor 1252A over window 1212 (e.g., a markup area). Cursor 1252A exhibits the first type of behavior (e.g., behaves as a markup cursor and/or updates in the first manner) when manipulated (e.g., moved and/or interacted with). Because the user's hand 1204 is within a threshold distance 1282 of window 1212, cursor 1252A moves based on the movement (e.g., distance, speed, and/or direction) of hand 1204 and does not follow gaze 1250K of the user (e.g., direct hand control), as illustrated by the difference in position between gaze 1250K and cursor 1252A in FIG. 12K. At FIG. 12K, device 1200 detects gesture 1254F (e.g., an air pinch gesture and movement to the right). In response to detecting gesture 1254F, device 1200 starts drawing mark 1216B (e.g., a line and/or an object) that starts at the location of cursor 1252A (and, optionally not the location of gaze 1252A) at FIG. 12K and extends to the right as cursor 1252A moves to the right in conjunction with movement of hand 1204 to the right, as shown in FIG. 12L. In some embodiments, cursor 1252A moves based on first acceleration curve 1272, such as shown in FIG. 12U. Thus, because hand 1204 is within the threshold distance 1282 of window 1212, the starting position of mark 1216B is based on a location of the cursor 1252A (that may be different from the user's gaze 1250K) when gesture 1254F begins and the path/distance of mark 1216B is based on the movement of hand 1204, as shown in FIG. 12L.

Figure 12M:
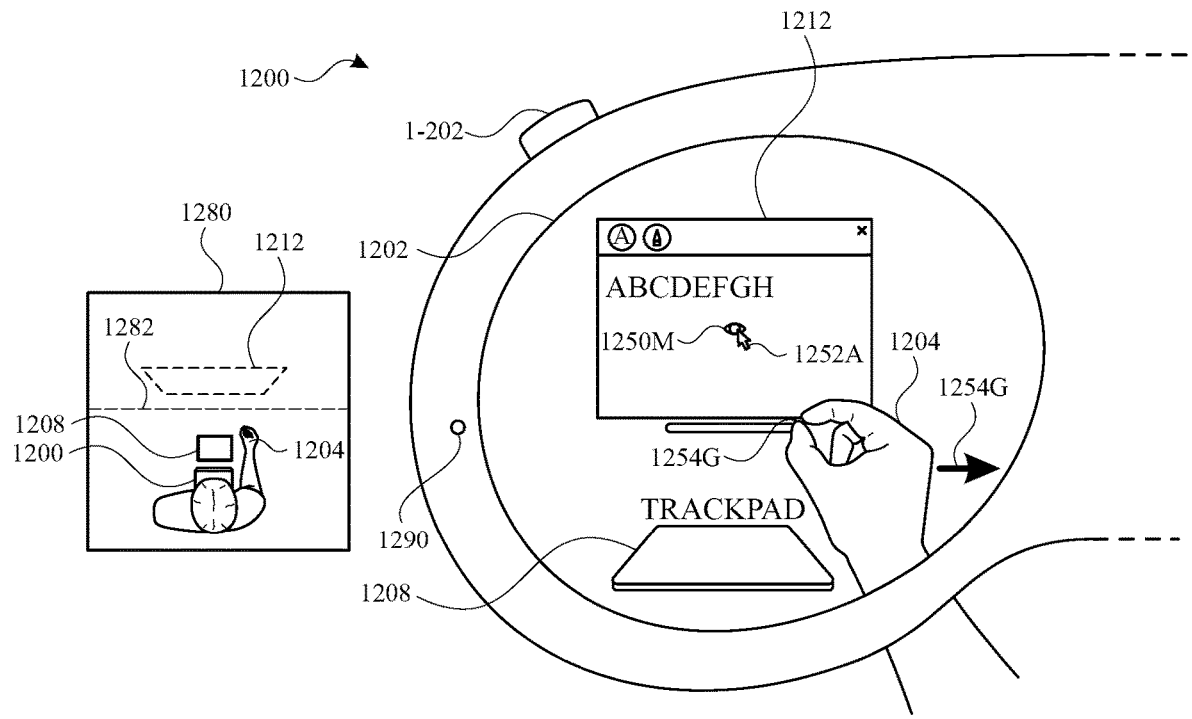
Figure 12N:
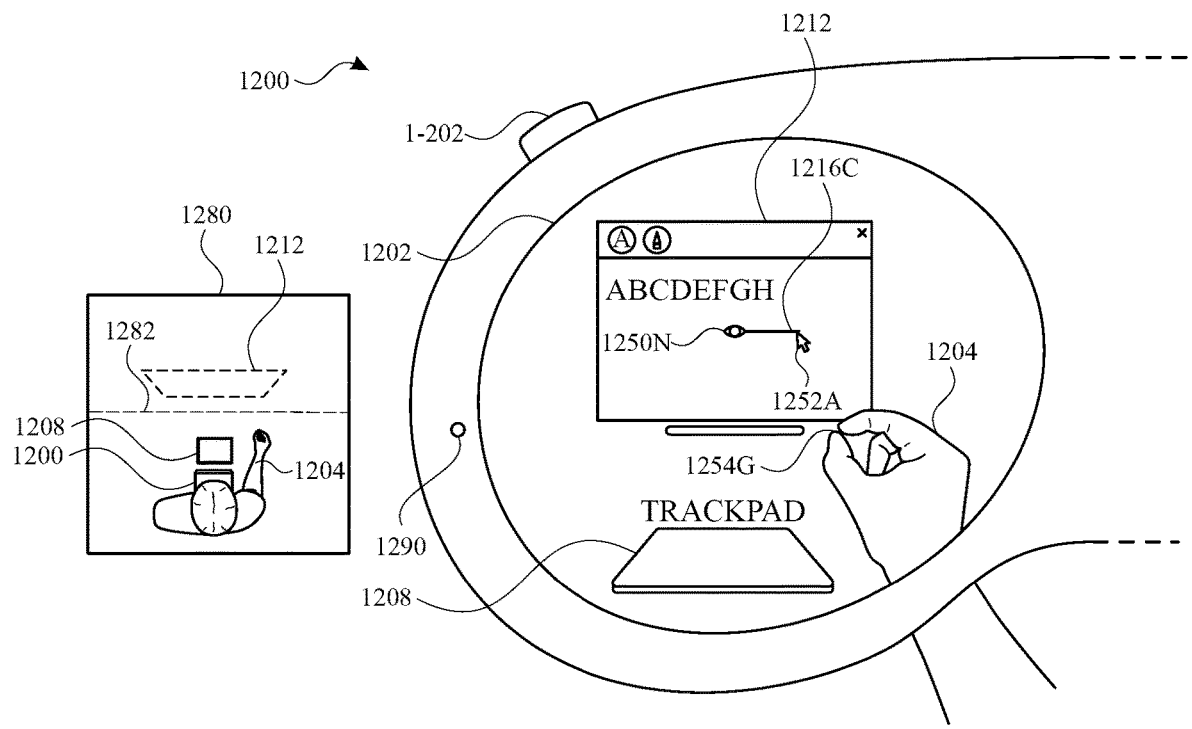
Figure 12O:
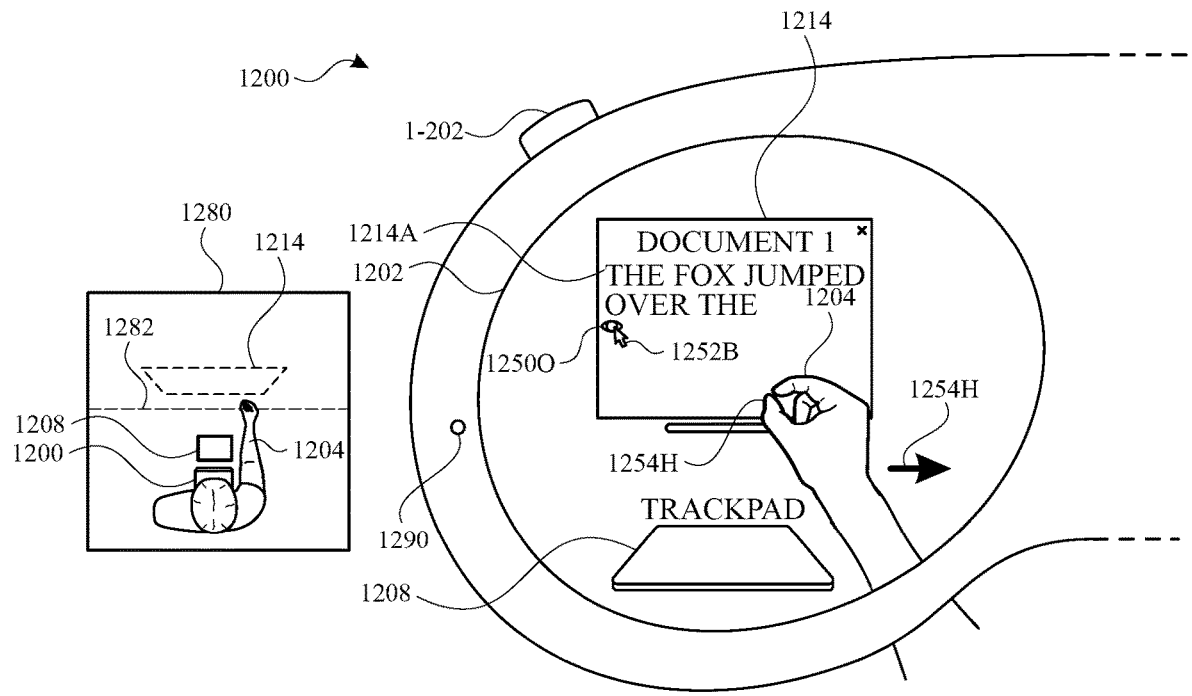

At FIG. 12M, device 1200 is displaying cursor 1252A over window 1212 (e.g., a markup area). Cursor 1252A exhibits the first type of behavior (e.g., behaves as a markup cursor and/or updates in the first manner) when manipulated (e.g., moved and/or interacted with). Because the user's hand 1204 is not within the threshold distance 1282 of window 1212 (as shown in top-down view 1280 of FIG. 12M), cursor 1252A moves based on the user's gaze 1250M and does not follow the movement (e.g., distance, speed, and/or direction) of hand 1204 (e.g., indirect control before detection of air pinch gesture 1254G), as illustrated by gaze 1250M and cursor 1252A having the same position in FIG. 12M. At FIG. 12M, device 1200 detects gesture 1254G (e.g., an air pinch gesture and movement to the right, the same as in FIG. 12K). In response to detecting gesture 1254G, device 1200 starts drawing mark 1216C (e.g., a line and/or an object) that starts at the location of cursor 1252A (and gaze 1250M) at FIG. 12M and extends to the right as cursor 1252A moves to the right in conjunction with movement of hand 1204 to the right, as shown in FIG. 12N. In some embodiments, cursor 1252A moves based on first acceleration curve 1272, such as shown in FIG. 12U. Thus, because hand 1204 is not within the threshold distance 1282 of window 1212, the starting position of mark 1216C is based on a location of the user's gaze (and, therefore, cursor 1252A, which follows the user's gaze) when gesture 1254F begins and the path/distance of mark 1216C is based on the movement of hand 1204, as shown in FIG. 12N. When gestures 1254F and 1254G are the same, the shape and distance of the marks 1216B and 1216C are also the same, though the starting locations of the two marks are different. Accordingly, the distance of hand 1204 from the canvas (e.g., window 1212) determines whether the cursor's position (before starting the mark) is based on the position of hand 1204 or the user's gaze (e.g., 1250M).

Figure 12P:
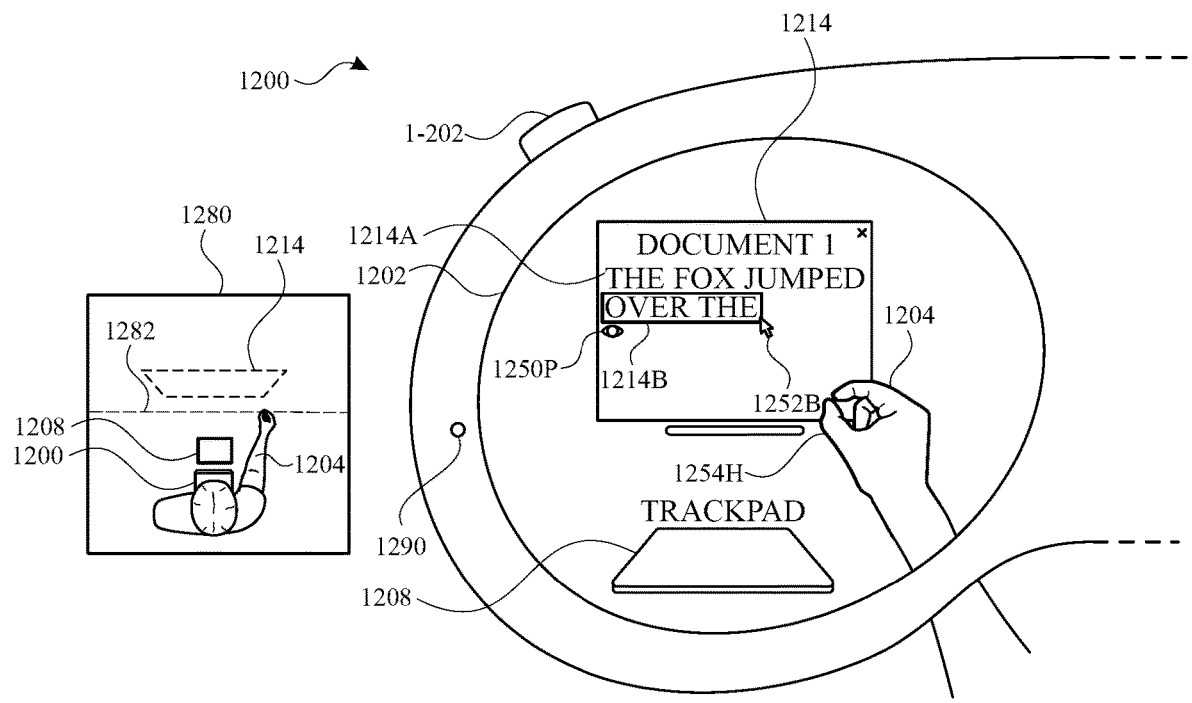

As illustrated in FIGS. 12O-12R, and in contrast to cursor 1252A (e.g., the markup cursor), the behavior of cursor 1252B (e.g., the hand cursor) optionally does not change based on distance of hand 1204 to window 1210. In each of FIGS. 12O-12R, top-down view 1280 illustrates the distance relationships between the user's hand 1204 and window 1210 for ease of understanding. At FIG. 12O, device 1200 is displaying cursor 1252B over window 1214 (e.g., a user interface of a document application (e.g., a web browser) and/or a document that includes selectable text) (e.g., not a markup area). Cursor 1252B exhibits the second type of behavior (e.g., behaves as a hand cursor and/or updates in the second manner) when manipulated (e.g., moved and/or interacted with). Regardless of whether the user's hand 1204 is within the threshold distance 1282 of window 1210, cursor 1252B moves based on the user's gaze 12500 and does not follow the movement (e.g., distance, speed, and/or direction) of hand 1204 (e.g., indirect control), as illustrated by gaze 1250O and cursor 1252B having the same position in FIG. 12O. At FIG. 12O, device 1200 detects gesture 1254H (e.g., an air pinch gesture and movement to the right and/or the same gesture as 1254F and 1254G). In response to detecting gesture 1254H, device 1200 initiates highlighting 1214B (e.g., highlighting of "over the") that starts at the location of gaze 1250O (and, therefore, cursor 1252B because the cursor tracks the user's gaze before highlighting starts) at FIG. 12O and extends to the right as cursor 1252B moves to the right in conjunction with movement of hand 1204 to the right, as shown in FIG. 12P. In some embodiments, cursor 1252B moves based on second acceleration curve 1270C, such as shown in FIG. 12V. Thus, regardless of whether hand 1204 is within the threshold distance 1282 of window 1210, the starting position of highlighting 1214B is based on a location of cursor 1252B that tracks the user's gaze 1250O and the path/distance of highlighting 1214B is based on the movement of hand 1204, as shown in FIG. 12P.

Figure 12Q:
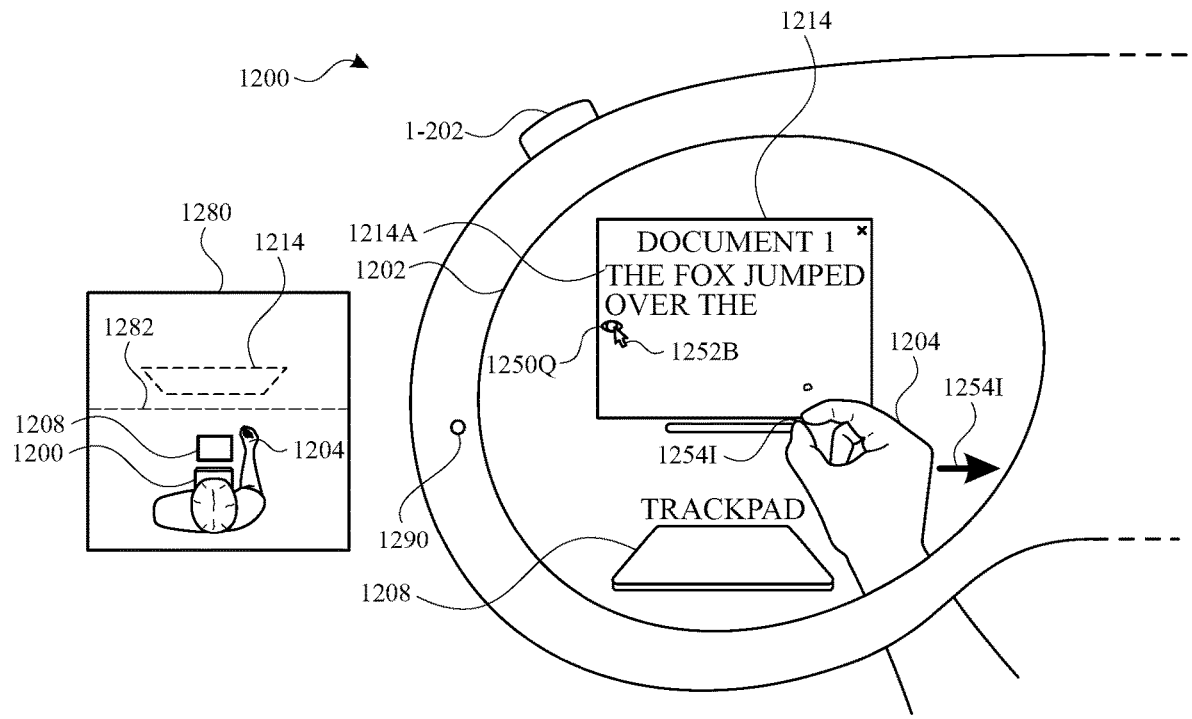
Figure 12R:
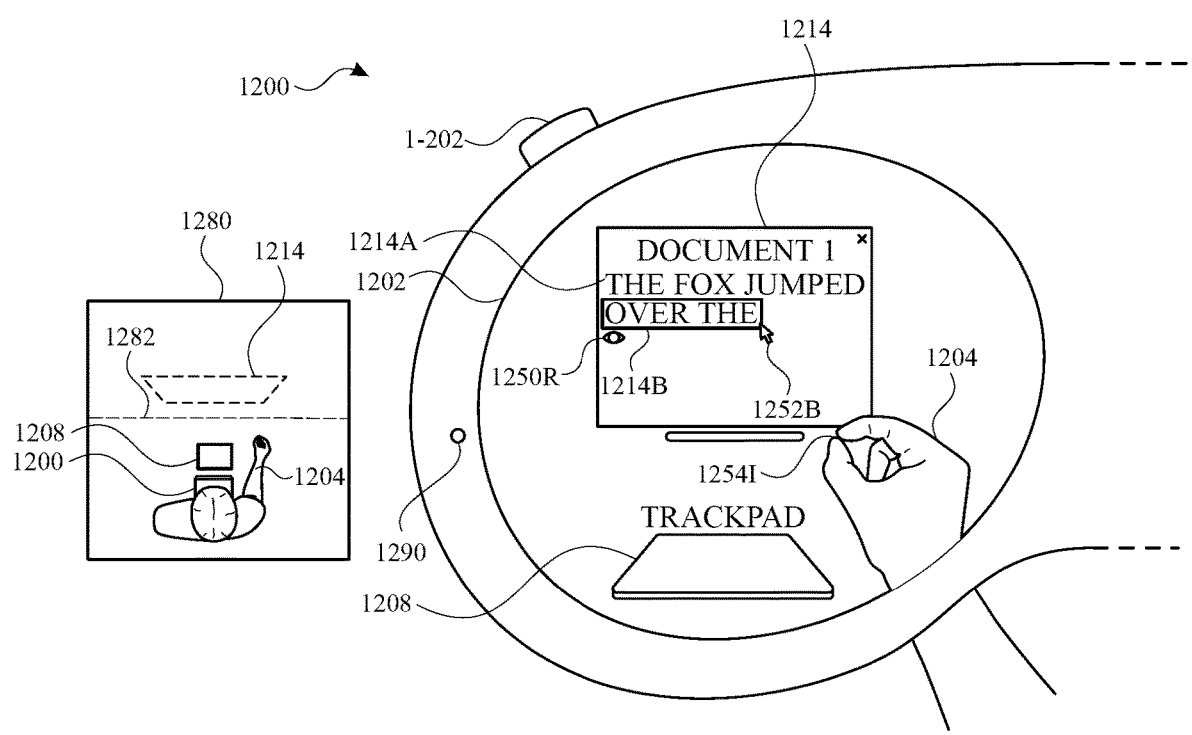

At FIG. 12Q, device 1200 is displaying cursor 1252B over window 1210 (e.g., not a markup area). Cursor 1252B exhibits the second type of behavior (e.g., behaves as a hand cursor and/or updates in the second manner) when manipulated (e.g., moved and/or interacted with). Regardless of whether the user's hand 1204 is within the threshold distance 1282 of window 1210, cursor 1252B moves based on the user's gaze 1250Q and does not follow the movement (e.g., distance, speed, and/or direction) of hand 1204 (e.g., indirect control), as illustrated by gaze 1250Q and cursor 1252B having the same position in FIG. 12Q. At FIG. 12Q, device 1200 detects gesture 1254I (e.g., an air pinch gesture and movement to the right and/or the same gesture as 1254F, 1254G, and 1254H). In response to detecting gesture 1254I, device 1200 starts highlighting 1214B (e.g., highlighting of "over the") that starts at the location of gaze 1250Q (and, therefore, cursor 1252B because the cursor tracks the user's gaze before highlighting starts) at FIG. 12Q and extends to the right as cursor 1252B moves to the right in conjunction with movement of hand 1204 to the right, as shown in FIG. 12R. In some embodiments, cursor 1252B moves based on second acceleration curve 1270C, such as shown in FIG. 12V. Thus, regardless of whether hand 1204 is within the threshold distance 1282 of window 1210, the starting position of highlighting 1214B is based on a location of cursor 1252B that tracks the user's gaze 1250Q and the path/distance of highlighting 1214B is based on the movement of hand 1204, as shown in FIG. 12R.

Figure 12S:
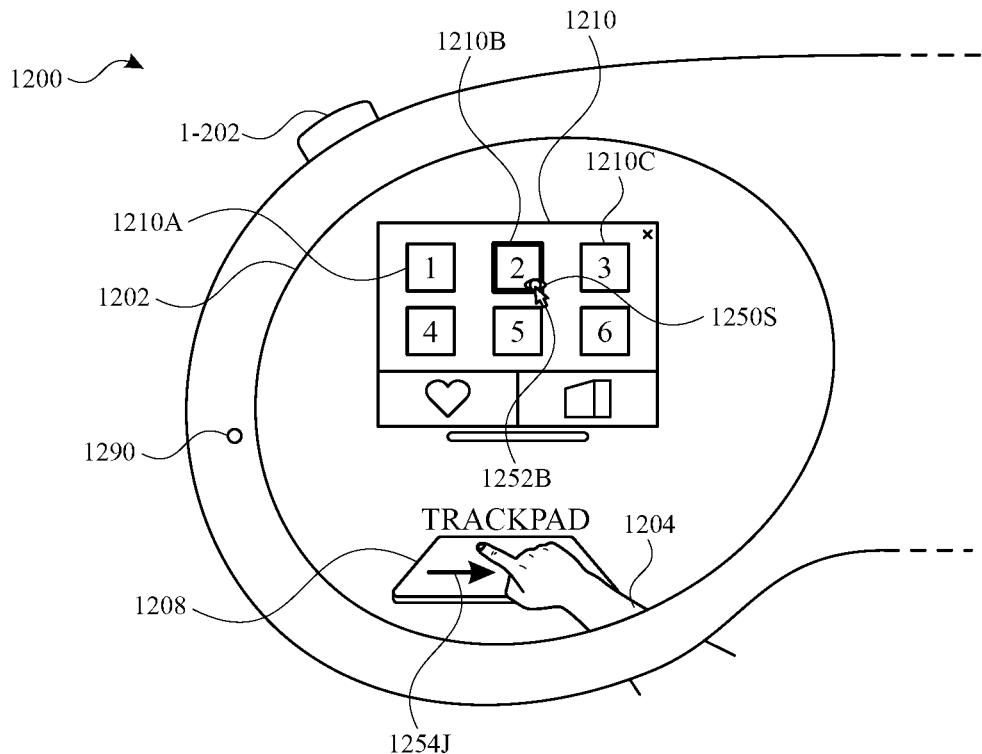
Figure 12T:
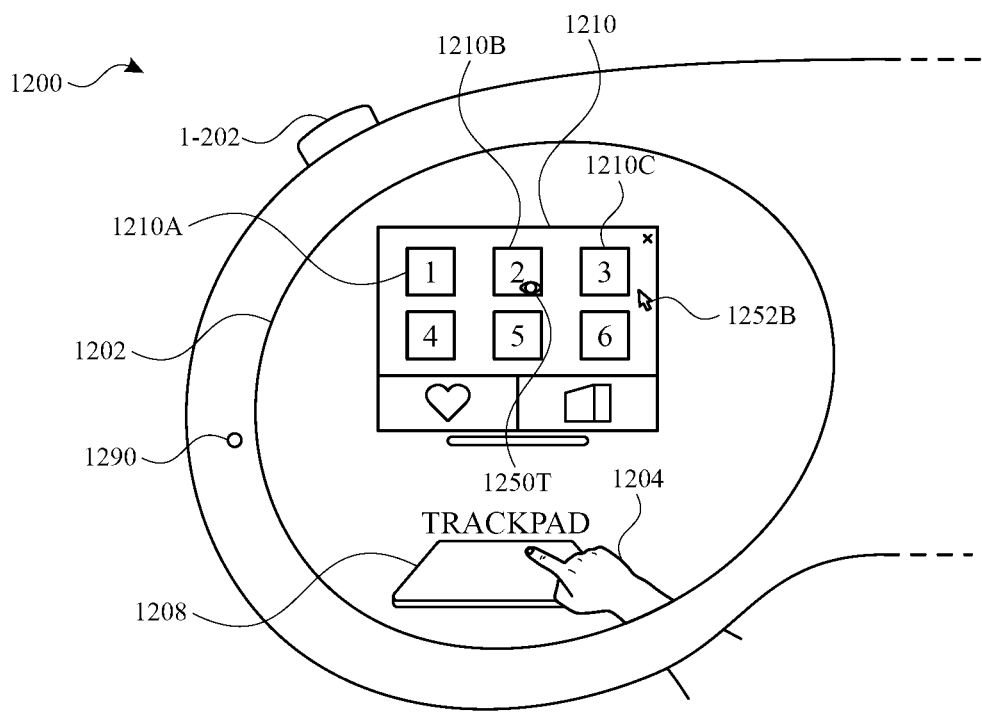
Figure 12U:
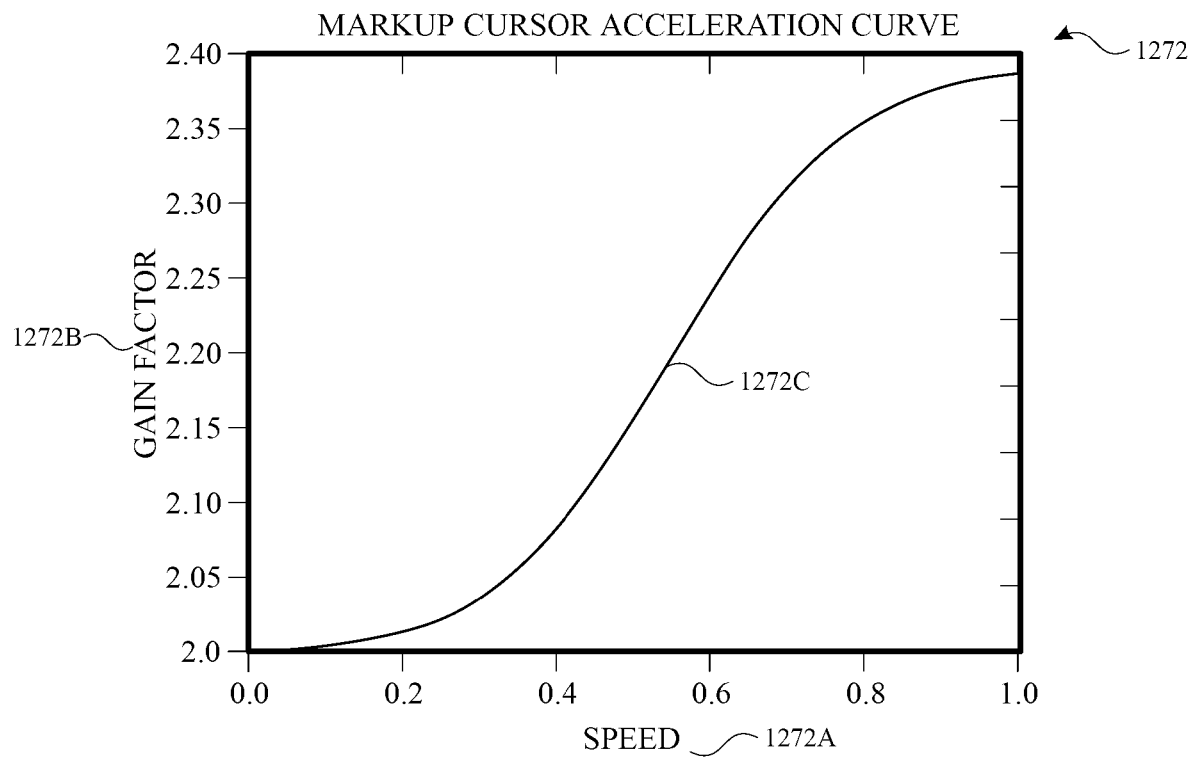
Figure 12V:
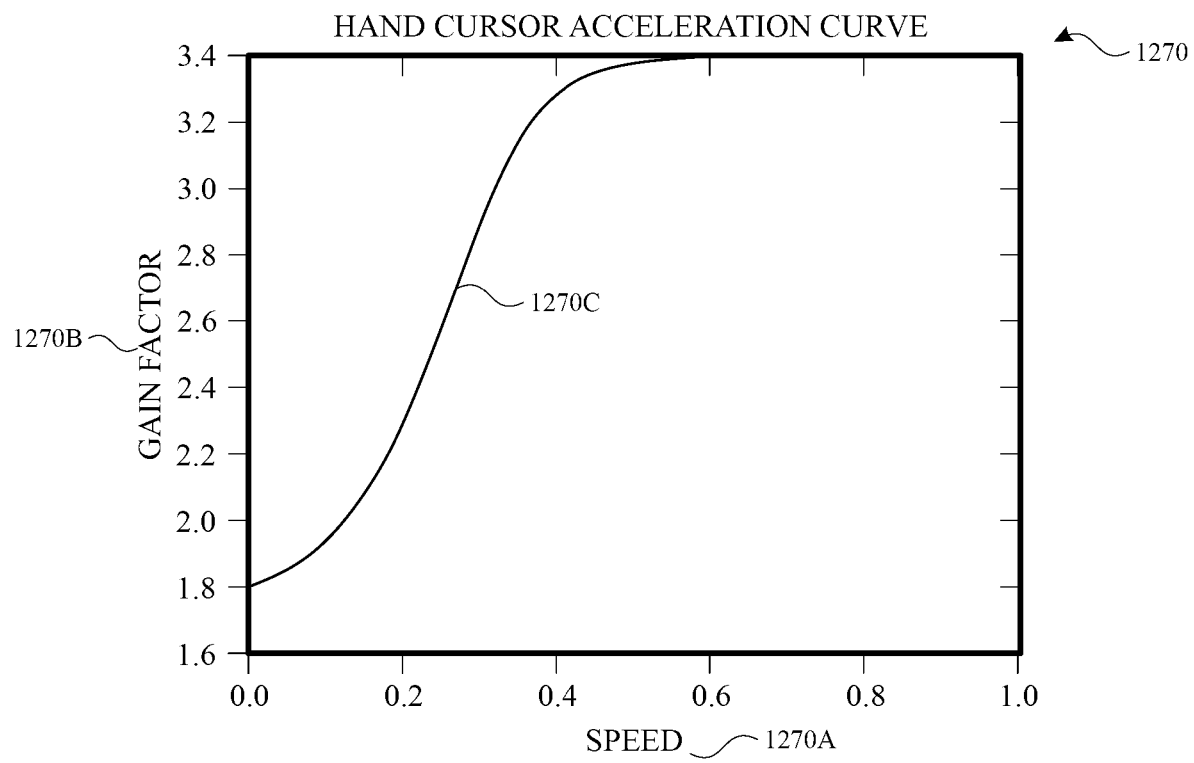

FIGS. 12S-12T illustrate behaviors of cursor 1252C (e.g., a trackpad cursor). At FIG. 12S, device 1200 displays cursor 1252C over window 1210 (e.g., not a markup area). Cursor 1252C exhibits the third type of behavior (e.g., behaves as a trackpad cursor and/or updates in the third manner) when manipulated (e.g., moved and/or interacted with). Cursor 1252C is initially displayed at a location corresponding to the user's gaze 1250S (e.g., when a touch input is detected on trackpad 1208), as shown in FIG. 12S. In some embodiments, cursor 1252C (e.g., a trackpad cursor) is more independent from the user's gaze as compared to cursor 1252A (e.g., a markup cursor) and/or cursor 1252B (e.g., a hand cursor). In some embodiments, cursor 1252C can be further from the user's gaze (as compared to cursor 1252A and/or cursor 1252B) without device 1200 ceasing to display cursor 1252C and/or without device 1200 moving cursor 1252C toward (e.g., to or near) the user's gaze. In some embodiments, cursor 1252C can be away from the user's gaze for longer (as compared to cursor 1252B) without device 1200 ceasing (or before device 1200 ceases) to display cursor 1252C and/or without device 1200 moving (or before device 1200 moves) cursor 1252C toward (e.g., to or near) the user's gaze. In some embodiments, cursor 1252C is independent of the user's gaze after the initial display of cursor 1252C. At FIG. 12S, while displaying cursor 1252C, device 1200 detects gesture 1254J (e.g., a swipe right gesture on trackpad 1208). In response to detecting gesture 1254J, device 1200 starts moving cursor 1252C in the direction of the hand movement (e.g., right) in conjunction with movement of hand 1204 to the right, as shown in FIG. 12T. In some embodiments, cursor 1252C moves based on a third acceleration curve that is different from first acceleration curve 1272C and second acceleration curve 1270C. Thus, although cursor 1252C has moved far from the user's gaze 1250T, as shown in FIG. 12T, device 1200 continues to display cursor 1252C (e.g., until a touch is no longer detected at trackpad 1208 for more than a threshold amount of time (e.g., 0 seconds, 0.5 seconds, 1 second, 2 seconds, or 5 seconds)).

FIG. 12U illustrates an exemplary acceleration curve 1272C as part of graph 1272. In some embodiments, device 1100 uses acceleration curve 1272C to determine the speed and/or amount of movement of a cursor (e.g., cursor 1252A) that exhibits the first type of behavior (e.g., behaves as a markup cursor and/or updates in the first manner) when manipulated (e.g., moved and/or interacted with). Graph 1272 indicates that different gain factors 1272B are used for different speeds 1272A of input (e.g., hand movement).

FIG. 12V illustrates an exemplary acceleration curve 1270C as part of graph 1270. In some embodiments, device 1100 uses acceleration curve 1270C to determine the speed and/or amount of movement of a cursor (e.g., cursor 1252B) that exhibits the second type of behavior (e.g., behaves as a hand cursor and/or updates in the second manner) when manipulated (e.g., moved and/or interacted with). Graph 1270 indicates that different gain factors 1270B are used for different speeds 1270A of input (e.g., hand movement).

In some embodiments, the different cursors are prioritized. In some embodiments, the trackpad cursor (and, optionally, its behavior) is prioritized over the markup cursor (and, optionally, its behavior) and the hand cursor (and, optionally, its behavior), and the markup cursor (and its behavior) is prioritized over the hand cursor (and, optionally, its behavior). For example, when trackpad input is being provided, the cursor exhibits the third type of behavior (e.g., behaves as a trackpad cursor and/or updates in a third manner, such as cursor 1252C). In some embodiments, once trackpad input has ended, the cursor transitions to the markup cursor or the hand cursor based on whether the cursor is on (and/or the user's gaze is directed to) a markup area. For another example, while the markup cursor or the hand cursor is active, device 1100 detects a touch input on the trackpad and, in response, switches to the trackpad cursor (and, optionally, its behavior).

FIG. 13 is a flow diagram of methods of updating different cursors (e.g., cursors 1252A, 1252B, and/or 1252C) in different manners, in some embodiments. In some embodiments, method 1300 is performed at a computer system (e.g., computer system 101 in FIG. 1A, device 1100, device 700, and/or device X700) (e.g., a smartphone, a desktop computer, a laptop, a tablet, a wearable device (e.g., a smart watch or a wearable fitness tracker), a head-mounted device, and/or a projection-based system) that is in communication with one or more input devices (e.g., 1208, 1290, 708, 790, and/or X704) (e.g., a camera, a gyroscope, an accelerometer, a mouse, a trackpad, and/or a physiological sensor (e.g., a blood pressure sensor and/or a heart rate sensor)) and a display generation component (e.g., 1202, 706, and/or X702) (e.g., a head-mounted display system, a display (e.g., a touch-sensitive display), and/or a projector). In some embodiments, the one or more input devices (e.g., 1208, 1290, 708, 790, and/or X704) are integrated into the computer system. In some embodiments, the one or more input devices (e.g., 1208, 1290, 708, 790, and/or X704) are integrated into one or more external devices (e.g., a wearable device) that are in communication with the computer system (e.g., device 1200).

In some embodiments, method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

While displaying (1302) a cursor (e.g., an indicator) (e.g., 1252A-1252C) that indicates a current location for user interaction (e.g., with a user interface) in an environment (e.g., a two-dimensional or three-dimensional environment) (e.g., the cursor moves (e.g., based on user input) around in relation to the user interface and/or the environment and/or selects (e.g., based on user input) objects of the user interface and/or the environment), the computer system (e.g., 1200) detects (1304), via the one or more input devices (e.g., 1208 and/or 1290), an occurrence of an event that includes user input (e.g., 1254A-1254J) that includes hand movement (e.g., an air gesture and/or movement on a touch-sensitive surface such as a trackpad or touchscreen).

While displaying (1302) the cursor (e.g., an indicator) (e.g., 1252A-1252C) that indicates a current location for user interaction (e.g., with a user interface) in an environment and in response (1306) to detecting occurrence of the event: in accordance with a determination that the cursor (e.g., 1252A-1252C) is a first type of cursor (e.g., 1252A) that responds to hand movement (e.g., 1254A and/or 1254D), the computer system (e.g., 1100) updates (1308), via the display generation component (e.g., 1202), the cursor (e.g., 1252A) in a first manner based on the user input (e.g., without updating the cursor in a second manner) (e.g., as shown in FIGS. 12B and/or 12H) and in accordance with (1310) a determination that the cursor is a second type of cursor (e.g., 1252B or 1252C) that is different from the first type of cursor (e.g., 1252A), wherein the second type of cursor responds to hand movement, the computer system forgoes updating (1312), via the display generation component, the cursor in the first manner (e.g., as in FIGS. 12D and/or 12F). Updating a cursor in a first manner when the cursor is of a first type and not updating the cursor in the first manner when the cursor is not of the first type provides the user with feedback about the type of the cursor and enables the user to control different cursors differently.

In some embodiments, while displaying (1302) the cursor (e.g., an indicator) that indicates the current location for user interaction (e.g., with a user interface) in the environment and in response (1306) to detecting occurrence of the event: in accordance with (1310) the determination that the cursor is the second type of cursor (e.g., 1252B or 1252C), the computer system (e.g., 1200) updates (1314), via the display generation component (e.g., 1202), the cursor (e.g., 1252B or 1252C) in a second manner based on the user input (e.g., as shown in FIGS. 12D and/or 12F), wherein the second manner is different from the first manner. Updating the cursor in a second manner that is different from the first manner provides the user with feedback about the type of the cursor and enables the user to control different cursors differently.

In some embodiments, the first type of cursor (e.g., 1252A) is a cursor (e.g., a markup cursor) (e.g., that moves based on air gestures) that is configured to add a mark (e.g., 1216A and/or 1216B) to a user interface element (e.g., is configured to draw a dot, line, and/or other mark on a document, image, and/or other user interface element) and the second type of cursor (e.g., 1252B) is a cursor (e.g., a hand cursor) (e.g., that moves based on air gestures) that is not configured to add a mark to a user interface element (e.g., is not configured to draw a dot, line, and/or other mark on a document, image, and/or other user interface element). Updating the cursor differently based on whether it is a markup cursor or a hand cursor provides the user with feedback about the type of the cursor and enables the user to control different cursors differently.

In some embodiments, updating, via the display generation component (e.g., 1202), the cursor (e.g., 1252A) in the first manner (e.g., a cursor that is configured to add a mark to a user interface element such as a markup cursor) based on the user input includes: in accordance with a determination that a set of direct input criteria is met (e.g., the markup cursor should be moved based on direct input) (e.g., as in FIG. 12K-12L), including a gaze criterion that is met when a gaze (e.g., 1250K) of a user of the computer system (e.g., 1200) is directed to within a threshold range (e.g., within 2 degrees, within 3 degrees, and/or within 5 degrees) of a location of the cursor (e.g., 1252A at FIG. 12K), moving the cursor (e.g., 1252A at FIGS. 12K-12L) based on a direction and/or magnitude of the hand movement (e.g., gesture 1254F) (and, optionally, without basing a direction of the movement of the cursor on the location of the gaze). In some embodiments, when a gaze of the user is directed to near (within the threshold range of) a location of the cursor, the computer system moves the cursor without directional bias that is based on the location of the gaze. In some embodiments, when the user is looking at the cursor (e.g., within the threshold range), the cursor moves in a direction that is based on the hand movement of the user and not in a direction that is based on where the user is gazing. In some embodiments, updating, via the display generation component (e.g., 1202), the cursor in the first manner (e.g., a cursor that is configured to add a mark to a user interface element such as a markup cursor) based on the user input includes: in accordance with a determination that the set of direct input criteria is not met (e.g., as in FIGS. 12M-12N) (e.g., the markup cursor should be moved based on indirect input), moving the cursor (e.g., 1252A in FIGS. 12M-12N) in a direction that is based on (e.g., towards or away from) a location of the gaze (e.g., 1252A at FIG. 12M). In some embodiments, updating, via the display generation component (e.g., 1202), the cursor (e.g., 1252A) in the first manner (e.g., a cursor that is configured to add a mark to a user interface element such as a markup cursor) based on the user input includes: in accordance with a determination that the set of direct input criteria is not met (e.g., the markup cursor should be moved based on indirect input) (e.g., as in FIGS. 12M-12N), a starting position of the cursor is based on a location of the gaze (e.g., 1250M) and the cursor moves based on (e.g., in a direction and/or an amount) of the hand movement (e.g., 1254G). In some embodiments, when a gaze of the user is not directed to near (within the threshold range of) the location of cursor, the computer system moves the cursor with directional bias towards the location of the gaze. In some embodiments, when the user is not looking at the cursor (e.g., not within the threshold range), the cursor moves in a direction (and, optionally with a magnitude) that is based on the location of the gaze (and, optionally, that is not based on the direction of the movement of the first hand). In some embodiments, updating, via the display generation component (e.g., 1202), the cursor (e.g., 1252B as in FIGS. 12O-12R) in the second manner (e.g., a cursor that is not configured to add a mark to a user interface element such as a hand cursor) based on the user input includes moving the cursor in a direction that is based on (e.g., towards or away from) the location of the gaze (e.g., the hand cursor should be moved based on indirect input). In some embodiments, updating, via the display generation component (e.g., 1202), the cursor (e.g., 1252B as in FIGS. 12O-12R) in the second manner (e.g., a cursor that is not configured to add a mark to a user interface element such as a hand cursor) based on the user input includes moving the cursor from a starting position that is based on gaze (e.g., 1250O) and in a direction that is based on the hand movement (e.g., 1254H). In some embodiments, updating the cursor in the second manner includes moving the cursor with directional bias towards the location of the user's gaze (e.g., independent of whether the user is looking at the cursor (e.g., within the threshold range) or not). In some embodiments, updating, via the display generation component (e.g., 1202), the cursor in the second manner (e.g., a cursor that is not configured to add a mark to a user interface element such as a hand cursor) based on the user input includes moving the cursor in a direction that is based on the hand movement (and, optionally, the starting location of the cursor is based on the user's gaze). Controlling the movement of the cursor differently based on whether the cursor is the first type of cursor or the second type of cursor provides the user with feedback about the type of cursor and also enables the user to control the movement of the cursor more appropriately for the context in which the cursor is displayed.

In some embodiments, the set of direct input criteria includes (e.g., for a direct pinch input): a pinch criterion that is met when (e.g., the computer system detects) a hand (e.g., with the hand movement) is performing an air pinch gesture (e.g., as in FIG. 12K-12L) (also referred to as a pinch air gesture) (e.g., concurrently with the hand movement) and a pinch location criterion that is met when (e.g., the computer system detects) the air pinch gesture is located (e.g., the location of two fingers coming together to form the pinch) within a threshold distance (e.g., within 1 cm, 3 cm, 5 cm, or 40 cm) (e.g., 1282) of a markup area (e.g., 1212) (e.g., the area in which a mark is to be made). Directly controlling the cursor when the user performs a pinch input near content allows the computer to provide the user with precise control of the cursor while the user navigates the content, thereby improving the man-machine interface.

In some embodiments, the set of direct input criteria includes (e.g., for a direct pointing input): an extended finger criterion that is met when (e.g., the computer system detects) a hand (e.g., with the hand movement) includes an extended finger (e.g., as in FIGS. 12K-12L if the pinch were instead an extended finger) (e.g., a particular finger being extended (e.g., a pointing finger or a middle finger) or any finger of a hand being extended (without adjacent finger(s) being extended), and/or concurrently with the hand movement) and a finger location criterion that is met when (e.g., the computer system detects) the extended finger (e.g., of the hand with the hand movement) is located within a threshold distance (e.g., 1282) (e.g., within 1 cm, 3 cm, 5 cm, or 40 cm) of a markup area (e.g., 1212) (e.g., the area in which a mark is to be made). Directly controlling the cursor when the user performs an input with a finger extended (e.g., near content) allows the computer to provide the user with precise control of the cursor while the user navigates the content, thereby improving the man-machine interface.

In some embodiments, the first type of cursor (e.g., 1252A) is a cursor (e.g., a markup cursor) (e.g., that moves based on air gestures) that is configured to add a mark (e.g., 1216A and/or 1216B) to a user interface element (e.g., 1212) (e.g., is configured to draw a dot, line, and/or other mark on a document, image, and/or other user interface element) and the second type of cursor is a cursor (e.g., as in FIGS. 12S-12T) (e.g., a trackpad cursor) (e.g., that moves based on input at a touch-sensitive surface and/or does not move based on air gestures) that selects (e.g., highlights and/or places focus on) user interface elements (e.g., 1210A-1210C) (e.g., and is not configured to draw a dot, line, and/or other mark on a document, image, and/or other user interface element). Updating the cursor differently based on whether it is a markup cursor or a trackpad cursor provides the user with feedback about the type of the cursor and enables the user to control different cursors differently.

In some embodiments, the first type of cursor is a cursor (e.g., 1252A) (e.g., a markup cursor) that moves based on an air gesture (e.g., 1254A) (e.g., using a direct pinch input, a direct point input, and/or an indirect pinch input) (and optionally does not move based on touch input at a touch-sensitive surface) and the second type of cursor is a cursor (e.g., 1252C) (e.g., trackpad cursor) that moves based on touch input (e.g., 1254C) at a touch-sensitive surface (e.g., of the computer system) (and optionally does not move based on an air gesture). Controlling different cursors with different types of input enables the computer system to differentiate between the input to control the appropriate cursor, thereby improving the man-machine interface.

In some embodiments, detecting the occurrence of the event includes detecting a hand gesture (e.g., 1254A, 1254B, and/or 1254C) (e.g., of the hand that performs the hand movement) (e.g., an air gesture, such as an air pinch gesture or an air pinch-and-hold gesture). In some embodiments, the occurrence of the event is detected when the computer system detects a first hand gesture and the occurrence of the event is not detected when the computer system does not detect the first hand gesture (e.g., instead detects a second hand gesture that is different from the first hand gesture). Using a hand gesture to control the cursor enables the computer system to update the cursor based on the gestures, thereby providing the user with precise control of the cursor while reducing the number of inputs required to control the cursor.

In some embodiments, detecting the hand gesture includes detecting hand movement (e.g., as in 1254A-1254C) (e.g., of the hand that performs the hand movement) (e.g., performing an air gesture, such as an air pinch gesture). In some embodiments, the occurrence of the event is detected when the computer system detects a first hand movement and the occurrence of the event is not detected when the computer system does not detect the first hand movement (e.g., instead detects a second hand movement that is different from the first hand movement). Using a hand movement to control the cursor enables the computer system to update the cursor based on the movement, thereby providing the user with precise control of the cursor while reducing the number of inputs required to control the cursor.

In some embodiments, detecting hand movement includes detecting less than a threshold amount of hand movement (e.g., as in 1254A-1254C) for at least a threshold amount of time (e.g., hand movement has stopped, is below 0.01 m/s, is below 0.05 m/s, and/or is below 0.5 m/s) (e.g., for a threshold amount of time (e.g., 0.01 seconds, 1 second, or 2 seconds)). In some embodiments, the occurrence of the event is detected when the computer system detects movement below the threshold amount (optionally, in conjunction with the first hand gesture) and the occurrence of the event is not detected when the computer system does not detect movement below the threshold amount (e.g., instead detects movement above the threshold amount). Using reduced (or stopped) hand movement to control the cursor enables the computer system to update the cursor based on the reduced (or stopped) hand movement, thereby providing the user with precise control of the cursor while reducing the number of inputs required to control the cursor.

In some embodiments, detecting the hand gesture includes detecting a hand pose (e.g., as in 1254A-1254B) (e.g., posed with tips of two fingers (e.g., thumb and index finger) touching each other) (e.g., and failing to detect the hand gesture when the hand is not in the hand pose). Using a hand pose to control the cursor enables the computer system to update the cursor based on the hand pose, thereby providing the user with precise control of the cursor while reducing the number of inputs required to control the cursor.

In some embodiments, updating the cursor (e.g., a markup cursor) in the first manner based on the user input includes: in accordance with a determination that the hand pose is a first hand pose (e.g., if 1254A was a pre-pinch gesture instead of an extending index finger/pointing gesture) (e.g., a pre-pinch gesture where two fingers (e.g., thumb and index finger) are close together (e.g., within a threshold distance) but not touching (and thus not a pinch gesture)), moving, via the display generation component (e.g., 1202), the cursor (e.g., 1252A) a first distance. In some embodiments, moving the cursor includes moving the cursor from a first location in an environment to a second location, different from the first location, in the environment. In some embodiments, updating the cursor (e.g., a markup cursor) in the first manner based on the user input includes: in accordance with a determination that the hand pose is a second hand pose (e.g., 1254A) (e.g., an index finger extended without other fingers being extended) that is different from the first hand pose, moving, via the display generation component (e.g., 1202), the cursor (e.g., 1252A) a second distance that is different from the first distance. In some embodiments, moving the cursor includes moving the cursor from a first location in an environment to a second location, different from the first location, in the environment. In some embodiments, updating the cursor (e.g., a markup cursor) in the second manner based on the user input includes: in accordance with a determination that the hand pose is a third hand pose (e.g., a pre-pinch gesture where two fingers (e.g., thumb and index finger) are close together (e.g., within a threshold distance) but not touching (and thus not a pinch gesture)), moving, via the display generation component, the cursor a third distance. In some embodiments, moving the cursor includes moving the cursor from a first location in an environment to a second location, different from the first location, in the environment. In some embodiments, updating the cursor (e.g., a markup cursor) in the second manner based on the user input includes: in accordance with a determination that the hand pose is a fourth hand pose (e.g., an index finger extended without other fingers being extended) that is different from the third hand pose, moving, via the display generation component, the cursor a fourth distance that is different from the third distance. In some embodiments, moving the cursor includes moving the cursor from a first location in an environment to a second location, different from the first location, in the environment. Updating the cursor differently based on the pose of the hand controlling the cursor provides the user with feedback about the detected pose of the hand and allows the user to control the cursor with different degrees of precision (e.g., slow movement that is precise vs. fast movement that is less precise), thereby improving the man-machine interface.

In some embodiments, detecting the hand gesture (e.g., 1254A-1254B) includes detecting a hand position (e.g., a location in 2D or 3D space and/or orientation of the hand). For example, the hand gesture is not detected when a particular hand position is not detected. Using a hand position to control the cursor enables the computer system to update the cursor based on the hand position, thereby providing the user with precise control of the cursor while reducing the number of inputs required to control the cursor.

In some embodiments, detecting the occurrence of the event includes detecting a location and/or direction of attention (e.g., 1250A-1250D) of a user of the computer system (e.g., 1200). In some embodiments, the occurrence of the event is detected when the computer system detects both the hand movement and that the location and/or direction of attention meets an attention criterion (e.g., attention is directed to the computer system, to the cursor, and/or to the markup area). In some embodiments, the occurrence of the event is not detected unless both the hand movement is detected and the attention criterion is met. Using user attention to control the cursor enables the computer system to update the cursor based on the user attention, thereby providing the user with precise control of the cursor while reducing the number of inputs required to control the cursor.

In some embodiments, updating the cursor (e.g., 1252A) in the first manner based on the user input includes updating the cursor (e.g., an appearance of the cursor and/or a location of the cursor) to indicate that the cursor has been activated (e.g., the cursor has changed from being inactive to active). In some embodiments, the cursor has a first visual appearance (e.g., a first size and/or a first color) while the cursor is inactive and the cursor has a second visual appearance (e.g., a second size that is different from (e.g., larger than) the first size and/or a second color that is different from the first color) when the cursor is active. In some embodiments, the user input is received while the cursor is inactive. In some embodiments, detecting the user input includes detecting a touch on a touch-sensitive surface (e.g., a trackpad and/or a touchscreen), detecting activation of a user interface affordance (e.g., via touch input, via mouse input, via gaze input, and/or via air gesture), detecting a specific gesture (e.g., touch gesture and/or air gesture), detecting a gaze input (e.g., directed to the cursor and/or a specific object or location) (e.g., in conjunction with a hand gesture), and/or detecting a specific hand gesture (e.g., an air pinch gesture and/or an air pinch-and-hold gesture) (e.g., in conjunction with a gaze input). Indicating that a cursor has been activated provides visual feedback to the user to indicate that the cursor has been activated, thereby providing improved visual feedback.

In some embodiments, updating the cursor (e.g., 1252A) in the first manner based on the user input includes updating the cursor (e.g., an appearance of the cursor and/or a location of the cursor) to indicate that the cursor has been deactivated (e.g., the cursor has changed from being active to being inactive). In some embodiments, updating the cursor to indicate the cursor has been deactivated includes ceasing to display the cursor. In some embodiments, the cursor has a first visual appearance (e.g., a first size and/or a first color) while the cursor is inactive and the cursor has a second visual appearance (e.g., a second size that is different from (e.g., larger than) the first size and/or a second color that is different from the first color) when the cursor is active. Indicating that a cursor has been deactivated provides visual feedback to the user to indicate that the cursor has been deactivated, thereby providing improved visual feedback.

In some embodiments, detecting the occurrence of the event includes: detecting, via the one or more input devices (e.g., 1290 and/or 1208), input for deactivating the cursor (e.g., 1252A-1252C), including: detecting, via the one or more input devices (e.g., 1290 and/or 1208), a manual deactivation request of the cursor (e.g., that manipulates (e.g., activates) a button and/or that includes a gesture (e.g., a touch gesture and/or an air gesture)) and/or detecting, via the one or more input devices (e.g., 1290 and/or 1208), an automatic deactivation request of the cursor (e.g., that includes detecting that a hand of the user (e.g., the hand that is currently in control of the cursor) is outside of a threshold area (e.g., an area of a field of view of a camera and/or outside of a designated area) for a (e.g., non-zero) threshold duration of time (e.g., 1 second, 5 seconds, or 15 seconds)). Manually or automatically deactivating the cursor enables the computer system to deactivate (e.g., cease to display) the cursor in different ways, thereby providing the user with additional controls.

In some embodiments, updating the cursor (e.g., a markup cursor) in the first manner based on the user input includes moving control of the cursor (e.g., movement of the cursor and/or selection of objects using the cursor) from a first hand of a user of the computer system (e.g., where movement of the first hand (and not the second hand) controls movement of the cursor) to a second hand (e.g., the hand that performed the hand movement) (e.g., where movement of the second hand (and not the first hand) controls movement of the cursor), different from the first hand, of the user (e.g., as in FIG. 12G-12H if the pinch gesture had been performed by the user's left hand). In some embodiments, the hand movement of the user input includes an air pinch gesture (e.g., using thumb and index finger and/or using thumb and middle finger) and/or an air double pinch gesture (e.g., using thumb and index finger and/or using thumb and middle finger). Updating the cursor based on the hand controlling the cursor changing from one hand to another provides the user with feedback that control of the cursor has moved from one hand to the other, thereby providing improved feedback.

In some embodiments, updating the cursor (e.g., a markup cursor) (e.g., 1252B) in a second manner based on the user input includes performing an object manipulation operation (e.g., moving a user interface object, scrolling a user interface object, and/or selecting a user interface object) (e.g., activating any of 1210A-1210C) using the cursor (e.g., as shown in FIG. 12C-12D) without moving control of the cursor from one hand to another hand. Using the same hand gesture for different operations based on the currently displayed cursor enables the computer system to provide additional functionality with a reduced set of types of inputs, thereby improving the man-machine interface.

In some embodiments, updating the cursor (e.g., 1252A) (e.g., a markup cursor) in the first manner based on the user input includes moving, via the display generation component (e.g., 1202), the cursor (e.g., as shown in FIGS. 12A-12B). In some embodiments, moving the cursor includes moving the cursor from a first location in an environment to a second location, different from the first location, in the environment. In some embodiments, updating the cursor in the second manner based on the user input includes moving, via the display generation component, the cursor in a manner that is different from the first manner. Updating the location of the cursor enables the user to control the cursor and provides the user with visual feedback that the input has been received.

In some embodiments, updating the cursor (e.g., 1252A) (e.g., a markup cursor) in the first manner based on the user input includes moving the cursor in a first area (e.g., within a markup area, such as a document or a canvas) (e.g., as shown in FIGS. 12A-12B). In some embodiments, updating (e.g., in accordance with the determination that the cursor is the second type of cursor), via the display generation component (e.g., 1202), the cursor (e.g., 1252B) in a second manner, different from the first manner, includes moving, via the display generation component (e.g., 1202), the cursor in a second area (e.g., from one selectable object to another selectable object) that is different from the first area (e.g., as shown in FIG. 12C-12D). In some embodiments, the first area is different from the second area based on one or more of: size, shape, limited to different boundaries (e.g., a boundary of a user interface window and/or a drawing region). The cursor moving in different areas based on the type of cursor provides the user with visual feedback about the type of cursor and that the input has been received, thereby providing improved visual feedback.

In some embodiments, the event includes a selection input (e.g., an air pinch gesture). In some embodiments, updating, via the display generation component (e.g., 1202), the cursor (e.g., a markup cursor) in the first manner based on the user input includes: in accordance with a determination that a gaze of a user of the computer system is directed to a location outside of a first threshold distance from (e.g., within 2 degrees, within 3 degrees, and/or within 5 degrees) a current location of the cursor, moving the cursor to a location corresponding to a location of the gaze (e.g., as in FIG. 12I-12J). In some embodiments, when a gaze of the user is not directed to near (within the first threshold distance of) the location of cursor, the computer system moves the cursor with directional bias towards the location of the gaze. In some embodiments, when the user is not looking at the cursor (e.g., not within the first threshold distance), the cursor moves in a direction (and, optionally with a magnitude) that is based on the location of the gaze (and, optionally, that is not based on the direction of the movement of the first hand). In some embodiments, when the first input is a movement input, the computer system moves the cursor based on a magnitude and/or direction of movement of the hand of the user (and, optionally, not based on the location of the gaze of the user). In some embodiments, updating, via the display generation component (e.g., 1202), the cursor (e.g., a markup cursor) in the first manner based on the user input includes: in accordance with a determination that a gaze (e.g., 1250G) of a user of the computer system (e.g., 1200) is directed to a location within the first threshold distance from (e.g., within 2 degrees, within 3 degrees, and/or within 5 degrees) a current location of the cursor (e.g., 1252A at FIG. 12G), forgoing moving the cursor (e.g., 1252A as in FIG. 12H) to a location corresponding to a location of the gaze (e.g., as in FIGS. 12G-12H) (and, optionally, performing an operation corresponding to the selection input at a location corresponding to the cursor such as switching hands, making a mark, starting to make a mark, or selecting an object). In some embodiments, updating (e.g., in accordance with the determination that the cursor is the second type of cursor), via the display generation component (e.g., 1202), the cursor (e.g., 1252B at FIGS. 12I-12J) (e.g., a hand cursor or trackpad) in a second manner based on the user input includes: in accordance with a determination that a gaze (e.g., 1250I) of a user of the computer system is directed to a location outside of a second threshold distance from (e.g., within 1 degrees, within 2 degrees, and/or within 4 degrees) a current location of the cursor (e.g., 1252B at FIG. 12I), moving the cursor (e.g., 1252B as in FIG. 12J) to a location corresponding to a location of the gaze (e.g., 1250J in FIG. 12J), wherein the second threshold distance is different from (e.g., greater than or less than) the first threshold distance. In some embodiments, when a gaze of the user is not directed to near (within the second threshold distance of) the location of cursor, the computer system moves the cursor with directional bias towards the location of the gaze. In some embodiments, when the user is not looking at the cursor (e.g., not within the second threshold distance), the cursor moves in a direction (and, optionally with a magnitude) that is based on the location of the gaze (and, optionally, that is not based on the direction of the movement of the first hand). In some embodiments, when the input is a movement input, the computer system moves the cursor based on a magnitude and/or direction of movement of the hand of the user (and, optionally, not based on the location of the gaze of the user). In some embodiments, updating (e.g., in accordance with the determination that the cursor is the second type of cursor), via the display generation component (e.g., 1202), the cursor (e.g., a hand cursor or trackpad) in a second manner based on the user input includes: in accordance with a determination that a gaze of a user of the computer system is directed to a location within the second threshold distance from (e.g., within 1 degrees, within 2 degrees, and/or within 4 degrees) a current location of the cursor, forgoing moving the cursor to a location corresponding to a location of the gaze (and, optionally, performing an operation corresponding to the selection input at a location corresponding to the cursor such as switching hands, starting a drag operation, starting a scroll operation, or selecting an object). In some embodiments, where the first threshold distance is greater than the second threshold distance, if the gaze is directed to a location that is between the first threshold distance and the second threshold distance and in accordance with a determination that the cursor is the first type of cursor, the cursor is moved to a location corresponding to a location of the gaze, while in accordance with a determination that the cursor is the second type of cursor, the cursor is not moved to a location corresponding to a location of the gaze. In some embodiments, where the second threshold distance is greater than the first threshold distance, if the gaze is directed to a location that is between the second threshold distance and the first threshold distance and in accordance with a determination that the cursor is the second type of cursor, the cursor is moved to a location corresponding to a location of the gaze, while in accordance with a determination that the cursor is the first type of cursor, the cursor is not moved to a location corresponding to a location of the gaze. The cursor moving differently based on the type of cursor provides the user with visual feedback about the type of cursor and that the input has been received, thereby providing improved visual feedback. Using different gaze criteria for different cursor types allows the user to have different amount of control for different types of cursors, thereby improving the man-machine interface.

In some embodiments, updating the cursor (e.g., a markup cursor) in the first manner based on the user input includes moving, via the display generation component (e.g., 1202), the cursor (e.g., 1252A) to a first location (e.g., as in FIG. 12B). In some embodiments, updating (e.g., in accordance with the determination that the cursor is the second type of cursor), via the display generation component (e.g., 1202), the cursor in a second manner, different from the first manner, based on the user input includes moving, via the display generation component (e.g., 1202), the cursor (e.g., 1252B) to a second location (e.g., as in FIG. 12D) that is different from the first location. In some embodiments, for the same input and the same starting position (e.g., on the display and/or in the user interface), the cursor ends up at different locations based on whether the cursor is of the first type of cursor or the second type of cursor. In some embodiments (for the same hand movement), the cursor being updated in the first manner is moved to a different location as compared to the cursor being updated in the second manner because the cursor is moved using different algorithms to translate the hand movement of the input to movements of the cursor (e.g., different acceleration curves, different friction, and/or different scaling factors). Moving the cursor to different locations based on the type of cursor provides the user with visual feedback about the cursor type that is displayed and enables the user to move different cursors different amounts based on the cursory type, thereby providing an improved man-machine interface.

In some embodiments, updating the cursor (e.g., 1252A) (e.g., a markup cursor) in the first manner based on the user input includes moving, via the display generation component (e.g., 1202), the cursor based on gaze input that is damped using a first amount of gaze damping (e.g., suppressing rapid movements of a first threshold of the user's gaze). In some embodiments, updating the cursor (e.g., 1252B) (e.g., a markup cursor) in a second manner based on the user input includes moving, via the display generation component (e.g., 1202), the cursor based on gaze input that is damped using a second amount of gaze damping (e.g., suppressing rapid movements of a first threshold of the user's gaze) that is different from the first amount of gaze damping. In some embodiments, the computer system applies different amounts and/or algorithms for gaze damping based on the type of cursor. In some embodiments, the gaze damping is used to suppress rapid movements of the user's gaze. In some embodiments, the more quickly the cursor responds to (e.g., moves based on) changes in the user's gaze location (e.g., faster response with less damping), the less stable the location of the cursor is (e.g., more stable with more damping) (e.g., cursor is affected by even minor eye movements). Applying different amounts and/or types of gaze damping to gaze input for the different types of cursors provides the user with feedback about the cursor currently being used and provides the user with different levels of response and/or cursor stability based on the cursor, thereby providing an improved man-machine interface.

In some embodiments, updating the cursor (e.g., 1252A) (e.g., a markup cursor) in the first manner based on the user input includes moving the cursor to a first location using a first amount of magnetism to a location and/or direction of a gaze of a user of the computer system and updating (e.g., in accordance with the determination that the cursor is the second type of cursor), via the display generation component (e.g., 1202), the cursor (e.g., 1252B) in a second manner, different from the first manner, includes moving, via the display generation component (e.g., 1202), the cursor to a second location, different from the first location, using a second amount of magnetism (e.g., no magnetism), different from (e.g., less magnetism or more magnetism) the first amount of magnetism, to the location and/or direction of the gaze of the user of the computer system. In some embodiments, for the same hand motion input, the same starting position (e.g., on the display and/or in the user interface), and the same gaze location and/or direction, the cursor moves to different locations based on whether the cursor is of the first type of cursor or the second type of cursor because the cursor is moved to locations based on the gaze with varying degrees (based on first type or second type of cursor). Moving the cursor to different locations using different amounts of magnetism of a location and/or direction of a gaze provides the user with visual feedback about the type of cursor that is displayed, thereby providing improved visual feedback.

In some embodiments, updating the cursor (e.g., 1252A) (e.g., a markup cursor) in the first manner based on the user input includes moving the cursor with first speed characteristics (e.g., a first set of velocity multipliers for portions of the path traversed, a first acceleration curve (e.g., 1272C in FIG. 12U) (e.g., with first slopes and/or first inflection points)) (e.g., to the first location). In some embodiments, updating (e.g., in accordance with the determination that the cursor is the second type of cursor), via the display generation component (e.g., 1202), the cursor in a second manner, different from the first manner, includes moving, via the display generation component (e.g., 1202), the cursor with second speed characteristics that are different from the first speed characteristics (e.g., a second set of velocity multipliers (e.g., different from the first set) for portions of the path traversed, a second acceleration curve (e.g., 1270C in FIG. 12V) (e.g., different from the first acceleration curve, with second slopes (e.g., different from first slopes), and/or second inflection points (e.g., different from first inflection points))) (e.g., to the first location and/or to a second location, different from the first location). Moving the cursor using different speed characteristics (e.g., curves) based on the cursor that is displayed provides the user with visual feedback about the type of cursor and allows the user to move the cursor with varying speeds, thereby providing an improved man-machine interface.

In some embodiments, updating the cursor (e.g., 1252A) (e.g., a markup cursor) in the first manner based on the user input by moving, via the display generation component (e.g., 1202), the cursor includes moving the cursor with a first warping characteristic (e.g., warping, such that the cursor moves from the starting location (e.g., at a first UI element) to the ending location (e.g., at a second UI element) without displaying the cursor in at least a portion (or any portion) of the path between two locations or not warping, such that the cursor is displaying along the full path as it moves from the starting location to the ending location). In some embodiments, updating (e.g., in accordance with the determination that the cursor is the second type of cursor), via the display generation component (e.g., 1202), the cursor (e.g., 1252B) in a second manner, different from the first manner, includes moving, via the display generation component (e.g., 1202), the cursor with a second warping characteristic that is different from the first warping characteristic (e.g., not warping, such that the cursor is displaying along the full path as it moves from the starting location (e.g., at the first UI element) to the ending location at the second UI element or warping, such that the cursor moves from the starting location to the ending location without displaying the cursor in at least a portion (or any portion) of the path between two locations). In some embodiments, the first warping characteristic includes animating movement of the continuously moving cursor such that the cursor jumps from one location to another location as it moves (e.g., the cursors jumps over a gap between two different user interface objects, such as when moving between a window and a tool bar of the window, moving between a window and a navigation bar of the window, moving between a search bar and a web browser user interface, and/or moving between two user interface windows for different applications). Moving the cursor with different warping characteristics based on the type of cursor provides the user with visual feedback about the type of the cursor and allows the user to either quickly navigate between set points (e.g., between UI elements) or precisely move the cursor to a desired location, thereby providing an improved man-machine interface.

In some embodiments, updating the cursor (e.g., 1252A) (e.g., a markup cursor) in the first manner based on the user input by moving, via the display generation component (e.g., 1202), the cursor includes moving the cursor with a first teleportation characteristic (e.g., such that the cursor (e.g., that is stationary at the starting location and/or does not have a speed/velocity) ceases to be displayed at the starting location (e.g., at a first UI element) and the cursor is displayed at the ending location (e.g., at a second UI element) (e.g., the cursor is stationary at the ending location and/or does not have a speed/velocity)). In some embodiments, updating (e.g., in accordance with the determination that the cursor is the second type of cursor), via the display generation component (e.g., 1202), the cursor (e.g., 1252B) in a second manner, different from the first manner, includes moving, via the display generation component (e.g., 1202), the cursor with a second teleportation characteristic that is different from the first teleportation characteristic (e.g., not teleporting, such that the cursor is displaying moving along a path with a speed). Moving the cursor with different teleportation characteristics based on the type of cursor provides the user with visual feedback about the type of the cursor and allows the user to either quickly navigate between set points (e.g., between UI elements) or precisely move the cursor to a desired location, thereby providing an improved man-machine interface.

In some embodiments, in accordance with a determination that the user input that includes hand movement is not detected via a touch-sensitive surface (e.g., is not detected via trackpad 1208) (e.g., the user input is an air gesture and/or is detected via one or more cameras) and that the cursor is not over a drawing canvas (e.g., window 1212), updating the cursor (e.g., 1252B) in the first manner based on the user input includes updating the cursor based on the hand movement and without adding a mark (e.g., without drawing a dot, a line, and/or shape) to a user interface element (e.g., the cursor is a hand cursor and optionally exhibits one or more of the other behaviors described herein with respect to the hand cursor). In some embodiments, in accordance with a determination that the user input that includes hand movement is detected via a touch-sensitive surface (e.g., a trackpad and/or a touchscreen), the cursor (e.g., 1252C) updates in a second manner based on the user input (e.g., the cursor is a trackpad cursor and optionally exhibits one or more of the other behaviors described herein with respect to the trackpad cursor), wherein the second manner is different from the first manner. The cursor behavior being different when the cursor is controlled with a touch-sensitive surface as compared to with air gestures provides the user with feedback about how the cursor is being controlled and allows the user to control the cursor differently based on which input device is used, thereby providing an improved man-machine interface.

In some embodiments, in accordance with a determination that the user input that includes hand movement is not detected via a touch-sensitive surface (e.g., the user input is an air gesture and/or is detected via one or more cameras) and that the cursor (e.g., 1252A) is over a drawing canvas (e.g., 1212), the computer system (e.g., 1200) updates the cursor in the first manner based on the user input (e.g., 1254A) includes updating the cursor based on the hand movement, including adding a mark (e.g., 1216A and/or 1216B) (e.g., drawing a dot, a line, and/or shape) to the drawing canvas (e.g., the cursor is a markup cursor and optionally exhibits one or more of the other behaviors described herein with respect to the markup cursor) and in accordance with a determination that the user input (e.g., 1254C) that includes hand movement is detected via a touch-sensitive surface (e.g., 1208) (e.g., a trackpad and/or a touchscreen), the cursor (e.g., 1254C) updates in a second manner (e.g., as in FIGS. 12E-12F) based on the user input (e.g., the cursor is a trackpad cursor and optionally exhibits one or more of the other behaviors described herein with respect to the trackpad cursor), wherein the second manner is different from the first manner. In some embodiments, the second manner includes adding a mark to the drawing canvas when the cursor is over the drawing canvas and not adding a mark to a drawing canvas when the cursor is not over a drawing canvas. The cursor behavior being different when the cursor is controlled with a touch-sensitive surface as compared to with air gestures provides the user with feedback about how the cursor is being controlled and allows the user to control the cursor differently based on which input device is used, thereby providing an improved man-machine interface.

In some embodiments, in accordance with a determination that the user input (e.g., 1254A) that includes hand movement is not detected via a touch-sensitive surface (e.g., the user input is an air gesture and/or is detected via one or more cameras) and that the cursor (e.g., 1254A) is over a drawing canvas (e.g., 1212), updating the cursor in the first manner based on the user input includes updating the cursor based on the hand movement, including adding a mark (e.g., 1216A and/or 1216B) (e.g., drawing a dot, a line, and/or shape) to the drawing canvas (e.g., 1212) (e.g., the cursor is a markup cursor and optionally exhibits one or more of the other behaviors described herein with respect to the markup cursor) and in accordance with a determination that the user input (e.g., 1254B) that includes hand movement is not detected via a touch-sensitive surface (e.g., the user input is an air gesture and/or is detected via one or more cameras) and that the cursor (e.g., 1252B) is not over the drawing canvas, the cursor updates in a second manner based on the user input, including updating the cursor based on the hand movement and not adding a mark (e.g., not drawing a dot, a line, and/or shape) to the drawing canvas (e.g., the cursor is a hand cursor and optionally exhibits one or more of the other behaviors described herein with respect to the hand cursor), wherein the second manner is different from the first manner. The cursor behavior being different when the cursor is over a canvas as compared to not over a canvas (e.g., when the input is provided via air gestures) provides the user with feedback about the position of the cursor and allows the user to control the cursor differently based on whether the cursor is a markup cursor (over a markup area and/or canvas) or a hand cursor (controlled by hand, but not over a markup area and/or canvas), thereby providing an improved man-machine interface.

In some embodiments, aspects/operations of methods 800, 1000, 1100, and 1300 may be interchanged, substituted, and/or added between these methods. In some embodiments, the cursor is the same cursor in the various methods. In some embodiments, the gestures are the same gestures in the various methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of improving XR experiences, the present technology can be configured to allow users to select to "opt in" or "opt out" of participation in the collection of personal information data during registration for services or anytime thereafter. In another example, users can select not to provide data to improve XR experiences. In yet another example, users can select to limit the length of time data is maintained or entirely prohibit collection of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with a display generation component and one or more input devices, the computer system comprising:
   one or more processors; and
   memory storing one or more programs configured to be executed by the one or more processors, the one or more programs including instructions for:
   detecting, via the one or more input devices, movement of a respective hand of a user of the computer system;
   in response to detecting the movement:
   in accordance with a determination that the movement of the respective hand satisfies a first set of criteria, wherein the first set of criteria includes a first criterion that is satisfied when the movement of the respective hand is movement of a first hand of the user of the computer system different from a second hand of the user of the computer system, changing a position of a cursor based on the movement of the respective hand; and
   in accordance with a determination that the movement of the respective hand does not satisfy the first set of criteria, forgoing changing the position of the cursor based on the movement of the respective hand;
   detecting, via the one or more input devices, a set of one or more inputs corresponding to a request to change the respective hand that controls the cursor;
   in response to detecting the set of one or more inputs, changing the respective hand that controls the cursor from the first hand to the second hand; and
   after detecting the set of one or more inputs:
   detecting, via the one or more input devices, second movement of the respective hand of the user of the computer system; and
   in response to detecting the second movement:
   in accordance with a determination that the respective hand is the second hand, changing the position of the cursor based on the second movement of the respective hand; and
   in accordance with a determination that the respective hand is the first hand, forgoing changing the position of the cursor based on the second movement of the respective hand.

2. The computer system of claim 1, wherein the one or more programs further include instructions for:
   prior to the cursor being displayed, detecting, via the one or more input devices, a first input corresponding to a request to invoke the cursor, wherein the first input is provided by the first hand; and
   in response to detecting the first input, invoking the cursor.

3. The computer system of claim 2, wherein the first input corresponds to a selection of a cursor display selectable user interface object.

4. The computer system of claim 2, wherein the first input corresponds to interaction with displayed content.

5. The computer system of claim 2, wherein the first input corresponds to initiation of a drawing mode in which the cursor can be used to draw marks on one or more virtual objects.

6. The computer system of claim 1, wherein a setting of the computer system specifies which hand of the user is the first hand.

7. The computer system of claim 1, wherein the first set of criteria includes a second criterion that is satisfied when the respective hand is in a first pose during the movement of the respective hand.

8. The computer system of claim 1, wherein the one or more programs further include instructions for:
   before detecting the movement of the respective hand:
   detecting, via the one or more input devices, third movement of the respective hand of the user that satisfies the first set of criteria, wherein the third movement of the respective hand is different from the movement of the respective hand; and
   in response to detecting the third movement, changing the position of the cursor based on the third movement of the respective hand.

9. The computer system of claim 1, wherein the one or more programs further include instructions for:
   in response to detecting the movement:

in accordance with a determination that the movement of the respective hand satisfies a second set of criteria, wherein the second set of criteria includes a second criterion that is satisfied when the movement of the respective hand is movement of the second hand, performing an operation based on the movement of the respective hand.

10. The computer system of claim 9, wherein:
the movement of the respective hand corresponds to a request to select a first user interface object; and
performing the operation based on the movement of the respective hand includes, displaying, via the display generation component, an indication that the first user interface object is selected.

11. The computer system of claim 9, wherein the one or more programs further include instructions for:
before detecting the movement of the respective hand, displaying, via the display generation component, a first user interface that includes a first portion of content and that does not include a second portion of the content, and wherein performing the operation based on the movement of the respective hand includes:
panning the content to display, via the display generation component, the second portion of the content in the first user interface without displaying the first portion of the content in the first user interface.

12. The computer system of claim 9, wherein the one or more programs further include instructions for:
before detecting the movement of the respective hand, displaying, via the display generation component, a first user interface object at a first location, and wherein performing the operation based on the movement of the respective hand includes:
displaying, via the display generation component, the first user interface object at a second location different from the first location.

13. The computer system of claim 9, wherein the one or more programs further include instructions for:
before detecting the movement of the respective hand, displaying, via the display generation component, a first user interface at a first location, and wherein performing the operation based on the movement of the respective hand includes:
moving the first user interface to display, via the display generation component, the first user interface at a second location different from the first location.

14. The computer system of claim 9, wherein the one or more programs further include instructions for:
before detecting the movement of the respective hand, displaying, via the display generation component, a first section of a first user interface without displaying a second section of the first user interface, and wherein performing the operation based on the movement of the respective hand includes:
navigating between the first section and the second section to display, via the display generation component, the second section without displaying the first section.

15. The computer system of claim 9, wherein the second set of criteria includes a third criterion that is satisfied when the respective hand is in a first pose during the movement of the respective hand, and wherein the one or more programs further include instructions for:
in response to detecting the movement:
in accordance with a determination that the movement of the respective hand does not satisfy the second set of criteria, forgoing performing the operation based on the movement of the respective hand.

16. The computer system of claim 1, wherein changing the position of the cursor based on the movement of the respective hand includes displaying the cursor sequentially at different locations that are selected based on a characteristic of the movement of the respective hand.

17. The computer system of claim 1, wherein the one or more programs further include instructions for:
before changing the respective hand that controls the cursor from the first hand to the second hand:
detecting, via the one or more input devices, a gesture performed by the second hand; and
in response to detecting the gesture performed by the second hand:
in accordance with a determination that the gesture performed by the second hand is detected after changing the position of the cursor based on the movement of the respective hand, forgoing performing an operation based on the gesture performed by the second hand.

18. The computer system of claim 1, wherein the one or more programs further include instructions for:
before changing the respective hand that controls the cursor from the first hand to the second hand:
detecting, via the one or more input devices, a gesture performed by the second hand; and
in response to detecting the gesture performed by the second hand:
in accordance with a determination that the gesture performed by the second hand is detected after changing the position of the cursor based on the movement of the respective hand, performing an operation based on the gesture performed by the second hand and the movement of the respective hand.

19. The computer system of claim 18, wherein the one or more programs further include instructions for:
before changing the respective hand that controls the cursor from the first hand to the second hand:
in response to detecting the movement of the respective hand:
in accordance with a determination that the movement of the respective hand satisfies the first set of criteria, displaying, via the display generation component, a marking generated based on the movement of the respective hand; and
in response to detecting the gesture performed by the second hand:
in accordance with a determination that the gesture performed by the second hand is detected after changing the position of the cursor based on the movement of the respective hand, ceasing to display, via the display generation component, the marking.

20. The computer system of claim 1, wherein the one or more programs further include instructions for:
before changing the respective hand that controls the cursor from the first hand to the second hand:
detecting, via the one or more input devices, a gesture performed by the second hand; and
in response to detecting the gesture performed by the second hand:
in accordance with a determination that the gesture performed by the second hand is detected within a predetermined duration after changing the position of the cursor based on the movement of the respective hand, performing an operation based on the gesture performed by the second hand and the movement of the respective hand; and in accordance with a determination that the gesture performed by the second hand is detected after the predetermined duration from when the position of the cursor changed based on the movement of the respective hand, forgoing performing the operation based on the gesture performed by the second hand.

21. The computer system of claim 1, wherein the one or more programs further include instructions for:
before changing the respective hand that controls the cursor from the first hand to the second hand:
detecting, via the one or more input devices, a first gesture performed by the first hand;
detecting, via the one or more input devices, a second gesture performed by the second hand; and
in response to detecting the first gesture and the second gesture:
in accordance with a determination that the second gesture is detected before the first gesture is detected, performing an operation based on the first gesture and the second gesture.

22. The computer system of claim 21, wherein the one or more programs further include instructions for:
before changing the respective hand that controls the cursor from the first hand to the second hand:
detecting, via the one or more input devices, an end of the second gesture; and
in response to detecting the end of the second gesture:
in accordance with a determination that the first gesture continues after detecting the end of the second gesture, performing a second operation based on the continued first gesture without changing the location of the cursor based on the continued first gesture.

23. The computer system of claim 1, wherein the set of one or more inputs includes:
a pinch and release input performed by the second hand or a double pinch and release input performed by the second hand.

24. The computer system of claim 1, wherein the set of one or more inputs includes an input selecting a user interface object.

25. A non-transitory computer-readable storage medium storing one or more programs configured to be executed by one or more processors of a computer system that is in communication with a display generation component and one or more input devices, the one or more programs including instructions for:
detecting, via the one or more input devices, movement of a respective hand of a user of the computer system;
in response to detecting the movement:
in accordance with a determination that the movement of the respective hand satisfies a first set of criteria, wherein the first set of criteria includes a first criterion that is satisfied when the movement of the respective hand is movement of a first hand of the user of the computer system different from a second hand of the user of the computer system, changing a position of a cursor based on the movement of the respective hand; and
in accordance with a determination that the movement of the respective hand does not satisfy the first set of criteria, forgoing changing the position of the cursor based on the movement of the respective hand;

detecting, via the one or more input devices, a set of one or more inputs corresponding to a request to change the respective hand that controls the cursor;
in response to detecting the set of one or more inputs, changing the respective hand that controls the cursor from the first hand to the second hand; and
after detecting the set of one or more inputs:
detecting, via the one or more input devices, second movement of the respective hand of the user of the computer system; and
in response to detecting the second movement:
in accordance with a determination that the respective hand is the second hand, changing the position of the cursor based on the second movement of the respective hand; and
in accordance with a determination that the respective hand is the first hand, forgoing changing the position of the cursor based on the second movement of the respective hand.

26. A method, comprising:
at a computer system that is in communication with a display generation component and one or more input devices:
detecting, via the one or more input devices, movement of a respective hand of a user of the computer system;
in response to detecting the movement:
in accordance with a determination that the movement of the respective hand satisfies a first set of criteria, wherein the first set of criteria includes a first criterion that is satisfied when the movement of the respective hand is movement of a first hand of the user of the computer system different from a second hand of the user of the computer system, changing a position of a cursor based on the movement of the respective hand; and
in accordance with a determination that the movement of the respective hand does not satisfy the first set of criteria, forgoing changing the position of the cursor based on the movement of the respective hand;
detecting, via the one or more input devices, a set of one or more inputs corresponding to a request to change the respective hand that controls the cursor;
in response to detecting the set of one or more inputs, changing the respective hand that controls the cursor from the first hand to the second hand; and
after detecting the set of one or more inputs:
detecting, via the one or more input devices, second movement of the respective hand of the user of the computer system; and
in response to detecting the second movement:
in accordance with a determination that the respective hand is the second hand, changing the position of the cursor based on the second movement of the respective hand; and
in accordance with a determination that the respective hand is the first hand, forgoing changing the position of the cursor based on the second movement of the respective hand.

27. The non-transitory computer-readable storage medium of claim 25, wherein the one or more programs further include instructions for:
prior to the cursor being displayed, detecting, via the one or more input devices, a first input corresponding to a request to invoke the cursor, wherein the first input is provided by the first hand; and in response to detecting the first input, invoking the cursor.

28. The non-transitory computer-readable storage medium of claim 27, wherein the first input corresponds to a selection of a cursor display selectable user interface object.

29. The non-transitory computer-readable storage medium of claim 27, wherein the first input corresponds to interaction with displayed content.

30. The non-transitory computer-readable storage medium of claim 27, wherein the first input corresponds to initiation of a drawing mode in which the cursor can be used to draw marks on one or more virtual objects.

31. The non-transitory computer-readable storage medium of claim 25, wherein a setting of the computer system specifies which hand of the user is the first hand.

32. The non-transitory computer-readable storage medium of claim 25, wherein the first set of criteria includes a second criterion that is satisfied when the respective hand is in a first pose during the movement of the respective hand.

33. The non-transitory computer-readable storage medium of claim 25, wherein the one or more programs further include instructions for:
  before detecting the movement of the respective hand:
    detecting, via the one or more input devices, third movement of the respective hand of the user that satisfies the first set of criteria, wherein the third movement of the respective hand is different from the movement of the respective hand; and
    in response to detecting the third movement, changing the position of the cursor based on the third movement of the respective hand.

34. The non-transitory computer-readable storage medium of claim 25, wherein the one or more programs further include instructions for:
  in response to detecting the movement:
    in accordance with a determination that the movement of the respective hand satisfies a second set of criteria, wherein the second set of criteria includes a second criterion that is satisfied when the movement of the respective hand is movement of the second hand, performing an operation based on the movement of the respective hand.

35. The non-transitory computer-readable storage medium of claim 34, wherein:
  the movement of the respective hand corresponds to a request to select a first user interface object; and
  performing the operation based on the movement of the respective hand includes, displaying, via the display generation component, an indication that the first user interface object is selected.

36. The non-transitory computer-readable storage medium of claim 34, wherein the one or more programs further include instructions for:
  before detecting the movement of the respective hand, displaying, via the display generation component, a first user interface that includes a first portion of content and that does not include a second portion of the content, and wherein performing the operation based on the movement of the respective hand includes:
    panning the content to display, via the display generation component, the second portion of the content in the first user interface without displaying the first portion of the content in the first user interface.

37. The non-transitory computer-readable storage medium of claim 34, wherein the one or more programs further include instructions for:
  before detecting the movement of the respective hand, displaying, via the display generation component, a first user interface object at a first location, and wherein performing the operation based on the movement of the respective hand includes:
    displaying, via the display generation component, the first user interface object at a second location different from the first location.

38. The non-transitory computer-readable storage medium of claim 34, wherein the one or more programs further include instructions for:
  before detecting the movement of the respective hand, displaying, via the display generation component, a first user interface at a first location, and wherein performing the operation based on the movement of the respective hand includes:
    moving the first user interface to display, via the display generation component, the first user interface at a second location different from the first location.

39. The non-transitory computer-readable storage medium of claim 34, wherein the one or more programs further include instructions for:
  before detecting the movement of the respective hand, displaying, via the display generation component, a first section of a first user interface without displaying a second section of the first user interface, and wherein performing the operation based on the movement of the respective hand includes:
    navigating between the first section and the second section to display, via the display generation component, the second section without displaying the first section.

40. The non-transitory computer-readable storage medium of claim 34, wherein the second set of criteria includes a third criterion that is satisfied when the respective hand is in a first pose during the movement of the respective hand, and wherein the one or more programs further include instructions for:
  in response to detecting the movement:
    in accordance with a determination that the movement of the respective hand does not satisfy the second set of criteria, forgoing performing the operation based on the movement of the respective hand.

41. The non-transitory computer-readable storage medium of claim 25, wherein changing the position of the cursor based on the movement of the respective hand includes displaying the cursor sequentially at different locations that are selected based on a characteristic of the movement of the respective hand.

42. The non-transitory computer-readable storage medium of claim 25, wherein the one or more programs further include instructions for:
  before changing the respective hand that controls the cursor from the first hand to the second hand:
    detecting, via the one or more input devices, a gesture performed by the second hand; and
    in response to detecting the gesture performed by the second hand:
      in accordance with a determination that the gesture performed by the second hand is detected after changing the position of the cursor based on the movement of the respective hand, forgoing performing an operation based on the gesture performed by the second hand.

43. The non-transitory computer-readable storage medium of claim 25, wherein the one or more programs further include instructions for:

before changing the respective hand that controls the cursor from the first hand to the second hand:
  detecting, via the one or more input devices, a gesture performed by the second hand; and
  in response to detecting the gesture performed by the second hand:
    in accordance with a determination that the gesture performed by the second hand is detected after changing the position of the cursor based on the movement of the respective hand, performing an operation based on the gesture performed by the second hand and the movement of the respective hand.

44. The non-transitory computer-readable storage medium of claim 43, wherein the one or more programs further include instructions for:
before changing the respective hand that controls the cursor from the first hand to the second hand:
  in response to detecting the movement of the respective hand:
    in accordance with a determination that the movement of the respective hand satisfies the first set of criteria, displaying, via the display generation component, a marking generated based on the movement of the respective hand; and
  in response to detecting the gesture performed by the second hand:
    in accordance with a determination that the gesture performed by the second hand is detected after changing the position of the cursor based on the movement of the respective hand, ceasing to display, via the display generation component, the marking.

45. The non-transitory computer-readable storage medium of claim 25, wherein the one or more programs further include instructions for:
before changing the respective hand that controls the cursor from the first hand to the second hand:
  detecting, via the one or more input devices, a gesture performed by the second hand; and
  in response to detecting the gesture performed by the second hand:
    in accordance with a determination that the gesture performed by the second hand is detected within a predetermined duration after changing the position of the cursor based on the movement of the respective hand, performing an operation based on the gesture performed by the second hand and the movement of the respective hand; and
    in accordance with a determination that the gesture performed by the second hand is detected after the predetermined duration from when the position of the cursor changed based on the movement of the respective hand, forgoing performing the operation based on the gesture performed by the second hand.

46. The non-transitory computer-readable storage medium of claim 25, wherein the one or more programs further include instructions for:
before changing the respective hand that controls the cursor from the first hand to the second hand:
  detecting, via the one or more input devices, a first gesture performed by the first hand;
  detecting, via the one or more input devices, a second gesture performed by the second hand; and
  in response to detecting the first gesture and the second gesture, in accordance with a determination that the second gesture is detected before the first gesture is detected, performing an operation based on the first gesture and the second gesture.

47. The non-transitory computer-readable storage medium of claim 46, wherein the one or more programs further include instructions for:
before changing the respective hand that controls the cursor from the first hand to the second hand:
  detecting, via the one or more input devices, an end of the second gesture; and
  in response to detecting the end of the second gesture:
    in accordance with a determination that the first gesture continues after detecting the end of the second gesture, performing a second operation based on the continued first gesture without changing the location of the cursor based on the continued first gesture.

48. The non-transitory computer-readable storage medium of claim 25, wherein the set of one or more inputs includes:
a pinch and release input performed by the second hand or a double pinch and release input performed by the second hand.

49. The non-transitory computer-readable storage medium of claim 25, wherein the set of one or more inputs includes an input selecting a user interface object.

50. The method of claim 26, further comprising:
prior to the cursor being displayed, detecting, via the one or more input devices, a first input corresponding to a request to invoke the cursor, wherein the first input is provided by the first hand; and
in response to detecting the first input, invoking the cursor.

51. The method of claim 50, wherein the first input corresponds to a selection of a cursor display selectable user interface object.

52. The method of claim 50, wherein the first input corresponds to interaction with displayed content.

53. The method of claim 50, wherein the first input corresponds to initiation of a drawing mode in which the cursor can be used to draw marks on one or more virtual objects.

54. The method of claim 26, wherein a setting of the computer system specifies which hand of the user is the first hand.

55. The method of claim 26, wherein the first set of criteria includes a second criterion that is satisfied when the respective hand is in a first pose during the movement of the respective hand.

56. The method of claim 26, further comprising:
before detecting the movement of the respective hand:
  detecting, via the one or more input devices, third movement of the respective hand of the user that satisfies the first set of criteria, wherein the third movement of the respective hand is different from the movement of the respective hand; and
  in response to detecting the third movement, changing the position of the cursor based on the third movement of the respective hand.

57. The method of claim 26, further comprising:
in response to detecting the movement:
  in accordance with a determination that the movement of the respective hand satisfies a second set of criteria, wherein the second set of criteria includes a second criterion that is satisfied when the movement of the respective hand is movement of the second hand, performing an operation based on the movement of the respective hand.

58. The method of claim 57, wherein:
the movement of the respective hand corresponds to a request to select a first user interface object; and
performing the operation based on the movement of the respective hand includes, displaying, via the display generation component, an indication that the first user interface object is selected.

59. The method of claim 57, further comprising:
before detecting the movement of the respective hand, displaying, via the display generation component, a first user interface that includes a first portion of content and that does not include a second portion of the content, and wherein performing the operation based on the movement of the respective hand includes:
panning the content to display, via the display generation component, the second portion of the content in the first user interface without displaying the first portion of the content in the first user interface.

60. The method of claim 57, further comprising:
before detecting the movement of the respective hand, displaying, via the display generation component, a first user interface object at a first location, and wherein performing the operation based on the movement of the respective hand includes:
displaying, via the display generation component, the first user interface object at a second location different from the first location.

61. The method of claim 57, further comprising:
before detecting the movement of the respective hand, displaying, via the display generation component, a first user interface at a first location, and wherein performing the operation based on the movement of the respective hand includes:
moving the first user interface to display, via the display generation component, the first user interface at a second location different from the first location.

62. The method of claim 57, further comprising:
before detecting the movement of the respective hand, displaying, via the display generation component, a first section of a first user interface without displaying a second section of the first user interface, and wherein performing the operation based on the movement of the respective hand includes:
navigating between the first section and the second section to display, via the display generation component, the second section without displaying the first section.

63. The method of claim 57, wherein the second set of criteria includes a third criterion that is satisfied when the respective hand is in a first pose during the movement of the respective hand, and wherein the method further comprises:
in response to detecting the movement:
in accordance with a determination that the movement of the respective hand does not satisfy the second set of criteria, forgoing performing the operation based on the movement of the respective hand.

64. The method of claim 26, wherein changing the position of the cursor based on the movement of the respective hand includes displaying the cursor sequentially at different locations that are selected based on a characteristic of the movement of the respective hand.

65. The method of claim 26, further comprising:
before changing the respective hand that controls the cursor from the first hand to the second hand:
detecting, via the one or more input devices, a gesture performed by the second hand; and
in response to detecting the gesture performed by the second hand:
in accordance with a determination that the gesture performed by the second hand is detected after changing the position of the cursor based on the movement of the respective hand, forgoing performing an operation based on the gesture performed by the second hand.

66. The method of claim 26, further comprising:
before changing the respective hand that controls the cursor from the first hand to the second hand:
detecting, via the one or more input devices, a gesture performed by the second hand; and
in response to detecting the gesture performed by the second hand:
in accordance with a determination that the gesture performed by the second hand is detected after changing the position of the cursor based on the movement of the respective hand, performing an operation based on the gesture performed by the second hand and the movement of the respective hand.

67. The method of claim 66, further comprising:
before changing the respective hand that controls the cursor from the first hand to the second hand:
in response to detecting the movement of the respective hand:
in accordance with a determination that the movement of the respective hand satisfies the first set of criteria, displaying, via the display generation component, a marking generated based on the movement of the respective hand; and
in response to detecting the gesture performed by the second hand:
in accordance with a determination that the gesture performed by the second hand is detected after changing the position of the cursor based on the movement of the respective hand, ceasing to display, via the display generation component, the marking.

68. The method of claim 26, further comprising:
before changing the respective hand that controls the cursor from the first hand to the second hand:
detecting, via the one or more input devices, a gesture performed by the second hand; and
in response to detecting the gesture performed by the second hand:
in accordance with a determination that the gesture performed by the second hand is detected within a predetermined duration after changing the position of the cursor based on the movement of the respective hand, performing an operation based on the gesture performed by the second hand and the movement of the respective hand; and
in accordance with a determination that the gesture performed by the second hand is detected after the predetermined duration from when the position of the cursor changed based on the movement of the respective hand, forgoing performing the operation based on the gesture performed by the second hand.

69. The method of claim 26, further comprising:
before changing the respective hand that controls the cursor from the first hand to the second hand:

detecting, via the one or more input devices, a first gesture performed by the first hand;

detecting, via the one or more input devices, a second gesture performed by the second hand; and in response to detecting the first gesture and the second gesture, in accordance with a determination that the second gesture is detected before the first gesture is detected, performing an operation based on the first gesture and the second gesture.

70. The method of claim 69, further comprising:

before changing the respective hand that controls the cursor from the first hand to the second hand:

detecting, via the one or more input devices, an end of the second gesture; and in response to detecting the end of the second gesture:
in accordance with a determination that the first gesture continues after detecting the end of the second gesture, performing a second operation based on the continued first gesture without changing the location of the cursor based on the continued first gesture.

71. The method of claim 26, wherein the set of one or more inputs includes:

a pinch and release input performed by the second hand or a double pinch and release input performed by the second hand.

72. The method of claim 26, wherein the set of one or more inputs includes an input selecting a user interface object.

\* \* \* \* \*